US012738078B2

(12) United States Patent
Phalak

(10) Patent No.: US 12,738,078 B2
(45) **Date of Patent: *Sep. 15, 2026**

(54) SYSTEMS AND METHODS FOR EFFICIENT FLOORPLAN GENERATION FROM 3D SCANS OF INDOOR SCENES

(71) Applicant: MAGIC LEAP, INC., Plantation, FL (US)

(72) Inventor: Ameya Pramod Phalak, Sunnyvale, CA (US)

(73) Assignee: Magic Leap, Inc., Plantation, FL (US)

( * ) Notice: Subject to any disclaimer, the term of this patent is extended or adjusted under 35 U.S.C. 154(b) by 201 days.

This patent is subject to a terminal disclaimer.

(21) Appl. No.: 18/414,163

(22) Filed: Jan. 16, 2024

(65) Prior Publication Data

US 2024/0203138 A1 Jun. 20, 2024

Related U.S. Application Data

(63) Continuation of application No. 17/190,889, filed on Mar. 3, 2021, now Pat. No. 11,928,873.

(Continued)

(51) Int. Cl.

| | |
|---|---|
| ***G06V 20/64*** | (2022.01) |
| ***G06F 18/23*** | (2023.01) |
| ***G06F 18/2431*** | (2023.01) |
| ***G06T 7/55*** | (2017.01) |
| ***G06T 17/00*** | (2006.01) |

(Continued)

(52) U.S. Cl.

CPC .............. *G06V 20/64* (2022.01); *G06F 18/23* (2023.01); *G06F 18/2431* (2023.01); *G06T 7/55* (2017.01); *G06T 17/00* (2013.01); *G06V 10/7625* (2022.01); *G06V 20/20* (2022.01); *G06T 2207/10024* (2013.01);

(Continued)

(58) Field of Classification Search

CPC .... G06F 18/23; G06F 18/231; G06F 18/2431; G06T 17/00; G06T 2207/10024; G06T 2207/10028; G06T 2207/20081; G06T 2207/20084; G06T 2210/04; G06T 7/55; G06V 10/7625; G06V 20/20; G06V 20/64

See application file for complete search history.

(56) References Cited

U.S. PATENT DOCUMENTS

2016/0055268 A1 2/2016 Bell et al.
2018/0315162 A1 11/2018 Sturm et al.

(Continued)

FOREIGN PATENT DOCUMENTS

CN 110633640 12/2019

OTHER PUBLICATIONS

Foreign NOA for JP Patent Appln. No. 2022-552796 dated Feb. 21, 2025.

(Continued)

*Primary Examiner* — Sing-Wai Wu

(74) *Attorney, Agent, or Firm* — Vista IP Law Group, LLP

(57) ABSTRACT

Methods, systems, and wearable extended reality devices for generating a floorplan of an indoor scene are provided. A room classification of a room and a wall classification of a wall for the room may be determined from an input image of the indoor scene. A floorplan may be determined based at least in part upon the room classification and the wall classification without constraining a total number of rooms in the indoor scene or a size of the room.

17 Claims, 56 Drawing Sheets

Related U.S. Application Data

(60) Provisional application No. 62/985,263, filed on Mar. 4, 2020.

(51) Int. Cl.
*G06V 10/762* (2022.01)
*G06V 20/20* (2022.01)

(52) U.S. Cl.
CPC .............. *G06T 2207/10028* (2013.01); *G06T 2207/20081* (2013.01); *G06T 2210/04* (2013.01)

(56) References Cited

U.S. PATENT DOCUMENTS

| | | | |
|---|---|---|---|
| 2018/0330184 A1 | 11/2018 | Mehr et al. | |
| 2019/0026957 A1 | 1/2019 | Gausebeck | |
| 2019/0035099 A1 | 1/2019 | Ebrahimi Afrouzi et al. | |
| 2019/0147220 A1* | 5/2019 | Mccormac | G06V 10/7715 382/103 |
| 2019/0197777 A1 | 6/2019 | Steinbrucker et al. | |
| 2021/0225090 A1 | 7/2021 | Tang et al. | |
| 2022/0319106 A1* | 10/2022 | Totty | G06T 15/205 |

OTHER PUBLICATIONS

Foreign OA for JP Patent Appln. No. 2022-552796 dated Nov. 1, 2024.
Foreign OA for CN Patent Appln. No. 202180032804.8 dated Jul. 22, 2025.
English Translation of Foreign OA for CN Patent Appln. No. 202180032804.8 dated Jul. 22, 2025.
Foreign OA Response for JP Patent Appln. No. 2022-552796 dated Jan. 27, 2025.
Foreign OA for JP Patent Appln. No. 2022-552796 dated Jun. 27, 2024 (with English translation).
Foreign Response for EP Patent Appln. No. 21763943.4 dated Feb. 20, 2024.
Foreign OA Response for JP Patent Appln. No. 2022-552796 dated Sep. 20, 2024.
Final Office Action for U.S. Appl. No. 17/190,889 dated Nov. 3, 2022.
Non-Final Office Action for U.S. Appl. No. 17/190,889 dated Mar. 13, 2023.
Non-Final Office Action for U.S. Appl. No. 17/190,889 dated Jun. 27, 2022.
Amendment Response to FOA for U.S. Appl. No. 17/190,889 dated Jan. 3, 2023.
Amendment Response to FOA for U.S. Appl. No. 17/190,889 dated Jun. 13, 2023.
Amendment Response to FOA for U.S. Appl. No. 17/190,889 dated Sep. 27, 2022.
Notice of Allowance for U.S. Appl. No. 17/190,889 dated Oct. 17, 2023.
Notice of Allowance for U.S. Appl. No. 17/190,889 dated Aug. 9, 2023.
Richter et al., "Constructing Hierarchical Representations of Indoor Spaces", 2009 Tenth International Conference on Mobile Data Management: Systems, Services and Middleware, IEEE Computer Society, p. 686-691. (Year: 2009).
Arayici et al., "Building Information Modelling (BIM) for Facilities Management (FM): The Mediacity Case Study Approach", International Journal of3-D Information Modeling, 1(1) 55-73, Jan.-Mar. 2012. (Year: 2012).
PCT International Search Report and Written Opinion for International Appln. No. PCT/US21/20668, Applicant Magic Leap, Inc., dated May 24, 2021 (15 pages).
Ankerst, M., et al., "OPTICS: Ordering Points To Identify the Clustering Structure," Proc. ACM SIGMOD'99 Int. Conf. on Management of Data, Philadelphia PA, 1999.
Avetisya, A., et al., "Scan2CAD: Learning CAD Model Alignment in RGB-D Scans," dated Nov. 27, 2018.
Ayad, H., et al., "Cumulative Voting Consensus Method for Partitions with a Variable Number of Clusters," IEEE Transactions on Pattern Analysis and Machine Intelligence, vol. 30, No. 1, Jan. 2008.
Caron, M., et al., "Deep Clustering for Unsupervised Learning of Visual Features," Facebook AI Research, dated Mar. 18, 2019.
Choy, C., et al., "4D Spatio-Temporal ConvNets: Minkowski Convolutional Neural Networks," dated Jun. 13, 2019.
G. A. Croes, "A Method for Solving Traveling-Salesman Problems," Operations Research 6(6):791-812. https://doi.org/10.1287/opre.6.6.791 (1958).
Dai, A., et al., "ScanComplete: Large-Scale Scene Completion and Semantic Segmentation for 3D Scans," dated Mar. 28, 2018.
Dasgupta, S., et al., "DeLay: Robust Spatial Layout Estimation for Cluttered Indoor Scenes," Stanford University, dated 2016.
Derpanis, K., "Mean Shift Clustering," dated Aug. 15, 2005.
Weingessel, A., et al., "An Ensemble Method for Clustering," DSC 2003 Working Papers, dated 2003.
Ester, M., et al., "A Density-Based Algorithm for Discovering Clusters in Large Spatial Databases with Noise," Institute for Computer Science, University of Munich, copyright 1996.
Fischler, M., et al., "Random Sample Consensus: A Paradigm for Model Fitting with Applications to Image Analysis and Automated Cartography," Communications of the ACM, Jun. 1981, vol. 24, No. 6.
Gkioxari, G., et al., "Mesh R-CNN," dated Jan. 25, 2020.
Graham, B., et al., "3D Semantic Segmentation with Submanifold Sparse Convolutional Networks," dated Nov. 29, 2017.
He, K., et al., "Mask R-CNN," Facebook AI Research (FAIR), dated Jan. 24, 2018.
Hsiao, C., et al., "Flat2Layout: Flat Representation for Estimating Layout of General Room Types," dated May 29, 2019.
Hirschmuller, H., "Stereo Processing by Semi-Global Matching and Mutual Information," IEEE Transactions on Pattern Analysis and Machine Intelligence, copyright 2007.
"3D-SIC: 3D Semantic Instance Completion for RGB-D Scans," ICLR, 2020.
Chen, J. et al., "Floor-SP: Inverse CAD for Floorplans by Sequential Room-wise Shortest Path," dated Aug. 19, 2019.
Hou, Y., Multi-View Stereo by Temporal Nonparametric Fusion, Department of Computer Science, Aalto University, Finland, Aug. 16, 2019.
Kruzhilov, I., et al., "Double Refinement Network for Room Layout Estimation," Preprints, dated May 22, 2019.
Lee, C., et al. "RoomNet: End-to-End Room Layout Estimation," Magic Leap, Inc., Aug. 7, 2017.
Huang, P., et al., "DeepMVS: Learning Multi-view Stereopsis," dated Apr. 2, 2018.
Li, Y., et al., "PointCNN: Convolution On X-Transformed Points," Preprint, dated Nov. 5, 2018.
Liu, C., et al., "FloorNet: A Unied Framework for Floorplan Reconstruction from 3D Scans," dated Mar. 31, 2018.
Liu, W., et al., "SSD: Single Shot MultiBox Detector," Dec. 29, 2016.
Murali, S., et al., "Indoor Scan2BIM: Building Information Models of House Interiors," dated 2017.
Ng, A., et al., "On Spectral Clustering: Analysis and an algorithm," dated 2001.
Phalak, A., et al., "DeepPerimeter: Indoor Boundary Estimation from Posed Monocular Sequences," Magic Leap, Inc., dated Jul. 1, 2019.
Wu, B., et al., "DGCNN: Disordered Graph Convolutional Neural Network Based on the Gaussian Mixture Model," State Key Laboratory of Software Development Environment, Beihang University, P.R.China, dated Dec. 10, 2017.
Qi, C., et al., "Deep Hough Voting for 3D Object Detection in Point Clouds," dated Aug. 22, 2019.
Qi, C., et al., "PointNet: Deep Learning on Point Sets for 3D Classification and Segmentation," dated Apr. 10, 2017.

(56) References Cited

OTHER PUBLICATIONS

Qi, C., et al., "PointNet++: Deep Hierarchical Feature Learning on Point Sets in a Metric Space," Stanford University, dated Jun. 7, 2017.
Qi, X., et al., "3D Graph Neural Networks for RGBD Semantic Segmentation," dated 2017.
Redmon, J., et al., "You Only Look Once: Unified, Real-Time Object Detection," dated May 9, 2016.
Ren, S., et al., "Faster R-CNN: Towards Real-Time Object Detection with Region Proposal Networks," dated Jan. 6, 2016.
Schubert, E., et al., "DBSCAN Revisited, Revisited: Why and How You Should (Still) Use DBSCAN," ACM Transactions on Database Systems, vol. 42, No. 3, Article 19. Publication date: Jul. 2017.
Shen, Y., et al., "Mining Point Cloud Local Structures by Kernel Correlation and Graph Pooling," dated Apr. 3, 2018.
Shukla, A., et al., "Semi-Supervised Clustering with Neural Networks," IIIT-Delhi, India, dated Jul. 10, 2018.
Tatarchenko, M., et al., "Octree Generating Networks: Efficient Convolutional Architectures for High-resolution 3D Outputs," dated Aug. 7, 2017.
Wang, P., et al., "O-CNN: Octree-based Convolutional Neural Networks for 3D Shape Analysis," ACM Transactions on Graphics, vol. 36, No. 4, Article 72. Publication date: Jul. 2017.
Wang, Y., et al., "Dynamic Graph CNN for Learning on Point Clouds," ACM Trans. Graph., vol. 1, No. 1, Article 1. Publication date: Jan. 2019.
Xie, J., et al., "Unsupervised Deep Embedding for Clustering Analysis," Proceedings of the 33 rd International Conference on Machine Learning, New York, NY, USA, 2016. MLR: W&CP vol. 48. Copyright 2016.
Zhang, J., et al., "Estimating the 3D Layout of Indoor Scenes and its Clutter from Depth Sensors," Stanford University, dated 2013.
Zhang, T., et al., "BIRCH: A New Data Clustering Algorithm and Its Applications," Data Mining and Knowledge Discovery, 1, 141-182 (1997), copyright 1997 Kluwer Academic Publishers.
Zhang, W., et al., "Edge-Semantic Learning Strategy for Layout Estimation in Indoor Environment," School of Control Science and Engineering, Shandong University, Jinan, Shandong, dated Jan. 3, 2019.
Zhao, H., et al., "Pyramid Scene Parsing Network," dated Apr. 27, 2017.
Zheng, J., et al., "Structured3D: A Large Photo-realistic Dataset for Structured 3D Modeling," dated Jul. 17, 2020.
Zhou, Y., et al., "VoxelNet: End-to-End Learning for Point Cloud Based 3D Object Detection," dated Nov. 17, 2017.
Zou, C., et al., "LayoutNet: Reconstructing the 3D Room Layout from a Single RGB Image," dated Mar. 23, 2018.
Extended European Search Report for EP Patent Appln. No. 21763943.4 dated Jul. 25, 2023.
Ameya Phalak et al: "DeepPerimeter: Indoor Boundary Estimation from Posed Monocular Sequences", arxiv.org, Cornell University Library, 201 Olin Library Cornell University Ithaca, NY 14853, Apr. 25, 2019 (Apr. 25, 2019), xp081387534, * section 3, section 4, section 8 *.
Cui Yang et al: "Automatic 3-D Reconstruction of Indoor Environment With Mobile Laser Scanning Point Clouds", IEEE Journal of Selected Topics in Applied Earth Observations and Remote Sensing, IEEE, USA, vol. 12 , No. 8, Aug. 1, 2019 (Aug. 1, 2019) , pp. 3117-3130, XP011746833, ISSN: 1939-1404 , 001 : 10.1109/ JSTARS.2019 . 2918937 [retrieved on Sep. 20, 2019] * section II-section III *.
Foreign Exam Report for EP Patent Appln. No. 21 763 943.4 dated Jul. 27, 2026.

* cited by examiner

| POINT | x | y |
|---|---|---|
| 1 | 0 | 0 |
| 2 | 1 | 1 |
| 3 | 2 | 2 |
| 4 | 3 | 2 |
| 5 | 3 | 3 |
| 6 | 4 | 4 |
| 7 | 10 | 2 |

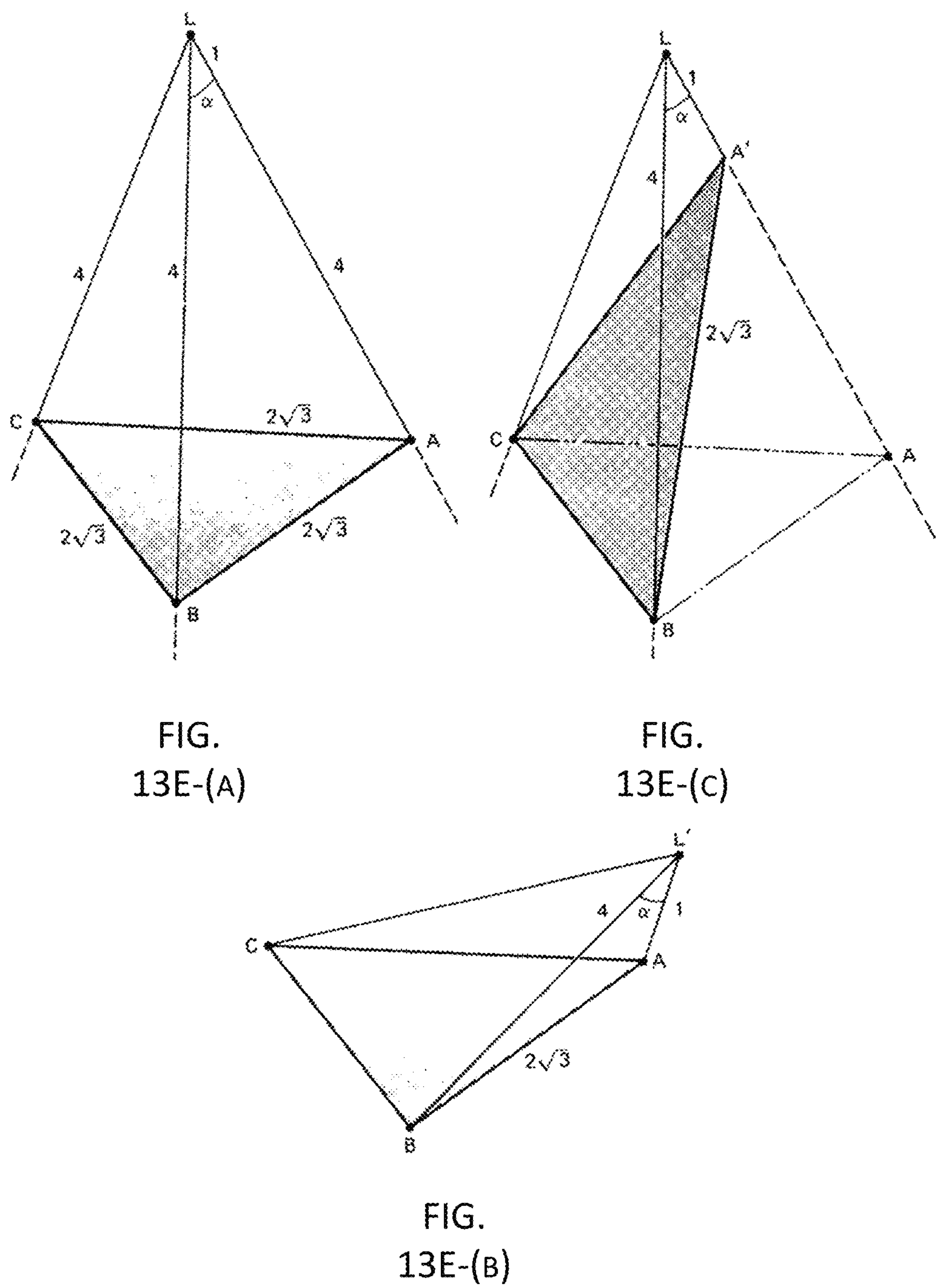
FIG. 13E-(A)
FIG. 13E-(C)
FIG. 13E-(B)

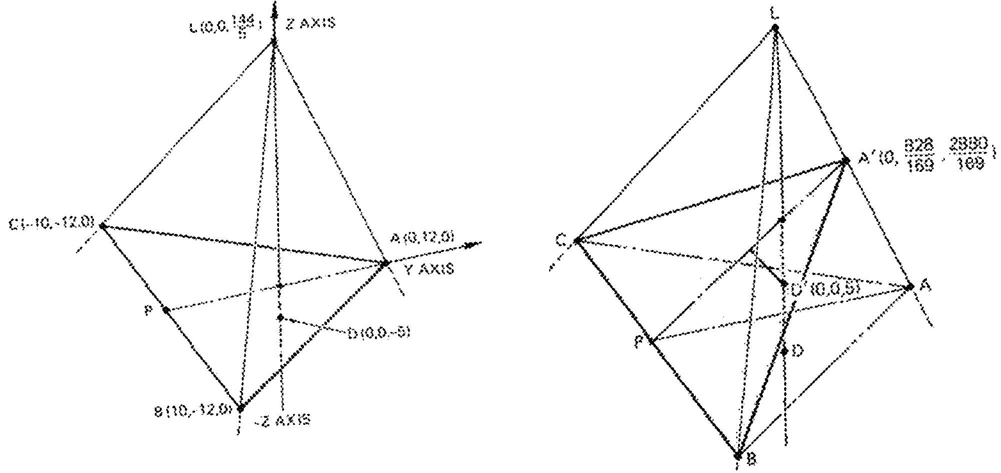
FIG. 13F-(A)
FIG. 13F-(C)
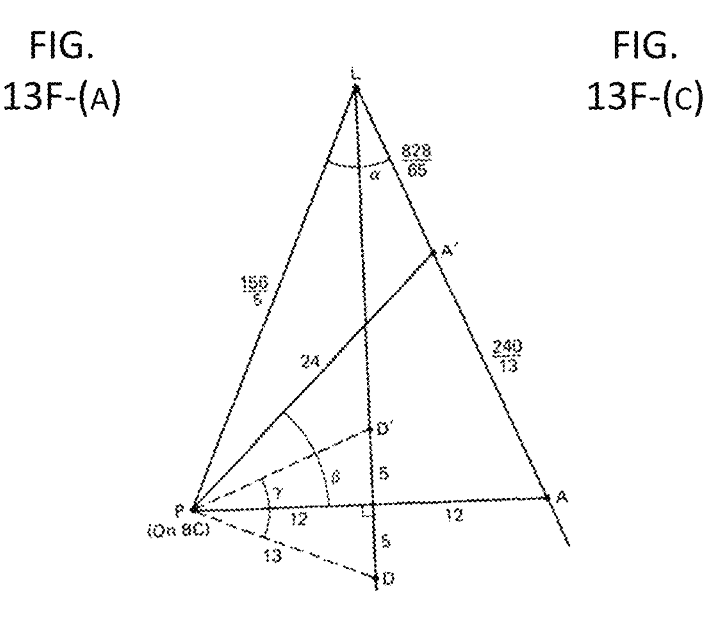
FIG. 13F-(B)

1402D
1404D
1406D 1450D
1408D Pooling
1430D
1432D
1434D
1436D
1412D Conv.
1414D Conv.
1416D Conv.
1418D Conv.
1420D Up-Sampling
1422D
1428D
1426D Conv.

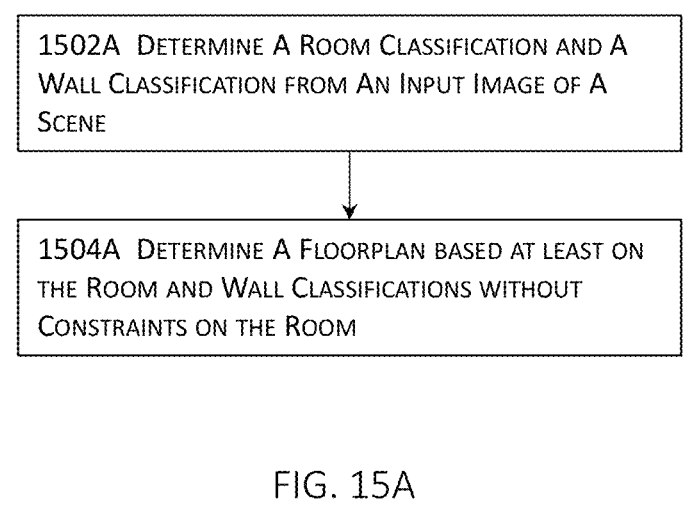

1502A DETERMINE A ROOM CLASSIFICATION AND A WALL CLASSIFICATION FROM AN INPUT IMAGE OF A SCENE

1504A DETERMINE A FLOORPLAN BASED AT LEAST ON THE ROOM AND WALL CLASSIFICATIONS WITHOUT CONSTRAINTS ON THE ROOM

FIG. 15A

SYSTEMS AND METHODS FOR EFFICIENT FLOORPLAN GENERATION FROM 3D SCANS OF INDOOR SCENES

CROSS REFERENCE TO RELATED APPLICATIONS

This application is a continuation of U.S. patent application Ser. No. 17/190,889, entitled "SYSTEMS AND METHODS FOR EFFICIENT FLOORPLAN GENERATION FROM 3D SCANS OF INDOOR SCENES," filed Mar. 3, 2021, which claims the benefit of U.S. Prov. Patent Application Ser. No. 62/985,263 filed on Mar. 4, 2020 and entitled "SYSTEMS AND METHODS FOR EFFICIENT FLOORPLAN GENERATION FROM 3D SCANS OF INDOOR SCENES". This application is also related to International Application No. PCT/US2021/020668 having the title "SYSTEMS AND METHODS FOR EFFICIENT FLOORPLAN GENERATION FROM 3D SCANS OF INDOOR SCENES" and filed Mar. 3, 2021. The contents of the aforementioned U.S. Patent Applications, U.S. Prov. Patent Applications, and International Applications are hereby expressly incorporated by reference in their entireties for all purposes.

TECHNICAL FIELD

This application is related to computing, learning network configurations, and connected mobile computing systems, methods, and configurations, and more specifically to mobile computing systems, methods, and configurations featuring at least one wearable component which may be utilized for virtual and/or augmented reality operation.

DESCRIPTION OF THE RELATED ART

Computers may control human user interfaces to create a Cross Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

Estimating room layout or floorplan is a fundamental indoor scene understanding problem with applications to a wide range of tasks such as scene reconstruction, indoor localization and augmented reality. Room layout or floorplan estimation from an image aims to delineate a 2D boxy representation of an indoor scene, is an important step for a wide variety of computer vision tasks, and has recently received great attention from several applications. These include indoor navigation, scene reconstruction/rendering, augmented reality, etc. This field of room layout estimation has been primarily focused on using bottom-up image features such as local color, texture, and edge cues followed by vanishing point detection. A separate post-processing stage is used to clean up feature outliers and generate/rank a large set of room layout hypotheses with structured SVMs (Support Vector Machines) or conditional random fields (CRFs).

In principle, the 3D reconstruction of the room layout can be obtained (up to scale) with knowledge of the 2D layout and the vanishing points. However, in practice, the accuracy of the final layout prediction often largely depends on the quality of the extracted low-level image features, which in itself is susceptible to local noise, scene clutter and occlusion. Consider a single-view RGB image: the layout or floorplan estimation task is to delineate the wall-ceiling, wall-floor, and wall-wall boundaries. Existing works only target special cases of room layouts that comprise at most five planes (e.g., ceiling, floor, left wall, front wall, and right wall).

Conventional deep learning-based methods typically predict 2D per-pixel edge maps or segmentation maps, (e.g., ceiling, floor, left, front, and right), followed by the classic vanishing point/line sampling methods to produce room layouts. However, none of these methods could directly apply to non-box-shaped room layout topology. For instance, more segmentation labels have to be defined in the framework to generate a layout for a room which contains more than three walls. In addition, these methods highly depend on the accuracy of the extraction of the three mutually orthogonal vanishing points, which sometimes fails due to misleading texture.

Existing solutions to these problems often rely strongly on hand-engineered features and vanishing point detection, which are prone to failure in the presence of clutter. Consider the task of estimating the spatial layout of a cluttered indoor scene (say, a messy classroom). However, inferring the layout, particularly in the presence of a large amount of clutter, is a challenging task. Indoor scenes have a high degree of intra-class variance, and critical information required for inferring the layout, such as room corners, is often occluded and must be inferred indirectly. Some conventional approaches address these problems given either depth information (e.g., an RGBD frame or red green blue depth) or a sequence of monocular images from which depth can be inferred. These conventional approaches often explicitly or implicitly impose limits on, for example, the number of scans that can be processed using consumer-grade computing devices, a small number of rooms in a layout to be estimated, etc. to render these conventional approaches impractical at best. Some other conventional approaches restrict the input to the most general case: a single RGB image. Some prior approaches to this problem usually follow a two-stage process. First, a series of layout hypotheses are generated. Next, these are ranked to arrive at the final layout. The first stage is usually accomplished by detecting three orthogonal vanishing points in the scene, often guided by low-level features such as edges. For instance, the influential work generates layout candidates by inferring vanishing points and then ranking them using a structured SVM (support vector machine). Unfortunately, this first stage is highly susceptible to clutter and often fails to produce a sufficiently accurate hypothesis. While subsequent works have proposed improvements to the second stage of this process (e.g., ranking the layouts), they are undermined by the fragility of the candidate generation.

Recently, with the rapid advances in deep convolutional neural networks (CNNs) for semantic segmentation, researchers have been exploring the possibility of using such CNNs for room layout estimation. For example, some prior approaches first train a fully convolutional network (FCN) model to produce "informative edge maps" that replace hand engineered low-level image feature extraction. The predicted edge maps are then used to sample vanishing lines for layout hypotheses generation and ranking. Some other prior approaches use the FCN to learn semantic surface labels such as left wall, front wall, right wall, ceiling, and ground. Then connected components and hole filling techniques are used to refine the raw per pixel prediction of the FCN, followed by the classic vanishing point/line sampling methods to produce room layouts. However, despite the improved results, these methods use CNNs to generate a new set of "low-level" features and fall short of exploiting the end-to-end learning ability of CNNs. In other words, the raw CNN predictions need to be post-processed by an expensive hypothesis testing stage to produce the final layout. This, for example, takes the pipeline 30 seconds to process each frame and is impractical, if not entirely useless in practical applications.

Some other prior approaches adopt fully convolutional neural networks. These prior approaches suffer from the constraints that are unique to layout estimation prevent a direct application of the existing general purpose semantic segmentation methods. For instance, the three potential wall classes do not possess any characteristic appearance. Multiple sub-objects may be contained within their boundaries, so color-consistency assumptions made by CRF (conditional random field) methods are not valid. Furthermore, there is an inherent ambiguity with the semantic layout labels. This is in contrast to traditional semantic segmentation problems where the labels are uniquely defined.

Moreover, floorplan estimation involves semantic segmentation and object recognition, coupled with the logistical difficulties associated with capturing real-world indoor environments, has naturally reflected in a shortage of datasets of indoor environments with annotated floorplans along with an accompanying 3D point cloud/mesh representation. Moreover, it is extremely unlikely that such a dataset of single origin is capable of possessing samples with a large number and variety of different layout types that are needed to train a deep network capable of performing well in the wild. Moreover, many semantic segmentation techniques require much more compute resources that may only be provided by state-of-the-art servers and thus lack wide applications and deployment among computing devices of various capacities. IN addition to the heavy compute resource requirement, these conventional semantic segmentation techniques often exhibit poor performance as the dimensionality of the input data becomes higher.

Another challenge in floorplan estimation relates to the utilization of data captured by various operatively coupled sensors in making determinations useful and/or critical to the user, such as in computer vision and/or object recognition challenges that may, for example, relate to the three-dimensional world around a user. In methods and configurations such as that known as "FloorSP" that use a global graph optimization technique, the complexity of the problem does not scale well with the size of the input in terms of number of rooms and the number of walls per room, which, in turn is proportional to the size of the graph to be optimized. Moreover, clustering has been well explored in work which require prior knowledge on the number of clusters, and also algorithms which determine the number of clusters organically.

Yet another challenge in scene understanding and analysis relates to the utilization of data captured by various operatively coupled sensors in making determinations useful and/or critical to the user, such as in computer vision and/or object recognition challenges that may, for example, relate to the three-dimensional world around a user. Many publicly available datasets and libraries may be used in training and validating various models for scene understanding and analysis and construction of an environment map of an outdoor environment by stitching smaller pieces of reconstructed layouts of the outdoor environments based on one or more landmarks. Nonetheless, such datasets and libraries are scarce at best (if existing at all) for indoor environments, let alone the much more cluttered nature of indoor environments.

Therefore, there is a need for improved methods, systems, and computer program products for efficient generation of a floorplan from scans of indoor scenes to address at least the aforementioned deficiencies, challenges, shortcomings, and difficulties of conventional approaches.

SUMMARY

According to some embodiments, a method for generating a floorplan of an indoor scene is described. In these embodiments, a room classification of a room and a wall classification of a wall for the room may be determined from an input image of an indoor scene; and a floorplan may be generated based at least in part upon the room classification and the wall classification without constraining a total number of rooms in the indoor scene or a size of the room.

In some of these embodiments, determining the room classification and the wall classification may include identifying the input image, wherein the input image comprises one image or a sequence of images from a three-dimensional scan of the indoor scene; and determining an input point cloud for the input image.

In some of the preceding embodiments, to determine the room classification and the wall classification, a subset of the input point cloud may be determined; and a deep network may be trained with at least a synthetic dataset. In some of the immediately preceding embodiments, one or more room cluster labels may be generated at a deep network for one or more vertices represented in the subset and a wall cluster label for the wall to determine the room classification of the room and the wall classification of the wall.

In some of these embodiments, a nested partitioning may be performed on a set of points to divide the set of points into a plurality of overlapping local regions based at least in part upon a distance metric pertaining to the indoor scene; and a local feature may be extracted that captures a geometric structure in the indoor scene at least by recursively performing semantic feature extraction on the nested partitioning of the set of points for generating the one or more room cluster labels and the wall cluster label.

In some of the immediately preceding embodiments, the local feature may be abstracted into a higher-level feature or representation; and a plurality of local features may be adaptively weighed at multiple, different scales or resolutions for generating the one or more room cluster labels and a wall cluster label.

In some embodiments, the plurality of local features at the multiple, different scales or resolutions may be combined; and the one or more room cluster labels and the wall cluster label may be assigned to a metric space for the indoor scene based at least in part upon the distance metric for generating the one or more room cluster labels and a wall cluster label.

According to some embodiments, a system having a processor and memory is provided. The memory stores instructions which, when executed by a processor, cause the processor to perform any of the methods described herein.

According to some embodiments, a non-transitory computer-readable medium is provided. The non-transitory computer-readable medium stores instructions thereon which, when executed by a processor, cause the processor to perform any of the methods described herein.

Summary Recitation of Some Embodiments of the Disclosure

1. A method for generating a floorplan of an indoor scene, comprising: determining a room classification of a room and a wall classification of a wall for the room from an input image of an indoor scene; and determining a floorplan based at least in part upon the room classification and the wall classification without constraining a total number of rooms in the floorplan or a size of the room.

2. The method of embodiment 1, wherein determining the room classification of the room and the wall classification of the wall comprises: identifying the input image, wherein the input image comprises one image or a sequence of images from a three-dimensional scan of the indoor scene; and determining an input point cloud for the input image.

3. The method of embodiment 2, wherein determining the room classification of the room and the wall classification of the wall further comprises: identifying a subset of the input point cloud; and training a deep network with at least a synthetic dataset.

4. The method of embodiment 3, wherein determining the room classification of the room and the wall classification of the wall further comprises: generating, at using a deep network, one or more room cluster labels for one or more vertices represented in the subset and a wall cluster label for the wall.

5. The method of embodiment 4, wherein generating the one or more room cluster labels and the wall cluster label comprises: performing a nested partitioning on a set of points to divide the set of points into a plurality of overlapping local regions based at least in part upon a distance metric pertaining to the indoor scene; and extracting a local feature that captures a geometric structure in the indoor scene at least by recursively performing semantic feature extraction on the nested partitioning of the set of points.

6. The method of embodiment 5, wherein generating the one or more room cluster labels and a wall cluster label comprises: abstracting the local feature into a higher-level feature or representation; and adaptively weighing a plurality of local features at multiple, different scales or resolutions.

7 The method of embodiment 6, wherein generating the one or more room cluster labels and a wall cluster label comprises: combining the plurality of local features at the multiple, different scales or resolutions; and assigning the one or more room cluster labels and the wall cluster label to a metric space for the indoor scene based at least in part upon the distance metric.

8. The method of embodiment 1, wherein determining the floorplan comprises: generating a shape for the room using at least the room classification and the wall classification, wherein the room classification comprises a room cluster label assigned to or associated with the room, and the wall classification comprises one or more wall cluster labels assigned to or associated with one or more walls of the room, and the one or more walls comprise the wall; and generating the floorplan at least by aggregating or integrating an estimated room perimeter relative to a global coordinate system based at least in part upon the shape, wherein the shape comprises a polygon of a DeepPerimeter type.

9. The method of embodiment 8, wherein generating the shape comprises: performing a deep estimation on an RGB (red green blue) frame of the input image of the indoor scene; and generating a depth map and a wall segmentation mask at least by using a multi-view depth estimation network and a segmentation module, wherein the segmentation module is based at least in part upon a PSPNet (Pyramid scene parsing network) and a ResNet (residual network).

10. The method of embodiment 9, wherein generating the shape further comprises: extracting a wall point cloud at least by fusing one or more mask depth images with pose trajectory using a marching cube algorithm; isolating a depth prediction corresponding to the wall point cloud at least by training a deep segmentation network; and projecting the depth prediction to a three-dimensional (3D) point cloud.

11. The method of embodiment 10, wherein generating the shape further comprises: clustering the 3D point cloud into a plurality of clusters at least by detecting, at the deep segmentation network, one or more points that belong to a same plane instance; and translating the plurality of clusters into a set of planes that forms a perimeter layout for the floorplan.

12. The method of embodiment 8, wherein generating the floorplan comprises: identifying a room instance and a wall instance from a scan of the indoor environment; and estimating a closed perimeter for the room instance.

13. The method of embodiment 12, wherein generating the floorplan further comprises: predicting a number of clusters at least by using a voting architecture; and extracting a plurality of features at least by performing room or wall regression that computes the plurality of features at one or more scales.

14. The method of embodiment 13, wherein generating the floorplan further comprises: determining a subsampled version of the input point cloud based at least in part upon the plurality of features at the one or more scales; and determining one or more votes cast by a seed point in the subsampled version of the input point cloud.

15. The method of embodiment 14, wherein generating the floorplan further comprises: performing vote clustering on the one or more votes; and estimating a room perimeter for the floorplan.

16. The method of embodiment 15, wherein performing the vote clustering comprises: identifying a set of predicted votes; and determining one or more room instances and one or more wall instances at least by generating a cluster label for the seed point in the subsampled version of the input point cloud.

17. The method of embodiment 16, wherein performing the vote clustering further comprises: preparing a clustering input at least by concatenating predicted room votes into one or more room votes and by concatenating predicted wall votes in to one or more wall votes; and performing density-based spatial clustering on the one or more room votes and the one or more wall votes to assign the room classification to the room and the wall classification to the wall.

18. The method of embodiment 17, wherein performing the vote clustering further comprises: generating an assignment at least by backtracking the room classification and the wall classification from the set of predicted votes to one or more seed points in the subsampled version of the input point cloud; and determining a list of wall points for the room at least by performing an intersection on a set of room points and a set of wall points.

19. The method of embodiment 15, wherein estimating the room perimeter for the floorplan comprises: identifying room points and wall points for the room with a label; determining an individual room perimeter using a DeepPerimeter module; and projecting a point in the room points or in the wall points for the room to a plane;

20. The method of embodiment 19, wherein estimating the room perimeter for the floorplan comprises: predicting a two-dimensional (2D) line segment for the wall points.

21. The method of embodiment 19, wherein estimating the room perimeter for the floorplan comprises: removing one or more 2D line segments based at least in part upon a criterion.

22. The method of embodiment 20, wherein estimating the room perimeter for the floorplan comprises: forming a closed path along a plurality of nodes as the room perimeter for the floorplan by using at least the 2D line segment.

23. A system for generating a floorplan of an indoor scene, comprising: a processor; and memory operatively coupled to the processor and storing a sequence of instructions which, when executed by the processor, causes the processor to perform a set of acts, the set of acts comprising: determining a room classification of a room and a wall classification of a wall for the room from an input image of an indoor scene; and determining a floorplan based at least in part upon the room classification and the wall classification without constraining a total number of rooms in the floorplan or a size of the room.

24. The system of embodiment 23, the memory comprising the sequence of instructions which, when executed by the processor, causes the processor to perform determining the room classification of the room and the wall classification of the wall further comprises instructions which, when executed by the processor, causes the processor to perform the set of acts that further comprises: identifying the input image, wherein the input image comprises one image or a sequence of images from a three-dimensional scan of the indoor scene; and determining an input point cloud for the input image.

25. The system of embodiment 24, the memory comprising the sequence of instructions which, when executed by the processor, causes the processor to perform determining the room classification of the room and the wall classification of the wall further comprises instructions which, when executed by the processor, causes the processor to perform the set of acts that further comprises: identifying a subset of the input point cloud; and training a deep network with at least a synthetic dataset.

26. The system of embodiment 25, the memory comprising the sequence of instructions which, when executed by the processor, causes the processor to perform determining the room classification of the room and the wall classification of the wall further comprises instructions which, when executed by the processor, causes the processor to perform the set of acts that further comprises: generating, at using a deep network, one or more room cluster labels for one or more vertices represented in the subset and a wall cluster label for the wall.

27. The system of embodiment 26, the memory comprising the sequence of instructions which, when executed by the processor, causes the processor to perform generating the one or more room cluster labels and the wall cluster label further comprises instructions which, when executed by the processor, causes the processor to perform the set of acts that further comprises: performing a nested partitioning on a set of points to divide the set of points into a plurality of overlapping local regions based at least in part upon a distance metric pertaining to the indoor scene; and extracting a local feature that captures a geometric structure in the indoor scene at least by recursively performing semantic feature extraction on the nested partitioning of the set of points.

28. The system of embodiment 27, the memory comprising the sequence of instructions which, when executed by the processor, causes the processor to perform generating the one or more room cluster labels and the wall cluster label further comprises instructions which, when executed by the processor, causes the processor to perform the set of acts that further comprises: abstracting the local feature into a higher-level feature or representation; and adaptively weighing a plurality of local features at multiple, different scales or resolutions.

29. The system of embodiment 28, the memory comprising the sequence of instructions which, when executed by the processor, causes the processor to perform generating the one or more room cluster labels and the wall cluster label further comprises instructions which, when executed by the processor, causes the processor to perform the set of acts that further comprises: combining the plurality of local features at the multiple, different scales or resolutions; and assigning the one or more room cluster labels and the wall cluster label to a metric space for the indoor scene based at least in part upon the distance metric.

30. The system of embodiment 23, the memory comprising the sequence of instructions which, when executed by the processor, causes the processor to perform determining the floorplan further comprises instructions which, when executed by the processor, causes the processor to perform the set of acts that further comprises: generating a shape for the room using at least the room classification and the wall classification, wherein the room classification comprises a room cluster label assigned to or associated with the room, and the wall classification comprises one or more wall cluster labels assigned to or associated with one or more walls of the room, and the one or more walls comprise the wall; and generating the floorplan at least by aggregating or integrating an estimated room perimeter relative to a global coordinate system based at least in part upon the shape, wherein the shape comprises a polygon of a DeepPerimeter type.

31. The system of embodiment 30, the memory comprising the sequence of instructions which, when executed by the processor, causes the processor to perform generating the shape further comprises instructions which, when executed by the processor, causes the processor to perform the set of acts that further comprises: performing a deep estimation on an RGB (red green blue) frame of the input image of the indoor scene; and generating a depth map and a wall segmentation mask at least by using a multi-view depth estimation network and a segmentation module, wherein the segmentation module is based at least in part upon a PSPNet (Pyramid scene parsing network) and a ResNet (residual network).

32. The system of embodiment 31, the memory comprising the sequence of instructions which, when executed by the processor, causes the processor to perform generating the shape further comprises instructions which, when executed by the processor, causes the processor to perform the set of acts that further comprises:

extracting a wall point cloud at least by fusing one or more mask depth images with pose trajectory using a marching cube algorithm; isolating a depth prediction corresponding to the wall point cloud at least by training a deep segmentation network; and projecting the depth prediction to a three-dimensional (3D) point cloud.

33. The system of embodiment 32, the memory comprising the sequence of instructions which, when executed by the processor, causes the processor to perform generating the shape further comprises instructions which, when executed by the processor, causes the processor to perform the set of acts that further comprises: clustering the 3D point cloud into a plurality of clusters at least by detecting, at the deep segmentation network, one or more points that belong to a same plane instance; and translating the plurality of clusters into a set of planes that forms a perimeter layout for the floorplan.

34. The system of embodiment 30, the memory comprising the sequence of instructions which, when executed by the processor, causes the processor to perform generating the floorplan further comprises instructions which, when executed by the processor, causes the processor to perform the set of acts that further comprises: identifying a room instance and a wall instance from a scan of the indoor environment; and estimating a closed perimeter for the room instance.

35. The system of embodiment 34, the memory comprising the sequence of instructions which, when executed by the processor, causes the processor to perform generating the floorplan further comprises instructions which, when executed by the processor, causes the processor to perform the set of acts that further comprises: predicting a number of clusters at least by using a voting architecture; and extracting a plurality of features at least by performing room or wall regression that computes the plurality of features at one or more scales.

36. The system of embodiment 35, the memory comprising the sequence of instructions which, when executed by the processor, causes the processor to perform generating the floorplan further comprises instructions which, when executed by the processor, causes the processor to perform the set of acts that further comprises: determining a subsampled version of the input point cloud based at least in part upon the plurality of features at the one or more scales; and determining one or more votes cast by a seed point in the subsampled version of the input point cloud.

37. The system of embodiment 36, the memory comprising the sequence of instructions which, when executed by the processor, causes the processor to perform generating the floorplan further comprises instructions which, when executed by the processor, causes the processor to perform the set of acts that further comprises: performing vote clustering on the one or more votes; and estimating a room perimeter for the floorplan.

38. The system of embodiment 37, the memory comprising the sequence of instructions which, when executed by the processor, causes the processor to perform performing the vote clustering further comprises instructions which, when executed by the processor, causes the processor to perform the set of acts that further comprises: identifying a set of predicted votes; and determining one or more room instances and one or more wall instances at least by generating a cluster label for the seed point in the subsampled version of the input point cloud.

39. The system of embodiment 38, the memory comprising the sequence of instructions which, when executed by the processor, causes the processor to perform performing the vote clustering further comprises instructions which, when executed by the processor, causes the processor to perform the set of acts that further comprises: preparing a clustering input at least by concatenating predicted room votes into one or more room votes and by concatenating predicted wall votes in to one or more wall votes; and performing density-based spatial clustering on the one or more room votes and the one or more wall votes to assign the room classification to the room and the wall classification to the wall.

40. The system of embodiment 39, the memory comprising the sequence of instructions which, when executed by the processor, causes the processor to perform performing the vote clustering further comprises instructions which, when executed by the processor, causes the processor to perform the set of acts that further comprises: generating an assignment at least by backtracking the room classification and the wall classification from the set of predicted votes to one or more seed points in the subsampled version of the input point cloud; and determining a list of wall points for the room at least by performing an intersection on a set of room points and a set of wall points.

41. The system of embodiment 37, the memory comprising the sequence of instructions which, when executed by the processor, causes the processor to perform estimating the room perimeter further comprises instructions which, when executed by the processor, causes the processor to perform the set of acts that further comprises: identifying room points and wall points for the room with a label; determining an individual room perimeter using a DeepPerimeter module; and projecting a point in the room points or in the wall points for the room to a plane;

42. The system of embodiment 41, the memory comprising the sequence of instructions which, when executed by the processor, causes the processor to perform estimating the room perimeter further comprises instructions which, when executed by the processor, causes the processor to perform the set of acts that further comprises: predicting a two-dimensional (2D) line segment for the wall points.

43. The system of embodiment 41, the memory comprising the sequence of instructions which, when executed by the processor, causes the processor to perform estimating the room perimeter further comprises instructions which, when executed by the processor, causes the processor to perform the set of acts that further comprises: removing one or more 2D line segments based at least in part upon a criterion.

44. The system of embodiment 42, the memory comprising the sequence of instructions which, when executed by the processor, causes the processor to perform estimating the room perimeter further comprises instructions which, when executed by the processor, causes the processor to perform the set of acts that further comprises: forming a closed path along a plurality of nodes as the room perimeter for the floorplan by using at least the 2D line segment.

45. A wearable extended reality device for generating a floorplan of an indoor scene, comprising: an optical system having an array of micro-displays or micro-projectors to present digital contents to an eye of a user; a processor coupled to the optical system; and memory operatively coupled to the processor and storing a sequence of instructions which, when executed by the processor, causes the processor to perform a set of acts, the set of acts comprising: determining a room classification of a room and a wall classification of a wall for the room from an input image of an indoor scene; and determining a floorplan based at least in part upon the room classification and the wall classification without constraining a total number of rooms in the floorplan or a size of the room.

46. The wearable extended reality device of embodiment 45, the memory comprising the sequence of instructions which, when executed by the processor, causes the processor to perform determining the room classification of the room and the wall classification of the wall further comprises instructions which, when executed by the processor, causes the processor to perform the set of acts that further comprises: identifying the input image, wherein the input image comprises one image or a sequence of images from a three-dimensional scan of the indoor scene; and determining an input point cloud for the input image.

47. The wearable extended reality device of embodiment 46, the memory comprising the sequence of instructions which, when executed by the processor, causes the processor to perform determining the room classification of the room and the wall classification of the wall further comprises instructions which, when executed by the processor, causes the processor to perform the set of acts that further comprises: identifying a subset of the input point cloud; and training a deep network with at least a synthetic dataset.

48. The wearable extended reality device of embodiment 47, the memory comprising the sequence of instructions which, when executed by the processor, causes the processor to perform determining the room classification of the room and the wall classification of the wall further comprises instructions which, when executed by the processor, causes the processor to perform the set of acts that further comprises: generating, at using a deep network, one or more room cluster labels for one or more vertices represented in the subset and a wall cluster label for the wall.

49. The wearable extended reality device of embodiment 48, the memory comprising the sequence of instructions which, when executed by the processor, causes the processor to perform generating the one or more room cluster labels and the wall cluster label further comprises instructions which, when executed by the processor, causes the processor to perform the set of acts that further comprises: performing a nested partitioning on a set of points to divide the set of points into a plurality of overlapping local regions based at least in part upon a distance metric pertaining to the indoor scene; and extracting a local feature that captures a geometric structure in the indoor scene at least by recursively performing semantic feature extraction on the nested partitioning of the set of points;

50. The wearable extended reality device of embodiment 49, the memory comprising the sequence of instructions which, when executed by the processor, causes the processor to perform generating the one or more room cluster labels and the wall cluster label further comprises instructions which, when executed by the processor, causes the processor to perform the set of acts that further comprises: abstracting the local feature into a higher-level feature or representation; and adaptively weighing a plurality of local features at multiple, different scales or resolutions.

51. The wearable extended reality device of embodiment 50, the memory comprising the sequence of instructions which, when executed by the processor, causes the processor to perform generating the one or more room cluster labels and the wall cluster label further comprises instructions which, when executed by the processor, causes the processor to perform the set of acts that further comprises: combining the plurality of local features at the multiple, different scales or resolutions; and assigning the one or more room cluster labels and the wall cluster label to a metric space for the indoor scene based at least in part upon the distance metric.

52. The wearable extended reality device of embodiment 45, the memory comprising the sequence of instructions which, when executed by the processor, causes the processor to perform determining the floorplan further comprises instructions which, when executed by the processor, causes the processor to perform the set of acts that further comprises: generating a shape for the room using at least the room classification and the wall classification, wherein the room classification comprises a room cluster label assigned to or associated with the room, and the wall classification comprises one or more wall cluster labels assigned to or associated with one or more walls of the room, and the one or more walls comprise the wall; and generating the floorplan at least by aggregating or integrating an estimated room perimeter relative to a global coordinate system based at least in part upon the shape, wherein the shape comprises a polygon of a DeepPerimeter type.

53. The wearable extended reality device of embodiment 52, the memory comprising the sequence of instructions which, when executed by the processor, causes the processor to perform generating the shape further comprises instructions which, when executed by the processor, causes the processor to perform the set of acts that further comprises: performing a deep estimation on an RGB (red green blue) frame of the input image of the indoor scene; and generating a depth map and a wall segmentation mask at least by using a multi-view depth estimation network and a segmentation module, wherein the segmentation module is based at least in part upon a PSPNet (Pyramid scene parsing network) and a ResNet (residual network).

54. The wearable extended reality device of embodiment 53, the memory comprising the sequence of instructions which, when executed by the processor, causes the processor to perform generating the shape further comprises instructions which, when executed by the processor, causes the processor to perform the set of acts that further comprises: extracting a wall point cloud at least by fusing one or more mask depth images with pose trajectory using a marching cube algorithm; isolating a depth prediction corresponding to the wall point cloud at least by training a deep segmentation network; and projecting the depth prediction to a three-dimensional (3D) point cloud.

55. The wearable extended reality device of embodiment 54, the memory comprising the sequence of instructions which, when executed by the processor, causes the processor to perform generating the shape further comprises instructions which, when executed by the processor, causes the processor to perform the set of acts that further comprises: clustering the 3D point cloud into a plurality of clusters at least by detecting, at the deep segmentation network, one or more points that belong to a same plane instance; and translating the plurality of clusters into a set of planes that forms a perimeter layout for the floorplan.

56. The wearable extended reality device of embodiment 52, the memory comprising the sequence of instructions which, when executed by the processor, causes the processor to perform generating the floorplan further comprises instructions which, when executed by the processor, causes the processor to perform the set of acts that further comprises: identifying a room instance and a wall instance from a scan of the indoor environment; and estimating a closed perimeter for the room instance.

57. The wearable extended reality device of embodiment 56, the memory comprising the sequence of instructions which, when executed by the processor, causes the processor to perform generating the floorplan further comprises instructions which, when executed by the processor, causes the processor to perform the set of acts that further comprises: predicting a number of clusters at least by using a voting architecture; and extracting a plurality of features at least by performing room or wall regression that computes the plurality of features at one or more scales.

58. The wearable extended reality device of embodiment 57, the memory comprising the sequence of instructions which, when executed by the processor, causes the processor to perform generating the floorplan further comprises instructions which, when executed by the processor, causes the processor to perform the set of acts that further comprises: determining a subsampled version of the input point cloud based at least in part upon the plurality of features at the one or more scales; and determining one or more votes cast by a seed point in the subsampled version of the input point cloud.

59. The wearable extended reality device of embodiment 58, the memory comprising the sequence of instructions which, when executed by the processor, causes the processor to perform generating the floorplan further comprises instructions which, when executed by the processor, causes the processor to perform the set of acts that further comprises: performing vote clustering on the one or more votes; and estimating a room perimeter for the floorplan.

60. The wearable extended reality device of embodiment 59, the memory comprising the sequence of instructions which, when executed by the processor, causes the processor to perform performing the vote clustering further comprises instructions which, when executed by the processor, causes the processor to perform the set of acts that further comprises: identifying a set of predicted votes; and determining one or more room instances and one or more wall instances at least by generating a cluster label for the seed point in the subsampled version of the input point cloud.

61. The wearable extended reality device of embodiment 60, the memory comprising the sequence of instructions which, when executed by the processor, causes the processor to perform performing the vote clustering further comprises instructions which, when executed by the processor, causes the processor to perform the set of acts that further comprises: preparing a clustering input at least by concatenating predicted room votes into one or more room votes and by concatenating predicted wall votes in to one or more wall votes; and performing density-based spatial clustering on the one or more room votes and the one or more wall votes to assign the room classification to the room and the wall classification to the wall.

62. The wearable extended reality device of embodiment 61, the memory comprising the sequence of instructions which, when executed by the processor, causes the processor to perform performing the vote clustering further comprises instructions which, when executed by the processor, causes the processor to perform the set of acts that further comprises: generating an assignment at least by backtracking the room classification and the wall classification from the set of predicted votes to one or more seed points in the subsampled version of the input point cloud; and determining a list of wall points for the room at least by performing an intersection on a set of room points and a set of wall points.

63. The wearable extended reality device of embodiment 59, the memory comprising the sequence of instructions which, when executed by the processor, causes the processor to perform estimating the room perimeter further comprises instructions which, when executed by the processor, causes the processor to perform the set of acts that further comprises: identifying room points and wall points for the room with a label; determining an individual room perimeter using a DeepPerimeter module; and projecting a point in the room points or in the wall points for the room to a plane;

64. The wearable extended reality device of embodiment 63, the memory comprising the sequence of instructions which, when executed by the processor, causes the processor to perform estimating the room perimeter further comprises instructions which, when executed by the processor, causes the processor to perform the set of acts that further comprises: predicting a two-dimensional (2D) line segment for the wall points.

65. The wearable extended reality device of embodiment 63, the memory comprising the sequence of instructions which, when executed by the processor, causes the processor to perform estimating the room perimeter further comprises instructions which, when executed by the processor, causes the processor to perform the set of acts that further comprises: removing one or more 2D line segments based at least in part upon a criterion.

66. The wearable extended reality device of embodiment 64, the memory comprising the sequence of instructions which, when executed by the processor, causes the processor to perform estimating the room perimeter further comprises instructions which, when executed by the processor, causes the processor to perform the set of acts that further comprises: forming a closed path along a plurality of nodes as the room perimeter for the floorplan by using at least the 2D line segment.

The foregoing summary is provided by way of illustration and is not intended to be limiting.

BRIEF DESCRIPTION OF THE SEVERAL VIEWS OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 13E-(a) through 13E-(c) illustrate some example solutions to a P3P task in some embodiments.

FIGS. 13F-(a) through 13F-(c) illustrate an example of a P4P task in some embodiments.

FIG. 15A illustrates a high-level flow diagram for generating a floorplan of a scene in some embodiments.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with eyewear, including spatial computing headsets, and hinge systems for temple arms of eyewear have not been shown or described in detail to avoid unnecessarily obscuring descriptions of the embodiments.

Unless the context requires otherwise, throughout the specification and claims which follow, the word “comprise” and variations thereof, such as, “comprises” and “comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual reality (VR), augmented reality (AR), mixed reality (MR), and extended reality (XR) systems have not been shown or described in detail to avoid unnecessarily obscuring descriptions of the embodiments. It shall be note that the terms virtual reality (VR), augmented reality (AR), mixed reality (MR), and extended reality (XR) may be used interchangeably in the present disclosure to denote a method or system for displaying at least virtual contents to a user via at least a wearable XR devices as well as one or more remote computing devices supporting the wearable XR devices.

Unless the context requires otherwise, throughout the specification and claims which follow, the word "comprise" and variations thereof, such as, "comprises" and "comprising" are to be construed in an open, inclusive sense that is as "including, but not limited to."

Figure 1:
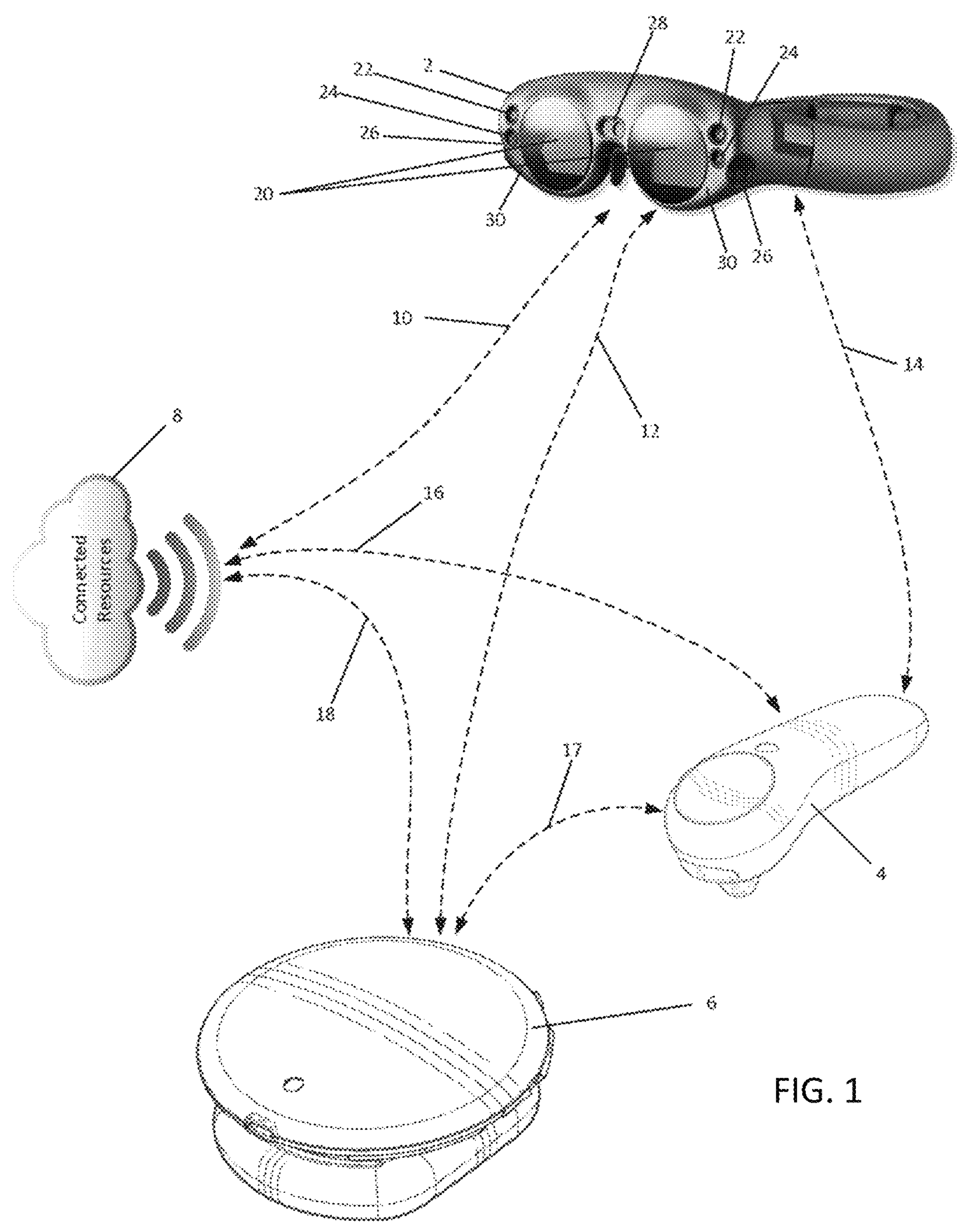
FIG. 1 is a sketch illustrating an example of a simplified augmented reality (AR) scene, according to some embodiments.

In various embodiments a user may be wearing an augmented reality system such as that depicted in FIG. 1, which may also be termed a "spatial computing" system in relation to such system's interaction with the three-dimensional world around the user when operated. Such a system may comprise, for example, a head wearable display component (2), and may feature environmental sensing capabilities as described above and in the aforementioned incorporated by reference materials, such as cameras of various types which may be configured to map the environment around the user, or to create a "mesh" of such environment, comprising various points representative of the geometry of various objects within the environment around the user, such as walls, floors, chairs, and the like. The spatial computing system may be configured to map or mesh the environment around the user, and to run or operate software, such as that available from Magic Leap, Inc., of Plantation, Florida, which may be configured to utilize the map or mesh of the room to assist the user in placing, manipulating, visualizing, creating, and modifying various objects and elements in the three-dimensional space around the user. Referring back to FIG. 1, the system may be operatively coupled to additional resources, such as other computing systems, by cloud or other connectivity configurations.

One of the challenges in spatial computing relates to the utilization of data captured by various operatively coupled sensors (such as elements 22, 24, 26, 28 of the system of FIG. 1) in making determinations useful and/or critical to the user, such as in computer vision and/or object recognition challenges that may, for example, relate to the three-dimensional world around a user. Some embodiments introduce an approach, which may be termed "FloorVoter" herein, for accurately determine an estimation of a floorplan pertaining to a physical environment which may be positioned and oriented around a user, based at least in part upon a scan of the structural elements of the related indoor environment. Certain variations of the described method and system configuration incorporate a two-stage approach where the initial stage clusters an unordered point cloud representation of the scene into room instances and wall instances using a neural network. These methods and configurations are broadly applicable to various scenarios outside of realm of wearable spatial computing, subject to the appropriate sensors and associated data being available. The subsequent stage estimates a closed perimeter, parameterized by a simple polygon, for each individual room by finding the shortest path along the predicted room and wall keypoints. The FloorVoter pipeline is highly parallelizable and extremely efficient compared to existing methods. Some embodiments employ deep networks trained on a fully synthetic dataset and evaluate the method on the publicly available Structured3D and BKE datasets to demonstrate excellent qualitative and quantitative results outperforming state-of-the-art techniques.

A detailed understanding of the semantic components that constitute an indoor environment is gradually growing into an issue of increasing importance. Such insights, which fall under a broad topic that is popularly known as Scene Understanding, can be expressed in various ways—for example semantic segmentation of 2D/3D data of indoor environments (incorporated references below: 15, 46), object detection/recognition (incorporated references below: 24, 34, 35), CAD scan replacement of furniture (incorporated reference below: 3), and floorplan estimation (incorporated references below: 19, 23), amongst others. This description focuses on various aspects of the task of efficiently generating an accurate floorplan of an indoor scene to aid such Scene Understanding. The capability of generating a floorplan from a 3D scan has far reaching implications in multiple academic and commercial domains. The housing industry, architecture design and interior design are being pervaded by technology more than before, and automated tools such as FloorVoter can greatly increase the efficiency and the spectrum of design possibilities for such industries. Similarly, a smarter understanding of the environment is absolutely essential for Augmented and Virtual reality (AR/VR) devices to provide a richer, more interactive experience for consumers.

Floorplan estimation being a niche task as compared to commonly seen deep learning problems that involve semantic segmentation and object recognition, coupled with the logistical difficulties associated with capturing real-world indoor environments, have naturally reflected in a shortage of datasets of indoor environments with annotated floorplans along with an accompanying 3D point cloud/mesh representation. Moreover, it is extremely unlikely that such a dataset of single origin is capable of possessing samples with a large number and variety of different layout types that are needed to train a deep network capable of performing well in the wild.

Some embodiments extract a floorplan of an indoor environment with single or multiple rooms from captured data, such as a 3D scan of the environment's structural elements, which may include walls, doors, and windows. Since extensive research in academia and also the industry has been performed on semantic segmentation of 2D and 3D data in indoor environments, some embodiments focus on the relatively unexplored task of estimating an unconstrained layout with no restrictions on the shape and number of rooms within the bounds of reason. These embodiments assume that state-of-the-art techniques such as those known as MinkowskiNet (incorporated reference below: 6), ScanComplete (incorporated reference below: 8) for 3D scans, and/or MaskRCNN (incorporated reference below: 16), PSPNET (incorporated references below: 46) for 2D segmentation (if accompanying RGB/Grayscale images are available) may be utilized to create a scan of the structural elements which FloorVoter can then process to generate a floorplan.

In methods and configurations such as that known as "FloorSP" (incorporated reference below: 19) which use a global graph optimization technique, the complexity of the problem does not scale well with the size of the input in terms of number of rooms and the number of walls per room, which, in turn is proportional to the size of the graph to be optimized. In contrast the subject FloorVoter methods and configurations aim to combat the scaling issue by breaking down the global problem into multiple smaller problems which can be processed efficiently in a parallel fashion.

In some embodiments, the methods and configurations described herein broadly follow a two-step approach. Firstly, a deep network based on a Pointnet++ (incorporated reference below: 32) backbone generates cluster labels for the vertices of a perceptually uniform subset of the input point cloud in order to identify the rooms/areas that comprise the indoor scene. Simultaneously, another output of this network is also cluster labels to identify each wall in the given scene. Secondly, some embodiments jointly utilize the room and wall labels to create a DeepPerimeter (incorporated reference below: 28) type of shape for every room, expressed by a simple polygon. The final floorplan is simply a collection of all the estimated room perimeters put together in the global coordinate system of the original point cloud.

In summary, some embodiments describe a novel technique to generate a detailed floorplan from a 3D scan of an indoor scene. In some embodiments, the methods and configurations described herein do not impose constraints on the number of rooms, their configurations, or their shapes. Some embodiments demonstrate that the problem of floorplan estimation can be solved by training deep networks on a purely synthetic dataset which can be generated efficiently and is also highly configurable in all aspects. These embodiments describe in detail the algorithm used to generate such a dataset with accompanying illustrations. The network performs impressively on real data without significant domain adaptation issues, which bears weight to the capability of the architecture to approximate the underlying function successfully. The proposed solution is highly parallelizable in multiple stages and outperforms the current state-of-the-art in terms of run-time efficiency as well as accuracy.

Feature extraction on unordered point clouds: With the increasing momentum of the augmented and virtual reality industry and the autonomous vehicle industry, availability of "2.5D" and three-dimensional ("3D") data from various sources such as smartphones, consumer-grade depth sensors, and LiDAR (Light Detection AND Ranging) systems has seen a massive boost. The need to perform complex learning tasks on such data has also seen a rise in demand. Architectures such as those described in below incorporated reference 31 and its successor reference 32 operate directly upon the point vectors whereas others such as those described in incorporated references 22, 39, 40, and 48 partition the input space into a structured grid and quantize the input so it is possible to run 3D convolutions on the derived grid. More recent approaches such as those described in incorporated reference 6 perform sparse convolutions on a 3D point set to achieve impressive results for object detection, while approaches such as those described in incorporated references 29, 33, 37, and 41 parameterize the input data points into a graph and exploit the graph connectivity and structure to extract features.

Clustering: The problem of clustering can be broadly defined as a label assignment task where data points with similar features are to be assigned the same label. Traditionally, clustering has been well explored in work such as those described in incorporated references 14, 25, 27, and 44 that require prior knowledge on the number of clusters, and also algorithms such as those described in incorporated references 2, 10, and 36, which determine the number of clusters organically. Recently, deep neural networks have also been utilized to perform this task in a supervised or semi-supervised (incorporated references below: 30, 38) and unsupervised (incorporated references below: 5, 28, 42) setting. Similar to some embodiments described herein, certain other descriptions (incorporated references below: 4, 11, 18, 30) include some prior research that focuses on a voting mechanism for clustering.

Floorplan Estimation: Prior research in floorplan estimation has been observed to have a large variation in the parameterization practices of output floorplans, since there is not a universal and standardized way of expressing such a representation. Similarly, an indoor environment can be captured in a variety of ways depending on the availability of sensor suites at hand and also the dimension and the desired resolution of the capture.

Traditional methods such as that described in incorporated reference 43 use panoramic RGBD images to procedurally reconstruct a space using structure grammar, whereas others (incorporated reference below: 26) utilize a 3D scan to extract plane primitives and heuristically generate building information models.

Deep-learning based methods (incorporated references below: 9, 17, 20, 21, 45, 49) process a single image (e.g., a pinhole or panoramic image) to generate a cuboid-based layout for a single room. Typically, these methods rely on visual cues such as vanishing points and wall edges to estimate a layout, often selecting the best match from a library of pre-compiled Manhattan-style room shapes. Incorporated reference 28 describes a single room layout estimation method that generates a polygonal perimeter using a monocular video of the scene.

For floorplans on an apartment/house scale, incorporated references 19 and 23 would process a 3D scan to generate a relatively more detailed and semi-constrained floorplan. However, the high compute requirements of their methods limit the number of scans that can be processed using consumer-grade hardware in an acceptable time.

Figure 2:
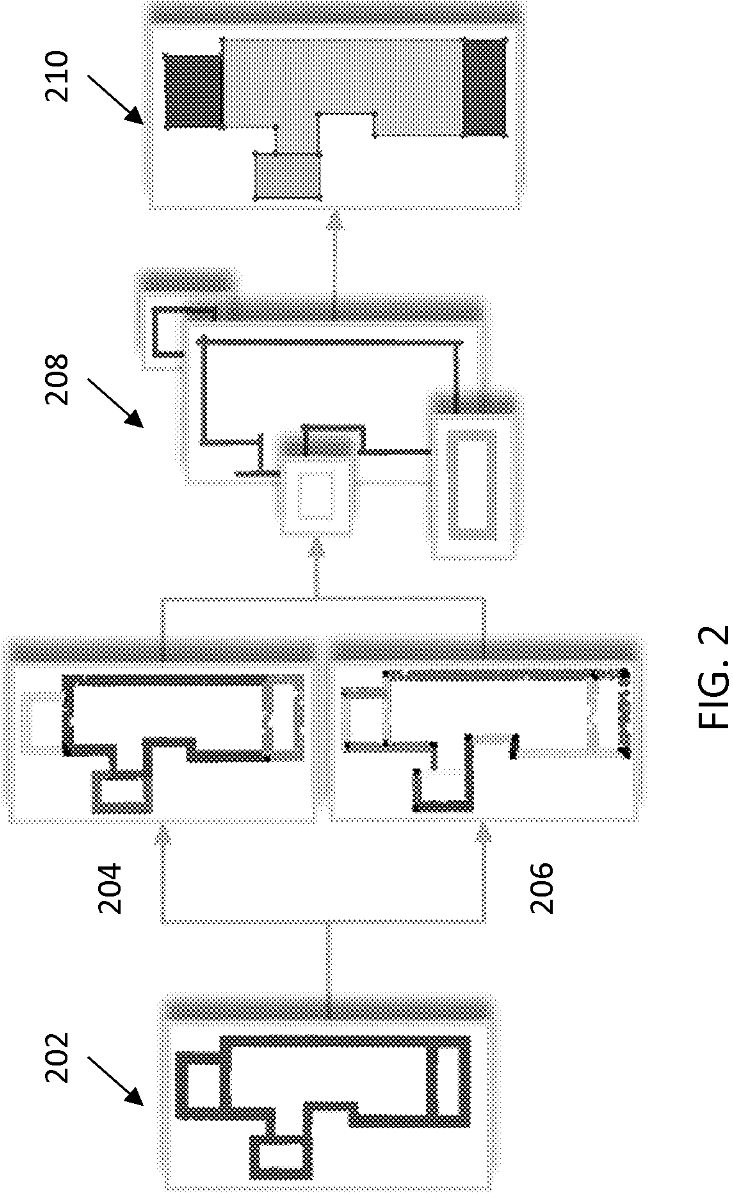
FIG. 2 is a sketch of an exemplary simplified AR scene, showing exemplary use cases of an XR system, according to some embodiments.

FloorVoter-System Overview: Referring to FIG. 2, FloorVoter is a robust and efficient method that extracts a detailed floorplan from a 3D scan of an indoor environment. This section below describes in detail the components involved in inferring a 2D floorplan from a 3D scan of an indoor scene. The key steps being-identifying room instances and wall instances for each room from the original 3D scan followed by estimating a closed perimeter for each room instance.

Room and wall clustering: some embodiments pose the problem of segregating the input 3D point cloud 202 into its constituting rooms (e.g., 204 room cluster(s)) and walls (e.g., 206 wall cluster(s)) as a non-exclusive clustering of 3D data points that is further processed into a floorplan 208 and then one or more wall clusters 210, without any prior assumptions on the number of clusters. In order to enable this step to predict an unconstrained number of clusters independent of the network architecture, some embodiments adopt a voting based technique inspired from incorporated reference 30.

Figure 3:
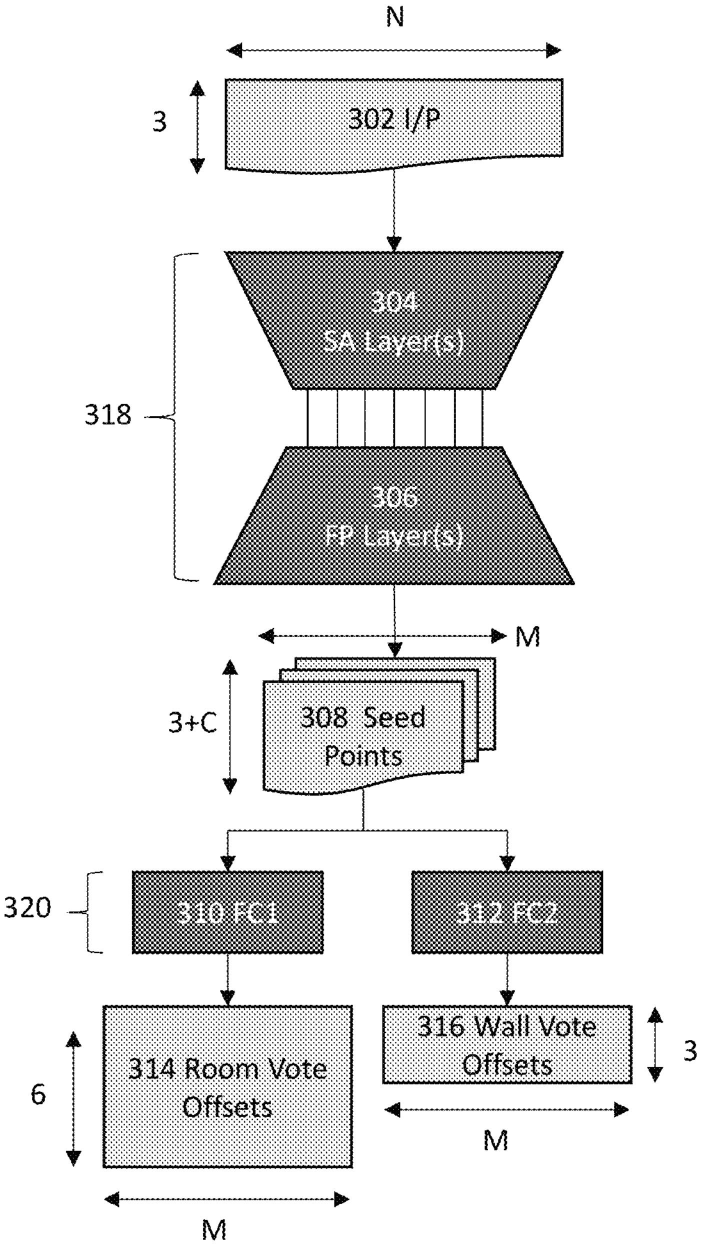
FIG. 3 is a schematic diagram illustrating data flow for a single user in an AR system configured to provide an experience to the user of AR content interacting with a physical world, according to some embodiments.

Room and wall center regression: The architecture of the voting module is summarized in FIG. 3. Some embodiments use a PointNet++ (incorporated reference 32) backbone as a feature extractor, the input to which is a point cloud of points p 302 such that $$\{p_j\}_{j=1}^{N}$$

and $p_j \in \mathbb{R}^3$. The set abstraction 304 (SA Layer(s) for down sampling) layers and the feature propagation 306 (e.g., FP layer(s) for up sampling) layers in the backbone 318 compute features at various scales to produce a subsampled version of the input (e.g., the seed points 308) denoted by s, with M points, M≤N having C additional feature dimensions such that $$\{s_i\}_{i=1}^{M}$$

and $s_i \in \mathbb{R}^{3+C}$. Some embodiments here on refer to the set s as seed points 308, each member of which casts votes v via vote generators 310 FC1 (Fully-Connected network 1) and 312 FC2 (Fully-Connected network 2) such that $$\{v_i^q\}_{i=1}^{M},$$

$v_i \in \mathbb{R}^3$ and $q \in \{R_0, R_1, W\}$. Each seed points $s_i$ casts 2 votes (e.g., three 3D offset vectors per seed-two for room votes 314 and one for wall votes 316) in some embodiments, where $q=R_0$ or $q=R_1$ implies that the vote denotes the center of room which $s_i$ belongs to, and q=W implies that the vote denotes the center of the wall that $s_i$ belongs to.

In the case where a seed point $s_i$ belongs to a single room, $$v_i^{R_0} \text{ and } v_i^{R_1}$$

are identical whereas in the case of wall points shared among two rooms, they are distinct. For votes cast to determine the wall centers $$v_i^W,$$

some embodiments assume that each point can only belong to a unique wall for the sake of simplicity.

In order to generate a vote $$v_i^q$$

from each seed $s_i$, some embodiments use multiple vote generators, which are fully connected layers followed by BatchNorm (batch normalization) and ReLU (Rectified Linear Unit) layers as described in incorporated reference 30. A vote generator extracts a vote offset $x_i$ from a single seed point $s_i$ into such that $$\{x_i^q\}_{i=1}^{M}$$

and $x_i \in \mathbb{R}^3$. A vote offset is nothing but an offset vector from a seed point to its vote such that $$v_i^q = s_i + x_i^q.$$

In practice, some embodiments use two vote generators, one for room votes where $q \in \{R_0, R_1\}$ and the other for wall votes where q=W. The parameters of any particular vote generator are shared among all the M seed points and hence each a $s_i$ is able to generate an $$x_i^q$$

independent of any other seed points.

Some embodiments train the network using smooth-L1 losses given by:

$$\mathcal{L}_{room} = \frac{1}{n}\sum_{i}^{M}\mathcal{L}_i^{q\in\{R_0,R_1\}},$$

$$\mathcal{L}_{wall} = \frac{1}{M}\sum_{i}^{M}\mathcal{L}_i^{W}$$

$$\mathcal{L}_i = \begin{cases} 0.5\times(e_i^q)^2 & \text{if} |e_i^q| < 1, \\ |e_i^q| - 0.5 & \text{otherwise} \end{cases}$$

$$e_i^q = \begin{cases} \min\left(g_i^{R_0} - x_i^{R_0} + g_i^{R_1} - x_i^{R_1},\ g_i^{R_0} - x_i^{R_1},\ g_i^{R_1} - x_i^{R_0}\right) & \text{if } q \in \{R_0, R_1\}, \\ g_i^W - x_i^W & \text{otherwise} \end{cases}$$

$$g_i^q$$

is the ground truth offset vector corresponding to the predicted offset vector $$x_i^q.$$

The total loss to be minimized is $\mathcal{L}_{room}+\alpha\cdot\mathcal{L}_{wall}$, where a is a constant to balance the loss magnitudes.

Figure 4:
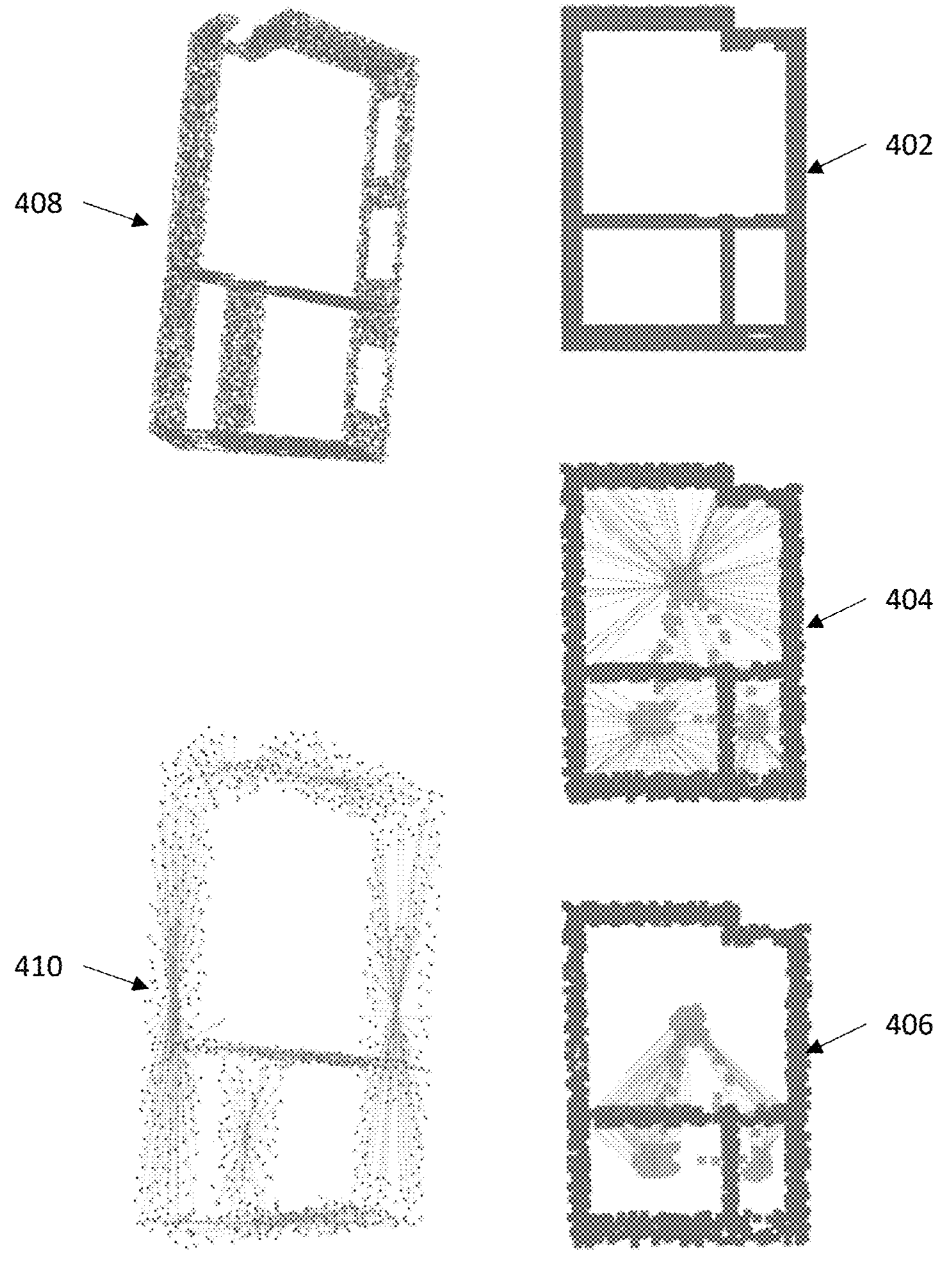
FIG. 4 is a schematic diagram illustrating an exemplary AR display system, displaying virtual content for a single user, according to some embodiments.

In the case of $\mathcal{L}_{room}$ where some embodiments have two unordered pairs of ground truths and predictions, these embodiments choose a pairwise difference that results in the lowest error. This allows us the to optimize the network parameters without enforcing an artificial ordering on the room votes. A visualization of the wall and room votes for an example from the Structured3D (incorporated reference 47) dataset is displayed in FIG. 4. Moreover, FIG. 4 illustrates voting for room and wall centers. In some embodiments, FIG. 4 illustrates that the point cloud input to a voting module may include a point cloud input to a voting module 402, seed points s with vote points v 404, vote offset vectors x for distinct and shared room votes 406, seed points s with vote points v 408, and vote offset vectors x for walls.

Figure 5:
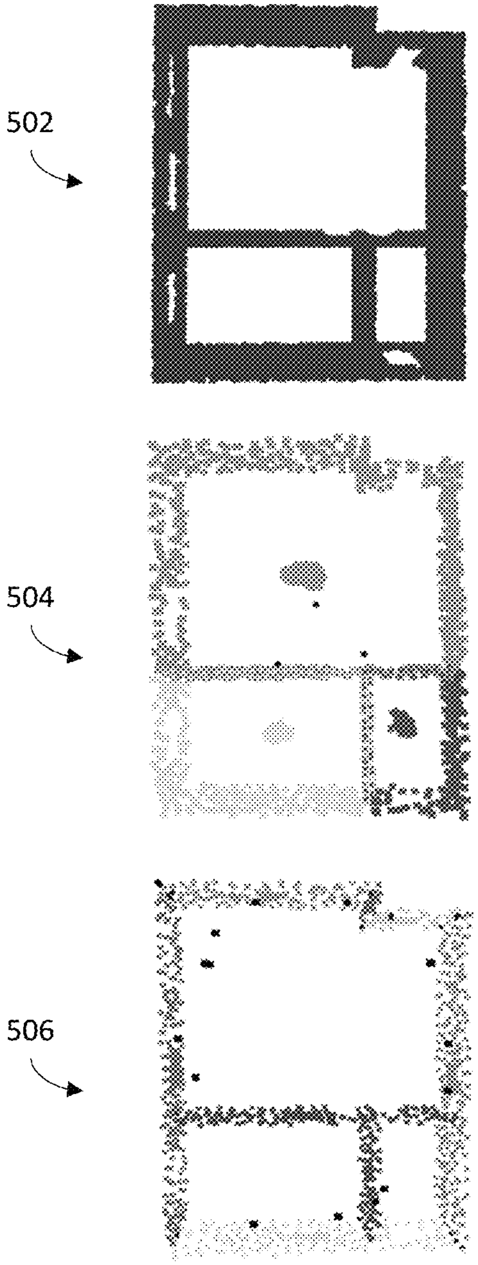
FIG. 5A is a schematic diagram illustrating a user wearing an AR display system rendering AR content as the user moves through a physical world environment, according to some embodiments.
FIG. 5B is a schematic diagram illustrating a viewing optics assembly and attendant components, according to some embodiments.

Vote Clustering—FIG. 5:

Given the set of predicted centers $$v_i^q,$$

some embodiments are not intend to generate corresponding cluster labels for the seed points to obtain room and wall instances. To perform this operation, some embodiments concatenate $$v_i^{R_0} \text{ and } v_i^{R_1}$$

to prepare clustering input (e.g., a point cloud input 502 to a voting module) for rooms, and simply use $$v_i^W$$

for walls. Some embodiments run a clustering algorithm—DBSCAN (incorporated references 12, 36) with eps=∈ on the room and wall votes separately and assign a cluster label $$l_i^{q'}$$

to each vote $$v_i^{q'},$$

such that q'∈{R,W} where q'=R implies the label is a cluster assignment for rooms, whereas q'=W implies that the label is a cluster assignment for walls. Using DBSCAN allows us to cluster the votes purely based on their spatial density distribution without a restriction on the maximum number of clusters. Some embodiments then backtrack the cluster labels $$l_i^{q'}$$

from the votes $$v_i^{q'}$$

to the seeds $s_i$ to create an assignment $$s_i^{q',L}$$

(e.g., cluster labels backtracted from the votes v to the seed points s for room 504 and cluster label backtracted from the votes to votes v to the seed points s for wall 506), where $$L = l_i^{q'}.$$

Following this, Some embodiments also remove any clusters with a member strength less than 0.05×M for rooms and 0.01×M for walls, to finally create $C^R$ number of room clusters and $C^W$ number of wall clusters. To obtain the list of wall points belonging to a room, some embodiments perform an intersection operation on the room and wall point sets as described below:

$$r^k = s^{R,k}$$

$$w^{m,k} = r^k \cap s^{W,m} \text{for} k \in \mathbb{R}^{C^W}, m \in \mathbb{R}^{C^R}$$

where $r^k$ is the set of points belonging to the $k^{th}$ room and $w^{m,k}$ is the set of points that belong to the $m^{th}$ wall of the $k^{th}$ room. Since not all walls belong to all the rooms, a large number of the intersections $w^{m,k}$ are a null set. For ease of notation, some embodiments ignore all such null sets and redefine $w^{m,k}$ as $w^{m',k}$ where $m' \in \mathbb{R}^{C^{mk}}$ and $C^{mk}$ is the number of non-empty sets in $$\{w^{m,k}\}_{m=1}^{C^W}$$

Room Perimeter Estimation:

Upon obtaining the room points $r^k$, and the room wall points $$\{w^{m',k}\}_{m'=1}^{C^{mk}}$$

for a room with cluster label k, some embodiments build upon the methods described in DeepPerimeter to delineate individual room perimeters. Because the final floorplan is 2D in some embodiments, some embodiments proceed by projecting all points in $r^k$ and $$\{w^{m',k}\}_{m'=1}^{C^{mk}}$$

to the x-Y plane under the assumption that all walls are orthogonal to the X-Y plane. Let $w^{h,k}$ denote the set of points belonging to the $h^{th}$ wall of the $k^{th}$ room. By using RANSAC (incorporated reference 13), some embodiments predict a 2D line segment for all points in $w^{h,k}$ denoted by $p^{h,k}$, parameterized by the line segment endpoints. Some embodiments remove any line segments in $$\{p^{m',k}\}_{m'=1}^{C^{mk}}$$

that are deemed to be duplicative, specifically if the difference in their slope≤$\theta_{min}$ and the difference in their bias ≤$\beta_{min}$. Any line segments with an angle of $\theta_{orth}$ with the nearest orthogonal axis. are snapped to the align with the said axis. To allow for non-Manhattan layouts while also account for minor errors in the RANSAC line fitting, some embodiments keep the value of $\theta_{orth}$ relatively low, as described in below.

Figure 6:
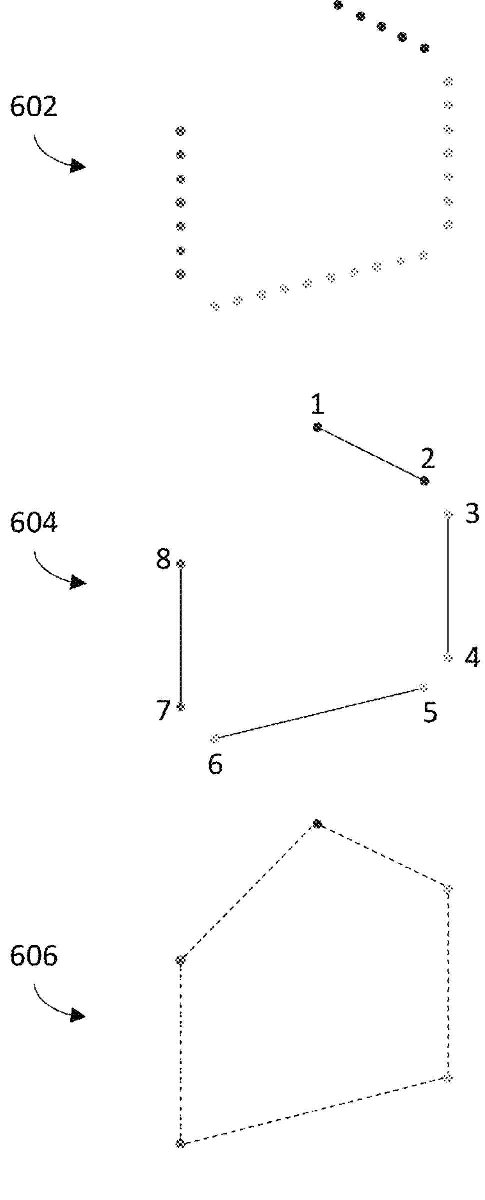
FIG. 6A is a schematic diagram illustrating an AR system using a world reconstruction system, according to some embodiments.
FIG. 6B is a schematic diagram illustrating components of an AR system that maintain a model of a passable world, according to some embodiments.

In order to form a closed path along a set of nodes, as shown in FIG. 6, some embodiments implement a modified version of the 2-opt algorithm from which provides a sub-optimal $O(n^2)$ solution to the infamous exponential time traveling-salesman problem. More specifically, FIG. 6 illustrates the input 602 of a set of clustered wall points to a perimeter estimation module for a room, the ordering of the wall segment endpoints 602 determined by the shortest path algorithm, and a room perimeter 606 determined as a polygon by extruding or extending the line segments to generate the polygon vertices. The set of nodes through which some embodiments compute a shortest path is the set of start-points $$\{p_1^{m',k}\}_{m'=1}^{C^{mk}}$$

and end-points $$\{p_2^{m',k}\}_{m'=1}^{C^{mk}}$$

of the line segments. This effectively doubles the number of input nodes, but also provides a more optimal solution in cases of more complicated layout shapes which uses only the medians of $$\{w^{m',k}\}_{m'=1}^{C^{mk}}$$

as their set of nodes. Since the pair of endpoints $$p_1^{h,k} \text{ and } p_2^{h,k}$$

of the segment $p^{h,k}$ may always be connected by an edge, some embodiments set the cost of traversal for all such pairs of edges to 0 in the optimization problem.

Datasets:

In this section, some embodiments describe the various datasets used for the training and evaluation of FloorVoter. It is important to note that the system is able to achieve competitive performance on unseen real and synthetic datasets while being trained purely on a procedurally generated synthetic dataset.

Synthetic Dataset:

The key motivation behind training the networks described herein on a fully synthetic dataset is rooted in the shortage of publicly available datasets with full 3D representations of indoor scenes with annotated floorplans. The synthetic dataset some embodiments generate is highly configurable in all aspects, which allows altering the distribution of samples in terms of the room shapes, sizes, configurations and noise patterns to match any target test dataset if need be. Moreover, the simplicity of the algorithm and the rapid speed of generation of such a dataset enables training on a large number of samples with a rich variety in possible layouts.

Figures 7A, 7B, 7C:
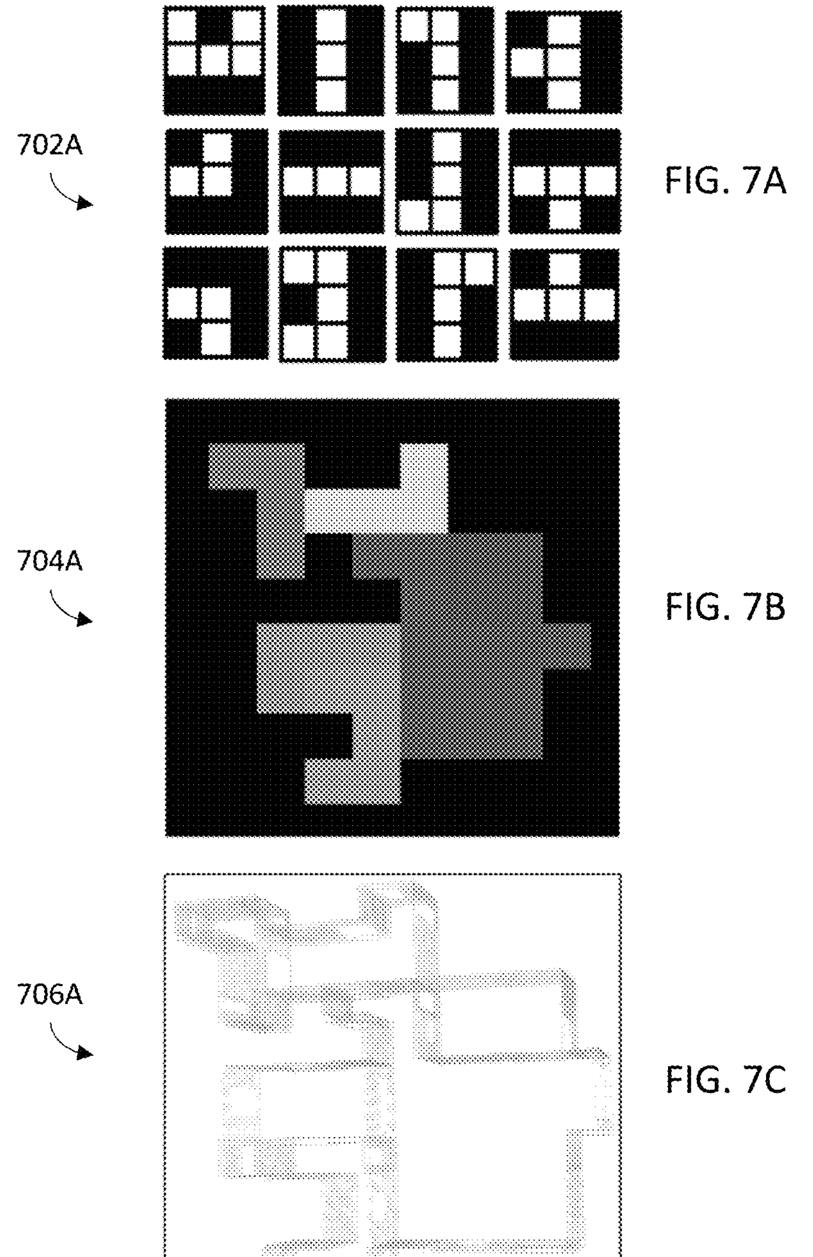
FIG. 7 is a schematic illustration of a tracking map formed by a device traversing a path through a physical world.

In order to generate this dataset, some embodiments start with a library of shapes shown in FIG. 7A, which are simply various combinations of bits on a binary 3×3 kernel. To create a synthetic layout with No rooms, some embodiments randomly select a shape from the library and place it on the center of a 32×32 grid, referred to as an occupancy grid, and assign a room label l=0 to it. To add the next $N_o-1$ rooms and their labels, some embodiments iteratively select any of the adjacent unoccupied grid spaces and place another random shape from the library as long it does not overlap with the currently occupied spaces. Occasionally, some embodiments randomly create a "super-room", which is when some embodiments assign the same label l to several connected shapes. An example can be seen in FIG. 7B, where the red room is created from a combination of the library shapes, whereas the others are created from a single shape. Moreover, FIG. 7A illustrates that some example shapes 702A from a shape library; FIG. 7B illustrates a labeled occupancy grid 704A that is generated for a sample of a dataset; and FIG. 7C illustrates a final point cloud 706A generated from the occupancy grid, which may be used for training or testing a pipeline.

Once an occupancy grid is created with a random number of rooms from 0 to $N_{omax}$, some embodiments iterate over the occupancy grid to identify wall locations and create a 3D representation of the wall plane by randomly sampling points on the plane assuming all the walls to have a fixed elevation, following which some embodiments are able to generate a 3D point cloud with two room labels and a wall label for each point. The two room labels are set to be identical if the point belongs to a single room, and they are distinct if the point belongs to two different rooms simultaneously.

Each point is assumed to belong to a single wall only. To create even more variance in the room dimensions, some embodiments randomly scale the width and height of the rows and columns of the occupancy grid. It is also possible to cut out randomly sized rectangular blocks to represent missing points in scenarios where a door or window might be part of the wall. The resulting point cloud can be seen in FIG. 7C.

At the time of training, some embodiments apply a random rotation and also a scaling for each of the X, Y and Z axes to each sample, and normalize the input to a 2m×2m box in the first quadrant. The same normalization is enforced during inference as well.

Structured 3D Dataset:

Some embodiments use the Structured3D dataset (incorporated reference 47) to evaluate the quantitative and qualitative performance of the systems or methods described herein. This dataset is a collection of 3500 well annotated apartment scans created by professional designers with a challenging variance in the room shapes and their configurations.

BKE Dataset:

Some embodiments also use the BKE (incorporated reference 1) dataset from incorporated reference 19 to evaluate the quantitative and qualitative performance of the systems or methods described herein. Because some embodiments operate under the assumption that the input scan contains only the structural elements such as walls, doors windows etc., some embodiments perform experiments by using two different versions of this dataset. In the first version which some embodiments shall refer to as BKE-syn, some embodiments construct a synthetic point cloud using the corner, edge and room annotations provided in the dataset. The samples from this dataset are clean, noise-free and contain a uniform sampling of points along all walls. The second version, which some embodiments shall refer to as BKE-struct may be obtained by retaining points in the original scan that are nearer than 0.15m to the nearest corresponding point from the same scene in BKE-syn. Some embodiments obtain a subset of points of the original scan that represent the structural elements essential to floorplan estimation while discarding the internal clutter. It is also possible to perform this filtering using publicly available semantic segmentation networks such as MinkowskiNet (incorporated reference 6) or ScanComplete (incorporated reference 8). However due to absence of a training dataset for BKE and poor performance of the pretrained MinkowskiNet on unseen datasets, some embodiments rely instead on the annotations provided in the dataset itself.

EXPERIMENTS

Some embodiments detail the various experiments performed on the pathway to generating a floorplan from a 3D scan and discuss the quantitative and qualitative results of the different parts of a pipeline on the datasets discussed above in the previous section.

Example Implementation Details

Some embodiments set the number of points input to the network as N=16384 for training and evaluation by randomly subsampling the original point cloud. For the PointNet backbone in the voting module, some embodiments use the same architecture as in. Because some embodiments normalize all the input points to lie in a 2×2m box, some embodiments set the radii of the four set abstraction layers to [0.2,0.4,0.8,1.2] respectively to enable computation of features at all possible scales. The number of feature channels is set to C=256 for every seed point, and the number of seed points to be created are M=1024. The first vote generator (for rooms) in FIG. 3 has layers with output of sizes of [256,256,6], whereas the second hidden layers (for walls) have layers with output sizes of [256,256,3].

For the DBSCAN clustering step, some embodiments set the value of ∈=5 cm for room votes and ∈=2.5 cm for wall votes. ∈ is in some sense a measure of the maximum distance between two points to group them into the same cluster. During the perimeter estimation step, some embodiments set $\theta_{min}$=15, $\beta_{min}$=15 cm and $\theta_{forth}$=15. The synthetic training dataset discussed above is generated with a maximum of just 10 rooms per sample, however during evaluation, the network is able to achieve excellent performance when the number of rooms is greater than 10 as well.

Example Results and Example Metrics:

In order to compare the results generated by some embodiments described herein to the state-of-the-art methods, some embodiments report on the same metrics as FloorSP (incorporated reference 19) and generate precision and recall values for all the corner locations, edges and room IOU (Intersection-over-Union). It should be noted that some embodiments do not parameterize the layout as a joint global graph but instead consider each room as an independent simple polygon for computing metrics. Similar to the FloorSP approach, some embodiments jointly transform and project both the ground truth and prediction corners and edges onto a 256×256 image grid and use the following rules for calculating metrics:

Corners: The list of corners is a concatenation of all room corners irrespective of their location. This implies that even though multiple corners might have the same 2D coordinates, some embodiments do not unify them if they belong to distinct rooms. Following this logic for both ground truth and predicted corners, some embodiments use a Hungarian matrix to solve the assignment problem and compute precision and recall wherein a prediction is considered true-positive if there exists a unique corner in the GT within a distance of 10 pixels from it.

Edges: Similar to the corners, some embodiments concatenate edges across all rooms and consider an edge to be a true-positive if both its corners are true-positives.

Room: A room is considered to be a true-positive if it has an IOU score of over 0.7 with a unique room from the ground truth. Contrast to Floor-SP, some embodiments already resolve any room overlaps in post-processing, so any room polygons generated by FloorVoter are guaranteed to be mutually exclusive in the 2D space.

To assess the efficiency of the method, some embodiments time the different modules of the pipeline. A forward pass of the deep network described above takes an average of 1.99s on an Nvidia GTX-Ti GPU when the input point cloud has N=16384 points. The subsequent per-room tasks are run on an Intel-XEON CPU with 8 cores, such that each room is processed in a parallel fashion. The algorithm described above takes 1.77s per scene to generate an initial layout. Following this, some embodiments assemble all room layouts in a common co-ordinate system and run some post processing steps to remove colinear corners and resolve any overlap among the room polygons. This step requires an average of 0.192s, to provide an average end-to-end runtime of 3.96s per scene for the Structured3D dataset. In comparison, the entire FloorSP pipeline run end-to-end on the same hardware takes upwards of 15-30 minutes per scene, with the expensive final global graph optimization step consuming a major chunk of the processing time.

Figure 8A:
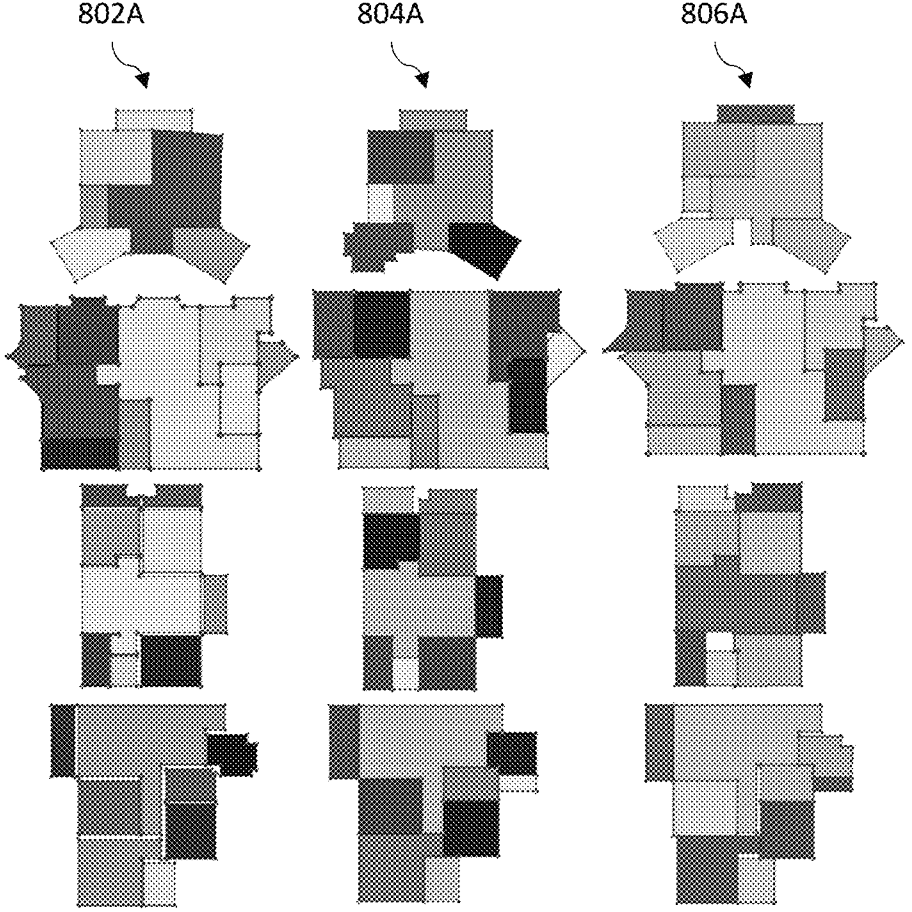
FIG. 8 is a schematic diagram illustrating a user of a cross reality (XR) system, perceiving virtual content, according to some embodiments.
Figure 8B:
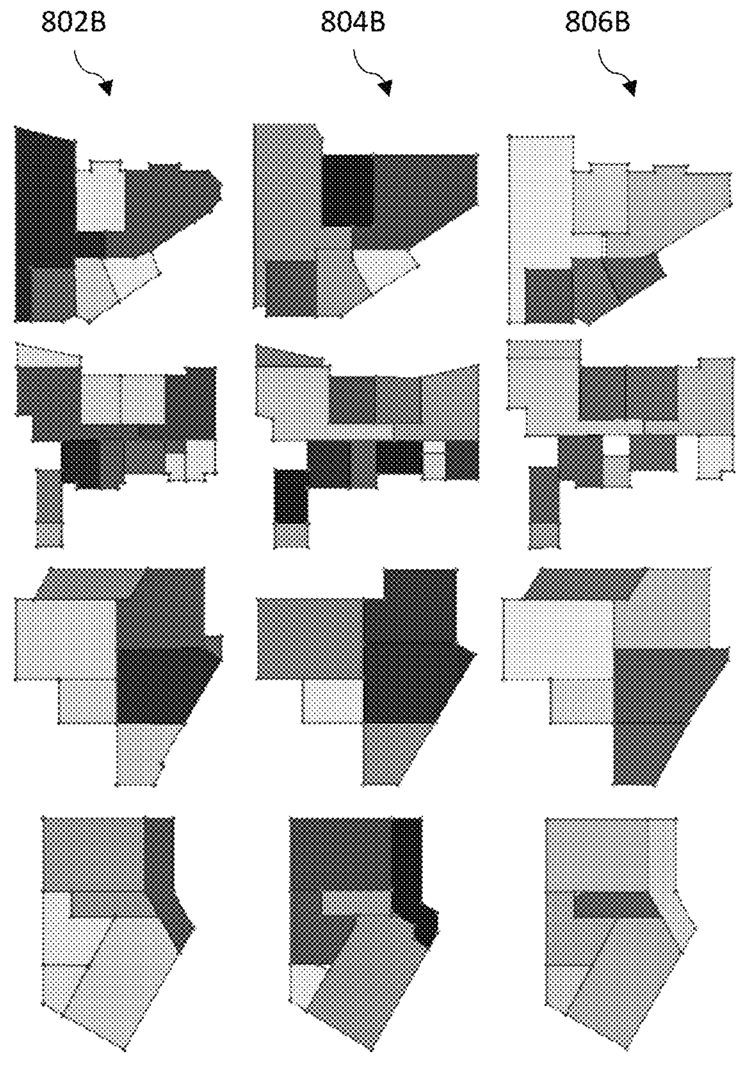

FloorVoter is able to generate accurate floorplans for a variety of shapes as shown in FIGS. 8A-8B. In FIG. 8A, 802A represents some example ground truth images; 804A represents some example result from a conventional FloorSP method; and 806A represents some example floorplan generated by some embodiments described herein on samples, from the same publicly available Structured3D and BKE datasets. In FIG. 8B, 802B represents some example ground truth images; 804B represents some example result from a conventional FloorSP method; and 806B represents some example floorplan generated by some embodiments described herein on samples, from the same publicly available Structured3D and BKE datasets. It may be seen that even though some embodiments train the voting network with only Manhattan style layouts, the room and wall clustering is equally successful on non-Manhattan style layouts, and also room shapes that are not present in the training set. This is possible due the augmentations some embodiments introduce in the dataset, primarily the randomized rotations some embodiments apply on the input, trains the network on rooms and walls that are not axis-aligned.

Figure 9A:
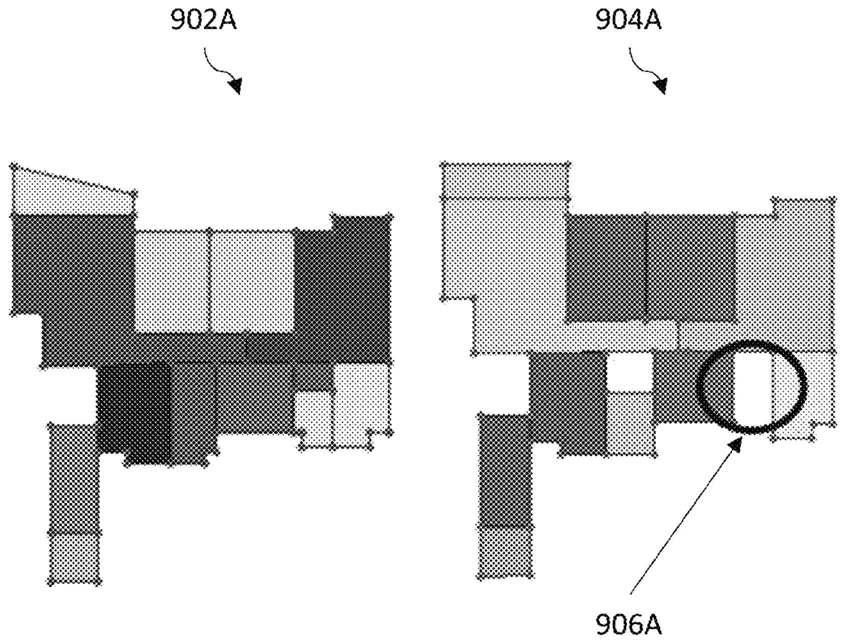
FIG. 9 is a block diagram of components of a first XR device of the XR system of FIG. 8 that transform between coordinate systems, according to some embodiments.
Figure 9B:
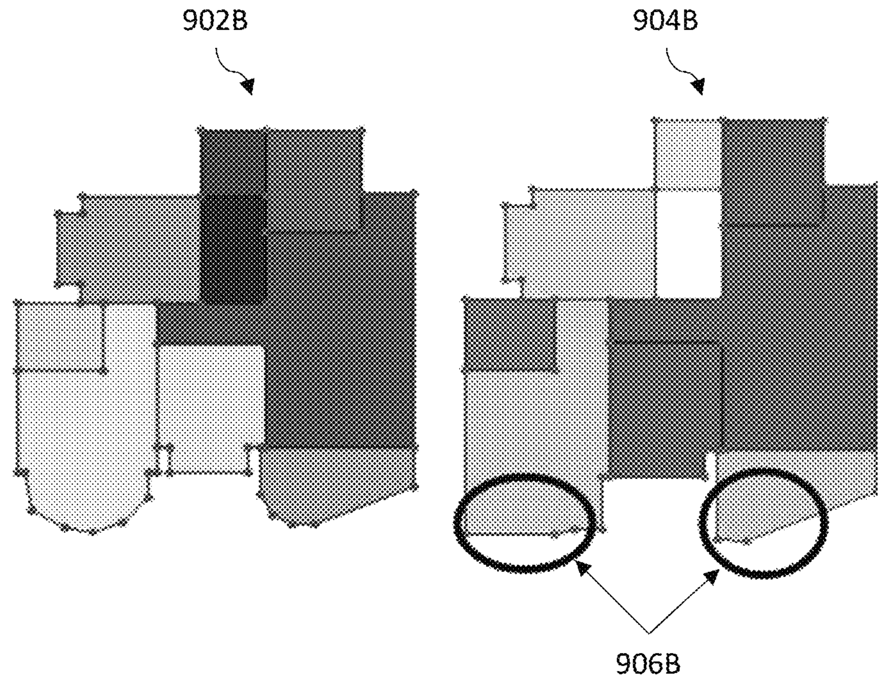
Figure 9C:
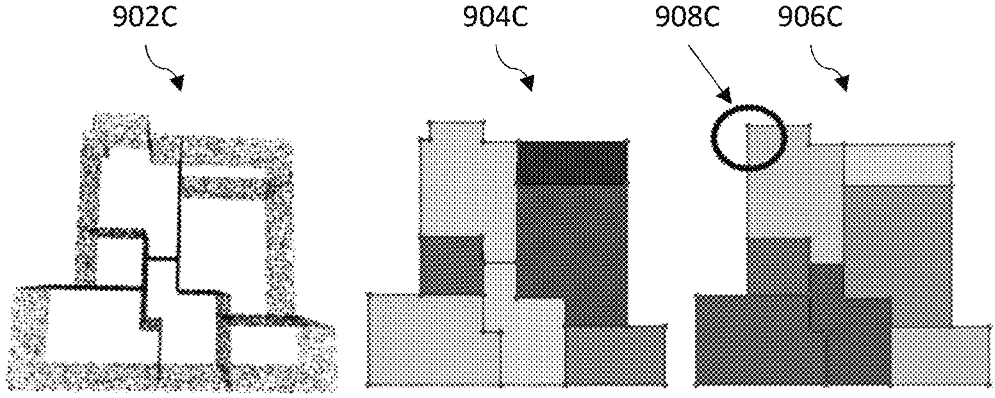
Figure 9D:
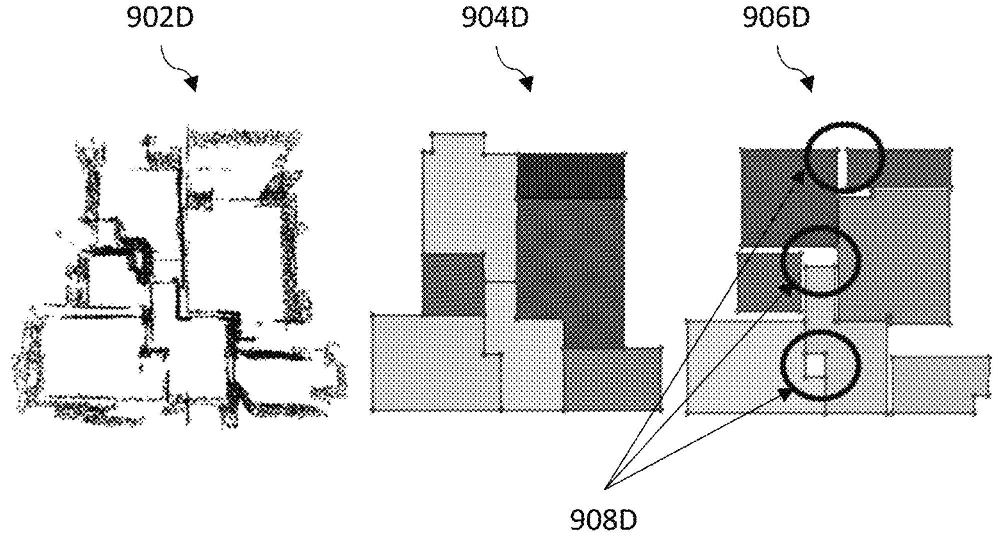

In case of extremely cluttered layouts such as ones in FIG. 9A, some small rooms are omitted because of a combination of firstly—imperfect clustering, where two small connected rooms are assigned the same label and secondly—a post processing step in the perimeter estimation where some embodiments omit walls with a low number of points as described above. Moreover, FIG. 9A illustrates some example effects of erroneous clustering on very cluttered layouts where smaller rooms in the ground truth 902A are absent in the prediction 904A as indicated by the area 906A. FIG. 9B illustrates some example inaccurate room perimeter estimation in cases with curved walls in the ground truth 902B while the prediction 904B shows inaccurate predictions as indicated by the areas 906B. FIG. 9C illustrates some example adverse effect of wall culling where an input point cloud 902C is provide to generate an estimated floor plan 906C. As shown in FIG. 9C, a small corner at the upper left-hand corner in both the input point cloud 092C and the ground truth 904C is not precisely represented in the estimated floorplan 906 as indicated by the area 908C in the estimated floorplan 906C. FIG. 9D illustrates some shortcomings of using a non-global method on inputs with missing points. More particularly, an input point cloud 902D with missing points is provide to generate an estimated floor plan 906D. As shown in FIG. 9D, the ground truth 904D indicates that the rooms are connected to one another, whereas the estimated floorplan 906D shows three unoccupied areas as indicated by 908D due to the missing points in these corresponding areas in the input cloud 902D.

One more effect of this wall culling can be seen in FIG. 9C, where a small notch in the floorplan is omitted. Another limitation of some example methods is exposed via scans with curved walls such as FIG. 9C, where in the ground truth, the curvature is expressed by a series of corners, whereas the clustering module combines multiple of these very small segments into one large segment.

On the structured3D and BKE-syn dataset (see Table 1 below), an example implementation outperforms the state-of-the-art in all the categories except room recall. This can be explained by the fact that some example methods described herein may be susceptible to grouping multiple rooms together, or omitting a room altogether in scenarios discussed in FIG. 9. On the BKE-struct, there is degradation in the precision-recall for corners and edges. This discrepancy can be explained by taking a look at FIG. 9D, where the input scans themselves are missing multiple sections of the structural elements in the scene due to the imperfect filtering procedure described above. However, since the overall shape of most of the rooms is retained, the room recall metrics remain competitive, whereas the room recall is low due to the filtering causing omission of entire rooms in some scenarios.

TABLE 1

Quantitative results of FloorVoter compared against state-of-the-art floorplan estimation methods

| | Corner P | Corner R | Edge P | Edge R | Room P | Room R |
|---|---|---|---|---|---|---|
| Structured3D(Ours) | 0.856 | 0.834 | 0.813 | 0.795 | 0.880 | 0.887 |
| Structured3D(Floorsp) | 0.838 | 0.804 | 0.778 | 0.753 | 0.795 | 0.866 |
| BKE(FloorSP) | 0.951 | 0.822 | 0.902 | 0.811 | 0.847 | 0.830 |
| BKE(FloorNet) | 0.950 | 0.766 | 0.948 | 0.768 | 0.812 | 0.721 |
| BKE-syn(FloorSP) | 0.926 | 0.833 | 0.830 | 0.750 | 0.947 | 0.944 |
| BKE-struct(FloorSP) | 0.830 | 0.659 | 0.697 | 0.557 | 0.808 | 0.690 |
| BKE-syn(ours) | 0.959 | 0.875 | 0.902 | 0.823 | 0.962 | 0.915 |
| BKE-struct(ours) | 0.842 | 0.607 | 0.714 | 0.518 | 0.870 | 0.610 |

In future iterations of this work, there exist multiple areas of this pipeline upon which some embodiments aim to improve. In order to further improve the runtime of this method, the perimeter estimation stage can be combined with the clustering stage to form an end-to-end trainable system. Such a system would take the same point cloud as an input and provided either a rasterized version of the layout or a series of polygons for each room in the scene. This would make the system even more robust to additive and subtractive noise in the inputs and also assist the clustering task with the error that is back-propagated from the perimeter estimation task. Furthermore, it should also be possible for the backbone network to generate features on the 3D scan to perform an additional task of identifying door and window locations to further add another dimension of semantic information to the current inference.

The methods and configurations of "FloorVoter" are directed to an efficient top-down approach for generating accurate floorplans from 3D scans of indoor scenes. FloorVoter relies on a deep network to perform room and wall clustering and is fully trainable on the synthetic dataset also described below. The latter part of the pipeline which predicts individual room perimeters using procedural algorithms, is highly parallelizable and as a whole, the method outperforms current state-of-the art techniques in speed and accuracy. FloorVoter is able to generate layouts of scenes without assumptions regarding the shape, size, number and configuration of rooms which renders it valuable for floorplan estimation from 3D data in the wild.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The present application includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

Figure 10:
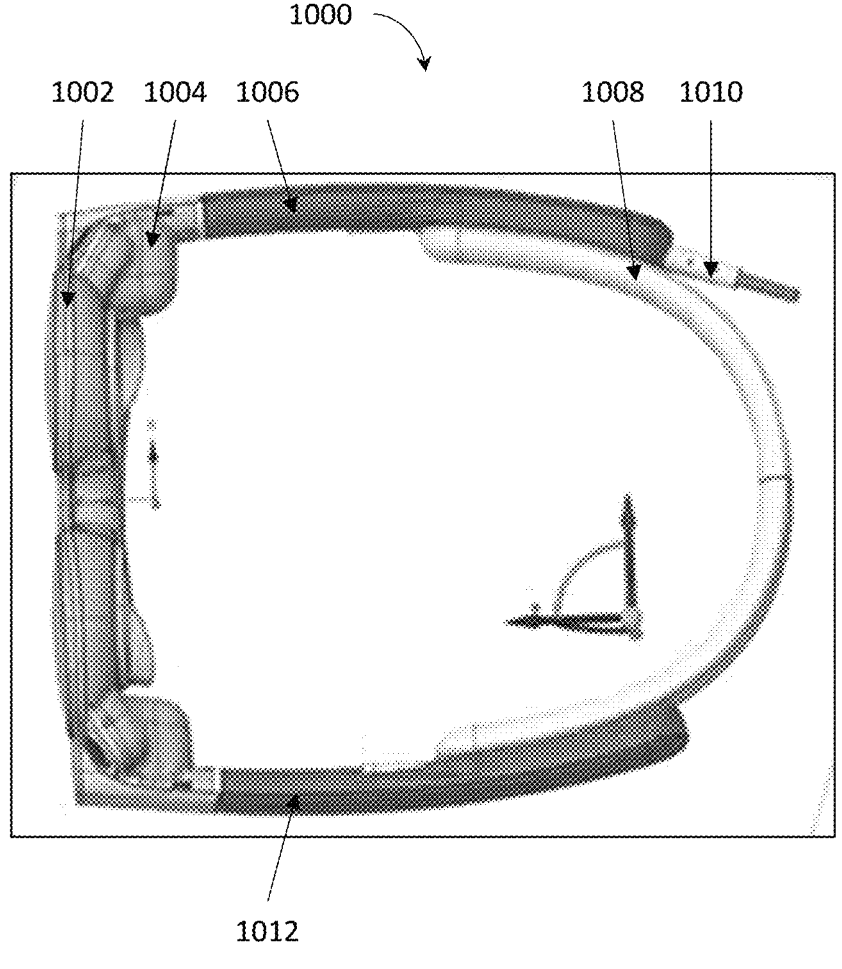
FIG. 10 illustrates a top view of an example eyewear device comprising two opposing temple arms and a torsion band that provide improved stability and enhanced ability against torsion in one or more embodiments.

FIG. 10 illustrates a top view of an example eyewear device comprising two opposing temple arms and a torsion band that provide improved stability and enhanced ability against torsion in one or more embodiments. More particularly the example eyewear device 1000 may include a frame front 1002 that may further comprise one or more spaces 1004 to accommodate, for example, optical elements, electronic components, fiber projectors, any integration components therefor, or any other suitable components or elements, etc. Unlike conventional virtual reality goggles, the example eyewear device 1000 may resemble a conventional pair of eye glasses and comprise the right temple arm 1006, the left temple arm 1012, and an expandable and collapsible torsion band assembly 1008 that is operatively attached to the right and the left temple arms. The example eyewear device 1000 may further include the provisioning for receiving a cable or a bundle of cables 1010 that may, for example, provide power and/or transmit data to and from the example eyewear device 1000.

Figure 11A:
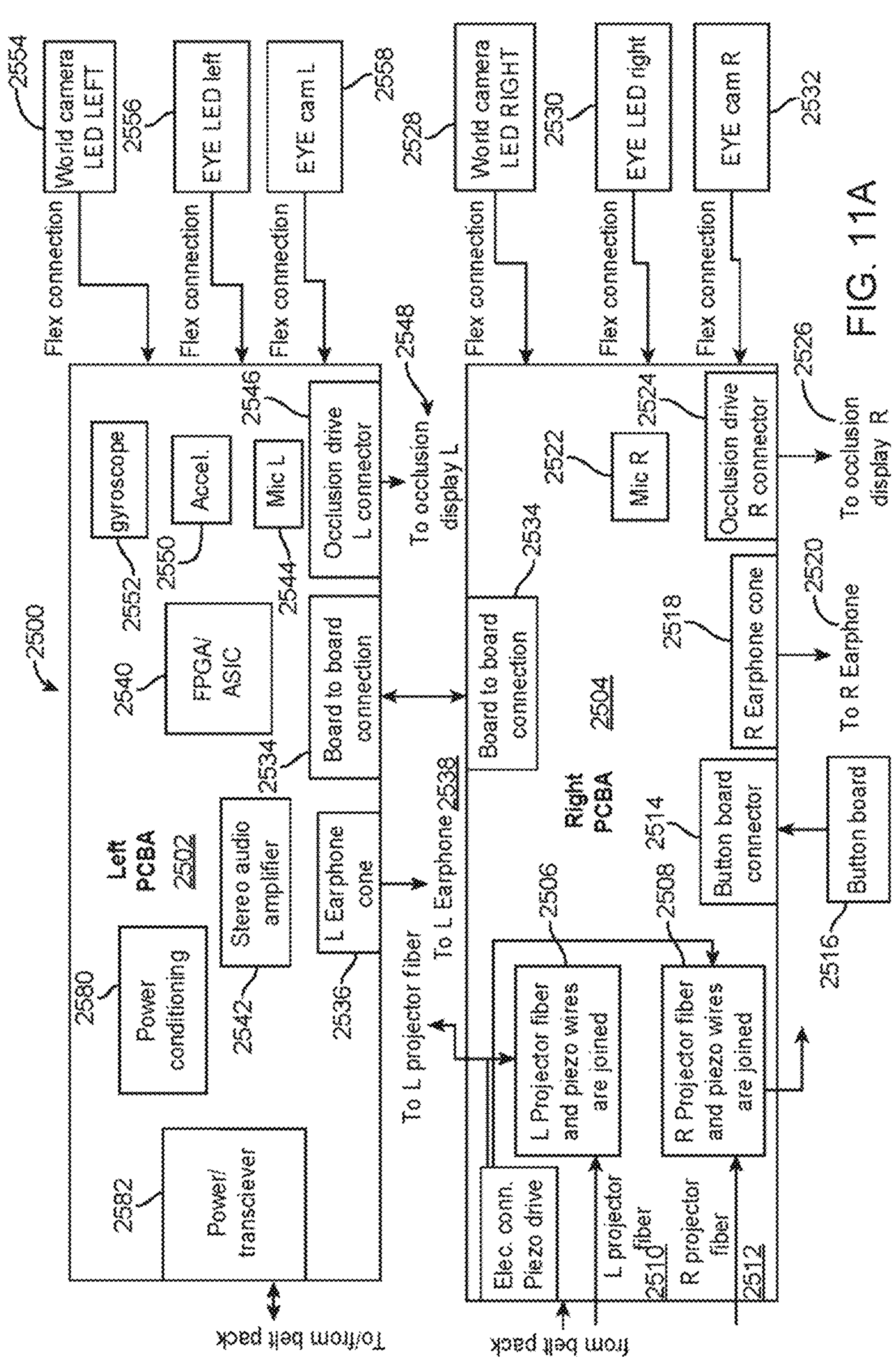
FIG. 11A illustrates example configurations of an array of micro-projectors and coupling the array of micro-projectors with an optical system in one or more embodiments.

FIG. 11A shows an example architecture 2500 for the electronics operatively coupled to an optics system or XR device in one or more embodiments. The optics system or XR device itself or an external device (e.g., a belt pack) coupled to the or XR device may include one or more printed circuit board components, for instance left (2502) and right (2504) printed circuit board assemblies (PCBA). As illustrated, the left PCBA 2502 includes most of the active electronics, while the right PCBA 604 supports principally supports the display or projector elements.

The right PCBA 2504 may include a number of projector driver structures which provide image information and control signals to image generation components. For example, the right PCBA 2504 may carry a first or left projector driver structure 2506 and a second or right projector driver structure 2508. The first or left projector driver structure 2506 joins a first or left projector fiber 2510 and a set of signal lines (e.g., piezo driver wires). The second or right projector driver structure 2508 joins a second or right projector fiber 2512 and a set of signal lines (e.g., piezo driver wires). The first or left projector driver structure 2506 is communicatively coupled to a first or left image projector, while the second or right projector drive structure 2508 is communicatively coupled to the second or right image projector.

In operation, the image projectors render virtual content to the left and right eyes (e.g., retina) of the user via respective optical components, for instance waveguides and/or compensation lenses to alter the light associated with the virtual images.

The image projectors may, for example, include left and right projector assemblies. The projector assemblies may use a variety of different image forming or production technologies, for example, fiber scan projectors, liquid crystal displays (LCD), LCOS (Liquid Crystal On Silicon) displays, digital light processing (DLP) displays. Where a fiber scan projector is employed, images may be delivered along an optical fiber, to be projected therefrom via a tip of the optical fiber. The tip may be oriented to feed into the waveguide. The tip of the optical fiber may project images, which may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Continuing with the right PCBA 2504, a button board connector 2514 may provide communicative and physical coupling to a button board 2516 which carries various user accessible buttons, keys, switches or other input devices. The right PCBA 2504 may include a right earphone or speaker connector 2518, to communicatively couple audio signals to a right earphone 2520 or speaker of the head worn component. The right PCBA 2504 may also include a right microphone connector 2522 to communicatively couple audio signals from a microphone of the head worn component. The right PCBA 2504 may further include a right occlusion driver connector 2524 to communicatively couple occlusion information to a right occlusion display 2526 of the head worn component. The right PCBA 2504 may also include a board-to-board connector to provide communications with the left PCBA 2502 via a board-to-board connector 2534 thereof.

The right PCBA 2504 may be communicatively coupled to one or more right outward facing or world view cameras 2528 which are body or head worn, and optionally a right cameras visual indicator (e.g., LED) which illuminates to indicate to others when images are being captured. The right PCBA 2504 may be communicatively coupled to one or more right eye cameras 2532, carried by the head worn component, positioned and orientated to capture images of the right eye to allow tracking, detection, or monitoring of orientation and/or movement of the right eye. The right PCBA 2504 may optionally be communicatively coupled to one or more right eye illuminating sources 2530 (e.g., LEDs), which as explained herein, illuminates the right eye with a pattern (e.g., temporal, spatial) of illumination to facilitate tracking, detection or monitoring of orientation and/or movement of the right eye.

The left PCBA 2502 may include a control subsystem, which may include one or more controllers (e.g., microcontroller, microprocessor, digital signal processor, graphical processing unit, central processing unit, application specific integrated circuit (ASIC), field programmable gate array (FPGA) 2540, and/or programmable logic unit (PLU)). The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 2502 may include a left earphone or speaker connector 2536, to communicatively couple audio signals to a left earphone or speaker 2538 of the head worn component. The left PCBA 2502 may include an audio signal amplifier (e.g., stereo amplifier) 2542, which is communicative coupled to the drive earphones or speakers. The left PCBA 2502 may also include a left microphone connector 2544 to communicatively couple audio signals from a microphone of the head worn component. The left PCBA 2502 may further include a left occlusion driver connector 2546 to communicatively couple occlusion information to a left occlusion display 2548 of the head worn component.

The left PCBA 2502 may also include one or more sensors or transducers which detect, measure, capture or otherwise sense information about an ambient environment and/or about the user. For example, an acceleration transducer 2550 (e.g., three axis accelerometer) may detect acceleration in three axes, thereby detecting movement. A gyroscopic sensor 2552 may detect orientation and/or magnetic or compass heading or orientation. Other sensors or transducers may be similarly employed.

The left PCBA 2502 may be communicatively coupled to one or more left outward facing or world view cameras 2554 which are body or head worn, and optionally a left cameras visual indicator (e.g., LED) 2556 which illuminates to indicate to others when images are being captured. The left PCBA may be communicatively coupled to one or more left eye cameras 2558, carried by the head worn component, positioned and orientated to capture images of the left eye to allow tracking, detection, or monitoring of orientation and/or movement of the left eye. The left PCBA 2502 may optionally be communicatively coupled to one or more left eye illuminating sources (e.g., LEDs) 2556, which as explained herein, illuminates the left eye with a pattern (e.g., temporal, spatial) of illumination to facilitate tracking, detection or monitoring of orientation and/or movement of the left eye.

The PCBAs 2502 and 2504 are communicatively coupled with the distinct computation component (e.g., belt pack) via one or more ports, connectors and/or paths. For example, the left PCBA 2502 may include one or more communications ports or connectors to provide communications (e.g., bi-directional communications) with the belt pack. The one or more communications ports or connectors may also provide power from the belt pack to the left PCBA 2502. The left PCBA 2502 may include power conditioning circuitry 2580 (e.g., DC/DC power converter, input filter), electrically coupled to the communications port or connector and operable to condition (e.g., step up voltage, step down voltage, smooth current, reduce transients).

The communications port or connector may, for example, take the form of a data and power connector or transceiver 2582 (e.g., Thunderbolt® port, USB® port). The right PCBA 2504 may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 2502 includes most of the active electronics, while the right PCBA 2504 supports principally supports the display or projectors, and the associated piezo drive signals. Electrical and/or fiber optic connections are employed across a front, rear or top of the body or head worn component of the optics system or XR device. Both PCBAs 2502 and 2504 are communicatively (e.g., electrically, optically) coupled to the belt pack. The left PCBA 2502 includes the power subsystem and a high-speed communications subsystem. The right PCBA 2504 handles the fiber display piezo drive signals. In the illustrated embodiment, only the right PCBA 2504 needs to be optically connected to the belt pack. In other embodiments, both the right PCBA and the left PCBA may be connected to the belt pack.

While illustrated as employing two PCBAs 2502 and 2504, the electronics of the body or head worn component may employ other architectures. For example, some implementations may use a fewer or greater number of PCBAs. As another example, various components or subsystems may be arranged differently than illustrated in FIG. 11A. For example, in some alternative embodiments some of the components illustrated in FIG. 11A as residing on one PCBA may be located on the other PCBA, without loss of generality.

As described above with reference to, for example, FIG. 1, an optics system or an XR device described herein may present virtual contents to a user so that the virtual contents may perceived as three-dimensional contents in some embodiments. In some other embodiments, an optics system or XR device may present virtual contents in a four- or five-dimensional lightfield (or light field) to a user.

Figure 11B:
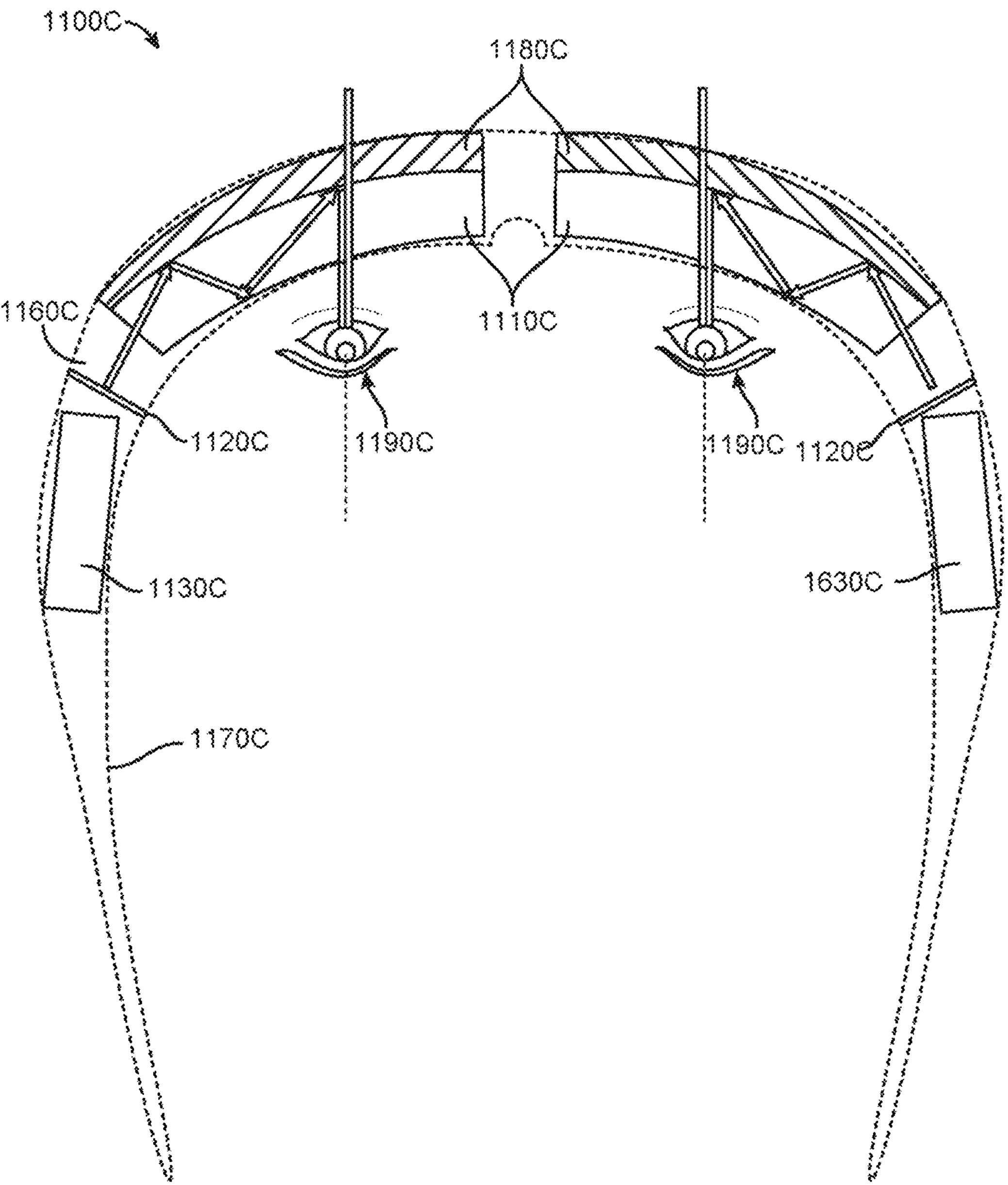
FIG. 11B illustrates a top view of some example components of a schematic representation of a wearable XR device in one or more embodiments.
Figure 11C:
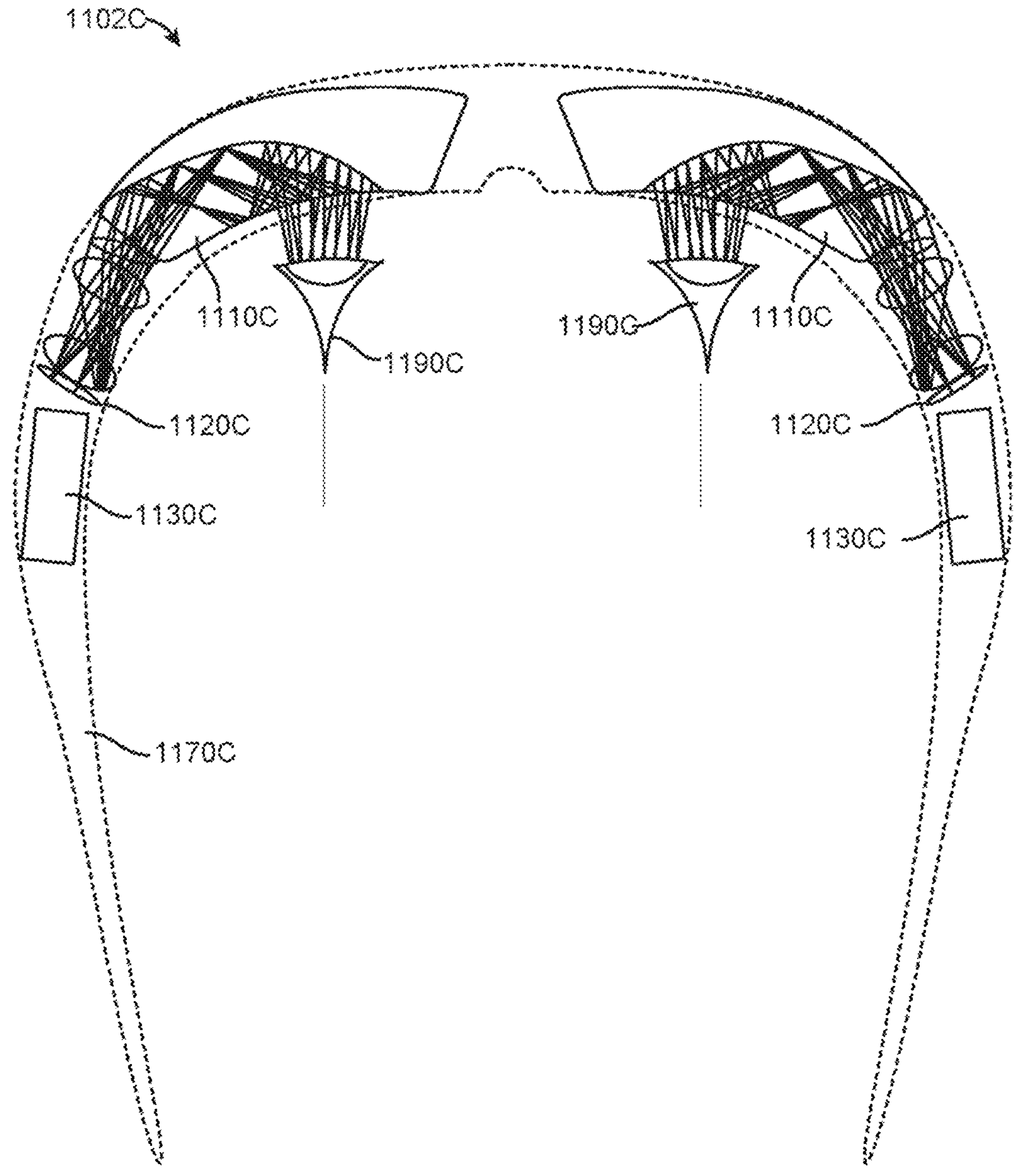
FIG. 11C illustrates an example embodiment of a schematic representation of wearable XR device in one or more embodiments.

As illustrated in FIGS. 11B-C, the light field generation subsystem (e.g., 1100C and 1102C respectively) is preferably operable to produce a light field. For example, an optical apparatus 1160C or subsystem may generate or project light to simulate a four-dimensional (4D) or five-dimensional (5D) light field that would be produced by light reflecting from a real three-dimensional object or scene. For instance, an optical apparatus such as a wave guide reflector array projector (WRAP) apparatus 1110C or multiple depth plane three-dimensional (3D) display system may generate or project multiple virtual depth planes at respective radial focal distances to simulate a 4D or 5D light field in some embodiments. In these embodiments, the optics system or XR device functions as a near-eye light field generator and display of 4D or 5D light field by interpreting input images as two-dimensional (2D) slices of a 4D function that represents the light field. It shall be noted that FIGS. 11B-C may illustrate an optics system or XR device having a light field generation subsystem described herein in some embodiments or a stereoscopic virtual content generation subsystem that projects light beams corresponding to multiple depth planes to a user's eye(s) in some other embodiments.

In some embodiments, the optics system or XR device renders stereoscopic representations of virtual contents to a user with image-based rendering that generates different views of a virtual content from a set of pre-acquired or pre-computed imagery. The virtual content may be blended or placed in an environment in which a user viewing the virtual content is located by using, for example, one or more of an environment map, a world map, a topological map (e.g., a map having point nodes representing respective locations and/or features and edges connecting nodes and representing one or more relations between connected nodes, etc.) In these embodiments, the optics system or XR device uses one or mor display or rendering algorithms for image-based rendering that requires relatively modest (e.g., compared to generation of a light field for the same virtual content) computational resources, especially in real-time implementations of the virtual content. Moreover, the cost of interactions with the generated virtual content may be independent of the complexities of the virtual content. Moreover, the source of the images used in generating the virtual content may be real (e.g., photographs or video sequences of a physical object) or virtual (e.g., from one or more models).

These embodiments based on image-based rendering and one or more maps may be based on one or more fixed viewpoints (e.g., a viewpoint from which a set of images for rendering the imaged-based virtual content is acquired). Some of these embodiments use depth values (e.g., depth information acquired by a depth sensor or computed by localization techniques such as triangulation, etc.) to relax the fixed viewpoint limit by view interpolation. In these embodiments, the optics system or XR device uses depth information (e.g., depth data for a smaller subset of pixels in an image or for each pixel in the image) for view interpretation in order to reproject points in, for example, the environment map (e.g., a geometric map having detailed geometric and/or geographical information of features, points, etc. in the map) relative to the user based on, for example, the location, the orientation, and/or the gaze direction of the user.

Some other embodiments using the image-based rendering and one or more maps relaxed the fixed viewpoint limit by determining corresponding point(s) and/or correspondences in a pair of images used for rendering the virtual content based at least in part upon the positions of the image sensor(s) capturing the pair of images. Both classes of embodiments with image-based rendering effectively generate and present virtual contents that may be perceived as stereoscopic by viewing users although there may exist situations where, for example, determining the correspondences between pair(s) of images may not necessarily be deterministically performed.

Some other embodiments thus generate a 4D or 5D light field with the optics system or XR device, rather than adopting the aforementioned image-based rendering. A light field may be generated with a 5D function (e.g., a 5D plenoptic function) and includes the radiance at a point in a given direction in a three-dimensional space. Therefore, a light field may include the 5D function that defines a set of spatial-angular images. In these embodiments where the radiance R at a point A having the coordinate (x, y, z) in space propagates along a direction $D(\phi,\theta)$ may have the form of $R(x, y, z, \phi, \theta)$ where $\phi$ has a range of $[0, \pi]$, inclusive, and $\theta$ has the range of $[0, 2\pi]$, also inclusive. In this form, $\phi$ denotes the angle from the horizontal plane defined by the x-axis and y-axis; and $\theta$ denotes an angle between a vector connecting the point in the 3D space and the origin of the coordinate system and a reference unit vector (e.g., a unit vector along the x-axis).

In some embodiments, radiance is conserved in a medium (e.g., a transparent medium such as air). The above 5D function exhibits a certain amount of redundance due to radiance conservation. In these embodiments, the aforementioned 5D function representing the light field may be reduced to a 4D function $R(x, y, \phi, \theta)$ when the optics system or XR device creates the 5D function in a surface (e.g., the plane z=0) and thus effectively reduces the 5D function having three spatial dimensions (x, y, z) and two angular dimensions $(\phi,\theta)$ into a 4D function having two spatial dimensions (x, y) and two angular dimensions $(\phi,\theta)$. Reducing the dimensionality of the light field function from a 5D function into a 4D function not only expediates the generation of the light field for virtual contents but also conserves computational resources.

In these embodiments, an optics system or XR device described herein generate and present a light field for a virtual content to a user by computing the respective radiance of a plurality of points for the virtual content with the aforementioned 4D function (or 5D function in a more general application of the light field techniques). The computed radiance (or radiance flux) for a point includes data for the light emitted, reflected, transmitted, or received by the point and may be computed based on a per projected area basis. The radiance for a point may also include frequency and/or wavelength information and is directional as the radiance represents what the point representing a point (e.g., a pixel or a set of pixels) or a portion of the virtual content may be perceived by a user of the optics system or XR device. The radiance may be computed with any techniques such as parameterizing a line (e.g., a line from a user's eye to a point of a virtual content) by the point and a direction with orthographic image(s) or image(s) with a fixed field of view using homogeneous coordinates. For example, radiance of a point may be determined by using the light slab techniques that restrict the point for the virtual content and the point representing an eye of the user to lie with a respective convex quadrilateral and by mapping between the point of the virtual content (e.g., an image pixel of the virtual content) and the point representing an eye of a user with a linear projective map (e.g., a 3×3 matrix).

For example, an optics system or XR device or the electronics (e.g., the aforementioned belt pack) may generate a light slab by rendering 2D array of images where each image represents a slice of the 4D light slab at a fixed plane and is formed by placing the center of the projection of a virtual camera at the sample location corresponding to the point of the virtual content by performing a sheared perspective projection that is substantially similar to that used to generate a stereo pair of images. In some embodiments, a light slab may be formed from a 2D array of orthographic views.

For generating and presenting a light field representation for a virtual content to a user via the optics system or XR device, a lens (e.g., 12*a* or 12*b* in FIG. 1) of the optics system or XR device may include a stack of one or more planar or free-form waveguides where a waveguide may define one or more distinct focal planes that respectively correspond to one or more distinct focal distances. The stack of one or more planar or free-form waveguides may thus define a plurality of focal planes located at corresponding focal distances in some embodiments. A 2D slice of image may be rendered on a focal plane at a specific focal distance, and a set of 2D slices may thus be rendered at a plurality of focal planes to represent a virtual content that may then be perceived as stereoscopic by a user of the optics system or XR device.

In some embodiments, a waveguide may comprise an orthogonal pupil expansion (OPE) element associated with the first face of the planar optical waveguide for splitting the in-coupled light beam into a first set of orthogonal light beamlets, and a second orthogonal pupil expansion (OPE) element associated with the second face of the planar optical waveguide for splitting the in-coupled light beam into a second set of orthogonal light beamlets. In some embodiments, the first OPE element is disposed on the first face of the planar optical waveguide, and the second OPE element is disposed on the second face of the planar optical waveguide. The in-coupling element may be configured for optically coupling the collimated light beam from the image projection assembly as the in-coupled light beam for propagation within the planar optical waveguide via total internal reflection (TIR) along a first optical path that alternately intersects the first OPE element and the second OPE element, such that portions of the in-coupled light beam are deflected as the respective first set of orthogonal light beamlets and the second set of orthogonal light beamlets that propagate within the planar optical waveguide via TIR along second parallel optical paths. In this case, the second parallel optical paths may be orthogonal to the first optical path.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interfaces are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

In some embodiments, a waveguide may comprise an exit pupil expansion (EPE) element associated with the planar optical waveguide for splitting the orthogonal light beamlets into an array of out-coupled light beamlets (e.g., a two-dimensional out-coupled light beamlet array) that exit the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil.

In some embodiments, the EPE element is disposed on one of the first and second surfaces of the planar optical waveguide. The first set of orthogonal light beamlets and the second set of orthogonal light beamlets may intersect the EPE element, such that portions of the first set of orthogonal light beamlets and the second set of orthogonal light beamlets are deflected as the out-coupled light beamlet array out of the planar optical waveguide. In some embodiments, the EPE element is configured for imparting a convex wavefront profile on the out-coupled light beamlet array exiting the planar optical waveguide. In this case, the convex wavefront profile may have a center of radius at a focal point to produce an image at a given focal plane. In another embodiment, each of the IC element, OPE element, and EPE element is diffractive.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beamlet array) that exit a face of the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil. In some embodiments, the first thickness of the primary substrate and the second thicknesses of the secondary substrates are selected, such that spacings between centers of at least two adjacent ones of the out-coupled light beamlets are equal to or less than a width of the collimated light beam. In another embodiment, the first thickness and the second thicknesses are selected, such that no gap resides between edges of greater than half of adjacent ones of the out-coupled light beamlets.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interfaces are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a third aspect of the present disclosure, a virtual image generation system comprises a planar optical waveguide comprising a plurality of substrates including a primary substrate having a first thickness, at least one secondary substrate respectively having at least one second thicknesses, and at least one semi-reflective interface respectively disposed between the substrates.

The first thickness is at least twice each of the at least one second thickness. In some embodiments, the first thickness is a non-multiple of each of the second thickness(es). In another embodiment, the secondary substrate(s) comprises a plurality of secondary substrates. In this case, the second thicknesses may be equal to each other or two or more of the secondary substrate(s) may have second thicknesses that are not equal to each other. The first thickness may be a non-multiple of at least one of the second thicknesses. At least two of the unequal second thicknesses may be non-multiples of each other.

In some embodiments, each of the semi-reflective interface(s) comprises a semi-reflective coating, which may be, e.g., respectively disposed between the substrates via one of physical vapor deposition (PVD), ion-assisted deposition (IAD), and ion beam sputtering (IBS). Each of the coatings may, e.g., be composed of one or more of a metal (Au, Al, Ag, Ni—Cr, Cr and so on), dielectric (Oxides, Fluorides and Sulfides), and semiconductors (Si, Ge). In yet another embodiment, adjacent ones of the substrates are composed of materials having different indices of refraction.

The virtual image generation system further comprises an in-coupling (IC) element configured for optically coupling a collimated light beam from an image projection assembly for propagation as an in-coupled light beam within the planar optical waveguide. The image projection assembly may comprise a scanning device configured for scanning the collimated light beam. The semi-reflective interface(s) are configured for splitting the in-coupled light beam into a plurality of primary light beamlets that propagate within the primary substrate.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beamlet array) that exit a face of the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil. In some embodiments, the first thickness of the primary substrate and the second thickness(es) of the secondary substrate(s) are selected, such that spacings between centers of at least two adjacent ones of the out-coupled light beamlets are equal to or less than a width of the collimated light beam. In another embodiment, the first thickness and the second thickness(es) are selected, such that no gap resides between edges of greater than half of adjacent ones of the out-coupled light beamlets.

In some embodiments, the semi-reflective interface(s) are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interface(s) are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a fourth aspect of the present disclosure, a virtual image generation system comprises a pre-pupil expansion (PPE) element configured for receiving a collimated light beam from an imaging element and splitting the collimated light beam into a set of initial out-coupled light beamlets. The virtual image generations system further comprises a planar optical waveguide, an in-coupling (IC) element configured for optically coupling the set of initial out-coupled light beamlets into the planar optical waveguide as a set of in-coupled light beamlets, and one or more diffractive elements associated with the planar optical waveguide for splitting the set of in-coupled light beamlets into a set of final out-coupled light beamlets that exit a face of the planar optical waveguide. The diffractive element(s) may comprise an orthogonal pupil expansion (OPE) element associated with the planar optical waveguide for further splitting the set of in-coupled light beamlets into a set of orthogonal light beamlets, and an exit pupil expansion (EPE) element associated with the planar optical waveguide for splitting the set of orthogonal light beamlets into the set of final out-coupled light beamlets.

In some embodiments, the collimated light beam defines an entrance pupil, the set of initial out-coupled light beamlets define a pre-expanded pupil larger than the entrance pupil, and the set of final out-coupled light beamlets define an exit pupil larger than the pre-expanded pupil. In one example, the pre-expanded pupil is at least ten times larger than the entrance pupil, and the exit pupil is at least ten times larger than the pre-expanded pupil. In some embodiments, the set of initial out-coupled light beamlets is optically coupled into the planar optical waveguide as a two-dimensional light beamlet array, and the set of final out-coupled light beamlets exits the face of the planar optical waveguide as a two-dimensional light beamlet array. In another embodiment, the set of initial out-coupled light beamlets is optically coupled into the planar optical waveguide as a one-dimensional light beamlet array, and the set of final out-coupled set of light beamlets exits the face of the planar optical waveguide as a two-dimensional light beamlet array.

In some embodiments, the PPE element comprises a mini-planar optical waveguide, a mini-OPE element associated with the mini-planar optical waveguide for splitting the collimated light beam into a set of initial orthogonal light beamlets, and a mini-EPE element associated with the mini-planar optical waveguide for splitting the set of initial orthogonal light beamlets into the set of initial out-coupled light beamlets that exit a face of the mini-planar optical waveguide. The PPE may further comprise a mini-IC element configured for optically coupling the collimated light beam into the planar optical waveguide.

In another embodiment, the PPE element comprises a diffractive beam splitter (e.g., a 1×N beam splitter or a M×N beam splitter) configured for splitting the collimated light beam into an initial set of diverging light beamlets, and a lens (e.g., a diffractive lens) configured for re-collimating the initial set of diverging light beamlets into the set of initial out-coupled light beamlets.

In still another embodiment, the PPE element comprises a prism (e.g., a solid prism or a cavity prism) configured for splitting the collimated light beam into the set of in-coupled light beamlets. The prism may comprise a semi-reflective prism plane configured for splitting the collimated light beam into the set of in-coupled light beamlets.

The prism may comprise a plurality of parallel prism planes configured for splitting the collimated light beam into the set of in-coupled light beamlets. In this case, the parallel prism planes may comprise the semi-reflective prism plane. The plurality of parallel prism planes may comprise a completely reflective prism plane, in which case, a portion of the collimated light beam may be reflected by the at least one semi-reflective prism in a first direction, and a portion of the collimated light beam may be transmitted to the completely reflective prism plane for reflection in the first direction. The prism may comprise a first set of parallel prism planes configured for splitting the collimated light beam into a set of initial orthogonal light beamlets that are reflected in a first direction, and a second set of parallel prism planes configured for splitting the initial orthogonal light beamlets into the set of in-coupled light beamlets that are reflected in a second direction different from the first direction. The first and second directional may be orthogonal to each other.

In yet another embodiment, the PPE element comprises a first planar optical waveguide assembly configured for splitting the collimated light beam into a two-dimensional array of out-coupled light beamlets (e.g., an N×N light beamlet array) that exits a face of the first planar optical waveguide assembly, and a second planar optical waveguide assembly configured for splitting the two-dimensional out-coupled light beamlet array into multiple two-dimensional arrays of out-out-coupled light beamlets that exit a face of the second planar optical waveguide assembly as the set of in-coupled light beamlets. The first and second planar optical waveguide assemblies may respectively have unequal thicknesses.

The two-dimensional out-coupled light beamlet array has an inter-beamlet spacing, and the multiple two-dimensional out-coupled light beamlet arrays are spatially offset from each other by an inter-array spacing different from the inter-beamlet spacing of the two-dimensional out-coupled light beamlet array. In some embodiments, the inter-array spacing of the multiple two-dimensional out-coupled light beamlet arrays and the inter-beamlet spacing of the two-dimensional out-coupled light beamlet array are non-multiples of each other. The inter-array spacing of the multiple two-dimensional out-coupled light beamlet arrays may be greater than the inter-beamlet spacing of the two-dimensional out-coupled light beamlet array.

In some embodiments, the first planar optical waveguide assembly comprises a first planar optical waveguide having opposing first and second faces, a first in-coupling (IC) element configured for optically coupling the collimated light beam for propagation within the first planar optical waveguide via total internal reflection (TIR) along a first optical path, a first exit pupil expander (EPE) element associated with the first planar optical waveguide for splitting the collimated light beam into a one-dimensional light beamlet array that exit the second face of the first planar optical waveguide, a second planar optical waveguide having opposing first and second faces, a second IC element configured for optically coupling the one-dimensional light beamlet array for propagation within the second planar optical waveguide via TIR along respective second optical paths that are perpendicular to the first optical path, and a second exit pupil expander (EPE) element associated with the second planar optical waveguide for splitting the one-dimensional light beamlet array into the two-dimensional light beamlet array that exit the second face of the second planar optical waveguide. In this case, the first face of the second planar optical waveguide may be affixed to the second face of the first planar optical waveguide. The first and second planar optical waveguides may respectively have substantially equal thicknesses.

The second planar optical waveguide assembly may comprise a third planar optical waveguide having opposing first and second faces, a third IC element configured for optically coupling the first two-dimensional light beamlet array for propagation within the third planar optical waveguide via TIR along respective third optical paths, a third EPE element associated with the third planar optical waveguide for splitting the two-dimensional light beamlet array into a plurality of two-dimensional light beamlet arrays that exit the second face of the third planar optical waveguide, a fourth planar optical waveguide having opposing first and second faces, a fourth IC element configured for optically coupling the plurality of two-dimensional light beamlet arrays for propagation within the fourth planar optical waveguide via TIR along respective fourth optical paths that are perpendicular to the third optical paths, and a fourth EPE element associated with the fourth planar optical waveguide for splitting the plurality of two-dimensional light beamlet arrays into the multiple two-dimensional light beamlet arrays that exit the second face of the fourth planar optical waveguide as the input set of light beamlets. In this case, the first face of the fourth planar optical waveguide may be affixed to the second face of the third planar optical waveguide, and first face of the third planar optical waveguide may be affixed to the second face of the second planar optical waveguide. The first and second planar optical waveguides may respectively have substantially equal thicknesses, and the third and fourth planar optical waveguides may respectively have substantially equal thicknesses. In this case, the substantially equal thicknesses of the first and second planar optical waveguides may be different from the substantially equal thicknesses of the third and fourth planar optical waveguides. The equal thicknesses of the third and fourth planar optical waveguides may be greater than the equal thicknesses of the first and second planar optical waveguides.

The optical apparatus 1160C in the form of a WRAP apparatus 1110C or multiple depth plane 3D display system may, for instance, project images into each eye of a user, either directly or indirectly. When the number and radial placement of the virtual depth planes is comparable to the depth resolution of the human vision system as a function of radial distance, a discrete set of projected depth planes mimics the psycho-physical effect that is produced by a real, continuous, three-dimensional object or scene. In one or more embodiments, the system 1100C may comprise a frame 1170C that may be customized for each AR user. Additional components of the system 1100C may include electronics 1130C (e.g., some or all of the electronics illustrated in FIG. 11A) to connect various electrical and electronic subparts of the AR system to each other.

The system 1100C may further comprise a microdisplay 1120C that projects light associated with one or more virtual images into the waveguide prism 1110C. As shown in FIG. 11B, the light produced from the microdisplay 1120C travels within the waveguide 1110C, and some of light reaches the user's eyes 1190C. In one or more embodiments, the system 1100C may further comprise one or more compensation lenses 1180C to alter the light associated with the virtual images. FIG. 11C illustrates the same components as FIG. 11B, but illustrates how light from the microdisplays 1120C travels through the waveguides 1110C to reach the user's eyes 1190C.

It should be appreciated that the optical apparatus 1160C may include a number of linear wave guides, each with a respective series of deconstructed curved spherical reflectors or mirrors embedded, located or formed within each of the linear wave guides. The series of deconstructed curved spherical reflectors or mirrors are designed to refocus infinity-focused light at specific radial distances. A convex spherical mirror can be used to produce an output spherical wave to represent a virtual point source which appears to be located at a defined distance behind the convex spherical mirror.

By concatenating in a linear or rectangular wave guide a series of micro-reflectors whose shapes (e.g., radii of curvature about two axes) and orientation together, it is possible to project a 3D image that corresponds to a spherical wave front produced by a virtual point source at a particular x, y, z coordinate. Each of the 2D wave guides or layers provides an independent optical path relative to the other wave guides, and shapes the wave front and focuses incoming light to project a virtual depth plane that corresponds to a respective radial distance. With a plurality of 2D wave guides each providing a focal plane at a different focal depth, a user viewing the projected virtual depth planes experiences a 3D effect.

Figure 14A:
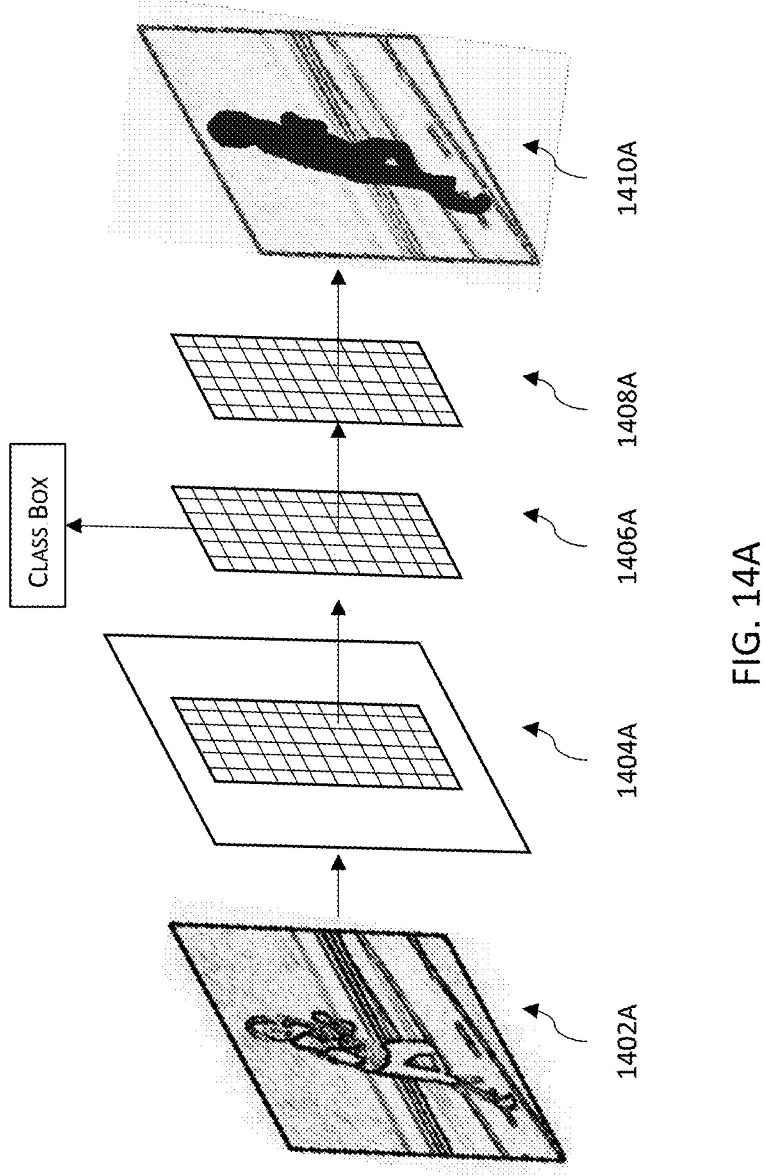
FIG. 14A illustrates a simplified schematic example of mask RCNN in some embodiments.
Figure 14B:
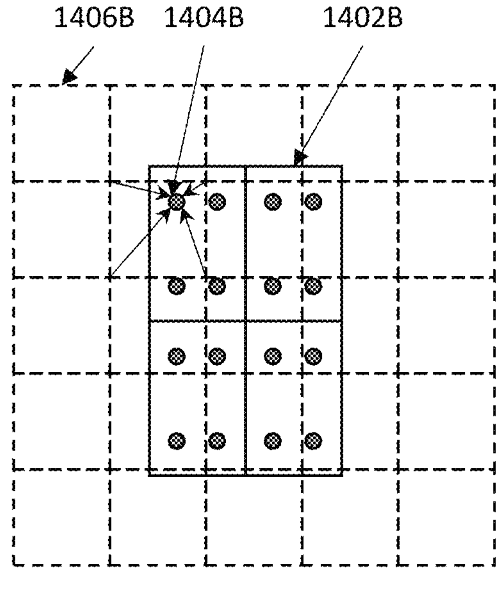
FIG. 14B illustrates an example RoIAlign (Region of Interest Alignment) in some embodiments.
Figure 14C:
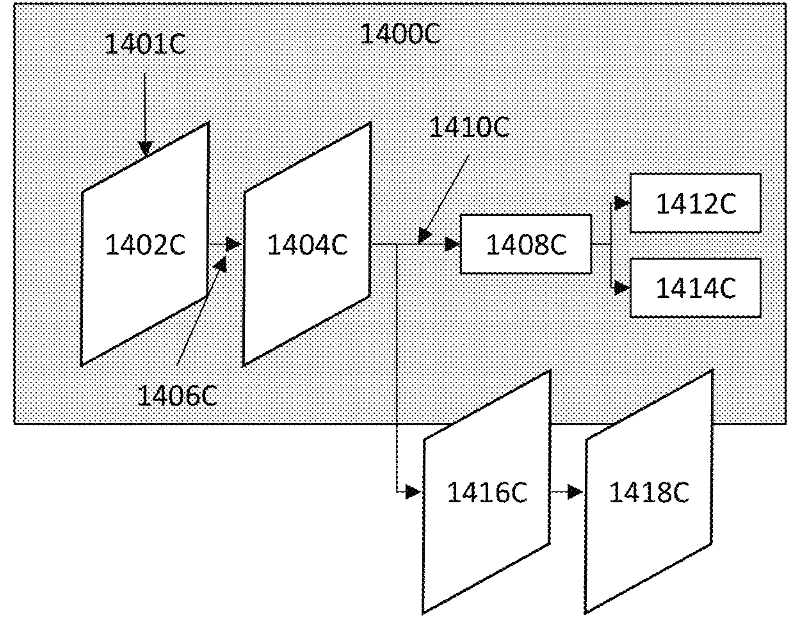
FIG. 14C illustrates an example Faster R-CNN head architecture with a ResNet and FPN (Feature Pyramid Network) backbone in some embodiments.
Figure 14C:
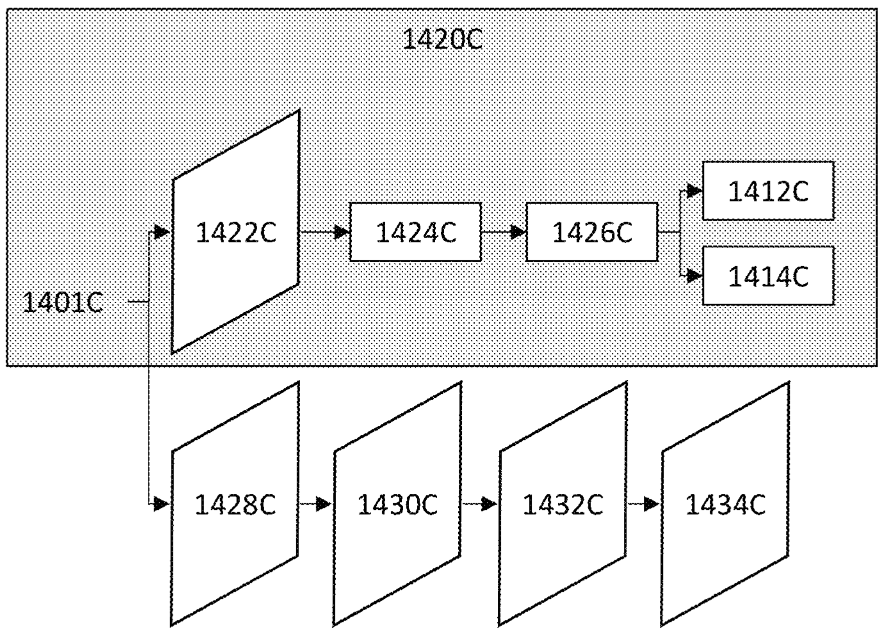
Figure 14D:
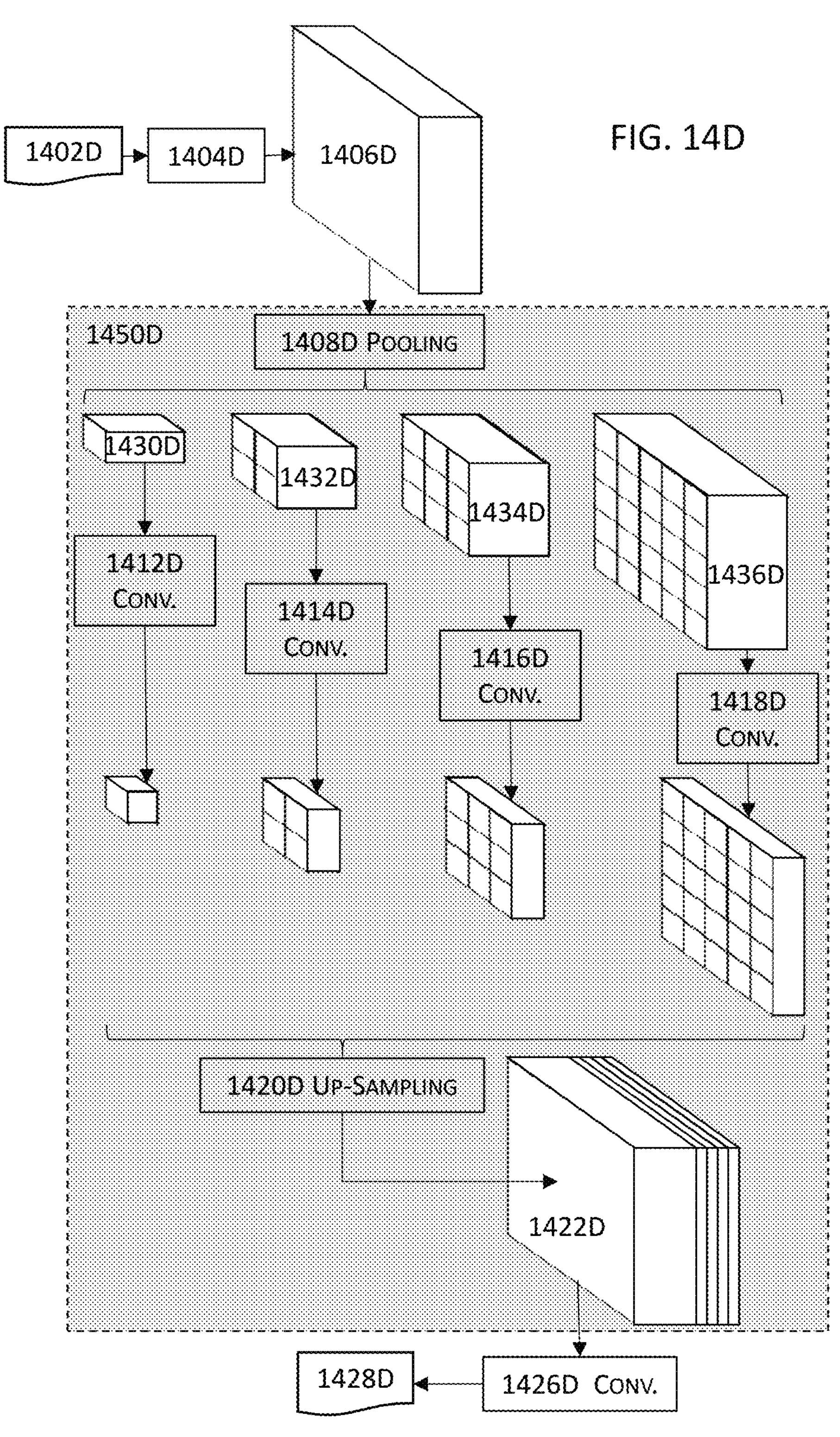
FIG. 14D illustrates an example PSPNet architecture in some embodiments.
Figure 14E:
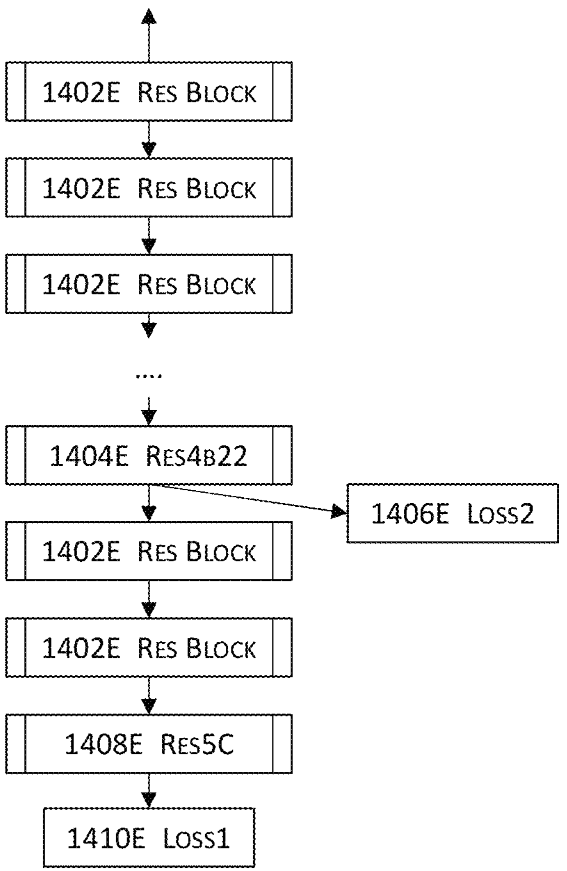
FIG. 14E illustrates an example ResNet with an auxiliary loss in some embodiments.
Figure 14F:
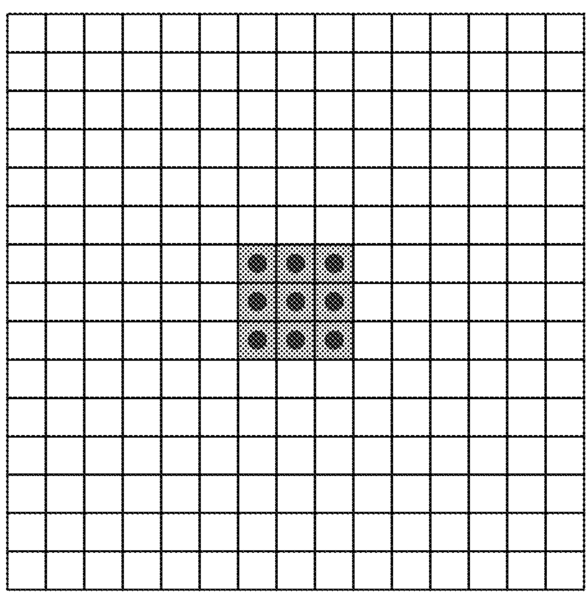
FIG. 14F illustrates a simplified example of a one (1)-dilated convolution having a 3×3 receptive field in some embodiments.

FIG. 14F illustrates a simplified example of a one (1)-dilated convolution having a 3×3 receptive field in some embodiments. More particularly, FIG. 14F illustrates that dilation supports exponential expansion of the receptive field without loss of resolution or coverage. Each element (the circular dots) in FIG. 14F has a receptive field of 3×3, and the number of parameters associated with each layer is identical with a one-dilated convolution.

Figure 14G:
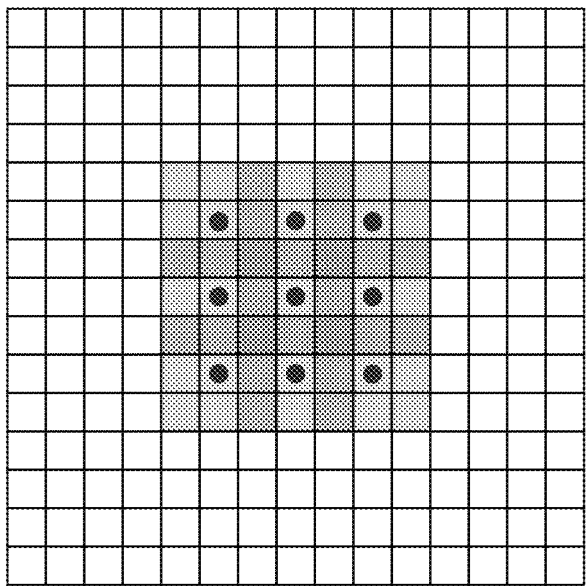
FIG. 14G illustrates a simplified example of a two (2)-dilated convolution produced from the one-dilated convolution in FIG. 7B and having a 7×7 receptive field in some embodiments.
Figure 14H:
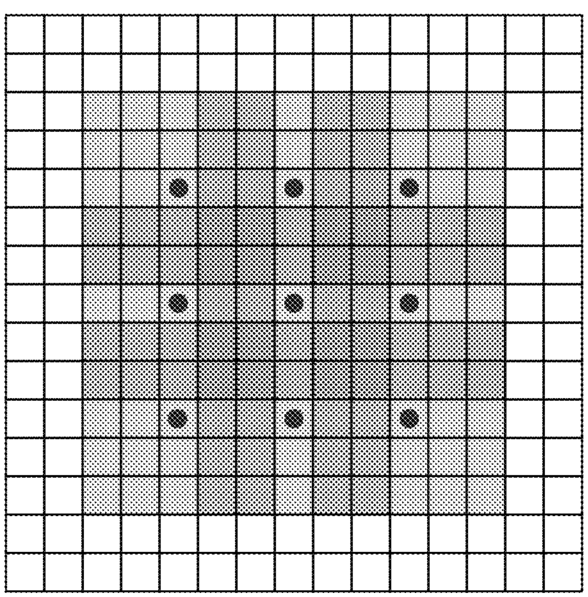
FIG. 14H illustrates a simplified example of a three (3)-dilated convolution produced from the two-dilated convolution in FIG. 7C and having a 11×11 receptive field in some embodiments.
Figure 14I:
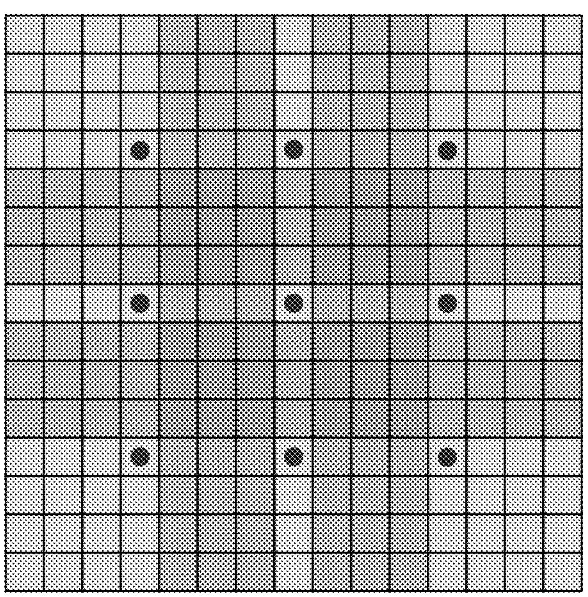
FIG. 14I illustrates a simplified example of a four (4)-dilated convolution produced from the two-dilated convolution in FIG. 7D and having a 15×15 receptive field in some embodiments.

FIG. 14G illustrates a simplified example of a two (2)-dilated convolution produced from the one-dilated convolution in FIG. 14F and having a 7×7 receptive field due to the two-dilated convolution in some embodiments. FIG. 14H illustrates a simplified example of a three (3)-dilated convolution produced from the two-dilated convolution in FIG. 14G and having a 11×11 receptive field due to the three-dilated convolution in some embodiments. FIG. 14I illustrates a simplified example of a four (4)-dilated convolution produced from the two-dilated convolution in FIG. 14H and having a 15×15 receptive field due to the four-dilated convolution in some embodiments. As it can be seen from FIGS. 14F-14I, the receptive field is a square of exponentially increasing size. That is, the respective field of each element is $(2^{i+1}-1)^2$, where i=1, 2, 3, . . . , n, and i indicates the dilation factor.

Figure 14J:
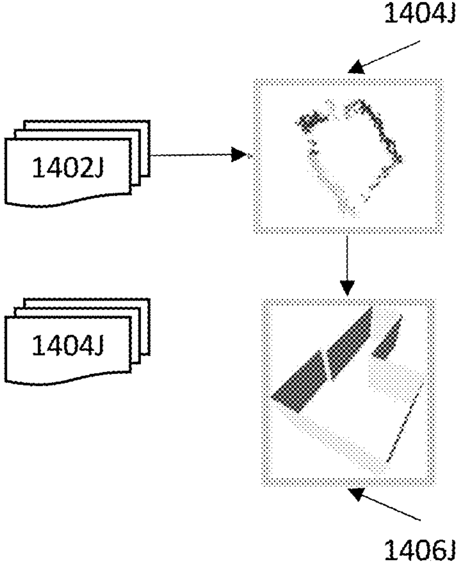
FIG. 14J illustrates an example pipeline for perimeter estimation in some embodiments.

FIG. 14H illustrates a simplified example of a three (3)-dilated convolution produced from the two-dilated convolution in FIG. 7C and having a 11×11 receptive field in some embodiments. FIG. 14I illustrates a simplified example of a four (4)-dilated convolution produced from the two-dilated convolution in FIG. 7D and having a 15×15 receptive field in some embodiments. FIG. 14J illustrates an example pipeline for perimeter estimation in some embodiments.

Figure 14K:
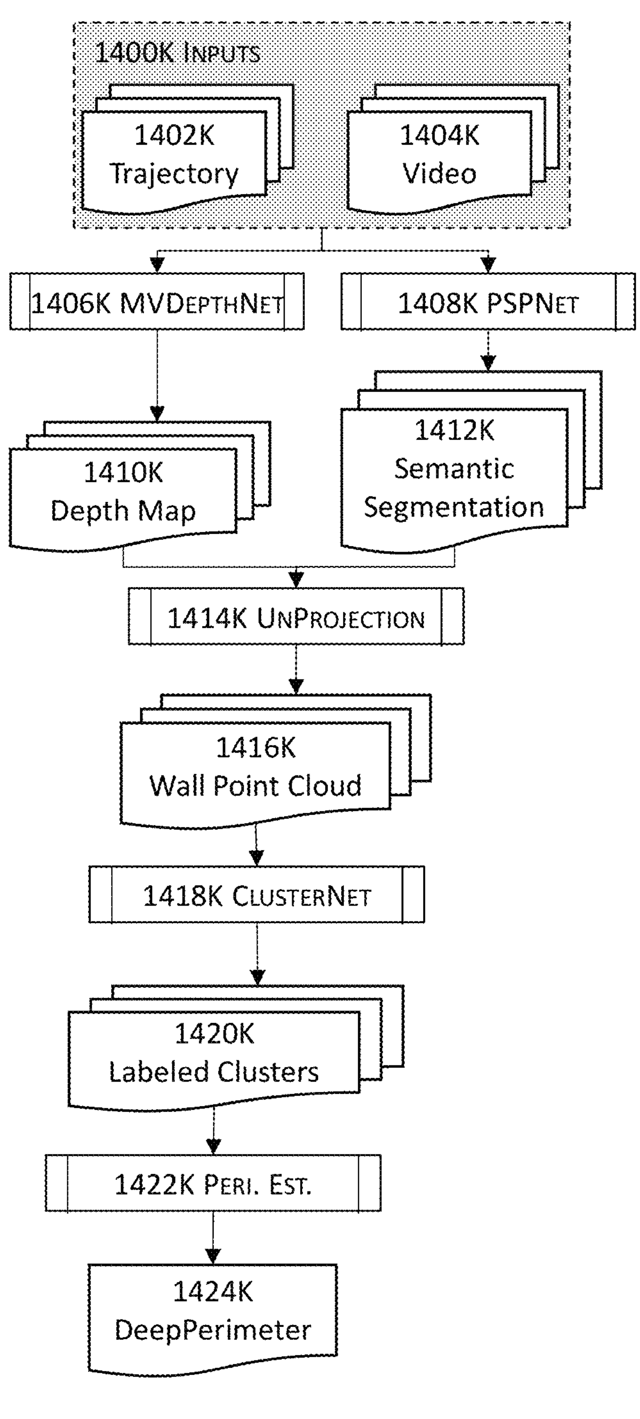
FIG. 14K illustrates another example pipeline for perimeter estimation in some embodiments.

FIG. 14K illustrates another example pipeline for perimeter estimation in some embodiments.

FIG. 15A illustrates a high-level flow diagram for generating a floorplan of a scene in some embodiments. More specifically, FIG. 15A illustrates a high-level flow diagram for generating an estimated floorplan with a two-step process. During the first step, a room classification and a wall classification may be determined at 1502A from an input image of a scene in some embodiments. An input image may include a static image such as a photograph captured by a camera in some embodiments, a sequence of images in some other embodiments, a video in other embodiments. The input image may be processed to determine a set of points or features that may also be referred to as an input point cloud. Classification may be performed to assign a label (e.g., a first wall label, a second wall label, a first room label, a second room label, etc.) to each point or feature.

During the second step 1504A, a floorplan may be estimated or determined based at least in part upon the room classification and wall classification. Unlike modern floorplan estimation approaches, a floorplan may be determined at 1504A without constraints on the number of rooms, any specific configurations of a room, or any shapes of a room in some embodiments. More details about each of the two steps illustrated in FIG. 15A will be described below.

Figure 15B:
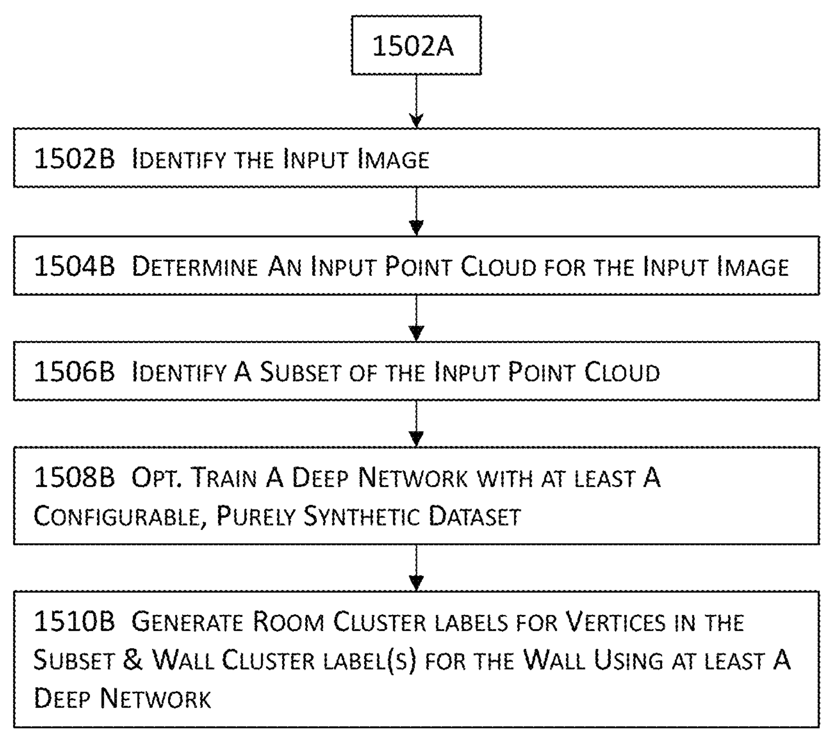
FIG. 15B illustrates more details about the high-level flow diagram illustrated in FIG. 15A for generating a floorplan of a scene in some embodiments.

FIG. 15B illustrates more details about the high-level flow diagram illustrated in FIG. 15A for generating a floorplan of a scene in some embodiments. More specifically, FIG. 15B illustrates more details about a determination of a room classification and a wall classification at 1502A in FIG. 15A. In these one or more embodiments, the input image may be identified at 1502B. An image may be obtained from a scan of a scene (e.g., an interior environment having one or more rooms with one or more walls). For example, an input image may be obtained from a 3D scan of a scene. As described above, an input image may include a static image such as a photograph captured by a camera in some embodiments, a sequence of images in some other embodiments, a video in other embodiments. An input image may be processed to determine a set of points or features that may also be referred to as an input point cloud. An image may be a two-dimensional (2D) planar image (or sequence of images) or a higher-dimensional image (or sequence of images such as a 3D image in the Euclidean space, a 4D image with temporal and spatial dimensions, a 4D lightfield representation, a 5D lightfield representation, etc.)

An input point cloud may be determined at 1504B from the input image. For example, various techniques may be applied to the input image to extract points or features (e.g., vertices, edges, etc.) from the input image and to store these extracted points or features into the input point cloud that comprises a collection of points obtained from the input image. In some embodiments, a subset of the input point cloud may be identified or determined at 1506B. In some of these embodiments, a uniform subset of the input point cloud may be identified or determined at 1506B. A deep network may be identified and optionally trained at 1508B with at least one dataset. In some embodiments, a purely synthetic dataset that includes no noise may be used to train a deep network.

At 1510B, one or more room cluster labels for one or more rooms may be generated for the input point cloud (or optionally a subset thereof). In some embodiments, room cluster labels and wall cluster labels may be generated concurrently for the respective room(s) and wall(s) with the deep network. In some embodiments, cluster labels may be generated for the input point cloud (or a subset thereof) by using a PointNet++-based clustering module that is described in greater details below with reference to FIG. 15D. In addition or in the alternative, cluster labels may be generated by identifying an existing number of clusters, determining the total number of clusters organically, determining the clusters by using one or more deep neural networks in supervised or semi-supervised settings or unsupervised settings, and/or clustering by using a voting mechanism in some other embodiments.

Figure 15C:
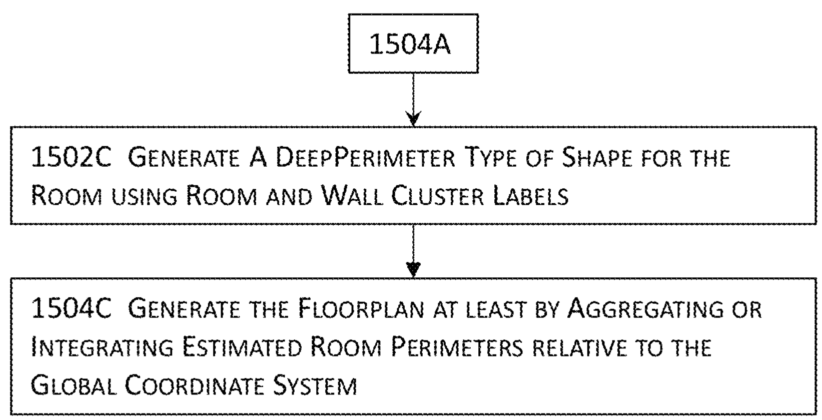
FIG. 15C illustrates more details about the high-level flow diagram illustrated in FIG. 15A for generating a floorplan of a scene in some embodiments.

FIG. 15C illustrates more details about the high-level flow diagram illustrated in FIG. 15A for generating a floorplan of a scene in some embodiments. More specifically, FIG. 15C illustrates more details about determining a floorplan at 1504A of FIG. 15A. In these embodiments, a DeepPerimeter type of shape (e.g., a room perimeter generated with a DeepPerimeter module) may be generated at 1502C for a room that is completely or partially captured in the input image (and hence represented in the input point cloud). Some of these embodiments generate a DeepPerimeter type of shape for each room, where the DeepPerimeter type of shape represents the room as a polygon and may be referred to herein as an estimated room perimeter. The floorplan may be generated at 1504C at least by aggregating or integrating the estimated room perimeter with one or more other estimated room perimeters determined for the scene from the same input image or one or more separate input images.

More details about generating a DeepPerimeter type of shape at 1502C are described below with reference to FIG. 15E.

Figure 15D:
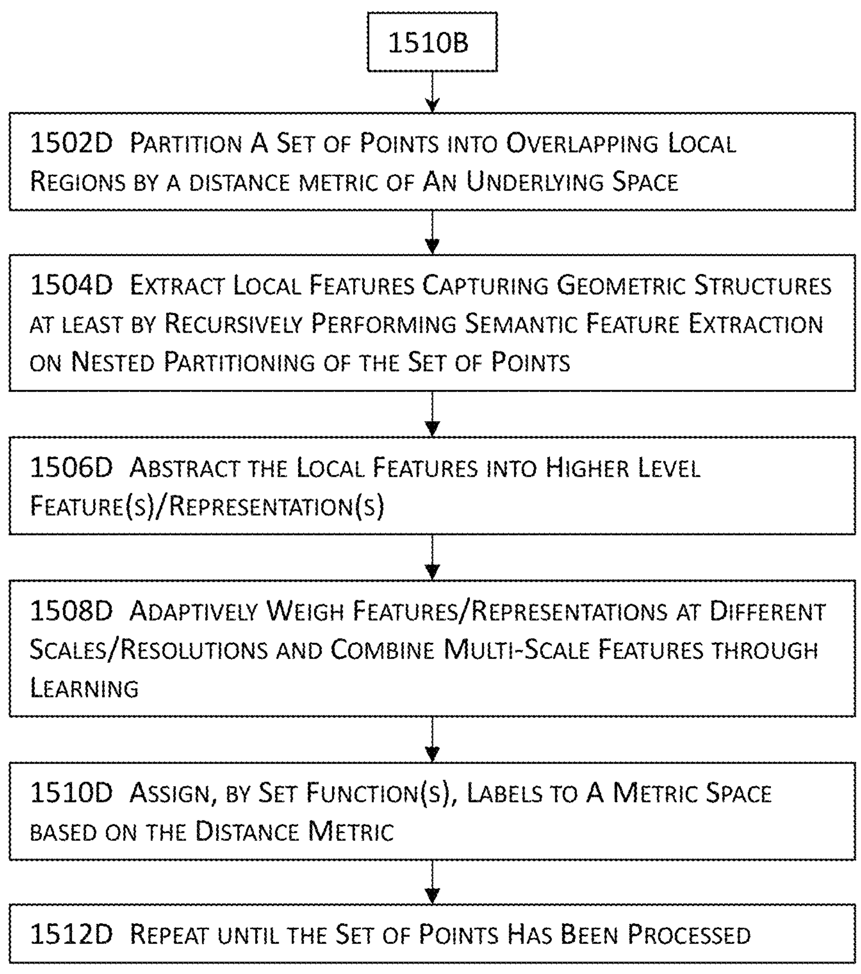
FIG. 15D illustrates more details about the flow diagram illustrated in FIG. 15B for generating a floorplan of a scene in some embodiments.

FIG. 15D illustrates more details about the flow diagram illustrated in FIG. 15B for generating a floorplan of a scene in some embodiments. More specifically, FIG. 15D illustrates more details about generating a room cluster label at 1510B of FIG. 15B. In these embodiments, a set of points may be partitioned at 1502D into overlapping local regions based at least in part upon a distance metric of the underlying space. To generate overlapping partitioning of a point set, a partition may be defined as a neighborhood ball in the underlying Euclidean space, whose parameters include centroid location and scale in some embodiments. To evenly cover the whole set, the centroids are selected among input point set by a farthest point sampling (FPS) algorithm in some of these embodiments. In some embodiments, the partitioning of the point produces common structures across partitions so that the weights of local feature learners may be shared, as in the convolutional setting.

One or more local features capturing geometric structures may be extracted at 1504D at least by recursively performing semantic feature extraction on nested partitioning of the set of points. A PointNet-based module may be employed to extract local features or points.

The vision community has rapidly improved object detection and semantic segmentation results over a short period of time. In large part, these advances have been driven by powerful baseline systems, such as the Fast/Faster R-CNN and Fully Convolutional Network (FCN) frameworks for object detection and semantic segmentation, respectively. These methods are conceptually intuitive and offer flexibility and robustness, together with fast training and inference time.

These techniques develop a framework for instance segmentation. Instance segmentation is challenging because it requires the correct detection of all objects in an image while also precisely segmenting each instance. These techniques therefore combine elements from the classical computer vision tasks of object detection, where an objective is to classify individual objects and localize each using a bounding box, and semantic segmentation, where an objective is to classify each pixel into a fixed set of categories without differentiating object instances.

Scene parsing, based on semantic segmentation, is a fundamental topic in computer vision. The goal is to assign each pixel in the image a category label. Scene parsing provides complete understanding of the scene. It predicts the label, location, as well as shape for each element. This topic is of broad interest for potential applications of automatic driving, robot sensing, to name a few. Difficulty of scene parsing is closely related to scene and label variety. The pioneer scene parsing task is to classify 33 scenes for 2,688 images on LMO dataset. More recent PASCAL VOC semantic segmentation and PASCAL context datasets include more labels with similar context, such as chair and sofa, horse and cow, etc. The new ADE20K dataset is the most challenging one with a large and unrestricted open vocabulary and more scene classes.

Semantic filtering or semantic segmentation is important in computer vision such as 2D/3D perception, scene analysis, and scene understanding, etc. and has a broad range of applications in technology areas such as XR (extended reality), AR (augmented reality), MR (mixed reality), VR (virtual reality), LiDAR (Light Detection AND Ranging), robotics, etc. Semantic segmentation or filtering receives input images for computer vision such as perception of environments. Various approaches have demonstrated successful semantic segmentation for 2D images with techniques such as 2D convolution neural networks, etc.

With the wide availability of commodity RGB-D sensors such as Microsoft Kinect, Intel RealSense, and Google Tango, 3D reconstruction of indoor spaces has gained momentum. 3D reconstructions can help create content for graphics applications, and virtual and augmented reality applications rely on obtaining high-quality 3D models from the surrounding environments. Although significant progress has been made in tracking accuracy and efficient data structures for scanning large spaces, the resulting reconstructed 3D model quality remains unsatisfactory. One fundamental limitation in quality is that, in general, one can only obtain partial and incomplete reconstructions of a given scene, as scans suffer from occlusions and the physical limitations of range sensors. In practice, even with careful scanning by human experts, it is virtually impossible to scan a room without holes in the reconstruction. Holes are both aesthetically unpleasing and can lead to severe problems in downstream processing, such as 3D printing or scene editing, as it is unclear whether certain areas of the scan represent free space or occupied space. Traditional approaches, such as Laplacian hole filling or Poisson Surface reconstruction can fill small holes. However, completing high-level scene geometry, such as missing walls or chair legs, is much more challenging. One promising direction towards solving this problem is to use machine learning for completion. Very recently, deep learning approaches for 3D completion and other generative tasks involving a single object or depth frame have shown promising results. However, generative modeling and structured output prediction in 3D remains challenging. When represented with volumetric grids, data size grows cubically as the size of the space increases, which severely limits resolution. Indoor scenes are particularly challenging, as they are not only large but can also be irregularly shaped with varying spatial extents.

State-of-the-art scene parsing frameworks are mostly based on the fully convolutional network (FCN). The deep convolutional neural network (CNN) based methods boost dynamic object understanding, and yet still face challenges considering diverse scenes and unrestricted vocabulary. These errors are due to similar appearance of objects. But when viewing the image regarding the context prior that the scene is described as boathouse near a river, correct prediction should be yielded. Towards accurate scene perception, the knowledge graph relies on prior information of scene context. One of the major issues for current FCN-based models is lack of suitable strategy to utilize global scene category clues. For typical complex scene understanding, previously to get a global image-level feature, spatial pyramid pooling was widely employed where spatial statistics provide a good descriptor for overall scene interpretation. Spatial pyramid pooling network further enhances the ability.

With the advent of 3D or even higher-dimensional (e.g., 4D spatial-temporal or spatio-temporal images, or even higher-dimensional images), these techniques suffer from poor performance and do not usually scale well with input images or image sequences (e.g., 3D video) of higher dimensionality.

In some embodiments where the input images or image sequences (e.g., videos) comprise 3D or higher-dimensional data (e.g., 3D video, 4D spatial-temporal image sequence, etc.), some embodiments utilize algorithms such as a Minkowski Net-based algorithm, a ScanComplete-based algorithm, etc. for semantic filtering or segmentation to perform scene analysis and understanding. In some other embodiments where the input images or image sequences (e.g., videos) comprise 2D data, some embodiments utilize algorithms such as a Mask RCNN-based algorithm, a PSP-Net-based algorithm, etc. for semantic filtering or segmentation to perform scene analysis and understanding.

For example, as LIDAR scanners and depth cameras become more affordable and widely used for robotics applications, 3D-videos became readily-available sources of input for robotics systems or AR/VR applications. However, there are many technical challenges in using 3Dvideos for high-level perception tasks. First, 3D data requires heterogeneous representations and processing those either alienates users or makes it difficult to integrate into larger systems. Second, the performance of the 3D convolutional neural networks is worse or on-par with 2D convolutional neural networks. Third, there are limited number of open-source libraries for fast large-scale 3D data.

To resolve most, if not all, of the challenges in the high dimensional perception, some embodiments adopt a sparse tensor for the problem and propose the generalized sparse convolutions. The generalized sparse convolution encompasses all discrete convolutions as its subclasses and is crucial for high-dimensional perception. Some embodiments implement the generalized sparse convolution and all standard neural network functions in Sec. 4 and open-source the library.

Some embodiments adopt the sparse representation for several reasons. Currently, there are various concurrent works for 3D perception: a dense 3D convolution, PointNet-variants, continuous convolutions, surface convolutions, and an octree convolution. Out of these representations, some embodiments chose a sparse tensor due to its expressiveness and generalizability for high-dimensional spaces. Also, it allows homogeneous data representation within traditional neural network libraries since most of them support sparse tensors. Second, the sparse convolution closely resembles the standard convolution (Sec. 3) which is proven to be successful in 2D perception as well as 3D reconstruction, feature learning, and semantic segmentation. Third, the sparse convolution is efficient and fast. It only computes outputs for predefined coordinates and saves them into a compact sparse tensor (Sec. 3). It saves both memory and computation especially for 3D scans or high-dimensional data where most of the space is empty. Thus, some embodiments adopt the sparse representation for the problem and create the first large-scale 3D/4D networks or Minkowski networks.

However, even with the efficient representation, merely scaling the 3D convolution to high-dimensional spaces results in significant computational overhead and memory consumption due to the curse of dimensionality. A 2D convolution with kernel size 5 requires 52=25 weights which increases exponentially to 53=125 in a 3D cube, and 625 in a 4D tesseract. This exponential increase, however, does not necessarily lead to better performance and slows down the network significantly. To overcome this challenge, some embodiments propose custom kernels with non-(hyper)-cubic shapes using the generalized sparse convolution. Finally, the predictions from the 4D spatio-temporal generalized sparse convnets are not necessarily consistent throughout the space and time. To enforce consistency, some embodiments adopt high-dimensional conditional random fields defined in a 7D trilateral space (space-time-color) with a stationary pairwise consistency function. Some embodiments use variational inference to convert the conditional random field to differentiable recurrent layers which can be implemented in as a 7D generalized sparse convnet and train both the 4D and 7D networks end-to-end.

Neural networks without 3D convolutions. Recently, a tremendous increase in the use of neural networks without 3D convolutions for 3D perception. Since 3D scans consist of thin observable surfaces, proposed to use 2D convolutions on the surface for semantic segmentation. Another direction is PointNet-based methods. PointNets use a set of input coordinates as features for a multi-layer perceptron. However, this approach processes a limited number of points and thus a sliding window for cropping out a section from an input was used for large spaces making the receptive field size rather limited.

Some approaches tried to resolve such shortcomings with a recurrent network on top of multiple pointnets, and proposed a variant of 3D continuous convolution for lower layers of a PointNet and got a significant performance boost.

Sparse Tensor and Convolution: In traditional speech, text, or image data, features are extracted densely. Type equation here. Thus, the most common representations of these data are vectors, matrices, and tensors. However, for 3-dimensional scans or even higher-dimensional spaces, such dense representations are inefficient due to the sparsity. Instead, some embodiments can only save the non-empty part of the space as its coordinates and the associated features. This representation is an N-dimensional extension of a sparse matrix; thus it is known as a sparse tensor. There are many ways to save such sparse tensors compactly, but some embodiments follow the COO format as it is efficient for Type equation here.neighborhood queries.

$$C = \begin{bmatrix} x_1 & y_1 & z_1 & t_1 & b_1 \\ \vdots & \vdots & \vdots & \vdots & \vdots \\ x_N & y_N & z_N & t_N & b_N \end{bmatrix}, F = \begin{bmatrix} f_1^T \\ \vdots \\ f_N^T \end{bmatrix}, \qquad \text{Eq. 15D-(1)}$$

Generalized sparse convolution: some embodiments generalize the sparse convolution for generic input and output coordinates and for arbitrary kernel shapes. The generalized sparse convolution encompasses not only all sparse convolutions but also the conventional dense convolutions. Let $$x_u^{in} \in R^{N^{in}}$$

be an $N^{in}$-dimensional input feature vector in a D-dimensional space at $u \in R^D$ (a D-dimensional coordinate), and convolution kernel weights be $W \in R^{K^D x N^{out} x N^{in}}$. Some embodiments break down the weights into spatial weights with $K^D$ matrices of size $N^{out} \times B^{in}$ as Wi for $\{i\}=K^D$. Then, the conventional dense convolution in D-dimension is:

$$x_u^{out} = \Sigma_{i \in V^D(k)} W_i x_{u+i}^{in}, \text{ for } u \in \{Z^D\}, \qquad \text{Eq. 15D-(2)}$$

where $V^D(k)$ is the list of offsets in D-dimensional hypercube centered at the origin, e.g., $V^1(3)=\{-1, 0, 1\}$. The generalized sparse convolution in Eq. 15D-3 relaxes Eq. 15D-2 as follows:

$$x_u^{out} = \Sigma_{i \in N^D(u, C^{in})} W_i x_{u+i}^{in}, \textit{ for } u \in Z^D, \qquad \text{Eq. 15D-(3)}$$

where $N^D$ is a set of offsets that define the shape of a kernel and $N^D(u, C^{in})=\{i|u+i \in C^{in}, i \in N^D$ as the set of offsets from the current center, u, that exist in $C^{in}$. $C^{in}$ and $C^{out}$ are predefined input and output coordinates of sparse tensors. First, note that the input coordinates and output coordinates are not necessarily the same. Second, some embodiments define the shape of the convolution kernel arbitrarily with $N^D$. This generalization encompasses many special cases such as the dilated convolution and typical hypercubic kernels. Another interesting special case is the "sparse submanifold convolution" when some embodiments set $C_{out}=C_{in}$ and ND=VD(K). If $C^{in}=C^{out}=Z^D$ and $N^D=V^D(k)$ are set, the generalized sparse convolution becomes the conventional dense convolution (Eq. 15D-2). If $C^{in}$ and $C^{out}$ are defined as multiples of a natural number and ND=VD(k), a strided dense convolution may be obtained.

Some embodiments utilize a Minkowski Engine and an automatic differentiation library for sparse tensors and the generalized sparse convolution described above. The first step in the sparse convolutional neural network is the data processing to generate a sparse tensor, which converts an input into unique coordinates, associated features, and optionally labels when training for semantic segmentation. In Algorithm 1, some embodiments list the GPU function for this process. When a dense label is given, it is important that these embodiments ignore voxels with more than one unique labels. This can be done by marking these voxels with IGNORE_LABEL. First, these embodiments convert all coordinates into hash keys and find all unique hashkey-label pairs to remove collisions. Note that SortByKey, UniqueByKey, and ReduceByKey are all standard Thrust library functions. The reduction function $f((I_x; i_x); (I_y; i_y)) =>$ (IGNORE_LABEL; ix) takes label-key pairs and returns the IGNORE_LABEL since at least two label-key pairs in the same key means there is a label collision. A CPU-version works similarly except that all reduction and sorting are processed serially.

[Algorithm 1] Inputs: coordinates $C_p \in R^{N \times D}$, features $F_p \in R^{N \times D_f}$, target labels $l \in Z_+^N$, quantization step size $v_l$ $C'_p \leftarrow \text{floor}(C_p/v_l)$ $k \leftarrow \text{hash}(C'_p)$, $i \leftarrow$ sequence $(N)$ ((i', l'), k') ← SortByKey(i, l), key = k)
(i", (k", l")) ← UniqueByKey(i', key = (k', l''))
(l''', i''') ← ReduceByKey(l", i"), key = k", fn = f)

return $C'_p[i''', ;], F_p[i'''. :], l'''$

The next step in the pipeline is generating the output coordinates Cout given the input coordinates $C^{in}$ (Eq. 15D-3). When used in conventional neural networks, this process requires only a convolution stride size, input coordinates, and the stride size of the input sparse tensor (the minimum distance between coordinates). The algorithm is presented in the supplementary material. Some embodiments create this output coordinates dynamically allowing an arbitrary output coordinates $C^{out}$ for the generalized sparse convolution. Next, to convolve an input with a kernel, some embodiments need a mapping to identify which inputs affect which outputs. This mapping is not required in conventional dense convolutions as it can be inferred easily. However, for sparse convolution where coordinates are scattered arbitrarily, some embodiments specify the mapping. This mapping may be referred to as the kernel maps and defined as pairs of lists of input indices and output indices, $M=\{(I_i,O_i)\}_i$ for $i \in N^D$. Finally, given the input and output coordinates, the kernel map, and the kernel weights Wi, some embodiments can compute the generalized sparse convolution by iterating through each of the offset $i \in N^D$ (Alg. 2) where I[n] and O[n] indicate the n-th element of the list of indices I and O respectively and Fin and Fon are also n-th input and output feature vectors respectively. The transposed generalized sparse convolution (deconvolution) works similarly except that the role of input and output coordinates is reversed.

[Algorithm 2] Kernel weights W, input features $F^i$, output feature placeholder $F^0$, convolution mapping M;

$F^0 \leftarrow 0$ // set to 0
for all $W_i$, $(I_i, O_i) \in (W, M)$ do $F_{tmp} \leftarrow W_i[F^i_{I_i[1]}, F^i_{I_i[2]}, \ldots, F^i_{I_i[n]}]$//(cu)BLAS $F_{tmp} \leftarrow F_{tmp} + [F^o_{O_i[1]}, F^o_{O_i[2]}, \ldots, F^o_{O_i[n]}]$ $[F^o_{O_i[1]}, F^o_{O_i[2]}, \ldots, F^o_{O_i[n]}] \leftarrow F_{tmp}$ end for Unlike dense tensors, on sparse tensors, the number of input features varies per output. Thus, this creates non-trivial implementation for a max/average pooling. Let I and O be the vector that concatenated all $\{I\}_i$ and $\{O_i\}_i$ for $i \in N^D$ respectively. Some embodiments first find the number of inputs per each output coordinate and indices of those inputs. Alg. 3 reduces the input features that map to the same output coordinate. Sequence (n) generates a sequence of integers from 0 to n−1 and the reduction function $f((k_1, v_1), (k_2, v_2))$=min (11, 12) which returns the minimum value given two key-value pairs. MaxPoolKernel is a custom CUDA kernel that reduces all features at a specified channel using S', which contains the first index of I that maps to the same output, and the corresponding output indices O".

- [Algorithm 3] Input: input feature F, output mapping O
- (I', O') ← sortByKey(I, key = O)
- S ← Sequence(length(O'))
- S', O" ← ReduceByKey(S, key = O', fn = f)
- return MaxPoolKernel(S', I', O", F)

An average pooling and a global pooling layer compute the average of input features for each output coordinate for average pooling or one output coordinate for global pooling. This can be implemented in multiple ways. Some embodiments use a sparse matrix multiplication since it can be optimized on hardware or using a faster sparse BLAS library. In particular, some embodiments use the cuSparse library for sparse matrix-matrix (cusparse_csrmm) and matrix-vector multiplication (cusparse_csrmv) to implement these layers. Similar to the max pooling algorithm, M is the (I, O) input-to-output kernel map. For the global pooling, some embodiments create the kernel map that maps all inputs to the origin and use the same Alg. 4. The transposed pooling (unpooling) works similarly. On the last line of the Alg. 4, some embodiments divide the pooled features by the number of inputs mapped to each output. However, this process could remove density information. Thus, some embodiments propose a variation that does not divide the number of inputs and named it the sum pooling.

For functions that do not require spatial information (coordinates) such as ReLU, some embodiments can apply the functions directly to the features F. Also, for batch normalization, as each row of F represents a feature, some embodiments may use the 1D batch normalization function directly on F.

- [Algorithm 4] Input: mapping M = (I,O), features F, one vector 1;
- $S_M$ = coo2csr(row = 0, col = I, val = 1)
- F' = cusparse_csrmm($S_M$, F)
- N = cusparse_csrmv($S_M$, 1)
- return F'/N Some embodiments introduce 4-dimensional spatio-temporal convolutional neural networks for spatio-temporal perception. Some embodiments treat the time dimension as an extra spatial dimension and create networks with 4-dimensional convolutions. However, there are unique problems arising from high-dimensional convolutions. First, the computational cost and the number of parameters in the networks increase exponentially as some embodiments increase the dimension. However, some embodiments experimentally demonstrate that these increases do not necessarily lead to better performance. Second, the networks do not have an incentive to make the prediction consistent throughout the space and time with conventional cross-entropy loss alone. To resolve the first problem, some embodiments make use of a special property of the generalized sparse convolution and propose non-conventional kernel shapes that not only save memory and computation, but also perform better. Second, to enforce spatio-temporal consistency, some embodiments adopt high-dimensional conditional random field (7D space-time-color space) that filters network predictions. Some embodiments use variational inference to train both the base network and the conditional random field end-to-end.

Tesseract kernel and hybrid kernel: The surface area of 3D data increases linearly to time and quadratically to the spatial resolution. However, when some embodiments use a conventional 4D hypercube, or a tesseract, for a convolution kernel, the exponential increase in the number of parameters leads to over-parametrization, overfitting, as well as high computational-cost and memory consumption. Instead, some embodiments adopt a hybrid kernel (non-hypercubic, non-permutohedral) to save computation. Some embodiments use the arbitrary kernel offsets N D of the generalized sparse convolution to implement the hybrid kernel. The hybrid kernel is a combination of a cross-shaped kernel a conventional cubic kernel. For spatial dimensions, some embodiments use a cubic kernel to capture the spatial geometry accurately. For the temporal dimension, some embodiments use the cross-shaped kernel to connect the same point in space across time. Some embodiments experimentally demonstrate that the hybrid kernel outperforms the tesseract kernel both in speed and accuracy.

Figure 12A:
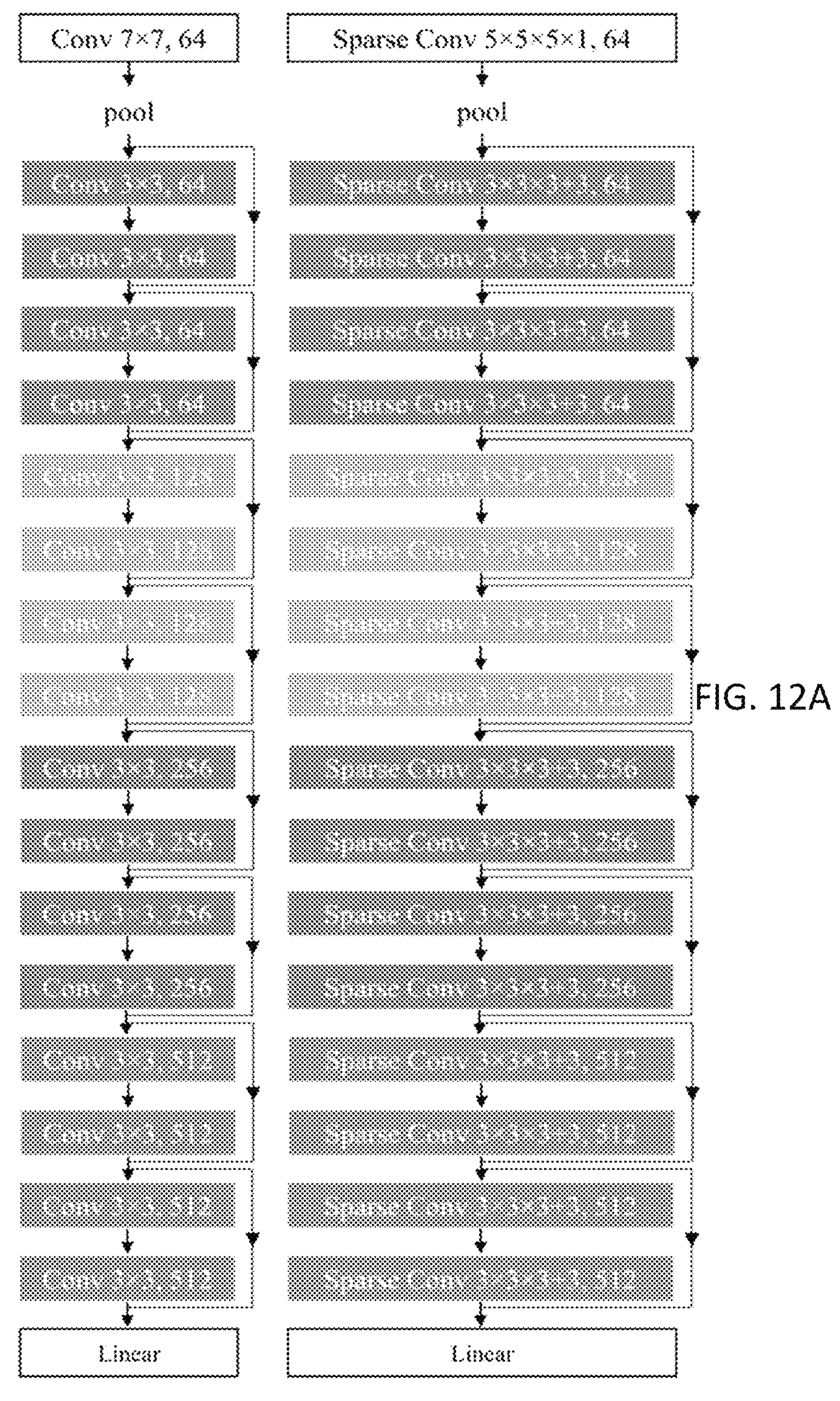
FIG. 12A illustrates an example architecture for a four-dimensional (4D), spatio-temporal (or spatial-temporal) convolutional neural network for spatial-temporal perception of 2D and/or 3D image sequence(s) in one or more embodiments.
Figure 12B:
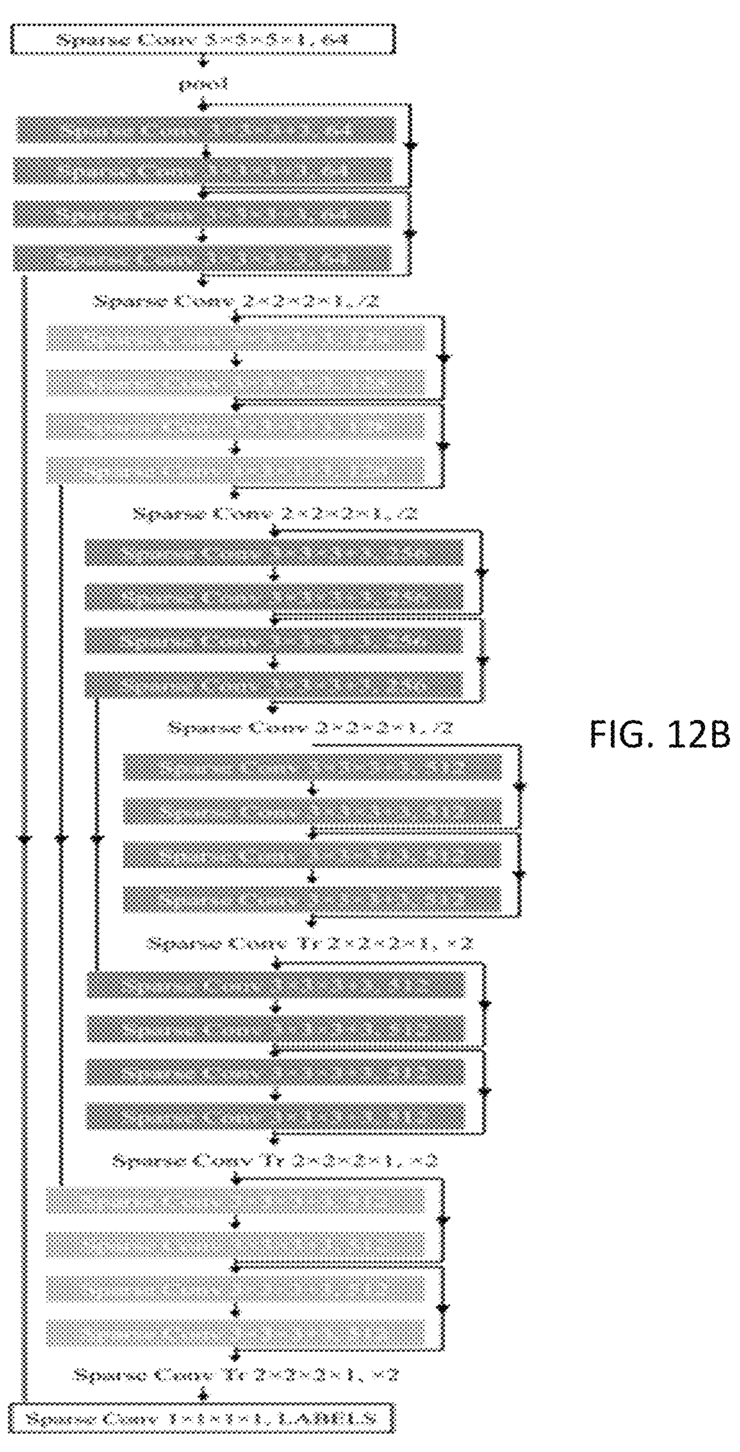
FIG. 12B illustrates another example architecture for a four-dimensional (4D), spatio-temporal (or spatial-temporal) convolutional neural network for spatial-temporal perception of 2D and/or 3D image sequence(s) in one or more embodiments.

Residual Minkowski Networks: The generalized sparse convolution allows us to define strides and kernel shapes arbitrarily. Thus, some embodiments can create a high-dimensional network only with generalized sparse convolutions, making the implementation easier and generic. In addition, it allows us to adopt recent architectural innovations in 2D directly to high-dimensional networks. To demonstrate, some embodiments create a high-dimensional version of a residual network on FIG. 12A. In FIG. 12A, the example architecture comprises a ResNet18 on the left-hand side and a MinkowskiNet18 on the right-hand side. It shall be noted that in this example architecture, "x" denotes a hypercubic kernel, and "+" denotes a hypercross kernel. For the first layer, instead of a 7×7 2D convolution, some embodiments use a 5×5×5×1 generalized sparse convolution. However, for the rest of the networks, some embodiments follow the original network architecture. For the U-shaped variants, some embodiments add multiple strided sparse convolutions and strided sparse transpose convolutions with skip connections connecting the layers with the same stride size (see FIG. 12B) on the base residual network. Some embodiments use multiple variations of the same architecture for semantic segmentation experiments. FIG. 12B illustrates an example architecture of MinkowskiUNet32. In FIG. 12B, "x" denotes a hypercubic kernel, and "+" denotes a hypercross kernel.

Trilateral Stationary-CRF: For semantic segmentation, the cross-entropy loss is applied for each pixel or voxel. However, the loss does not enforce consistency as it does not have pair-wise terms. To make such consistency more explicit, some embodiments adopt a high-dimensional conditional random field (CRF) similar to the one used in image semantic segmentation. In image segmentation, the bilateral space that consists of 2D space and 3D color is used for the CRF. For 3D-videos, some embodiments use the trilateral space that consists of 3D space, 1D time, and 3D chromatic space. The color space creates a "spatial" gap between points with different colors that are spatially adjacent (e.g., on a boundary). Thus, it prevents information from "leaking out" to different regions. Unlike conventional CRFs with Gaussian edge potentials and dense connections, some embodiments do not restrict the compatibility function to be a Gaussian. Instead, some embodiments relax the constraint and only apply the stationarity condition. To find the global optima of the distribution, some embodiments use the variational inference and convert a series of fixed point update equations to a recurrent neural network similar to. Some embodiments use the generalized sparse convolution in 7D space to implement the recurrence and jointly train both the base network that generates unary potentials and the CRF end-to-end.

Let a CRF node in the 7D (space-time-chroma) space be $x_i$ and the unary potential be $\emptyset_u(x_i)$ and the pairwise potential as $\emptyset_p(x_i, x_j)$ where $x_j$ is a neighbor of $x_j$, $N^7(x_i)$. The conditional random field is defined as:

$$P(X) = \frac{1}{Z}\exp\sum_i\left(\phi_u(x_i) + \sum_{j\in N^7(x_i)}\phi_p(x_i, x_j)\right), \qquad \text{Eq. 15D-4}$$

where Z is the partition function; X is the set of all nodes; and $\emptyset_p$ must satisfy the stationarity condition $\emptyset_p(u+\tau_u, v+\tau_v)$ for $\tau_u, \tau_v \in R^D$. Note that some embodiments use the camera extrinsics to define the spatial coordinates of a node $x_i$ in the world coordinate system. This allows stationary points to have the same coordinates throughout the time.

The optimization arg max, P(X) is intractable. Instead, some embodiments use the variational inference to minimize divergence between the optimal P(X) and an approximated distribution Q(X). Specifically, some embodiments use the mean-field approximation, $Q=\Pi_i Q_i(x_i)$ as the closed form solution exists. From the Theorem 11.9, Q is a local maximum if and only if:

$$Q_i(x_i) = \frac{1}{Z_i} \exp E_{X_{-i} \sim Q_{-i}} \left[ \phi_U(x_i) + \sum_{j \in N^7(x_i)} \phi_p(x_i, x_j) \right]$$

$X_{-i}$ and $Q_{-i}$ indicate all nodes or variables except for the i-th one. The final fixed-point equation is Eq. 15D-4. The derivation is in the supplementary material.

$$Q_i^+(x_i) = \frac{1}{Z_i} \exp \left\{ \phi_u(x_i) + \sum_{j \in N^7(x_i)} \sum_{x_j} \phi_p(x_i, x_j) Q_j(x_j) \right\}, \quad \text{Eq. 15D-(4)}$$

Learning with 7D Sparse Convolution: the weighted sum $\emptyset_p(x_i,x_j)Q_j(x_j)$ in Eq. 15D-4 is equivalent to a generalized sparse convolution in the 7D space since $\emptyset_p(x_i,x_j)$ is stationary and each edge between $x_i,x_j$ can be encoded using $N^7$. Thus, these embodiments convert fixed point update equation Eq. 15D-4 into an algorithm in Alg. 5.

- [Algorithm 5 variational inference of TS-CRF] Input: logit scores $\emptyset_u$ for all $x_i$; associated coordinate $C_i$, color $F_i$, time $T_i$.
- $Q^0(X) = \exp\emptyset_u(X)$, $C_{crf} = [C, F, T]$
- For n from 1 to N do
  1. $\tilde{Q}^n(X)$ = Sparseconvolution( $(C_{crf}, Q^{n-1})$, kernel = $\emptyset_p$)
  2. $Q^n$ = Softma($\emptyset_u + \tilde{Q}^n$
- end for
- Return $Q^N$ Finally, some embodiments use φ u as the logit predictions of a 4D Minkowski network and train both φ u and φ p end-to-end using one 4D and one 7D Minkowski network using Eq. 15D-5 below.

$$\frac{\partial L}{\partial \phi_p} = \sum_n^N \frac{\partial L}{\partial Q^{n+}} \frac{\partial Q^{n+}}{\partial \phi_p}, \frac{\partial L}{\partial \phi_u} = \sum_n^N \frac{\partial L}{\partial Q^{n+}} \frac{\partial Q^{n+}}{\partial \phi_u}, \quad \text{Eq. 15D-(5)}$$

The above description is for utilizing a Minkowski Net-based algorithm for semantic segmentation and filtering. The following description is to utilize a ScanComplete-based algorithm for semantic segmentation or filtering.

Some embodiments propose a novel approach, ScanComplete, that operates on large 3D environments without restrictions on spatial extent. Some embodiments leverage fully-convolutional neural networks that can be trained on smaller sub-volumes but applied to arbitrarily-sized scene environments at test time. This ability allows efficient processing of 3D scans of very large indoor scenes: Some embodiments show examples with bounds of up to 1480×1230×64 voxels (≈70×60×3m). Some embodiments specifically focus on the tasks of scene completion and semantic inference: for a given partial input scan, Some embodiments infer missing geometry and predict semantic labels on a per-voxel basis. To obtain high-quality output, the model must use a sufficiently high resolution to predict fine-scale detail. However, it must also consider a sufficiently large context to recognize large structures and maintain global consistency. To reconcile these competing concerns, Some embodiments adopt a coarse-to-fine strategy in which the model predicts a multi-resolution hierarchy of outputs. The first hierarchy level predicts scene geometry and semantics at low resolution but large spatial context. Following levels use a smaller spatial context but higher resolution, and take the output of the previous hierarchy level as input in order to leverage global context. In some embodiments, scene completion and semantic labeling have been observed at unprecedented spatial extents. In addition, some embodiments demonstrate that it is possible to train the model on synthetic data and transfer it to completion of real RGB-D scans taken from commodity scanning devices. The results outperform existing completion methods and obtain significantly higher accuracy for semantic voxel labeling. In summary, some embodiments provide at least the following technological advantages: 3D fully-convolutional completion networks for processing 3D scenes with arbitrary spatial extents; a coarse-to-fine completion strategy which captures both local detail and global structure; and scene completion and semantic labeling, both of outperforming existing methods by significant margins.

A ScanComplete method takes as input a partial 3D scan, represented by a truncated signed distance field (TSDF) stored in a volumetric grid. The TSDF is generated from depth frames following the volumetric fusion approach, which has been widely adopted by modern RGB-D scanning methods. Some embodiments feed this partial TSDF into a new volumetric neural network, which outputs a truncated, unsigned distance field (TDF). At train time, some embodiments provide the network with a target TDF, which is generated from a complete ground-truth mesh. The network is trained to output a TDF which is as similar as possible to this target complete TDF. The network uses a fully-convolutional architecture with three-dimensional filter banks. Its key property is its invariance to input spatial extent, which is particularly critical for completing large 3D scenes whose sizes can vary significantly. That is, some embodiments can train the network using random spatial crops sampled from training scenes, and then test on different spatial extents at test time. The memory requirements of a volumetric grid grow cubically with spatial extent, which limits manageable resolutions. Small voxel sizes capture local detail but lack spatial context; large voxel sizes provide large spatial context but lack local detail. To get the best of both worlds while maintaining high resolution, some embodiments use a coarse-to-fine hierarchical strategy. The network first predicts the output at a low resolution in order to leverage more global information from the input. Subsequent hierarchy levels operate at a higher resolution and smaller context size. They condition on the previous level's output in addition to the current-level incomplete TSDF. Some embodiments use three hierarchy levels, with a large context of several meters (~6 $m^3$) at the coarsest level, up to a fine-scale voxel resolution of ~5 $cm^3$. The network uses an autoregressive architecture. some embodiments divide the volumetric space of a given hierarchy level into a set of eight voxel groups, such that voxels from the same group do not neighbor each other. The network predicts all voxels in group one, followed by all voxels in group two, and so on. The prediction for each group is conditioned on the predictions for the groups that precede it. Thus, some embodiments use eight separate networks, one for each voxel group. Some embodiments also explore multiple options for the training loss function which penalizes differences between the network output and the ground truth target TDF. As one option, some embodiments use a deterministic' 1–distance, which forces the network to focus on a single mode. This setup is ideal when partial scans contain enough context to allow for a single explanation of the missing geometry. As another option, some embodiments use a probabilistic model formulated as a classification problem, e.g., TDF values are discretized into bins and their probabilities are weighted based on the magnitude of the TDF value. This setup may be better suited for very sparse inputs, as the predictions can be multi-modal. In addition to predicting complete geometry, the model jointly predicts semantic labels on a per-voxel basis. The semantic label prediction also leverages the fully-convolution autoregressive architecture as well as the coarse-to-fine prediction strategy to obtain an accurate semantic segmentation of the scene. In the results, some embodiments demonstrate how completion greatly helps semantic inference.

To train a ScanComplete CNN architecture, some embodiments prepare training pairs of partial TSDF scans and their complete TDF counterparts. Some embodiments generate training examples from SUNCG, using 5359 train scenes and 155 test scenes from the train-test split from prior work. As the network requires only depth input, some embodiments virtually scan depth data by generating scanning trajectories mimicking real-world scanning paths. To do this, some embodiments extract trajectory statistics from the ScanNet dataset and compute the mean and variance of camera heights above the ground as well as the camera angle between the look and world-up vectors. For each room in a SUNCG scene, some embodiments then sample from this distribution to select a camera height and angle.

Within each 1.5 $m^3$ region in a room, some embodiments select one cam era to add to the training scanning trajectory. Some embodiments choose the camera c whose resulting depth image D(c) is most similar to depth images from ScanNet. To quantify this similarity, some embodiments first compute the histogram of depth of values H(D(c)) for all cameras in ScanNet, and then compute the average histogram, $\overline{H}$. Some embodiments then compute the Earth Mover's Distance between histograms for all cameras in ScanNet and $\overline{H}$, e.g., EMD(H(D(c)), $\overline{H}$) for all cameras c in ScanNet. Some embodiments take the mean $\mu_{EMD}$ and variance $$\sigma^2_{EMD}$$

of these distance values. This gives us a Gaussian distribution over distances to the average depth histogram expected in real scanning trajectories. For each candidate camera c, some embodiments compute its probability under this distribution, e.g., N(EMD(H(D(c)), $\overline{H}$), $\mu_{EMD}$, $\sigma_{EMD}$). Some embodiments take a linear combination of this term with the percentage of pixels in D(c) which cover scene objects (e.g., not floor, ceiling, or wall), reflecting the assumption that people tend to focus scans on interesting objects rather than pointing a depth sensor directly at the ground or a wall. The highest-scoring camera c*under this combined objective is added to the training scanning trajectory.

For rendered views, some embodiments store per-pixel depth in meters. These embodiments then volumetrically fuse the data into a dense regular grid, where each voxel stores a truncated signed distance value. Some embodiments set the truncation to 3× the voxel size, and these embodiments store TSDF values in voxel-distance metrics. These embodiments repeat this process independently for three hierarchy levels, with voxel sizes of 4.7 cm 3, 9.4cf'm 3, and 18.8 cm 3. Some embodiments generate target TDFs for training using complete meshes from SUNCG. To do this, these embodiments employ the level set generation toolkit by Batty. For each voxel, these embodiments store a truncated distance value (no sign; truncation of 3×voxel size), as well as a semantic label of the closest object to the voxel center. As with TSDFs, TDF values are stored in voxel-distance metrics, and these embodiments repeat this ground truth data generation for each of the three hierarchy levels.

For training, some embodiments uniformly sample subvolumes at 3m intervals out of each of the train scenes. These embodiments keep all subvolumes containing any non-structural object voxels (e.g., tables, chairs), and randomly discard subvolumes that contain only structural voxels (e.g., wall/ceiling/floor) with 90% probability. This results in a total of 225, 414 training subvolumes. Some embodiments use voxel grid resolutions of [32×16×32], [32×32×32], and [32×64×32] for each level, resulting in spatial extents of [6m×3m×6m], [3 $m^3$], [1.5 m×3m×1.5 m], respectively. For testing, some embodiments test on entire scenes. Both the input partial TSDF and complete target TDF are stored as uniform grids spanning the full extent of the scene, which varies across the test set. The fully-convolutional architecture allows training and testing on different sizes and supports varying training spatial extents.

Note that the sign of the input TSDF encodes known and unknown space according to camera visibility, e.g., voxels with a negative value lie behind an observed surface and are thus unknown. In contrast, some embodiments use an unsigned distance field (TDF) for the ground truth target volume, since all voxels are known in the ground truth. One could argue that the target distance field should use a sign to represent space inside objects. However, this is infeasible in practice, since the synthetic 3D models from which the ground truth distance fields are generated are rarely watertight. The use of implicit functions (TSDF and TDF) rather than a discrete occupancy grid allows for better gradients in the training process; this is demonstrated by a variety of experiments on different types of grid representations in prior work.

In some embodiments, a ScanComplete network architecture for a single hierarchy level comprises a fully-convolutional architecture operating directly in 3D, which makes it invariant to different training and testing input data sizes. At each hierarchy level, the network takes the input partial scan as input (encoded as an TSDF in a volumetric grid) as well as the previous low-resolution TDF prediction (if not the base level) and any previous voxel group TDF predictions. Each of the input volumes is processed with a series of 3D convolutions with 1×1×1 convolution shortcuts. They are then all concatenated feature-wise and further processed with 3D convolutions with shortcuts. At the end, the network splits into two paths, one outputting the geometric completion, and the other outputting semantic segmentation, which are measured with an '1 loss and voxel-wise softmax cross entropy, respectively. An overview of the architectures between hierarchy levels.

To train the networks, some embodiments use the training data generated from the SUNCG dataset as described above. At training time, some embodiments feed ground truth volumes as the previous voxel group inputs to the network. For the previous hierarchy level input, however, some embodiments feed in volumes predicted by the previous hierarchy level network. By using previous hierarchy level predicted volumes as input instead, the network must learn to use the current-level partial input scan to resolve details, relying on the previous level input only for more global, lower-frequency information (such as how to fill in large holes in walls and floors). The one downside to this approach is that the networks for each hierarchy level can no longer be trained in parallel. They must be trained sequentially, as the networks for each hierarchy level depend on output predictions from the trained networks at the previous level. In some embodiments, all hierarchy levels may be trained in a single, end-to-end procedure. However, current GPU memory limitations make this intractable. Because some embodiments train the model on synthetic data, these embodiments introduce height jittering for training samples to counter overfitting, jittering every training sample in height by a (uniform) random jitter in the range [0, 0.1875] m. Because the training data is skewed towards walls and floors, some embodiments apply re-weighting in the semantic loss, using a 1:10 ratio for structural classes (e.g., wall/floor/ceiling) versus all other object classes. For the final model, some embodiments train all networks on a NVIDIA GTX 1080, using the Adam optimizer with learning rate 0.001 (decayed to 0.0001). Some embodiments train one network for each of the eight voxel groups at each of the three hierarchy levels, for a total of 24 trained networks. Note that the eight networks within each hierarchy level are trained in parallel, with a total training time for the full hierarchy of about 3 days.

Semantic segmentation on 3D or other higher-dimensional datasets (e.g., 3D scans) may be performed by using the aforementioned, modified Minkowski Net-based algorithm, ScanComplete-based algorithm, etc. while semantic segmentation on 2D datasets may be performed by using a modified Mask RCNN-based algorithm, a modified PSPNet-based algorithm, etc. The following description is directed to a modified Mask RCC-based algorithm that may be used for semantic segmentation or filtering on 2D datasets.

Rather than providing a complex method is required to achieve good results, some embodiments provide a surprisingly simple, flexible, and fast system that surpass current state-of-the-art instance segmentation results. These embodiments, also referred to as Mask R-CNN, extends Faster R-CNN by adding a branch for predicting segmentation masks on each Region of Interest (RoI), in parallel with the existing branch for classification and bounding box regression (FIG. 14A). FIG. 14A illustrates a simplified architecture for a modified mask RCNN-based architecture that receives an input 1402A such as an image or an image sequence. The modified mask RCNN-based architecture processes the input image 1402A to align a region of interest (RoI) by using RoIAlign described herein at 1404A. The output of RoIAlign 1404A is provided to a first convolution 1406A (which may also provide its output to a classification box) followed by a second convolution 1408A as described below to generate the output 1410A.

The mask branch is a small FCN applied to each RoI, predicting a segmentation mask in a pixel-to-pixel manner. Mask R-CNN is simple to implement and train given the Faster R-CNN framework, which facilitates a wide range of flexible architecture designs. Additionally, the mask branch only adds a small computational overhead, enabling a fast system and rapid experimentation. In principle Mask R-CNN is an intuitive extension of Faster R-CNN, yet constructing the mask branch properly is critical for good results. Most importantly, Faster R-CNN was not designed for pixel-to-pixel alignment between network inputs and outputs. This is most evident in how RoIPool, the de facto core operation for attending to instances, performs coarse spatial quantization for feature extraction. To fix the misalignment, we propose a simple, quantization-free layer, called RoIAlign, that faithfully preserves exact spatial locations. Despite being a seemingly minor change, RoIAlign has a large impact: it improves mask accuracy by relative 10% to 50%, showing bigger gains under stricter localization metrics. Second, we found it essential to decouple mask and class prediction: we predict a binary mask for each class independently, without competition among classes, and rely on the network's RoI classification branch to predict the category. In contrast, FCNs (Fully Convolutional Networks) usually perform per-pixel multi-class categorization, which couples segmentation and classification, and based on various experiments works poorly for instance segmentation.

Mask R-CNN is conceptually simple: Faster R-CNN has two outputs for each candidate object, a class label and a bounding-box offset; to this we add a third branch that outputs the object mask. Mask R-CNN is thus a natural and intuitive idea. But the additional mask output is distinct from the class and box outputs, requiring extraction of much finer spatial layout of an object. Next, we introduce the key elements of Mask R-CNN, including pixel-to-pixel alignment, which is the main missing piece of Fast/Faster R-CNN.

Some embodiments begin by briefly reviewing the Faster R-CNN detector. Faster R-CNN consists of two stages. The first stage, called a Region Proposal Network (RPN), proposes candidate object bounding boxes. The second stage, which is in essence Fast R-CNN, extracts features using RoIPool from each candidate box and performs classification and bounding-box regression. The features used by both stages can be shared for faster inference. Some embodiments refer readers to for latest, comprehensive comparisons between Faster R-CNN and other frameworks.

Mask R-CNN adopts the same two-stage procedure, with an identical first stage (which is RPN). In the second stage, in parallel to predicting the class and box offset, Mask R-CNN also outputs a binary mask for each RoI. This is in contrast to most recent systems, where classification depends on mask predictions. Some embodiments follow the spirit of Fast R-CNN that applies bounding-box classification and regression in parallel (which turned out to largely simplify the multi-stage pipeline of original R-CNN). Formally, during training, some embodiments define a multi-task loss on each sampled RoI as $L=L_{cls}+L_{box}+L_{mask}$. The classification loss Los and bounding-box loss $L_{box}$ are identical as those defined in. The mask branch has a $Km^2$-dimensional output for each RoI, which encodes K binary masks of resolution m×m, one for each of the K classes. To this end, some embodiments apply a per-pixel sigmoid, and define L mask as the average binary cross-entropy loss. For an RoI associated with ground-truth class k, L mask is only defined on the k-th mask (other mask outputs do not contribute to the loss). A definition of L mask allows the network to generate masks for every class without competition among classes; some embodiments rely on the dedicated classification branch to predict the class label used to select the output mask. This decouples mask and class prediction. This is different from common practice when applying FCNs to semantic segmentation, which typically uses a per-pixel softmax and a multinomial cross-entropy loss. In that case, masks across classes compete; in some embodiments, with a per-pixel sigmoid and a binary loss, they do not. Some embodiments show that this formulation is key for good instance segmentation results.

Mask Representation: A mask encodes an input object's spatial layout. Thus, unlike class labels or box offsets that are inevitably collapsed into short output vectors by fully-connected (fc) layers, extracting the spatial structure of masks can be addressed naturally by the pixel-to-pixel correspondence provided by convolutions. Specifically, some embodiments predict an m x m mask from each RoI using an FCN. This allows each layer in the mask branch to maintain the explicit m x m object spatial layout without collapsing it into a vector representation that lacks spatial dimensions. Unlike previous methods that resort to fc layers for mask prediction, the fully convolutional representation requires fewer parameters, and is more accurate as demonstrated by experiments. This pixel-to-pixel behavior requires the RoI features, which themselves are small feature maps, to be well aligned to faithfully preserve the explicit per-pixel spatial correspondence. This motivated us to develop the following RoIAlign layer that plays a key role in mask prediction.

RoIAlign: RoIPool is a standard operation for extracting a small feature map (e.g., 7×7) from each RoI. RoIPool first quantizes a floating-number RoI to the discrete granularity of the feature map, this quantized RoI is then subdivided into spatial bins which are themselves quantized, and finally feature values covered by each bin are aggregated (usually by max pooling). Quantization is performed, e.g., on a continuous coordinate x by computing [x/16], where 16 is a feature map stride and [·] is rounding; likewise, quantization is performed when dividing into bins (e.g., 7×7). These quantizations introduce misalignments between the RoI and the extracted features. While this may not impact classification, which is robust to small translations, it has a large negative effect on predicting pixel-accurate masks. To address this, some embodiments adopt an RoIAlign layer that removes the harsh quantization of RoIPool, properly aligning the extracted features with the input. Some proposed change is simple: some embodiments avoid any quantization of the RoI boundaries or bins (e.g., some embodiments use x/16 instead of [x/16]). Some embodiments use bilinear interpolation to compute the exact values of the input features at four regularly sampled locations in each RoI bin, and aggregate the result (using max or average), see FIG. 14B for details. FIG. 14B illustrates more details about the RoIAlign (e.g., 1404A in FIG. 14A). More specifically, the dashed grid 1406B represent a feature map; and the solid lines 1402B represent a region of interest which comprises 2×2 bins. The four dots 1404B in each bin represent sampling points in the bin. The described RoIAlign module (e.g., 1404A in FIG. 14A) described herein computes the value of each sampling point by, for example, bilinear interpolation from the nearby grid points on the feature map. In some embodiments, no quantization is performed on any coordinates involved in the RoI, its bins, or the sampling points. It shall be noted that the results are not sensitive to the exact sampling locations, or how many points are sampled, as long as no quantization is performed.

The RoIAlign module leads to large improvements as some embodiments show in the following paragraphs. Some embodiments also compare to the RoIWarp operation. Unlike RoIAlign, RoIWarp overlooked the alignment issue and was implemented in as quantizing RoI just like RoIPool. So even though RoIWarp also adopts bilinear resampling motivated by, it performs on par with RoIPool as shown by experiments (more details in Table 2c), demonstrating the crucial role of alignment.

Network Architecture: To demonstrate the generality of some embodiments, some embodiments instantiate Mask R-CNN with multiple architectures. For clarity, some embodiments differentiate between: (i) the convolutional backbone architecture used for feature extraction over an entire image, and (ii) the network head for bounding-box recognition (classification and regression) and mask prediction that is applied separately to each RoI. Some embodiments denote the backbone architecture using the nomenclature network-depth-features. Some embodiments evaluate ResNet and ResNeXt networks of depth 50 or 101 layers. The original implementation of Faster R-CNN with ResNets extracted features from the final convolutional layer of the 4-th stage, which may be referred to as C4. This backbone with ResNet-50, for example, is denoted by ResNet-50-C4. This is a common choice used in. Some embodiments also explore another more effective backbone such as a Feature Pyramid Network (FPN). FPN uses a top-down architecture with lateral connections to build an in-network feature pyramid from a single-scale input. Faster R-CNN with an FPN backbone extracts RoI features from different levels of the feature pyramid according to their scale, but otherwise the rest of the approach is similar to vanilla ResNet. Using a ResNet-FPN backbone for feature extraction with Mask R-CNN gives excellent gains in both accuracy and speed. For further details on FPN, some embodiments refer readers to. For the network head some embodiments follow architectures presented in previous work to which some embodiments add a fully convolutional mask prediction branch. Specifically, some embodiments extend the Faster R-CNN box heads from the ResNet and FPN. Details are shown in FIG. 14C. The head on the ResNet-C4 backbone includes the 5-th stage of ResNet (namely, the 9-layer 'res5'), which is compute intensive. For FPN, the backbone already includes res5 and thus allows for a more efficient head that uses fewer filters. It shall be noted that the mask branches have a straightforward structure. More complex designs have the potential to improve performance but are not the focus of this work.

In FIG. 14C, the faster R-CNN with ResNet 1400C in the head architecture identifies an RoI 1401C at 1402C which is a 7×7×1024 block that produces an output to another 7×7×2048 block 1404C via a res5 block 1406C. The output of the block 1404C may be provided to a block 1408C (corresponding to 1024 channels) to provide classifications and bounding boxes and/or a 14×14×256 block 1416C that further provides its output to a 14×14×80 block 1418C. In the faster R-CNN block with FPN 1420C, an RoI 1401C may be provided to a 7×7×256 block 1422C and/or a 14×14×256 block 1428C. The output of the 7×7×256 block 1422C may be provided to block 1424C (corresponding to 1024 channels) that further produces an output to block 1026C (also corresponding to 1024 channels) that generates the classification output 1412C and/or bounding boxes 1414C. The output of the 14×14×256 block 1428C may be provided to a first 14×14×256 block 1430C followed by a 28×28×256 block 1432C preceding a 28×28×80 block 1434C.

Head Architecture: Some embodiments extend two existing Faster R-CNN heads. The two blocks show the heads for the ResNet C4 (1400C) and FPN (1420C) backbones respectively, to which a mask branch is added. Numbers below such as 7×7×1025 denote spatial resolution (7×7) and channels (1024). Arrows denote either convolution, deconvolution, or fc (fully connected) layers as can be inferred from context (conv preserves spatial dimension while deconvolution increases it). All convolutions are 3×3, except the output conv which is 1×1, deconvolutions are 2×2 with stride 2, and some embodiments use ReLU (Rectified Linear Unit) in hidden layers. Left: 'res5' denotes ResNet's fifth stage, which for simplicity some embodiments altered so that the first conv operates on a 7×7 RoI with stride 1 (instead of 14×14/stride 2). Right: '×4' denotes a stack of four consecutive convolutions.

Example Implementation Details: Some embodiments set hyper-parameters following existing Fast/Faster R-CNN work. Although these decisions were made for object detection in original, some embodiments found the instance segmentation system is robust to them.

Training: As in Fast R-CNN, an RoI is considered positive if it has IoU with a ground-truth box of at least 0.5 and negative otherwise. The mask loss L mask is defined only on positive RoIs. The mask target is the intersection between an RoI and its associated ground-truth mask. Some embodiments adopt image-centric training. Images are resized such that their scale (shorter edge) is 800 pixels. Each mini-batch has 2 images per GPU and each image has N sampled RoIs, with a ratio of 1:3 of positive to negatives. N is 64 for the C4 backbone and 512 for FPN. Some embodiments train on 8 GPUs (so effective minibatch size is 16) for 160k iterations, with a learning rate of 0.02 which is decreased by 10 at the 120k iteration. Some embodiments use a weight decay of 0.0001 and momentum of 0.9. With ResNext, some embodiments train with 1 image per GPU and the same number of iterations, with a starting learning rate of 0.01. The RPN anchors span 5 scales and 3 aspect ratios, following. For convenient ablation, RPN is trained separately and does not share features with Mask R-CNN, unless specified. For every entry, RPN and Mask R-CNN have the same backbones and so they are shareable. Inference: At test time, the proposal number is 300 for the C4 backbone and 1000 for FPN. Some embodiments run the box prediction branch on these proposals, followed by non-maximum suppression. The mask branch is then applied to the highest scoring 100 detection boxes. Although this differs from the parallel computation used in training, it speeds up inference and improves accuracy (due to the use of fewer, more accurate RoIs). The mask branch can predict K masks per RoI, but some embodiments only use the k-th mask, where k is the predicted class by the classification branch. The m×m floating-number mask output is then resized to the RoI size, and binarized at a threshold of 0.5. Note that since some embodiments only compute masks on the top 100 detection boxes, Mask R-CNN adds a small overhead to its Faster R-CNN counterpart (e.g., ~20% on typical models).

The above describes some example implementation details of a modified mask RCNN module for semantic segmentation or filtering. As described above, semantic segmentation on 3D or other higher-dimensional datasets (e.g., 3D scans) may be performed by using the aforementioned, modified Minkowski Net-based algorithm, ScanComplete-based algorithm, etc. while semantic segmentation on 2D datasets may be performed by using a modified Mask RCNN-based algorithm, a modified PSPNet-based algorithm, etc. The following description is directed to a modified Mask RCC-based algorithm that may be used for semantic segmentation or filtering on 2D datasets. The following section is directed to a modified PSPNet-based algorithm for semantic segmentation or filtering.

As described above, State-of-the-art scene parsing frameworks are mostly based on the fully convolutional network (FCN). The deep convolutional neural network (CNN) based methods boost dynamic object understanding, and yet still face challenges considering diverse scenes and unrestricted vocabulary. Different from these methods, to incorporate suitable global features, some embodiments propose pyramid scene parsing network (PSPNet). In addition to traditional dilated FCN for pixel prediction, some embodiments extend the pixel-level feature to the specially designed global pyramid pooling one. The local and global clues together make the final prediction more reliable. Some embodiments adopt an optimization strategy with deeply supervised loss. Some embodiments give all implementation details, which are key to decent performance, and make the code and trained models publicly available. Some embodiments achieve state-of-the-art performance on all available datasets and manifest that PSPNet gives a promising direction for pixel-level prediction tasks, which may even benefit CNN-based stereo matching, optical flow, depth estimation, etc. in follow-up work. Some of the advantages include utilization of a pyramid scene parsing network to embed difficult scenery context features in an FCN based pixel prediction framework; an effective optimization strategy for deep ResNet based on deeply supervised loss; and provisioning of a practical system for state-of-the-art scene parsing and semantic segmentation where all crucial implementation details are included.

Some embodiments start with the observation and analysis of representative failure cases when applying FCN methods to scene parsing with a pyramid pooling module as the effective global context prior. A pyramid scene parsing network (PSPNet) illustrated in FIG. 14D is described to improve performance for open-vocabulary object and stuff identification in complex scene parsing.

Pyramid Pooling Module: Some embodiments adopt a pyramid pooling module 1450D, which has proven to be an effective global contextual prior. In a deep neural network, the size of receptive field can roughly indicates how much context information is used. Although theoretically the receptive field of ResNet is already larger than the input image, the empirical receptive field of CNN is much smaller than the theoretical one especially on high-level layers. This makes many networks not sufficiently incorporate the momentous global scenery prior. Some embodiments address this issue by proposing an effective global prior representation. In some embodiments, global average pooling is a good baseline model as the global contextual prior, which is commonly used in image classification tasks. In some embodiments, global average pooling may be successfully applied to semantic segmentation. In some embodiments concerning complex-scene images, this strategy alone may not be enough to cover necessary information. Pixels in these scene images are annotated regarding many stuff and objects. Directly fusing them to form a single vector may lose the spatial relation and cause ambiguity. Global context information along with sub-region context is helpful in this regard to distinguish among various categories.

A more powerful representation may be fused information from different sub-regions with these receptive fields. In some embodiments, feature maps in different levels generated by pyramid pooling were finally flattened and concatenated to be fed into a fully connected layer for classification. This global prior is designed to remove the fixed-size constraint of CNN for image classification. To further reduce context information loss between different sub-regions, some embodiments propose a hierarchical global prior, comprising information with different scales and varying among different sub-regions. This may be referred to as a pyramid pooling module (e.g., 1450D) for global scene prior construction upon the final-layer-feature-map of the deep neural network, as illustrated in FIG. 14D.

The pyramid pooling module (1450D) uses a pooling block 1408D to fuse features under four different pyramid scales. The coarsest level (1430D) is global pooling to generate a single bin output. The following pyramid level (1432D) separates the feature map into different sub-regions and forms pooled representation for different locations. The output at different levels (1430D, 1432D, 1434D, and 1436D) in the pyramid pooling module 1450D comprises the feature map with varied sizes and are respectively provided to their corresponding convolution blocks (e.g., convolution block 1412D for 1430D, convolution block 1414D for 1432D, convolution block 1416D for 1434D, and convolution block 1418D for 1436D) to generate respective convolutional outputs that are further provided to an up-sampling block 1420D. The output of the up-sampling block 1420D is provided to a concatenation layer 1422D that concatenates the respective convolution block outputs into a concatenated output that is provided to a convolution layer 1426D the convolves the concatenated output into the output 1428D (e.g., a prediction map).

It shall be noted that although FIG. 14D illustrates a particular arrangement of processing blocks, this particular arrangement is not intended to limit other embodiments that have different arrangement(s) or constituents of blocks. For example, some embodiments may employ a max pooling block for the pyramid pooling module 1450D while some other embodiments may employ an average pooling block for the pyramid pooling module 1450D. Moreover, some embodiments may utilize respective processing blocks to into pooled feature maps having a bin size of {1×1} while other embodiments may utilize different processing blocks to into pooled feature maps having one or more bin sizes of {1×1}, {2×2}, {3×3}, {6×6}, or other appropriate sizes, etc., or any combinations thereof. Some embodiments may further include a dimension reduction block after the pooling block 1408, while some other embodiments may not include such dimension reduction block.

To maintain the weight of global feature, some embodiments use 1×1 convolution layer after each pyramid level to reduce the dimension of context representation to 1/N of the original one if the level size of pyramid is N. These embodiments then directly up-sample the low-dimension feature maps to get the same size feature as the original feature map via bilinear interpolation. Finally, different levels of features are concatenated as the final pyramid pooling global feature. Noted that the number of pyramid levels and size of each level can be modified. They are related to the size of feature map that is fed into the pyramid pooling layer. The structure abstracts different sub-regions by adopting varying-size pooling kernels in a few strides. The multi-stage kernels should maintain a reasonable gap in representation. The pyramid pooling module 1450D is a four-level one with bin sizes of 1×1, 2×2, 3×3 and 6×6, respectively.

With the pyramid pooling module 1450D, some embodiments adopt a pyramid scene parsing network (PSPNet) as illustrated in FIG. 14D. Given an input image 1402D in FIG. 14D, some embodiments process the input image 1402D with a convolutional neural network (CNN) 1404D and use a pretrained ResNet model with the dilated network strategy to extract the feature map. The final feature map or feature representation (1406D) size is ⅛ of the input image 1402D, as shown in FIG. 14D. On top of the map, these embodiments use the pyramid pooling module 1450D to gather context information. Using a 4-level pyramid, the pooling kernels cover the whole, half of, and small portions of the image. These whole, half of, and small portions are fused as the global prior.

Then the prior is concatenated in the concatenation layer 1422D with the original feature map 1406D. The concatenation is followed by a convolution layer 1426D to generate the final prediction map 1428D. To explain this architecture, PSPNet provides an effective global contextual prior for pixel-level scene parsing. The pyramid pooling module can collect levels of information, more representative than global pooling. The PSPNet does not much increase computational cost compared to the original dilated FCN network. In end-to-end learning, the global pyramid pooling module and the local FCN feature can be optimized simultaneously.

Deep pretrained networks lead to good performance. In some cases, increasing depth of the network may introduce additional optimization difficulty for image classification. ResNet solves this problem with skip connection in each block. Latter layers of deep ResNet mainly learn residues based on previous ones. Some embodiments propose generating initial results by supervision with an additional loss, and learning the residue afterwards with the final loss. In these embodiments, optimization of the deep network may be decomposed into two, each is simpler to solve. An example of a deeply supervised ResNet101 model is illustrated in FIG. 14E that illustrates the introduction of an auxiliary loss in ResNet101. In FIG. 14E, the deeply supervised ResNet101 model includes a first plurality of residue blocks 1402E in the first three stages that are operatively coupled to a res4b22 residue block 1404E in a fourth stage followed by two first residue block 1402E as the fifth and the sixth stages. An auxiliary loss 1406E is added after the res4b22 residue block 1404E. The output of the res4b22 block 1404E is provided to a Res5C block 1408E with the final loss 1410E. In the example architecture illustrated in FIG. 14E, latter blocks learn residues based at least in part upon previous block(s) while the example architecture generates an initial result by supervision with an additional loss (1406E) and learn the residues afterwards with the final loss (1410E).

Apart from the main branch using softmax loss to train the final classifier, another classifier is applied after the fourth stage, e.g., the res4b22 residue block. Different from relay backpropagation that blocks the backward auxiliary loss to several shallow layers, some embodiments let the two loss functions pass through all previous layers. The auxiliary loss helps optimize the learning process, while the master branch loss takes the most responsibility. Some embodiments add weight to balance the auxiliary loss. In the testing phase, some embodiments abandon this auxiliary branch and only use the well optimized master branch for final prediction. This kind of deeply supervised training strategy for ResNet-based FCN (Fully Convolutional Network) is broadly useful under different experimental settings and works with the pre-trained ResNet model. This manifests the generality of such a learning strategy.

Referring back to FIG. 15D, the local features may be abstracted into higher level feature(s) or representation(s) at 1506D. In some embodiments, a PointNet-based module abstracts sets of local points or features into higher level representations. In these embodiments, a PointNet++-based module applies PointNet recursively on a nested partitioning of the input set. Moreover, the features or representations having multiple different scales and/or resolutions may be adaptively weighed and combined through learning at 1508D. Cluster labels may be assigned by one or more set functions (sf) to a metric space that has the aforementioned distance metric at 1510D. A set function may include a classification function and receives a metric space as the input along with additional features for each point and produces information of semantic interest regarding the metric space. A set functions may also assign a label to a portion of the metric space or a segmentation function that assigns a per point label to each member of a set of points. The above processes may be repeated at 1512D until, for example, the entire set of points have been similarly processed.

In these embodiments that employ a PointNet- and/or PointNet++-based module, these embodiments analyze geometric point sets which are collections of points in a Euclidean space. A particularly important type of geometric point set is point cloud captured by 3D scanners, e.g., from appropriately equipped autonomous vehicles. As a set, such data has to be invariant to permutations of its members. In addition, the distance metric defines local neighborhoods that may exhibit different properties. For example, the density and other attributes of points may not be uniform across different locations—in 3D scanning the density variability can come from perspective effects, radial density variations, motion, etc. Few prior works study deep learning on point sets. PointNet is a pioneering effort that directly processes point sets.

Various embodiments involving PointNet are to learn a spatial encoding of each point and then aggregate all individual point features to a global point cloud signature. By its design, PointNet may not capture local structure induced by the metric. However, exploiting local structure has proven to be important for the success of convolutional architectures. A CNN takes data defined on regular grids as the input and is able to progressively capture features at increasingly larger scales along a multi-resolution hierarchy. At lower levels neurons have smaller receptive fields whereas at higher levels they have larger receptive fields. The ability to abstract local patterns along the hierarchy allows better generalizability to unseen cases. Some embodiments introduce a hierarchical neural network, named as PointNet++, to process a set of points sampled in a metric space in a hierarchical fashion.

Various embodiments involving PointNet++ first partition the set of points into overlapping local regions by the distance metric of the underlying space. Similar to CNNs, some of these embodiments extract local features capturing fine geometric structures from small neighborhoods; such local features are further grouped into larger units and processed to produce higher level features. This process is repeated until these embodiments obtain the features of the whole point set. The design of PointNet++ address two issues: (1) how to generate the partitioning of the point set, and (2) how to abstract sets of points or local features through a local feature learner. The two issues are correlated because the partitioning of the point set has to produce common structures across partitions, so that weights of local feature learners can be shared, as in the convolutional setting. Some embodiments choose the local feature learner to be PointNet that is an effective architecture to process an unordered set of points for semantic feature extraction. In addition, this architecture is robust to input data corruption. As a basic building block, PointNet abstracts sets of local points or features into higher level representations. In this view, PointNet++ applies PointNet recursively on a nested partitioning of the input set.

To generate overlapping partitioning of a point set, a partition is defined as a neighborhood ball in the underlying Euclidean space, whose parameters include centroid location and scale. To evenly cover the whole set, the centroids are selected among input point set by a farthest point sampling (FPS) algorithm. Compared with volumetric CNNs that scan the space with fixed strides, the local receptive fields with PointNet++ may be dependent on both the input data and the metric, and thus more efficient and effective. Deciding the appropriate scale of local neighborhood balls, however, is a more challenging yet intriguing problem, due to the entanglement of feature scale and non-uniformity of input point set. Some of these embodiments assume that the input point set may have variable density at different areas, which is quite common in real data such as Structure Sensor scanning. In some embodiments, the input point set is thus very different from CNN inputs which may be viewed as data defined on regular grids with uniform constant density. In CNNs, the counterpart to local partition scale is the size of kernels. Some embodiments demonstrate that using smaller kernels helps to improve the ability of CNNs. One of the advantages is that PointNet++ leverages neighborhoods at multiple scales to achieve both robustness and detail capture. Assisted with random input dropout during training, the network learns to adaptively weight patterns detected at different scales and combine multi-scale features according to the input data. Experiments show that the PointNet++-based module is able to process point sets efficiently and robustly. In particular, results that are significantly better than state-of-the-art have been obtained on challenging benchmarks of 3D point clouds.

In some embodiments, suppose that X=(M, d) is a discrete metric space whose metric is inherited from a Euclidean space $R^n$, where $M \subseteq R^n$ denotes the set of points and d is the distance metric. In addition, the density of M in the ambient Euclidean space may not be uniform everywhere. These embodiments learn set functions f that receive such X as the input (along with additional features for each point) and produce information of semantic interest regrading X. In some embodiments, such f may be classification function that assigns a label to X or a segmentation function that assigns a per point label to each member of M.

Some embodiments may be viewed as an extension of PointNet with added hierarchical structure. These embodiments introduce a basic extension of PointNet with hierarchical structure and robustly learn features even in non-uniformly sampled point sets.

PointNet:

A Universal Continuous Set Function Approximator: Given an unordered point set $\{x_1, x_2, \ldots, x_n\}$ with x i∈R d, one can define a set function f:X→R that maps a set of points to a vector:

$$f(x_1, x_2, \ldots, x_n) = \gamma(\mathrm{MAX}_{i=1, \ldots, n}\{h(x_i)\}), \quad \text{Eq. 15D-(1)}$$

where y and h are usually multi-layer perceptron (MLP) networks. The set function f in Eq. 15D-(1) is invariant to input point permutations and can arbitrarily approximate any continuous set function. Note that the response of h can be interpreted as the spatial encoding of a point. PointNet achieved impressive performance on a few benchmarks. However, it lacks the ability to capture local context at different scales. Some embodiments introduce a hierarchical feature learning framework below to resolve the limitation.

Hierarchical Point Set Feature Learning:

While PointNet uses a single max pooling operation to aggregate the whole point set, some embodiments build a hierarchical grouping of points and progressively abstract larger and larger local regions along the hierarchy. This hierarchical structure is composed by a number of set abstraction levels (FIG. 12E). FIG. 12E illustrates an example architecture for a modified PointNet++ in one or more embodiments. More specifically, FIG. 12E illustrates the hierarchical feature learning architecture and tis application to set segmentation and classification using points in 2D Euclidean space as an example. It shall be noted that although FIG. 12E illustrates single point grouping, an identical or substantially similar approach may also be applied to density adaptive grouping.

In these embodiments, the example network architecture includes a hierarchical point set feature learning module having a first set abstraction 1250E that further includes the first sampling and grouping module 1202E and the PointNet module 1204E. This hierarchical point set feature learning module architecture in FIG. 12E further includes a second set abstraction 1252E having a second sampling and grouping module 1206E and a second PointNet module 1208E as described herein. The output of the hierarchical point set feature learning module (1250E, 1252E) 1210E may be provided for segmentation 1254E and classification 1256E either in series or in parallel. The segmentation processing 1254E includes interpolation 1212E, unit PointNet 1214E (($N_1$, d+$C_2$+$C_1$)), interpolation 1216E (($N_1$, d+$C_3$)), another unit PointNet 1218E ((N, d+$C_3$+C)) to generate per-point scores (N, k)). The output of the sampling and grouping module 1202E may be concatenated with the unit PointNet 1214E as described below; and the output of the second sampling and grouping module 1206E may be concatenated with the second unit PointNet 1218E via a skip link concatenation.

The classification processing 1256E provides the hierarchical point set feature learning output 1210E to a Pointnet module 1222E that generates the PointNet output 1224E ((1, $C_4$)) which is in turn used to generate a set of fully connected (FC) layers 1226E. The process may then generate a set of class scores 1228E. More details about FIG. 12E are described below.

At each level, a set of points is processed and abstracted to produce a new set with fewer elements. The set abstraction level may include three key layers: Sampling layer, Grouping layer, and PointNet layer. The Sampling layer selects a set of points from input points, which defines the centroids of local regions. Grouping layer then constructs local region sets by finding "neighboring" points around the centroids. PointNet layer uses a mini-PointNet to encode local region patterns into feature vectors. A set abstraction level takes an N× (d+C) matrix as input that is from N points with d-dim coordinates and C-dim point feature. It outputs an N'×(d+C') matrix of N' subsampled points with d-dim coordinates and new C'-dim feature vectors summarizing local context. Some embodiments introduce the layers of a set abstraction level in the following paragraphs.

Sampling layer. Given input points $\{x_1, x_2, \ldots, x_n\}$, some embodiments use iterative farthest point sampling (FPS) to choose a subset of points $\{x_{i1}, x_{i2}, \ldots, x_{im}\}$, such that x i j is the most distant point (in metric distance) from the set $\{x_{i1}, x_{i2}, \ldots, x\ i_{j-1}\}$ with regard to the rest points. Compared with random sampling, it has better coverage of the entire point set given the same number of centroids. In contrast to CNNs that scan the vector space agnostic of data distribution, a sampling strategy generates receptive fields in a data dependent manner.

Grouping layer. In some embodiments, the input to this layer is a point set of size N×(d+C) and the coordinates of a set of centroids of size N'×d. The output are groups of point sets of size N'×K×(d+C), where each group corresponds to a local region and K is the number of points in the neighborhood of centroid points. Note that K varies across groups but the succeeding PointNet layer is able to convert flexible number of points into a fixed length local region feature vector. In convolutional neural networks, a local region of a pixel consists of pixels with array indices within certain Manhattan distance (kernel size) of the pixel. In a point set sampled from a metric space, the neighborhood of a point is defined by metric distance. Ball query finds all points that are within a radius to the query point (an upper limit of K is set in implementation). An alternative range query is K nearest neighbor (kNN) search which finds a fixed number of neighboring points. Compared with kNN, ball query's local neighborhood guarantees a fixed region scale thus making local region feature more generalizable across space, which is preferred for tasks requiring local pattern recognition (e.g., semantic point labeling).

PointNet layer. In this layer, the inputs are N' local regions of points with data size N'×K×(d+C). Each local region in the output is abstracted by its centroid and local feature that encodes the centroid's neighborhood. Output data size is N'×(d+C').

The coordinates of points in a local region are firstly translated into a local frame relative to the centroid point:

$$x_i^{(j)} = x_i^{(j)} - \hat{x}_i^{(j)}$$

for i=1, 2, . . . , K and j=1, 2, . . . , d where ^x is the coordinate of the centroid. Some embodiments use PointNet above as the basic building block for local pattern learning. By using relative coordinates together with point features, some embodiments can capture point-to-point relations in the local region.

Robust Feature Learning Under Non-Uniform Sampling Density:

As discussed above, it may be common that a point set comes with nonuniform density in different areas. Such non-uniformity introduces a significant challenge for point set feature learning. Features learned in dense data may not generalize to sparsely sampled regions. Consequently, models trained for sparse point cloud may not recognize fine-grained local structures. Some embodiments inspect as closely as possible into a point set to capture finest details in densely sampled regions. However, such close inspect is prohibited at low density areas because local patterns may be corrupted by the sampling deficiency. In this case, these embodiments look for larger scale patterns in greater vicinity. To achieve this goal, some embodiments propose density adaptive PointNet layers that learn to combine features from regions of different scales when the input sampling density changes. some embodiments call the hierarchical network with density adaptive PointNet layers as PointNet++. As described above, each abstraction level contains grouping and feature extraction of a single scale. In PointNet++, each abstraction level extracts multiple scales of local patterns and combine them intelligently according to local point densities. In terms of grouping local regions and combining features from different scales, some embodiments adopt two types of density adaptive layers as listed below.

Multi-Scale Grouping (MSG):

A simple but effective way to capture multiscale patterns is to apply grouping layers with different scales followed by according PointNets to extract features of each scale. Features at different scales are concatenated to form a multi-scale feature. Some embodiments train the network to learn an optimized strategy to combine the multi-scale features. This may be achieved by randomly dropping out input points with a randomized probability for each instance, which some embodiments call random input dropout. Specifically, for each training point set, some embodiments choose a dropout ratio θ uniformly sampled from [θ, p] where p≤1. For each point, some embodiments randomly drop a point with probability θ. In practice, some embodiments set p=0.95 to avoid generating empty point sets. In doing so, these embodiments present the network with training sets of various sparsity (induced by θ) and varying uniformity (induced by randomness in dropout). During test, some embodiments keep all available points.

Multi-Resolution Grouping (MRG):

The MSG approach above is computationally expensive since it runs local PointNet at large scale neighborhoods for every centroid point. In particular, because the number of centroid points is usually quite large at the lowest level, the time cost is significant. Some embodiments avoid such expensive computation but still preserves the ability to adaptively aggregate information according to the distributional properties of points. In these embodiments, features of a region at some level $L_i$ is a concatenation of two vectors. One vector (left in figure) is obtained by summarizing the features at each subregion from the lower level $L_{i-1}$ using the set abstraction level. The other vector (right) is the feature that is obtained by directly processing all raw points in the local region using a single PointNet. When the density of a local region is low, the first vector may be less reliable than the second vector, since the subregion in computing the first vector contains even sparser points and suffers more from sampling deficiency. In such a case, the second vector should be weighted higher. On the other hand, when the density of a local region is high, the first vector provides information of finer details because it possesses the ability to inspect at higher resolutions recursively in lower levels. Compared with MSG, this method is computationally more efficient because these embodiments avoid the feature extraction in large scale neighborhoods at lowest levels.

Point Feature Propagation for Set Segmentation:

In set abstraction layer, the original point set is subsampled. However, in set segmentation task such as semantic point labeling, some embodiments obtain point features for all the original points. One solution is to always sample all points as centroids in all set abstraction levels, which however results in high computation cost. Another way is to propagate features from subsampled points to the original points. Some embodiments adopt a hierarchical propagation strategy with distance-based interpolation and across level skip links (as shown in FIG. 12E). In a feature propagation level, some embodiments propagate point features from $N_l \times (d+C)$ points to $N_{l-1}$ points where $N_{l-1}$ and $N_l$ (with $N_l \leq N_{l-1}$) are point set size of input and output of set abstraction level I. Some embodiments achieve feature propagation by interpolating feature values f of N I points at coordinates of the N I−1 points. Among the many choices for interpolation, some embodiments use inverse distance weighted average based on k nearest neighbors (as in Eq. 15D-(2), in default, some embodiments use p=2, k=3). The interpolated features on N I−1 points are then concatenated with skip linked point features from the set abstraction level. Then the concatenated features are passed through a "unit pointnet", which is similar to one-by-one convolution in CNNs. A few shared fully connected and ReLU layers are applied to update each point's feature vector. The process is repeated until some embodiments have propagated features to the original set of points.

$$f^{(j)}(x) = \frac{\sum_{i=-1}^{k} w_i(x) f_i^{(j)}}{\sum_{i=-1}^{k} w_i(x)}, \text{ where} \qquad \text{Eq. 15D-(2)}$$

$$w_i(x) = \frac{1}{d(x, x_i)^p}, \; j = 1, \ldots C,$$

Figure 15E:
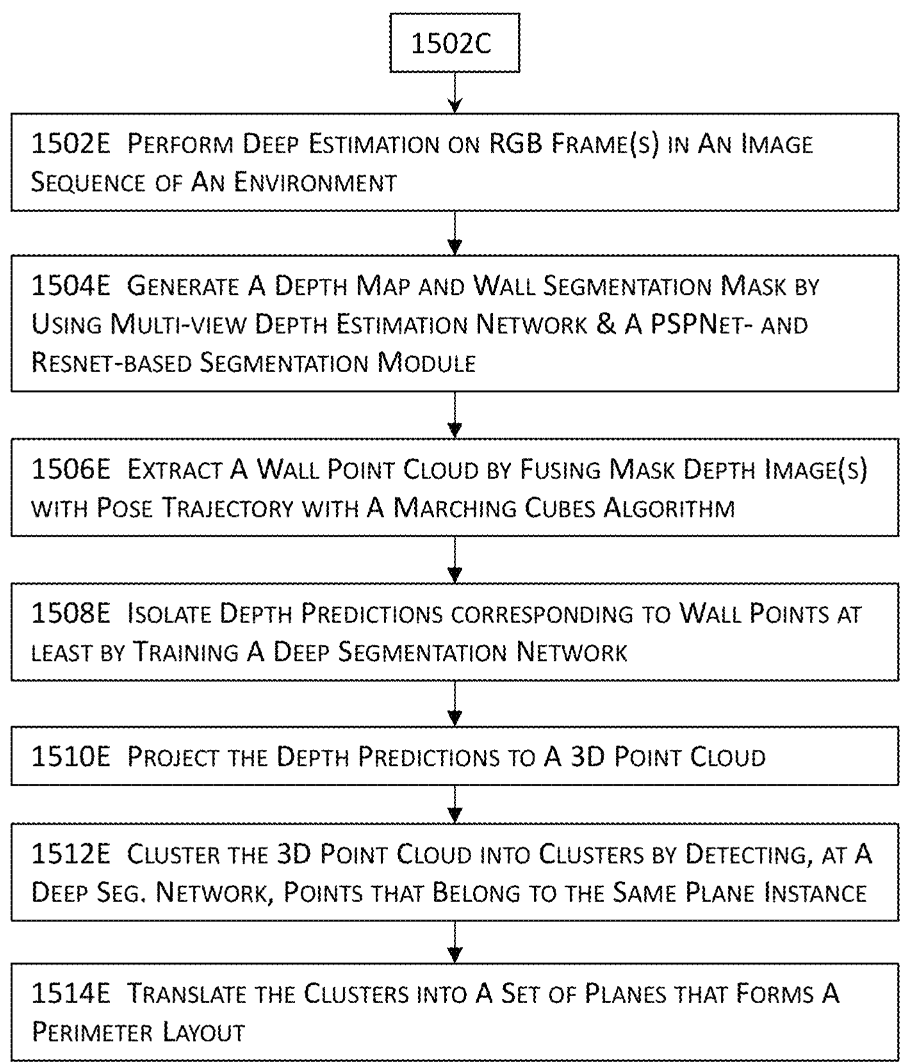
FIG. 15E illustrates more details about the flow diagram illustrated in FIG. 15C for generating a floorplan of a scene in some embodiments.

FIG. 15E illustrates more details about the flow diagram illustrated in FIG. 15C for generating a floorplan of a scene in some embodiments. More specifically, FIG. 15E illustrates more details about generating a DeepPerimeter type of shape at 1502C of FIG. 15C. These embodiments perform a deep estimation at 1502E on one or more RGB frames in an input image sequence of an environment. A depth map and a wall segmentation mask may be generated at 1504E by using, for example, a multi-view depth estimation network and a PSPNet-based and/or a Resnet-based segmentation module. In some embodiments, a per-frame dense depth map may be generated at 1502E with, for example, a Multiview depth estimation network.

A wall point cloud may be extracted at 1506E by fusing one or more mask depth images with one or more pose trajectories by using a marching cubes module. These embodiments further isolate depth predictions corresponding to wall points at least by training a deep segmentation network at 1508E. The depth predictions may be projected at 1510E to a three-dimensional (3D) point cloud. The 3D point cloud may be clustered into one or more clusters at 1512E at least by detecting, with a deep network, points that belong to the same plane instance. Some embodiments directly cluster wall points so that these embodiments are not handicapped when points (e.g., points corresponding to corners, edges, etc.) are occluded. Some embodiments adopt an end-to-end model for clustering point louds into long-range planar regions using synthetically generated ground truth. The clusters determined at 1512E may be translated at 1514E into a set of planes that forms a perimeter layout. More details about FIG. 15E are described below.

Some embodiments utilize a DeepPerimeter module to gain understanding the 3D layout of an indoor environment may be of importance to understanding the long-range geometry of a space with a myriad of applications in augmented reality, navigation, and general scene understanding. Such layouts can be presented in a variety of ways, from cuboid parameters to monocular corner coordinates and their connectivity to more semantically rich full floor plans. These methods differ in the amount of information they require at input and their assumptions regarding the room geometry (e.g., some approaches require a clean 3D point cloud at input while other approaches require monocular perspective or panorama images). The lack of consistency between this set of related problems reveals a general disagreement over what the standard setting for layout prediction should be for indoor scenes. Some embodiments are directed to answer the challenges: what types of data are the most readily available in the wild and what type of layout fills the most immediate need for modern vision applications.

In terms of sensor data, it may be easy to obtain RGB (Red Green Blue) camera and pose data from many modern de vices (e.g., smartphones, AR/VR HMDs, etc.). Access to the full video sequence allows us to go beyond the corner and edge estimation that pervade monocular layout estimation and makes possible the estimation of the full perimeter map of an interior space. Such metric information on the spatial extent and shape of a space is a fundamental invariant of interior spaces (unlike objects within a room which can dynamically shift around), and thus is useful for a variety of downstream 3D applications by enabling area and volume measurements for mobile Augmented Reality platforms.

Some embodiments adopting a DeepPerimeter framework precisely infer this perimeter without any hand-crafted enumerated set of the types of possible rooms. DeepPerimeter is also robust to corner and edge occlusions which are frequent in real world scenes. For the ease of description and illustration, the description below predicts the horizontal perimeter (e.g., location of exterior walls), as these contain the vast majority of the structure within a room layout while the floors and ceilings are usually well-approximated by a single plane. See FIG. 14J for a basic outline of an example pipeline. In FIG. 14J, an input posed video 1402J of a scene is provided to a deep network such as the DeepPerimeter module described herein to produce the clustering result 1404J that is in turn processed by the deep network to produce an estimated perimeter 1408J (e.g., an estimated perimeter produced by a DeepPerimeter type of shape). A ground truth 1404J of the same scene may also be referenced to train or validate the estimated perimeter or any other intermediate results.

A pipeline may start with deep depth estimation on the RGB frames of the video sequence. Indeed, one of the most restrictive bottlenecks for general 3D reconstruction applications of deep learning is the accuracy of deep depth estimation models. On cluttered indoor scenes like those in the NYUv2 dataset, such networks still struggle to perform better than 0.5-0.6m of RMS error given monocular inputs. Some embodiments bypass this performance bottleneck by incorporating multiple views into a depth estimation module by using modern multi-view stereo methods instead. These embodiments then train a deep segmentation network to isolate the depth predictions corresponding to wall points. These predictions are projected to a 3D point cloud and then clustered through a deep network that is tuned to detect points that belong to the same plane instance.

Once point clusters are assigned, standard methods translate the clusters into a full set of planes which form the full perimeter layout. In some embodiments, by directly clustering wall points, some embodiments are not handicapped when corners are occluded. Some embodiments provide a deep learning-based pipeline for predicting indoor perimeter from a monocular sequence of posed RGB images. These embodiments are both robust to occluded corners and do not depend on an enumerated set of a priori room shapes. Some embodiments develop an end-to-end model for clustering point clouds into long-range planar regions using synthetically generated ground truth.

Pipeline Overview:

A pipeline may include two key stages-Deep multi-view depth estimation and segmentation to extract wall point clouds (3.1), and deep clustering for detecting plane instances (3.2). The final perimeter is generated in postprocessing by a simple least squares plane fitting (3.3). The full pipeline is illustrated in FIG. 14K.

FIG. 14K illustrates an example pipeline for perimeter estimation. Some embodiments begin with a posed monocular sequence of images along with their relative poses. These embodiments extract semantic segmentation maps for walls and a dense depth map through a multi-view stereo algorithm. These two outputs are combined through standard un-projection to form a 3D point cloud consisting of wall pixels only. These wall pixels are then colored into wall instance candidates using a deep clustering network and post processed with linear least squares and a shortest path algorithm to form the final perimeter prediction. In FIG. 14K, one or more inputs 1400K including, for example, trajectory 1402K, video(s) 1404K, images, posed images, posed video, or any other suitable inputs, or any combinations thereof may be provided to a multi-view depth network 1406K (MVDepthNet) and a semantic segmentation module such as a PSPNet (Pyramid Scene Parsing Network) 1408K that may respectively generate a depth map 1410K and semantic segmentation 1412K.

The depth map 1410K and the semantic segmentation may be combined or otherwise merged through an un-projection module 1414K to generate a set of wall point cloud 1416K. The wall point cloud 1416K may be provided to a cluster module 1418K (e.g., ClusterNet described herein) to produce labeled cluster(s) 1420K. The labeled clusters 1420K may be further provided to a perimeter estimation module 1422K such as the deep network or a DeepPerimeter network described herein to produce a DeepPerimeter type of shape to represent a room and wall(s) therefor.

Extracting Wall Point Clouds:

Some embodiments utilize multiple observations of the same real-world scene from various poses to generate a per-frame dense depth map, through the state-of-the art Multiview Depth Estimation network. These embodiments then optimize a segmentation algorithm for classifying ceiling, floor, and walls through a standard pyramid scene parsing (PSP) network with a Resnet-50 backbone. After obtaining a depth map and a wall segmentation mask for each input frame, some embodiments generate a unified point cloud using only the depth pixels belonging to the wall class. To do so, these embodiments fuse a collection of the masked depth images with known pose trajectory in an implicit surface representation and extract the point cloud by a derivative of the marching cubes method. The benefit of using an implicit surface representation over simply un-projecting each depth pixel is that it removes redundant points and it averages out the noise over multiple observations leading to a smoother and cleaner set of points as shown in FIG. 14K. Finally, to remove internal wall points, some embodiments use the concept of $\alpha$-shape to create a subset of the point cloud that is representative of its concave hull.

ClusterNet:

Upon obtaining an $\alpha$-culled, subsampled point cloud representation of the walls in the scene, some embodiments proceed to separate the wall instances by a performing a deep clustering of this point cloud. Some embodiments employ a fully unsupervised technique of clustering unordered point clouds based on planar sections without explicitly computing surface normals or plane parameters during inference. ClusterNet may be trained using only the synthetic dataset and uses a PointNet architecture with two additional 128→128 filter convolutional layers right before the prediction head for added capacity. PointNet global features are then used to output a cluster probability for each input point. In order to generate unique cluster assignments for separate wall instances, some embodiments need to be robust to 3D location noise, occlusions and variable point density. Furthermore, the clustering needs to distinguish between parallel planar walls which share the same point normals. Some embodiments formulate a pairwise loss function that penalizes the network when two points lying on distinct wall instances are assigned the same label. Some embodiments however do not penalize over-segmentation as cluster merging can be easily accomplished in post-processing. Take N points x i with 3D coordinates P i=($x_i$, $y_i$, $z_i$), point normals=

$$\left(x_i^{(n)}, y_i^{(n)}, z_i^{(n)}\right)$$

and predicted cluster probability vector $$P(x) = \left(p^{(x)}, \ldots , p_{k+1}^{(x)}\right).$$

The (k+1)-th class is reserved for points which cannot be confidently placed onto any plane instance to allow the network the ability to filter out noisy points. The clustering loss $L^{cluster}$ is given as:

$$L^{cluster}=\Sigma_{i,j>i}P(x_i,x_j)D(x_i,x_j), \quad \text{Eq. 15C-(1)}$$

wherein the sum is taken over all discrete pairs of points, and $$P(x_i, x_j) = \Sigma_{a=1}^{k} p_a^{(x_i)} p_a^{(xj)}, \quad \text{Eq. 15C-(2)}$$

is the pairwise dot product of the first k elements of the predicted cluster probabilities, and $$D(x_i, x_j) = (x_j - x_j)x_i^{(n)} + (x_j - x_i)x_i^{(n)}, \quad \text{Eq. 15C-(3)}$$

The term D($x_i$, $x_j$) has a high value when $x_i$ and $x_j$ lie on different planes (including parallel planes) and a low value when $x_i$ and $x_j$ lie on the same plane. Further, if $x_i$ and $x_j$ have a similar cluster assignment probability vector, P ($x_i$, $x_j$) may be high. Some embodiments penalize when two pairs belong to distinct walls but have a similar cluster assignment probability. To prevent a trivial solution where all points are assigned to the (k+1)-th cluster, some embodiments use the regularization loss L reg as follows:

$$L^{reg} = \Sigma_x \Sigma_{a=1}^{k} - 1 \times \log\left(p_a^{(x)}\right), \quad \text{Eq. 15C-(4)}$$

These embodiments penalize whenever the probability a point belongs to any plane is small. The total loss is then L cluster+βL reg where some embodiments set β to 1.0 in these embodiments.

Perimeter Estimation:

Following the assumption that all walls are parallel to the Z-axis, some embodiments project all clustered 3d wall points to the X-Y plane to generate a top-down view of the point cloud. Some embodiments estimate 2D line parameters for every cluster using linear least squares. To remove duplicate wall predictions, clusters having line parameters with a relative normal deviation of <θ merge=30° and an inter-cluster point-to-line error of <e merge=0.3m are assigned the same label. To establish connectivity among the clusters, some embodiments find a closed shortest path along all cluster medians. The solution is calculated using the algorithm based on the traveling salesman problem and the 2D line parameters are re-estimated. Resultant lines are then snapped to the nearest orthogonal axis and trivially extended to intersect. The intersection point of two neighboring wall segments is defined as a corner. When major occlusions occur and result in two connected parallel segments, some embodiments extend an endpoint of one of the segments in an orthogonal direction so as to force an intersection. Note that such occurrences are rare, and certainly much rarer than the corner occlusion which cause issues in many layout estimation pipelines that operate through direct corner prediction.

Datasets:

Some embodiments describe the datasets used for training the various networks, including the synthetically generated dataset for training a deep clustering model.

Public Datasets:

Some embodiments use the following datasets to evaluate various models. The ScanNet dataset to train a depth network, evaluate an estimated perimeters, and evaluate depth and segmentation modules. The ADE20K and SunRGBD datasets for training a segmentation network. The FloorNet dataset for additional evaluation of inference of perimeters from un-clustered point clouds.

Various embodiments build a fully synthetic dataset along with normal labels, starting from a room perimeter skeleton randomly sampled from various shapes (rectangle, L-shaped, T-shaped, or U-shaped). Lengths and angular orientation of each edge and the height of the room are uniformly sampled. Gaussian noise is added, and some embodiments also included random deletion of points within cylindrical areas to mimic missing points that commonly occur in point cloud measurements.

Figure 15F:
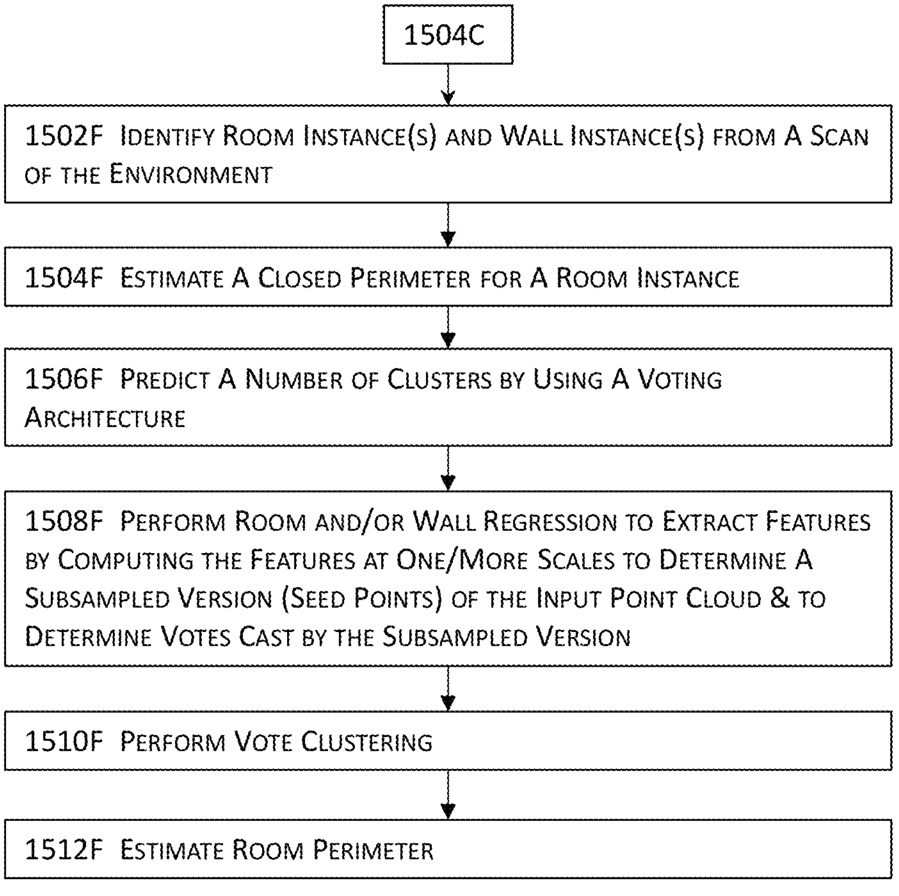
FIG. 15F illustrates more details about the flow diagram illustrated in FIG. 15C for generating a floorplan of a scene in some embodiments.

FIG. 15F illustrates more details about the flow diagram illustrated in FIG. 15C for generating a floorplan of a scene in some embodiments. More specifically, FIG. 15E illustrates more details about generating a floorplan at 1504C in FIG. 15C. In these embodiments, one or more room instances and one or more wall instances may be identified at 1502F from a scan of an environment such as an indoor environment having scarce publicly available datasets and/or libraries. A closed perimeter may be estimated at 1504F for a room instance.

A number of clusters may be predicted at 1506F at least by using, for example, a voting architecture. Some embodiments predict an unconstrained number of clusters independent of the network architectures by using a voting-based architecture such as a deep Hough voting architecture described in greater details below. In some embodiments, predicting a number of clusters may include predicting an unconstrained number of clusters independent of network architectures by using a voting-based architecture that performs room clustering and wall clustering in parallel at least by segregating an input 3D point cloud into one or more constituting rooms and walls as a non-exclusive clustering of 3D data points without prior assumptions on the number of clusters in some embodiments. In addition or in the alternative, predicting a number of clusters at 1506F may include performing non-exclusive clustering of 3D data point without prior assumptions on the number of clusters by (1) segregating input point cloud (3d) into constituting rooms and walls by using a voting-based technique that is described in greater details immediately below with reference to FIGS. 12C-12D.

A traditional Hough voting 2D detector comprises an offline and an online step. First, given a collection of images with annotated object bounding boxes, a codebook is constructed with stored mappings between image patches (or their features) and their offsets to the corresponding object centers. At inference time, interest points are selected from the image to extract patches around them. These patches are then compared against patches in the codebook to retrieve offsets and compute votes. As object patches will tend to vote in agreement, clusters will form near object centers. Finally, the object boundaries are retrieved by tracing cluster votes back to their generating patches. Some embodiments identify two ways in which this technique is well suited to the problem of interest. First, voting-based detection is more compatible with sparse sets than region-proposal networks (RPN) is. For the latter, the RPN has to generate a proposal near an object center which is likely to be in an empty space, causing extra computation. Second, it is based on a bottom-up principle where small bits of partial information are accumulated to form a confident detection. Even though neural networks can potentially aggregate context from a large receptive field, it may be still beneficial to aggregate in the vote space. However, as traditional Hough voting comprises multiple separated modules, integrating it into state-of-the-art point cloud networks is an open research topic. To this end, some embodiments comprise the following adaptations to the different pipeline ingredients.

Interest points are described and selected by deep neural networks instead of depending on hand-crafted features. Vote generation is learned by a network instead of using a codebook. Leveraging larger receptive fields, voting can be made less ambiguous and thus more effective. In addition, a vote location can be augmented with a feature vector allowing for better aggregation. Vote aggregation is realized through point cloud processing layers with trainable parameters. Utilizing the vote features, the network can potentially filter out low quality votes and generate improved proposals. Object proposals in the form of: location, dimensions, orientation and even semantic classes can be directly generated from the aggregated features, mitigating the need to trace back votes' origins. In what follows, some embodiments describe how to combine all the aforementioned ingredients into a single end-to-end trainable network named as VoteNet.

Figure 12C:
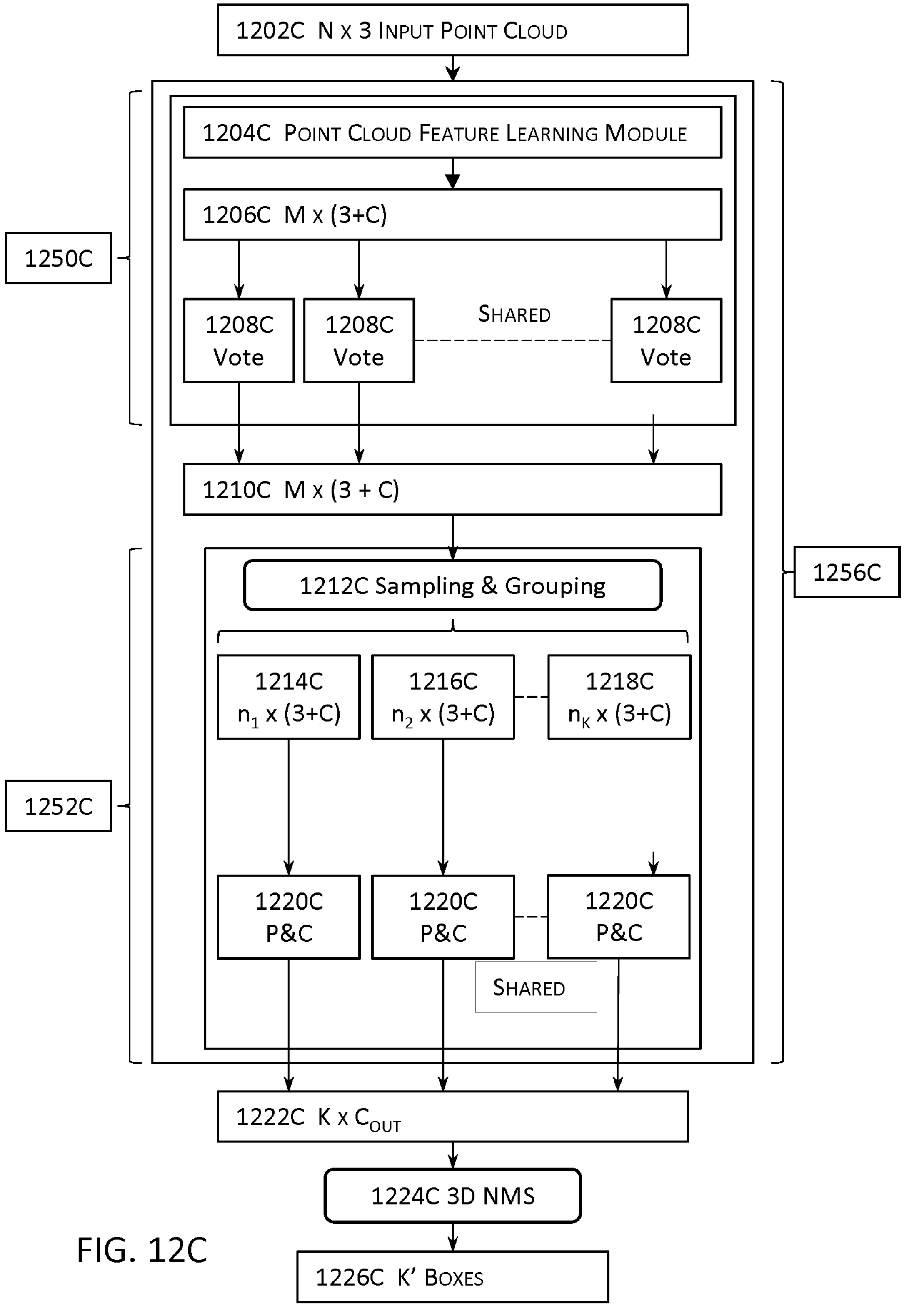
FIG. 12C illustrates an example architecture for 3D object detection in a point cloud in one or more embodiments.
Figure 12D:
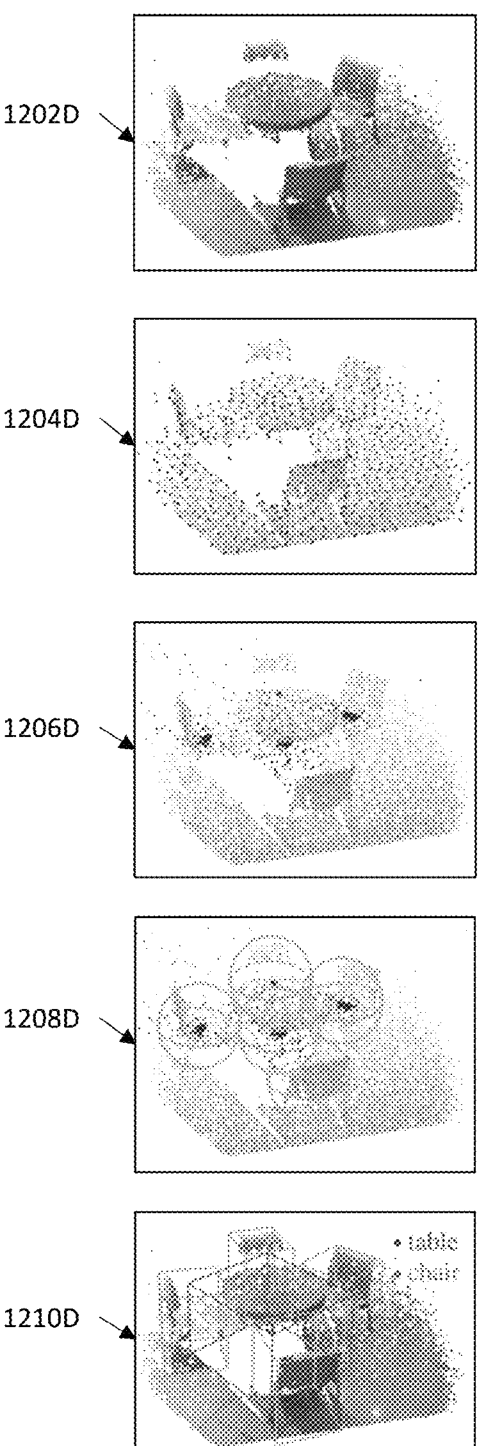
FIG. 12D illustrates a simplified example of generating three-dimensional (3D) bounding boxes from an input point cloud in one or more embodiments.
Figure 12E:
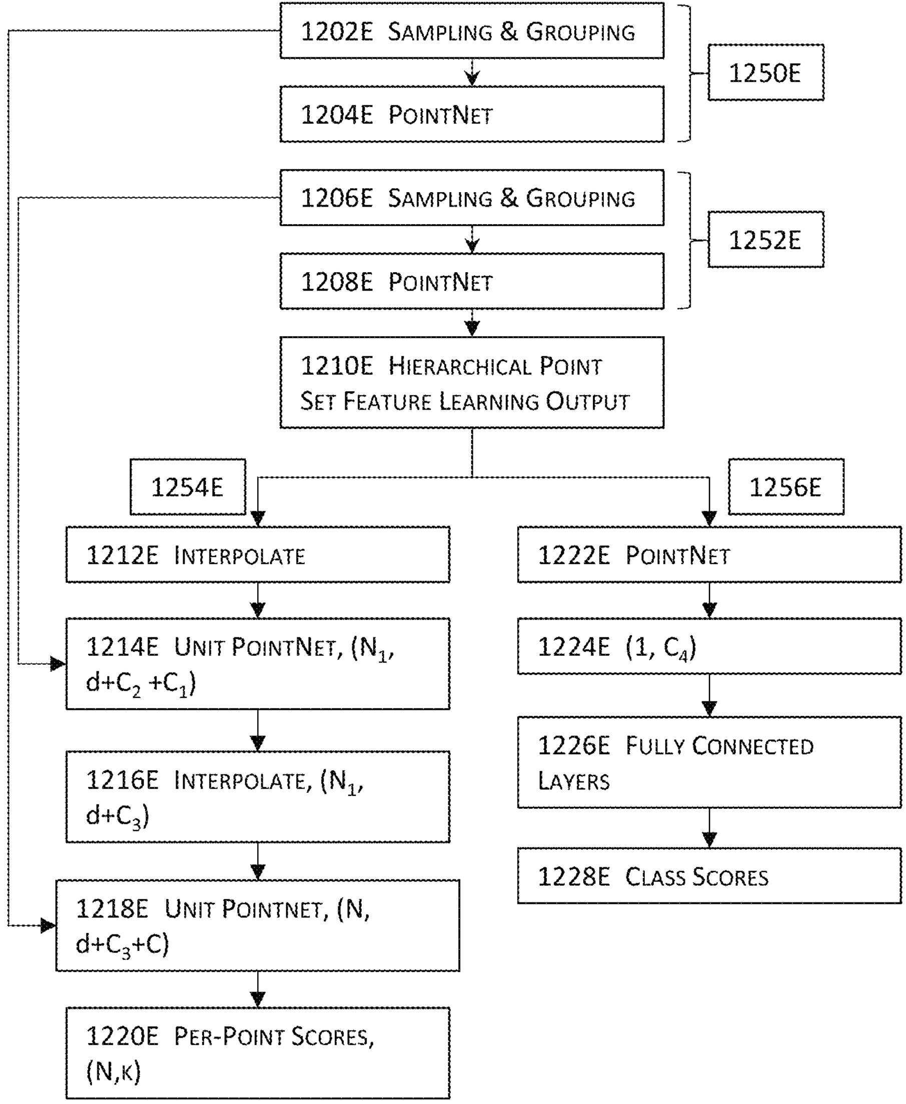
FIG. 12E illustrates an example architecture for a modified PointNet++ in one or more embodiments.

VoteNet Architecture:

FIGS. 12C-12D illustrate an example end-to-end detection network (VoteNet). The entire network may be split into two parts: one that processes existing points to generate votes; and the other part that operates on virtual points—the votes—to propose and classify objects. FIG. 12C illustrates an example architecture 1256C of VoteNet comprising a voting module 1250C and an object proposal and classification module 1252C for 3D object detection in point clouds. In these embodiments, given an input point cloud of N points with XYZ coordinates, a backbone network (e.g., implemented with PointNet++ layers described herein) subsamples and learns deep features on the points and outputs a subset of M points but extended by C-dim features. This subset of points may be considered as seed points.

A seed may independently generate a vote through a voting module (e.g., 1208C). These votes may be grouped into clusters and processed by the proposal and classification module (e.g., 1220C) to generate the final proposals. The classified (1222C) and NMSed (1224) proposals become the final 3D bounding boxes output (1226C). In FIG. 12C, a N×3 input point cloud 1202C is provided to a voting module 1250C that comprises a point cloud feature learning module 1204C generating M×(3+C) (e.g., XYZ+feature) seed points 1206C. The output 1210C of the voting module 1250C has a dimensionality of M×(3+C) and may be further provided to a sampling and grouping module 1212C in the object proposal and classification module 1252C that generates outputs (1214C, 1216C, 1218C, etc.) that are respectively provided to the corresponding proposal and classification modules (1220C) that may be shared. The output 1222C of the proposal and classification modules 1220C may be further processed by a 3D NMS module 1224C with an IoU threshold of 0.25 to generate the final output 1226C (e.g., a 3D bounding box).

FIG. 12D illustrates some graphical examples of various types of aforementioned data processed or generated with the aforementioned example architecture illustrated in FIG. 12C. 1202D illustrates a graphical example of an input point cloud. 1204D illustrates a graphical example of some seed points corresponding to respective XYZ coordinates and features. 1206D illustrates a graphical example of votes cast the seed points. 1208D illustrates a graphical example of vote clusters. 1210D illustrates a graphical example output of 3D bounding boxes.

Learning to Vote in Point Clouds:

From an input point cloud of size N×3, with a 3D coordinate for each of the N points, some embodiments aim to generate M votes, where each vote has both a 3D coordinate and a high dimensional feature vector. There are two major steps: point cloud feature learning through a backbone network and learned Hough voting from seed points.

Point Cloud Feature Learning:

Generating an accurate vote requires geometric reasoning and contexts. Instead of relying on hand-crafted features, some embodiments leverage recently proposed deep networks on point clouds for point feature learning. While some other embodiments are not restricted to any point cloud network, some embodiments adopt PointNet++ as the backbone due to its simplicity and demonstrated success on tasks ranging from normal estimation, semantic segmentation to 3D object localization. The backbone network has several set-abstraction layers and feature propagation (upsampling) layers with skip connections, which outputs a subset of the input points with XYZ and an enriched C-dimensional feature vector. The results are M seed points of dimension (3+C). Each seed point generates one vote.

Hough Voting with Deep Networks:

Compared to traditional Hough voting where the votes (offsets from local key-points) are determined by look ups in a pre-computed code-book, some embodiments generate votes with a deep network based voting module, which is both more efficient (without kNN look ups) and more accurate as it is trained jointly with the rest of the pipeline.

Given a set of seed points $$\{s_i\}_{i=1}^{M}$$

where $s_i=\{x_i; f_i\}$ with $x_i \in R^3$ and $f_i \in R^C$, a shared voting module generates votes from each seed independently. Specifically, the voting module is realized with a multi-layer perceptron (MLP) network with fully connected layers, ReLU (Rectified Linear Unit) and batch normalization. The MLP takes seed feature $f_i$ and outputs the Euclidean space offset $\Delta x_i \in R^3$ and a feature offset $\Delta f_i \in R^C$ such that the vote $v_i=[y_i; g_i]$ generated from the seed $s_i$ has $y_i=x_i+\Delta x_i$ and $g_i=f_i+\Delta f_i$. The predicted 3D offset $\Delta x_i$ is explicitly supervised by a regression loss.

$$L_{vote-reg} = \frac{1}{M_{pos}} \|\Delta x_i - \Delta x_i^*\| 1[s_i \text{ on object}], \quad \text{Eq. 15F-(1)}$$

where $1[s_i$ on object] indicates whether a seed point $s_i$ is on an object surface, and $M_{pos}$ is the count of total number of seeds on object surface. $\Delta x_i^*$ is the ground truth displacement from the seed position $x_i$ to the bounding box center of the object it belongs to.

Votes are the same as seeds in tensor representation but are no longer grounded on object surfaces. A more essential difference though is their position-votes generated from seeds on the same object are now closer to each other than the seeds are, which makes it easier to combine cues from different parts of the object. Next, some embodiments will take advantage of this semantic-aware locality to aggregate vote features for object proposal.

Object Proposal and Classification from Votes:

The votes create canonical "meeting points" for context aggregation from different parts of the objects. After clustering these votes, some embodiments aggregate their features to generate object proposals and classify them.

Vote clustering through sampling and grouping. While there can be many ways to cluster the votes, some embodiments opt for a simple strategy of uniform sampling and grouping according to spatial proximity. Specifically, from a set of votes $$\{v_i = [y_i; g_i] \in \{v_i = [y_i; g_i] \in R^{3+C}\}_{i=1}^{M},$$

some embodiments sample a subset of K votes using farthest point sampling based on $\{y_i\}$ in 3D Euclidean space, to get $\{v_{ik}\}$ with k=1, . . . , K. Then, these embodiments form K clusters by finding neighboring votes to each of the $v_{ik}$'s 3D location:

$$C_k = \{v_i^{(k)} \mid \|v_i - v_{il}\| < r\}$$

for k=1, . . . , K. Though simple, this clustering technique is easy to integrate into an end-to-end pipeline and works well in practice.

Proposal and Classification from Vote Clusters:

As a vote cluster is in essence a set of high-dim points, some embodiments may leverage a generic point set learning network to aggregate the votes in order to generate object proposals. Compared to the back-tracing step of traditional Hough voting for identifying the object boundary, this procedure allows to propose amodal boundaries even from partial observations, as well as predicting other parameters like orientation, class, etc. In an example implementation, some embodiments use a shared PointNet for vote aggregation and proposal in clusters. Given a vote cluster $C=\{w_i\}$ with i=1, . . . , n and its cluster center $w_j$, where $w_i=[z_i; h_i]$ with $z_i \in R^3$ as the vote location and $h_i \in R^C$ as the vote feature. To enable usage of local vote geometry, some embodiments transform vote locations to a local normalized coordinate system by $$z_i' = (z_i - z_j)/r.$$

Then an object proposal for this cluster p (C) is generated by passing the set input through a PointNet-like module:

$$p(C) = MLP_2\{\max_{i=1,\ldots,n}([z_i'; h_i])\}, \quad \text{Eq. 15F-(2)}$$

In the above equation 15F-(2), votes from each cluster are independently processed by a MLP 1 before being max-pooled (channel-wise) to a single feature vector and passed to MLP 2 where information from different votes are further combined. Some embodiments represent the proposal p as a multidimensional vector with an objectness score, bounding box parameters (center, heading and scale parameterized) and semantic classification scores.

Loss Function:

The loss functions in the proposal and classification stage consist of objectness, bounding box estimation, and semantic classification losses. Some embodiments supervise the objectness scores for votes that are located either close to a ground truth object center (within 0.3 meters) or far from any center (by more than 0.6 meters). Some embodiments consider proposals generated from those votes as positive and negative proposals, respectively. Objectness predictions for other proposals are not penalized. Objectness is supervised via a cross entropy loss normalized by the number of non-ignored proposals in the batch. For positive proposals, some embodiments further supervise the bounding box estimation and class prediction according to the closest ground truth bounding box. Specifically, some embodiments decouple the box loss to center regression, heading angle estimation and box size estimation. For semantic classification some embodiments use the standard cross entropy loss. In all regression in the detection loss, some embodiments use the Huber (smooth-$L_1$) loss. Further details are provided in the appendix.

Implementation Details:

Input and data augmentation. Input to a detection network is a point cloud of N points randomly sub-sampled from either a popped-up depth image (N=20k) or a 3D scan (mesh vertices, N=40k). In addition to XY Z coordinates, some embodiments also include a height feature for each point indicating its distance to the floor. The floor height is estimated as the 1% percentile of all points' heights. To augment the training data, some embodiments randomly sub-sample the points from the scene points on-the-fly. Some embodiments also randomly flip the point cloud in both horizontal direction, randomly rotate the scene points by Uniform [−5°, 5°] around the upright-axis, and randomly scale the points by Uniform [0.9, 1.1].

Training the Network:

Some embodiments train the entire network end-to-end and from scratch with an Adam optimizer, batch size 8 and an initial learning rate of 0.001. The learning rate is decreased by 10× after 80 epochs and then decreased by another 10× after 120 epochs. Training the model to convergence on one Volta Quadro GP100 GPU takes around 10 hours on SUN RGB-D and less than 4 hours on ScanNetV2.

Inference. In some embodiments, VoteNet is able to take point clouds of the entire scenes and generate proposals in one forward pass. The proposals are post-processed by a 3D NMS module with an IoU threshold of 0.25. The evaluation follows the same protocol as in using mean average precision.

Some embodiments perform room and/or wall regression to extract features at 1508F at least by computing the features at one or more scales to determine a subsampled version (e.g., a set of seed points) of the input point cloud and to determine votes cast by the subsampled version of the input point cloud. In some embodiments, room and/or wall regression at 1508F may be performed with a PointNet-based and/or PointNet++-based module which is described below in greater details above with reference to FIG. 15D. Vote clustering may be performed at 1510F; and a room perimeter may be estimated at 1512F.

Figure 15G:
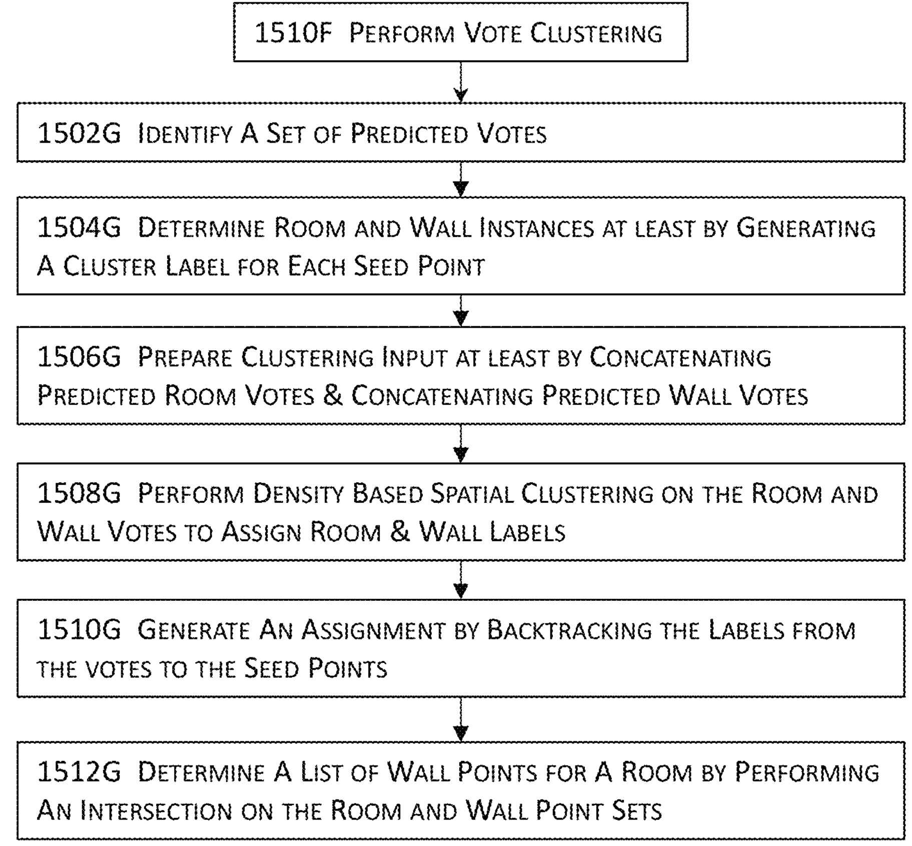
FIG. 15G illustrates more details about the flow diagram illustrated in FIG. 15F for generating a floorplan of a scene in some embodiments.

FIG. 15G illustrates more details about the flow diagram illustrated in FIG. 15F for generating a floorplan of a scene in some embodiments. More specifically, FIG. 15G illustrates more details about performing vote clustering at 1510F of FIG. 15F. In these embodiments, a set of votes or predicted votes may be identified at 1502G. One or more room instances and one or more wall instances may be determined at 1504G at least by generating a cluster label for a seed point. Some embodiments prepare a clustering input at 1506G at least by concatenating room votes (or predicted room votes) into one or more room votes and further at least by concatenating wall votes (or predicted wall votes) into one or more wall votes.

Clustering may be performed at 1508G on the one or more room votes and/or the one or more wall votes to assign one or more room labels and/or one or more wall labels. In some embodiments, a density-based spatial clustering (e.g., DBSCAN or Density-Based Spatial Clustering of Applications with Noise) may be performed at 1508G with eps=ϵ on the room and wall votes separately and assign a cluster label $$l_i^{q'}$$

to each vote $$v_i^{q'}$$

such that q' belongs to {R, W}, where q'=R implies the label is a cluster assignment for rooms, and q'=W implies that the label is a cluster assignment for walls, purely based on spatial density distribution of votes without restriction on the maximum number of clusters (e.g., rooms or walls).

A DBSCAN model uses a simple minimum density level estimation, based on a threshold for the number of neighbors, minPts, within the radius ε (with an arbitrary distance measure). Objects with more than minPts neighbors within this radius (including the query point) are considered to be a core point. The intuition of DBSCAN is to find those areas, which satisfy this minimum density, and which are separated by areas of lower density. For efficiency reasons, DBSCAN does not perform density estimation in-between points. Instead, all neighbors within the ε radius of a core point are considered to be part of the same cluster as the core point (called direct density reachable). If any of these neighbors is again a core point, their neighborhoods are transitively included (density reachable). Non-core points in this set are called border points, and all points within the same set are density connected. Points which are not density reachable from any core point are considered noise and do not belong to any cluster.

Moreover, a DBSCAN module computes clusters according to the above model (except that border points belonging to multiple clusters are only assigned to one of them). In this algorithm, the database is linearly scanned for objects which have not yet been processed. Non-core points are assigned to noise, and when a core point is discovered, its neighbors are iteratively expanded and added to the cluster. Objects that have been assigned to a cluster will then be skipped when encountered later by the linear scan. This basic algorithm is the standard approach to compute the transitive closure of a relation, with the minimal modification that only core points are expanded. Yet, this can yield a reasonably efficient algorithm if a database index is used. Algorithm 1 gives a simplified pseudo-code for this DBSCAN algorithm. There are two calls to the function RangeQuery in this pseudocode. Both line 3 and line 13 will only execute if the point has not yet been labeled, in which case the point is subsequently labeled. This makes it easy to see the following properties: (i) Neighborhood queries are only executed for points labeled undefined. (ii) If a neighborhood query is executed on a point, the point is subsequently labeled either with a cluster label or Noise. (iii) The only time a point is relabeled is when its label changes from Noise to a cluster label in line 11. Thus, some embodiments execute exactly one neighborhood query for every point in the database. If the seed set iteration in line 10 is implemented adequately, this loop executes at most once for every point in the database, and some embodiments get a runtime complexity of $O(C+n \times Q+\Sigma_i r_i)$ where Q is the complexity of the function RangeQuery and ri is the result size of the i-th query. If the data is not already stored in an indexed database, some embodiments take the index construction time C into account, which yields a total runtime complexity of $O(C+n \times Q+\Sigma_i r_i)$. The index may also need additional storage, so some embodiments have space complexity O(n+I) to store the cluster labels and the index.

The index may, however, be shared across multiple runs of the algorithm, and different algorithms can benefit from the same index, if it is a "general purpose" index (such as an R*-tree) that supports range queries (among other queries). Implementing the range query with a linear scan yields $Q \in \Theta(n \cdot D)$ with cost D of computing the distance of two points, and then the DBSCAN runtime complexity is $\Theta(n^2 \cdot D)$. For Euclidean space of dimensionality d, this is $\Theta(n^2 \cdot d)$, but when using expensive distance functions such as the shared-nearest-neighbors distance the complexity can even be O(n3). DBSCAN never has been constrained to using Euclidean distance, or to points in $R^d$, but has always been intended to also be used with geographic data, polygons, and other data types. This "original DBSCAN" algorithm is not the only algorithm to produce a clustering based on the theoretical DBSCAN cluster model. For example, scikit-learn 0.16 includes a variant that first materializes all neighborhoods (which yields worst-case quadratic memory), then performs the cluster expansion in a "vectorized" way on the core points only. The overall runtime complexity is not improved, but this is more efficient to execute by the Python/NumPy runtime environment. The result of this DBSCAN algorithm is deterministic, but may change if the dataset is permuted. Firstly, cluster labels can trivially change depending on the order in which the clusters are discovered. Secondly, border points in the DBSCAN theoretical model can be density-reachable from more than one cluster. The original DBSCAN algorithm simply assigns border points to the first cluster they are reachable from, because a unique cluster assignment is often desirable from a user point of view and this requires the least amount of memory. Because this is a rare situation of little interest, it is not necessary to try different permutations of the dataset. In the improved cluster model of HDBSCAN*, this anomaly has been removed since there are no border points anymore. In some embodiments, the question to discussing the complexity of the original DBSCAN algorithm is the runtime complexity Q of the neighborhood query RangeQuery. This query constitutes a reusable (other algorithms can also use RangeQuery) and powerful interface for implementing and optimizing data mining algorithms efficiently on top of a database. But if this query is not accelerated, the runtime is $\Theta(n2 \cdot D)$ with D being the cost of a distance computation.

When looking at the sample sets of points, some embodiments may easily and unambiguously detect clusters of points and noise points not belonging to any of those clusters. The main reason that these embodiments recognize the clusters is that within each cluster, these embodiments have a typical density of points which is considerably higher than outside of the cluster. Furthermore, the density within the areas of noise is lower than the density in any of the clusters. In the following, some embodiments formalize this intuitive notion of "clusters" and "noise" in a database D of points of some k-dimensional space S. Note that both, the notion of clusters and the algorithm DBSCAN, apply as well to 2D or 3D Euclidean space as to some high dimensional feature space. The key idea is that for each point of a cluster the neighborhood of a given radius has to contain at least a minimum number of points, e.g., the density in the neighborhood has to exceed some threshold. The shape of a neighborhood is determined by the choice of a distance function for two points p and q, denoted by dist(p,q). For instance, when using the Manhattan distance in 2D space, the shape of the neighborhood is rectangular. Note, that various embodiments with DBSCAN described herein work with any distance function so that an appropriate function can be chosen for some given application. For the purpose of proper visualization, all examples will be in 2D space using the Euclidean distance.

Definition 1: (Eps-neighborhood of a point) The Eps-neighborhood of a point p, denoted by $N_{Eps}(p)$ is defined by $N_{Eps}(p)=\{q \in D | dist(p,q) \leq Eps\}$.

A naive approach may require for each point in a cluster that there are at least a minimum number (MinPts) of points in an Eps-neighborhood of that point. However, this approach fails because there are two kinds of points in a cluster, points inside of the cluster (core points) and points on the border of the cluster (border points). In general, an Eps-neighborhood of a border point contains significantly less points than an Eps-neighborhood of a core point. Therefore, some embodiments set the minimum number of points to a relatively low value in order to include all points belonging to the same cluster. This value, however, will not be characteristic for the respective cluster-particularly in the presence of noise. Therefore, some embodiments require that for every point p in a cluster C there is a point q in C so that p is inside of the Eps-neighborhood of q and $N_{Eps}(q)$ contains at least MinPts points. This definition is elaborated in the following.

Definition 2: (directly density-reachable) A point p is directly density-reachable from a point with respect to Eps, MinPts if 1) $q \in N_{Eps}(q)$ and 2) $|N_{Eps}(q)| \geq MinPts$ (core point conditin).

Directly density-reachable is symmetric for pairs of core points. In general, however, it is not symmetric if one core point and one border point are involved.

Definition 3: (density-reachable) A point p is density-reachable from a point q with respect to Eps and MinPts if there is a chain of points $p_1, \ldots, p_n$, $p_1=q$, $p_n=p$ such that $P_{i+1}$ is directly density-reachable from $p_i$.

Density-reachability is a canonical extension of direct density-reachability. This relation is transitive, but it is not symmetric. Although not symmetric in general, it is obvious that density-reachability is symmetric for core points. Two border points of the same cluster C are possibly not density reachable from each other because the core point condition might not hold for both of them. However, there must be a core point in C from which both border points of C are density-reachable. Therefore, some embodiments introduce the notion of density-connectivity which covers this relation of border points.

Definition 4: (density-connected) A point "p" is density-collected to a point "q" with respect to Eps and MinPts if there is a point "o" such that both, p and q are density-reachable from o with respect to Eps and MinPts.

Density-connectivity is a symmetric relation. For density reachable points, the relation of density-connectivity is also reflexive. Now, some embodiments are able to define the density-based notion of a cluster. Intuitively, a cluster is defined to be a set of density-connected points which is maximal with respect to density-reachability. Noise will be defined relative to a given set of clusters. Noise is simply the set of points in D not belonging to any of its clusters.

Definition 5: (cluster) Let D be a database of points. A cluster C with respect to Eps and MinPts is a non-empty subset of D satisfying the following conditions: 1) $\forall p,q$: if $p \in C$ and q is density-reachable from p with respect to Eps and MinPts, then $q \in C$ (maximality); and 2) $\forall p,q \in C$: p is density-connected to q with respect to Eps and MinPts (Connectivity).

Definition 6: (noise) Let $C_1, \ldots, C_k$ be the clusters of the database D with respect to parameters $Eps_i$ and $MinPts_i$, $i=1, \ldots, k$. Then the noise is defined as the set of points in the database D not belonging to any cluster Ci, e.g., noise$=\{p \in D | \forall i: p ! \in C\}$.

Note that a cluster C with respect to Eps and MinPts contains at least MinPts points because of the following reasons. Since C contains at least one point p, p must be density-connected to itself via some point o (which may be equal top). Thus, at least o has to satisfy the core point condition and, consequently, the Eps-Neighborhood of o contains at least MinPts points. The following lemmata are important for validating the correctness of the clustering algorithm. Intuitively, they state the following. Given the parameters Eps and MinPts, some embodiments may discover a cluster in a two-step approach. First, choose an arbitrary point from the database satisfying the core point condition as a seed. Second, retrieve all points that are density-reachable from the seed obtaining the cluster containing the seed.

Lemma 1: Let p be a point in D and $|N_{Eps}(p)|>MinPts$. Then the set $0=\{o | o \in D$ and o is density-reachable from p with respect to Eps and MinPts$\}$ is a cluster with respect to Eps and MinPts. It is not obvious that a cluster C with respect to and MinPts is uniquely determined by any of its core points. However, each point in C is density-reachable from any of the core points of C and, therefore, a cluster C contains exactly the points which are density-reachable from an arbitrary core point of C.

Lemma 2: Let C be a cluster with respect to Eps and MinPts and let p be any point in C with $|N_{Eps}(p)| \geq MinPts$. Then C equals to the set 0={o|o is density-reachable from p with respect to Eps and MinPts}.

Density Based Spatial Clustering of Applications with Noise:

Some embodiments present the algorithm DBSCAN (Density Based Spatial Clustering of Applications with Noise) which is designed to discover the clusters and the noise in a spatial database according to definitions 5 and 6. Ideally, some embodiments would have to know the appropriate parameters Eps and MinPts of each cluster and at least one point from the respective cluster. Then, these embodiments could retrieve all points that are density-reachable from the given point using the correct parameters. But there is no easy way to get this information in advance for all clusters of the database. However, there is a simple and effective heuristic (presented in section 4.2) to determine the parameters Eps and MinPts of the "thinnest", e.g., least dense, cluster in the database. Therefore, DBSCAN uses global values for Eps and MinPts, e.g., the same values for all clusters. The density parameters of the "thinnest" cluster are good candidates for these global parameter values specifying the lowest density which is not considered to be noise.

To find a cluster, DBSCAN starts with an arbitrary point p and retrieves all points density-reachable from p with respect to Eps and MinPts. If p is a core point, this procedure yields a cluster with respect to Eps and MinPts (see Lemma 2). If pi s a border point, no points are density-reachable from p and DBSCAN visits the next point of the database. Because some embodiments use global values for Eps and MinPts, DBSCAN may merge two clusters according to definition 5 into one cluster, if two clusters of different density are "close" to each other. Let the distance between two sets of points $S_1$ and $S_2$ be defined as dist $(S_1, S_2)=\min\{dist(p,q)|p\in S_1, q\in S_2\}$. Then, two sets of points having at least the density of the thinnest cluster will be separated from each other only if the distance between the two sets is larger than Eps. Consequently, a recursive call of DBSCAN may be necessary for the detected clusters with a higher value for MinPts. This is, however, no disadvantage because the recursive application of DBSCAN yields an elegant and very efficient basic algorithm. Furthermore, the recursive clustering of the points of a cluster is only necessary under conditions that can be easily detected. In the following, some embodiments present a basic version of DBSCAN omitting details of data types and generation of additional information about clusters:

```
DBSCAN (SetOfPoints, Eps, MinPts)
// SetOfPoints is UNCLASSIFIED
  Clusterid := nextid(NOISE);
  FOR i FROM 1 TO SetOfPoints.size DO
    Point := SetOfPoints.get(i);
    IF Point.Clid = UNCLASSIFIED THEN
      IF ExpandCluster(SetOfPoints, Point,
          Clusterid, Eps, MinPts) THEN
        Clusterid := nextid(Clusterid)
      END IF
    END IF
  END FOR
  END; // DBSCAN
```

SetOf Points is either the whole database or a discovered cluster from a previous run. Eps and MinPts are the global density parameters determined either manually or according to the heuristics presented in section 4.2. The function SetOf Points.get (i) returns the i-th element of SetOf Points. The most important function used by DBSCAN is ExpandCluster which is presented below:

```
ExpandCluster(SetOfPoints, Point, Clid, Eps, MinPts) : Boolean;
  seeds:=SetOfPoints.regionQuery(Point,Eps);
  IF seeds.size<MinPts THEN // no core point
    SetOfPoint.changeClid(Point,NOISE);
    RETURN False;
  ELSE // all points in seeds are density reachable from Point
    SetOfPoints.changeClids(seeds,Clid);
    seeds.delete(Point);
    WHILE seeds <> Empty DO
      currentP :=seeds.first( );
      result := SetOfPoints.regionQuery(currentP, Eps);
      IF result.size >= MinPts THEN
        FOR i FROM 1 TO result.size DO
          resultP := result.get(i);
          IF resultP.Clid
            IN {UNCLASSIFIED, NOISE} THEN
            IF resultP.Clid = UNCLASSIFIED THEN
              seeds.append(resultP);
            END IF;
          SetOfPoints.changeClid(resultP,Clid);
          END IF; // UNCLASSIFIED or NOISE
        END FOR;
      END IF; // result.size >= MinPts
      seeds.delete(currentP);
    END WHILE; // seeds <> Empty
    RETURN True;
  END IF
END; // ExpandCluster
```

A call of SetOf Points.regionQuery (Point, Eps) returns the Eps-Neighborhood of Point in SetOf Points as a list of points. Region queries can be supported efficiently by spatial access methods such as R*-trees which are assumed to be available in a SDBS for efficient processing of several types of spatial queries. The height of an R*-tree is O(log n) for a database of n points in the worst case and a query with a "small" query region has to traverse only a limited number of paths in the R*-tree. Since the Eps-Neighborhoods are expected to be small compared to the size of the whole data space, the average run time complexity of a single region query is O(log n). For each of the n points of the database, some embodiments have at most one region query. Thus, the average run time complexity of DBSCAN is O(n*log n). The CIId (ClusterId) of points which have been marked to be NOISE may be changed later, if they are density-reachable from some other point of the database. This happens for border points of a cluster. Those points are not added to the seeds-list because some embodiments already know that a point with a CIId of NOISE is not a core point. Adding those points to seeds would only result in additional region queries which would yield no new answers. If two clusters C1 and C2 are very close to each other, it might happen that some point p belongs to both, C1 and C2. Then p must be a border point in both clusters because otherwise C1 would be equal to C2 because some embodiments use global parameters. In this case, point p will be assigned to the cluster discovered first. Except from these rare situations, the result of DB SCAN is independent of the order in which the points of the database are visited due to Lemma 2.

To determine the Parameters Eps and MinPts, some embodiments use heuristic to determine the parameters Eps and MinPts of the "thinnest" cluster in the database. This heuristic is based on the following observation. Let d be the distance of a point p to its k-th nearest neighbor, then the d-neighborhood of p contains exactly k+I points for almost all points p. The d-neighborhood of p contains more than k+1 points only if several points have exactly the same distance d from p which is quite unlikely. Furthermore, changing k for a point in a cluster does not result in large changes of d. This only happens if the k-th nearest neighbors of p fork=1, 2, 3, . . . are located approximately on a straight line which is in general not true for a point in a cluster. For a given k, some embodiments define a function k-dist from the database D to the real numbers, mapping each point to the distance from its k-th nearest neighbor. When sorting the points of the database in descending order of their k-dist values, the graph of this function gives some hints concerning the density distribution in the database. This graph may be called a sorted k-dist graph. If an arbitrary point p is chosen, some embodiments set the parameter Eps to k-dist (p) and set the parameter MinPts to k, all points with an equal or smaller k-dist value will be core points. If there exists a threshold point with the maximal k-dist value in the "thinnest" cluster of D, the desired parameter values may be obtained. The threshold point is the first point in the first "valley" of the sorted k-dist graph. All points with a higher k-dist value (left of the threshold) are considered to be noise, all other points (right of the threshold) are assigned to some cluster.

In general, it may be difficult to detect the first "valley" automatically, but it is relatively simple for a user to see this valley in a graphical representation. Therefore, some embodiments follow an interactive approach for determining the threshold point. DBSCAN needs two parameters, Eps and MinPts. However, experiments indicate that the k-dist graphs fork>4 do not significantly differ from the 4-dist graph and, furthermore, they need considerably more computation. Therefore, these embodiments eliminate the parameter MinPts by setting it to 4 for all databases (for 2-dimensional data).

In some embodiments, the model introduced by DBSCAN uses a simple minimum density level estimation, based on a threshold for the number of neighbors, minPts, within the radius $\varepsilon$ (with an arbitrary distance measure). Objects with more than minPts neighbors within this radius (including the query point) are considered to be a core point. The intuition of DBSCAN is to find those areas, which satisfy this minimum density, and which are separated by areas of lower density. For efficiency reasons, DBSCAN does not perform density estimation in-between points. Instead, all neighbors within the $\varepsilon$ radius of a core point are considered to be part of the same cluster as the core point (called direct density reachable). If any of these neighbors is again a core point, their neighborhoods are transitively included (density reachable). Non-core points in this set are called border points, and all points within the same set are density connected. Points which are not density reachable from any core point are considered noise and do not belong to any cluster.

DBSCAN model further computes clusters according to the above model (except that border points belonging to multiple clusters are only assigned to one of them). In this algorithm, the database is linearly scanned for objects which have not yet been processed. Non-core points are assigned to noise, and when a core point is discovered, its neighbors are iteratively expanded and added to the cluster. Objects that have been assigned to a cluster will then be skipped when encountered later by the linear scan. This basic algorithm is the standard approach to compute the transitive closure of a relation, with the minimal modification that only core points are expanded. Yet, this can yield a reasonably efficient algorithm if a database index is used. Algorithm 1 gives a simplified pseudo-code for this DBSCAN algorithm. DBSCAN models generally have the following properties: (i) Neighborhood queries are only executed for points labeled undefined. (ii) If a neighborhood query is executed on a point, the point is subsequently labeled either with a cluster label or Noise. (iii) The only time a point is relabeled is when its label changes from Noise to a cluster label in line 11. Some embodiments execute exactly one neighborhood query for every point in the database. If the seed set iteration is implemented adequately, this loop executes at most once for every point in the database, and these embodiments obtain a runtime complexity of $O(C+n\times Q+\Sigma_i r_i)$ where Q is the complexity of the function RangeQuery and ri is the result size of the i-th query. If the data is not already stored in an indexed database, some embodiments may need to take the index construction time C into account, which yields a total runtime complexity of $O(C+n\times Q+\Sigma_i r_i)$. The index may also need additional storage, so these embodiments have space complexity O(n+I) to store the cluster labels and the index.

The index may, however, be shared across multiple runs of the algorithm, and different algorithms can benefit from the same index, if it is a "general purpose" index (such as an R*-tree) that supports range queries (among other queries). Implementing the range query with a linear scan yields $Q\in\Theta(n\cdot D)$ with cost D of computing the distance of two points, and then the DBSCAN runtime complexity is $\Theta(n^2\cdot D)$. For Euclidean space of dimensionality d, this is $\Theta(n^2\cdot d)$, but when using expensive distance functions such as the shared-nearest-neighbors distance the complexity can even be O(n3). DBSCAN never has been constrained to using Euclidean distance, or to points in $R_d$, but has always been intended to also be used with geographic data, polygons, and other data types.

With the clustering performed at 1508G, an assignment may be generated at 1510G at least by backtracking the one or more room labels and/or one or more wall labels from the corresponding room votes and/or wall votes to the corresponding seed points. A list of wall points may be determined at 1512G at least by performing an intersection on the set of room points and the set of wall points.

Figure 15H:
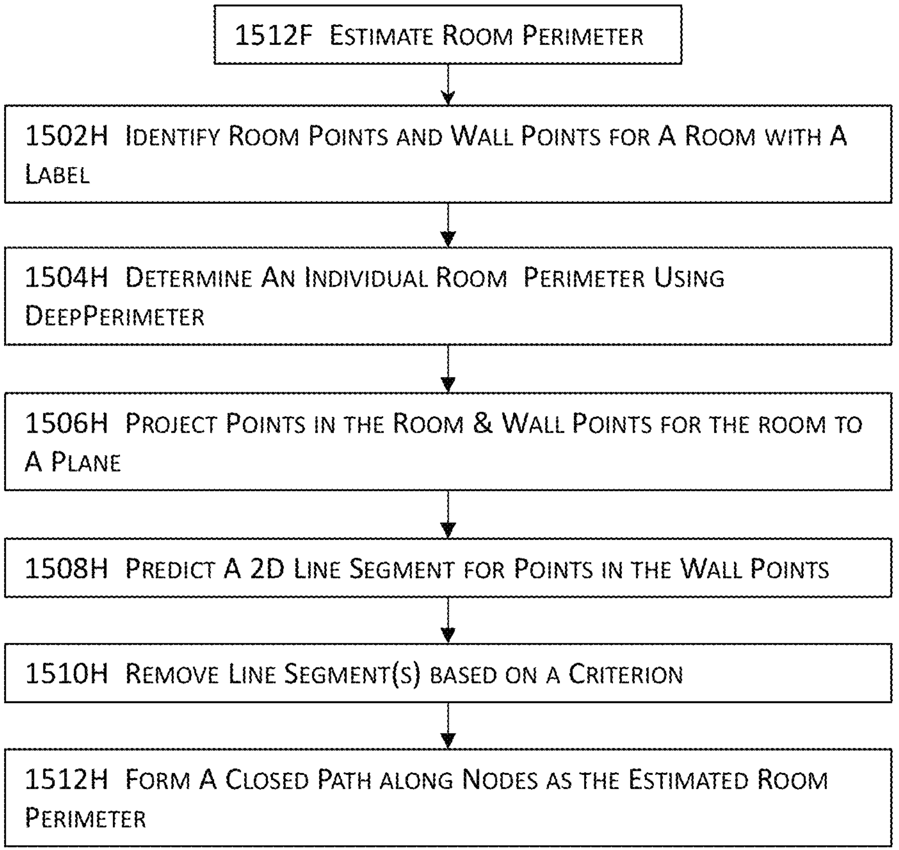
FIG. 15H illustrates more details about the flow diagram illustrated in FIG. 15F for generating a floorplan of a scene in some embodiments.

FIG. 15H illustrates more details about the flow diagram illustrated in FIG. 15F for generating a floorplan of a scene in some embodiments. More specifically, FIG. 15H illustrates more details about estimating a room perimeter at 1512F of FIG. 15F. In these embodiments, a set of room points and one or more sets of wall points for a room may be identified at 1502H. An individual room perimeter may be determined at 1504H by obtaining understanding of a layout of an indoor environment and understanding of long-range geometry of a space in technological fields such as extended reality, scene understanding, etc. In some embodiments, individual room perimeter may be determined at 1504H at least by using the DeepPerimeter module described above with reference to FIG. 15E above.

The points in the room points and wall points for the room may be projected to a plane at 1506H. For example, these points may be projected to a horizontal plane such as the X-Y plane where the Z-direction denotes the gravity direction. A two-dimensional (2D) line segment may be predicted at 1508H for points in the one or more sets of wall points by using a scene analysis or scene understanding module. In some embodiments, a 2D line segment may be predicted at 1508H for wall points by using a Random Sample Consensus (RANSAC) model.

The Random Sample Consensus (RANSAC) model, developed for fitting a model to experimental data, may be used in scene analysis and automated cartography. The application discussed, the location determination problem (LOP), is treated at a level beyond that of a mere example of the use of the RANSAC paradigm; new basic findings concerning the conditions under which the LDP can be solved are presented and a comprehensive approach to the solution of this problem that some embodiments anticipate will have near-term practical applications is described. To a large extent, scene analysis (and, in fact, science in general) is concerned with the interpretation of sensed data in terms of a set of predefined models. Conceptually, interpretation involves two distinct activities: First, there is the problem of finding the best match between the data and one of the available models (the classification problem); Second, there is the problem of computing the best values for the free parameters of the selected model (the parameter estimation problem). In practice, these two problems are not independent—a solution to the parameter estimation problem is often required to solve the classification problem. Classical techniques for parameter estimation, such as least squares, optimize (according to a specified objective function) the fit of a functional description (model) to all of the presented data. These techniques have no internal mechanisms for detecting and rejecting gross errors. They are averaging techniques that rely on the assumption (the smoothing assumption) that the maximum expected deviation of any datum from the assumed model is a direct function of the size of the data set, and thus regardless of the size of the data set, there will always be enough good values to smooth out any gross deviations.

In many practical parameter estimation problems the smoothing assumption does not hold; e.g., the data contain uncompensated gross errors. To deal with this situation, several heuristics have been proposed. The technique usually employed is some variation of first using all the data to derive the model parameters, then locating the datum that is farthest from agreement with the instantiated model, assuming that it is a gross error, deleting it, and iterating this process until either the maximum deviation is less than some preset threshold or until there is no longer sufficient data to proceed. It can easily be shown that a single gross error ("poisoned point"), mixed in with a set of good data, can cause the above heuristic to fail (for example, see FIG. 13A). Conventional approaches adopting averaging may not be an appropriate technique to apply to an unverified data set.

In some embodiments, a RANSAC model smooths data that includes a significant percentage of gross errors. This model is also applicable to scene analysis because local feature detectors, which often make mistakes, are the source of the data provided to the interpretation algorithms. Local feature detectors make two types of errors-classification errors and measurement errors. Classification errors occur when a feature detector incorrectly identifies a portion of an image as an occurrence of a feature.

Measurement errors occur when the feature detector correctly identifies the feature, but slightly miscalculates one of its parameters (e.g., its image location). Measurement errors generally follow a normal distribution, and therefore the smoothing assumption is applicable to them. Classification errors, however, are gross errors, having a significantly larger effect than measurement errors, and do not average out. A RANSAC model may be used to address the location determination problem "Given a set of "landmarks" ("control points"), whose locations are known in some coordinate frame, determine the location (relative to the coordinate frame of the landmarks) of that point in space from which an image of the landmarks was obtained."

In response to a RANSAC requirement, some new results are derived on the minimum number of landmarks needed to obtain a solution, and then algorithms are presented for computing these minimum-landmark solutions in closed form. (Conventional techniques are iterative and require a good initial guess to assure convergence.) These results form the basis for an automatic system that can solve the LDP under severe viewing and analysis conditions. In particular, the system performs properly even if a significant number of landmarks are incorrectly located due to low visibility, terrain changes, or image analysis errors. Implementation details and experimental results are presented to complete the description of the LDP application.

The procedure in a RANSAC model is opposite to that of conventional smoothing techniques: Rather than using as much of the data as possible to obtain an initial solution and then attempting to eliminate the invalid data points, RANSAC uses as small an initial data set as feasible and enlarges this set with consistent data when possible. For example, given the task of fitting an arc of a circle to a set of two-dimensional points, the RANSAC approach would be to select a set of three points (since three points are required to determine a circle), compute the center and radius of the implied circle, and count the number of points that are close enough to that circle to suggest their compatibility with it (e.g., their deviations are small enough to be measurement errors). If there are enough compatible points, RANSAC would employ a smoothing technique such as least squares, to compute an improved estimate for the parameters of the circle now that a set of mutually consistent points has been identified. The RANSAC paradigm is more formally stated as follows:

Given a model that requires a minimum of n data points to instantiate its free parameters, and a set of data points P such that the number of points in P is greater than n [#(P) 2≥n], randomly select a subset S1 of n data points from P and instantiate the model. Use the instantiated model M1 to determine the subset S1* of points in P that are within some error tolerance of M1. The set S1* is called the consensus set of SI.

If #(S1*) is greater than some threshold t, which is a function of the estimate of the number of gross errors in P, use SI* to compute (possibly using least squares) a new model M1*. If #(S1*) is less than t, randomly select a new subset S2 and repeat the above process. If, after some predetermined number of trials, no consensus set with t or more members have been found, either solve the model with the largest consensus set found, or terminate in failure.

There are two obvious improvements to the above algorithm by a RANSAC model: First, if there is a problem related rationale for selecting points to form the S's, use a deterministic selection process instead of a random one; second, once a suitable consensus set S* has been found and a model M* instantiated, add any new points from P that are consistent with M* to S* and compute a new model on the basis of this larger set. The RANSAC paradigm comprises three unspecified parameters: (I) the error tolerance used to determine whether or not a point is compatible with a model, (2) the number of subsets to try, and (3) the threshold t, which is the number of compatible points used to imply that the correct model has been found. Methods are discussed for computing reasonable values for these parameters in the following subsections.

Error Tolerance For Establishing Datum/Model Compatibility: The deviation of a datum from a model is a function of the error associated with the datum and the error associated with the model (which, in part, is a function of the errors associated with the data used to instantiate the model). If the model is a simple function of the data points, it may be practical to establish reasonable bounds on error tolerance analytically. However, this straightforward approach is often unworkable; for such cases it is generally possible to estimate bounds on error tolerance experimentally. Sample deviations can be produced by perturbing the data, computing the model, and measuring the implied errors. The error tolerance could then be set at one or two standard deviations beyond the measured average error. The expected deviation of a datum from an assumed model is generally a function of the datum, and therefore the error tolerance should be different for each datum. However, the variation in error tolerances is usually relatively small compared to the size of a gross error. Thus, a single error tolerance for all data is often sufficient.

The Maximum Number of Attempts to Find a Consensus Set: The decision to stop selecting new subsets of P can be based upon the expected number of trials k required to select a subset of n good data points. Let w be the probability that any selected data point is within the error tolerance of the model. Then these embodiments have:

$E(k) = b + 2 * (1 - b) * b + 3 *(1 - b) 2 * b \ldots +$
$i * (l - b)i - l * b + \ldots,$
$E(k) = b * [l] + 2 * a + 3 * a^2 \ldots + i * a^{i-l} + \ldots],$
where E(k) is the expected value of k, $b = w^n$, and $a = (1 - b)$.
An identity for the sum of a geometric series is $a/(1 - a) = a + a^2 + a^3 \ldots + a^i + \ldots.$
Differentiating the above identity with respect to a, these embodiments have: $1/(1 - a)^2 = l + 2 * a + 3 * a^2 \ldots + i * a^{i-1} + \ldots$
Thus, $E(k) = l/b = W^{-n}$
Some embodiments may exceed E(k) trials by one or two standard deviationsbefore the process terminates. Note that the standard deviation of k, SD(k), is given by:
$SD(k) = sqrt[E(k^2) - E(k)^2,$
Then $$E(k^2) = \sum_{i=0}^{\infty}(b * i^2 * a^{i-1}) = \sum_{i=0}^{\infty}(b * i * (i - 1) * a^{i-1}) + \sum_{i=0}^{\infty}(b * i * a^{i-1})$$

But (using the geometric series identity and two differentiations:
$2a/(1 - a)^3 = E_{i=0}^{\infty}(i * (i - 1) * a^{i-1}),$
Thus,
$E(k^2) = (2 - b)/(b^2),$
and
$SD(k) = [sqrt(1 - w^n)] * (1/w^n).$ It shall be noted that generally SD(k) will be approximately equal to E(k); thus, for example, if (w=0.5) and (n=4), then E(k)=16 and SD(k)=15.5. This means that one might want to try two or three times the expected number of random selections implied by k (as tabulated above) to obtain a consensus set of more than t members. From a slightly different point of view, if some embodiments are to ensure with probability z that at least one of the random selections is an error-free set of n data points, then these embodiments must expect to make at least k selections (n data points per selection), where (I–b)k=(I–z), $k = [log(l - z)]/[log(l - b)].$
For example, if $(w = 0.5)$ and $(n = 4)$, then $(b = 1/16)$. To obtain a 90 percent assurance of making at least one error-free selection,
$k = log(O.I)/log(l5/16) = 35.7.$
Note that if $w^n \ll l$, then $k \sim log(l - z)E(k)$. Thus if $z = 0.90$ and $w^n \ll 1$, then $k \sim 2.3E(k)$; if $z = 0.95$ and $w^n \ll 1$, then $k \sim 3.0E(k)$.

A Lower Bound On the Size of an Acceptable Consensus Set: The threshold t, an unspecified parameter in the formal statement of the RANSAC paradigm, is used as the basis for determining that an n subset of P has been found that implies a sufficiently large consensus set to permit the algorithm to terminate. Thus, t must be chosen large enough to satisfy two purposes: that the correct model has been found for the data, and that a sufficient number of mutually consistent points have been found to satisfy the needs of the final smoothing procedure (which computes improved estimates for the model parameters). To ensure against the possibility of the final consensus set being compatible with an incorrect model, and assuming that y is the probability that any given data point is within the error tolerance of an incorrect model, some embodiments would like $y^{t-n}$ to be very small. While there is no general way of precisely determining y, it is certainly reasonable to assume that it is less than w (e.g., w is the a priori probability that a given data point is within the error tolerance of the correct model). Assuming $y<0.5$, a value of t–n equal to 5 will provide a better than 95 percent probability that compatibility with an incorrect model will not occur. To satisfy the needs of the final smoothing procedure, the particular procedure to be employed must be specified. If least-squares smoothing is to be used, there are many situations where formal methods can be invoked to determine the number of points required to produce a desired precision.

Figure 13A:
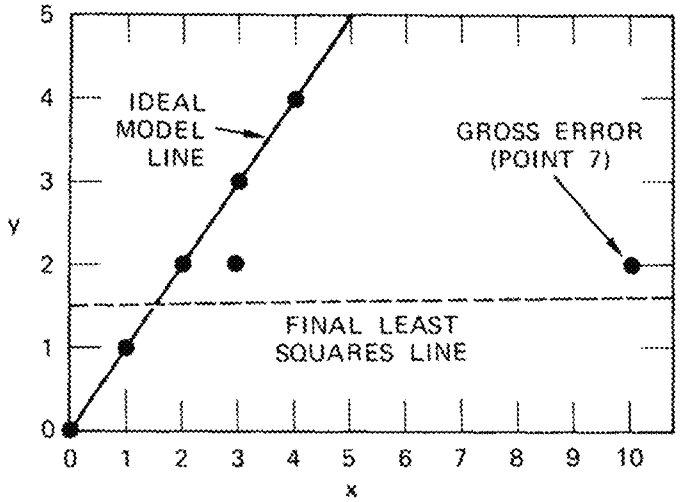
FIG. 13A illustrates an example application of least squares to some example data points in one or more embodiments.

Some embodiments apply RANSAC to the example described in FIG. 13A. A value of w (the probability that any selected data point is within the error tolerance of the model) equal to 0.85 is consistent with the data, and a tolerance (to establish datum/model compatibility) of 0.8 units was supplied as part of the problem statement. The RANSAC-supplied model will be accepted without external smoothing of the final consensus set; thus, some embodiments may obtain a consensus set that comprises all seven data points. Because one of these points is a gross error, it is obvious that some embodiments will not find a consensus set of the desired size, and so these embodiments will terminate with the largest set these embodiments are able to find. The theory presented earlier indicates that if some embodiments take two data points at a time, compute the line through them and measure the deviations of the remaining points from this line, these embodiments should expect to find a suitable consensus set within two or three trials; however, because of the limited amount of data, some embodiments may try all 21-combinations to find the largest consensus set. In either case, some embodiments may easily find the consensus set containing the six valid data points and the line that they imply.

The Location Determination Problem (LDP): A basic problem in image analysis is establishing a correspondence between the elements of two representations of a given scene. One variation of this problem, especially important in cartography, is determining the location in space from which an image or photograph was obtained by recognizing a set of landmarks (control points) appearing in the image (this is variously called the problem of determining the elements of exterior camera orientation, or the camera calibration problem, or the image-to-database correspondence problem). It is routinely solved using a least-squares technique [11, 8] with a human operator interactively establishing the association between image points and the three-dimensional coordinates of the corresponding control points. However, in a fully automated system, where the correspondences must be based on the decisions of marginally competent feature detectors, least squares is often incapable of dealing with the gross errors that may result; this consideration, discussed at length in Sec. II, is illustrated for the LDP in an example presented in Sec. IV. In this section a new solution to the LDP is presented based on the RANSAC paradigm, which is unique in its ability to tolerate gross errors in the input data. Some embodiments will first examine the conditions under which a solution to the LDP is possible and describe new results concerning this question; these embodiments then present a complete description of the RANSAC-based algorithm, and finally, describe experimental results obtained through use of the algorithm.

The LDP may be formally defined as follows: Given a set of m control points, whose 3-dimensional coordinates are known in some coordinate frame, and given an image in which some subset of them control points is visible, determine the location (relative to the coordinate system of the control points) from which the image was obtained. Some embodiments will initially assume that these embodiments know the correspondences between n image points and control points; some other embodiments consider the situation in which some of these correspondences are invalid. Some embodiments will also assume that both the principal point in the image plane (where the optical axis of the camera pierces the image plane) and the focal length (distance from the center of perspective to the principal point in the image plane) of the imaging system are known; thus (see FIG. 13B) some embodiments can easily compute the angle to any pair of control points from the center of perspective (CP). Finally, some embodiments assume that the camera resides outside and above a convex hull enclosing the control points. If some embodiments can compute the lengths of the rays from the CP to three of the control points, then these embodiments can directly solve for the location of the CP (and the orientation of the image plane if desired). Thus, an equivalent but mathematically more concise statement of the LDP is Given the relative spatial locations of n control points, and given the angle to every pair of control points from an additional point called the Center of Perspective (CP), find the lengths of the line segments ("legs") joining the CP to each of the control points. This may be referred to as the "perspective-n-point" problem (PnP). In order to apply the RANSAC paradigm, some embodiments may determine the smallest value of n for which it is possible to solve the PnP problem.

Figure 13B:
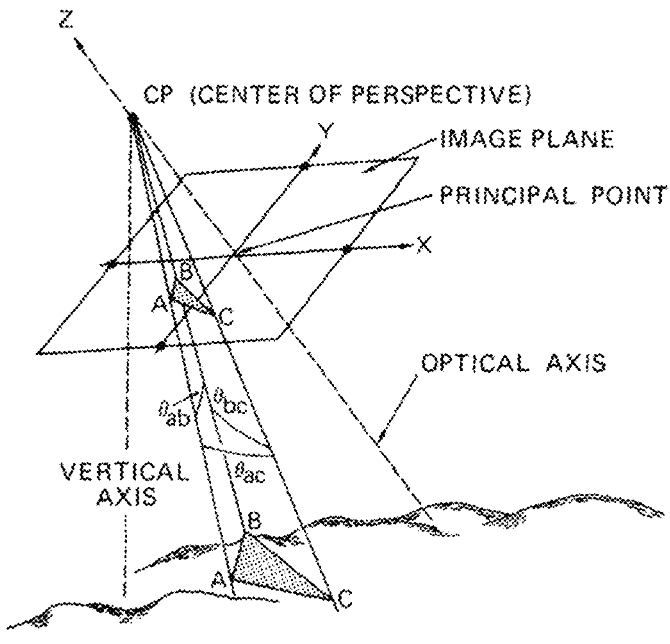
FIG. 13B illustrates an example geometry of a location determination task in one or more embodiments.

Solution of the Perspective-n-Point Problem: The PIP problem (n=I) provides no constraining information, and thus an infinity of solutions is possible. The P2P problem (n=2), illustrated in FIG. 13C, also admits an infinity of solutions; the CP can reside anywhere on a circle of diameter Rab/sin(Oab), rotated in space about the chord (line) joining the two control points A and B. The P3P problem (n=3) requires that some embodiments determine the lengths of the three legs of a tetrahedron, given the base dimensions and the face angles of the opposing trihedral angle (see FIG. 13D). The solution to this problem is implied by the three equations [A*]:

$$(Rab)^2=a^2+b^2-2*a*b[\cos(\theta ab)]$$

$$(Rac)^2=a^2+c^2-2*a*c[\cos(0ac)]$$

$$(Rbc)^2=b^2+c^2-2*b*c[\cos(\theta bc)] \quad [A^*]$$

It is known that n independent polynomial equations, in n unknowns, can have no more solutions than the product of their respective degrees [2]. Thus, the system A* can have a maximum of eight solutions. However, because every term in the system A* is either a constant or of second degree, for every real positive solution there is a geometrically isomorphic negative solution. Thus, there are at most four positive solutions to A*, and in FIG. 13E-(a)-13E-(c), some embodiments demonstrate an example demonstrating that the upper bound of four solutions is attainable.

Some embodiments derive an explicit algebraic solution for the system A*. This is accomplished by reducing A* to a biquadratic (quartic) polynomial in one unknown representing the ratio of two legs of the tetrahedron, and then directly solving this equation (some embodiments may also present a very simple iterative method for obtaining the solutions from the given problem data).

Figure 13C:
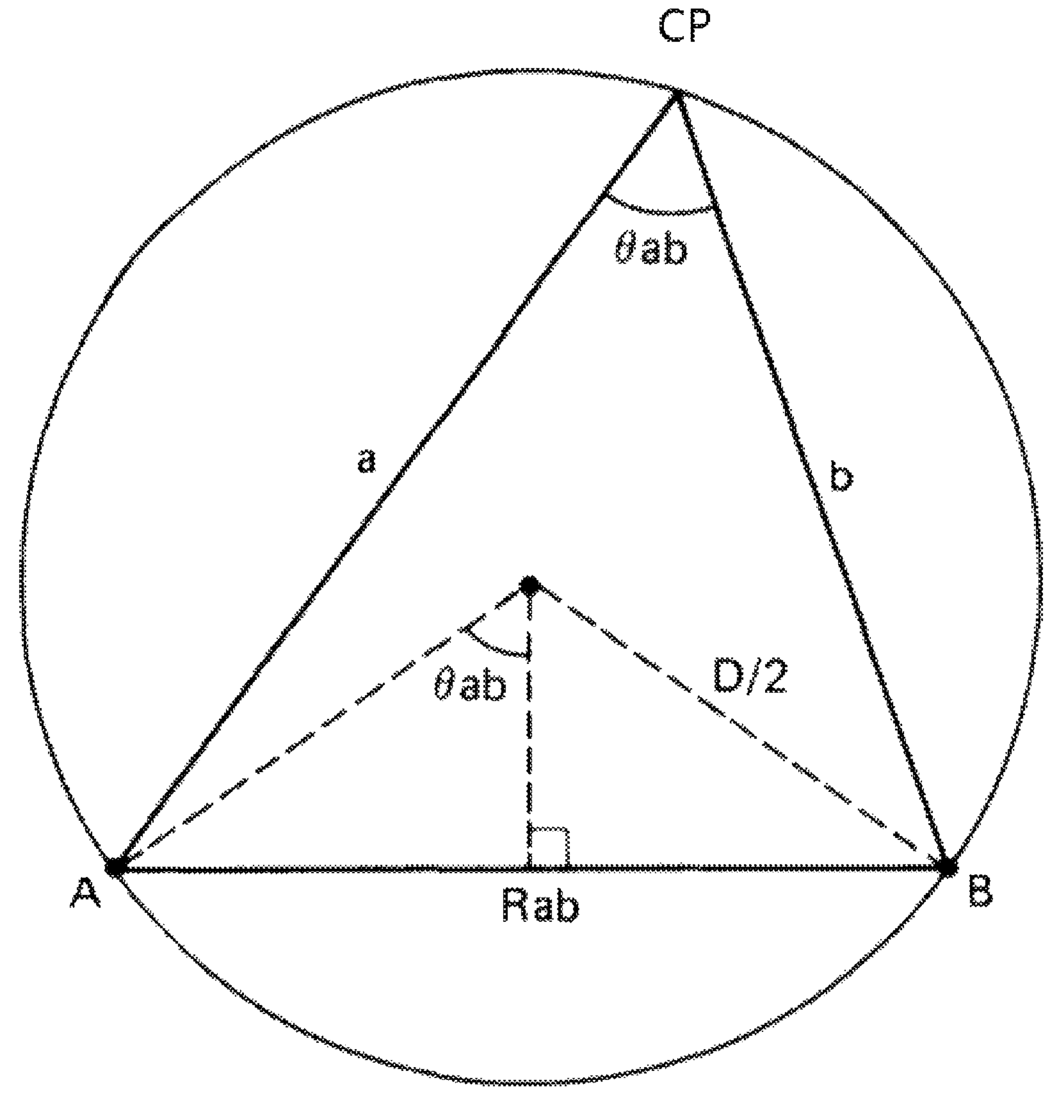
FIG. 13C illustrates an example geometry of a P2P task in some embodiments.
Figure 13D:
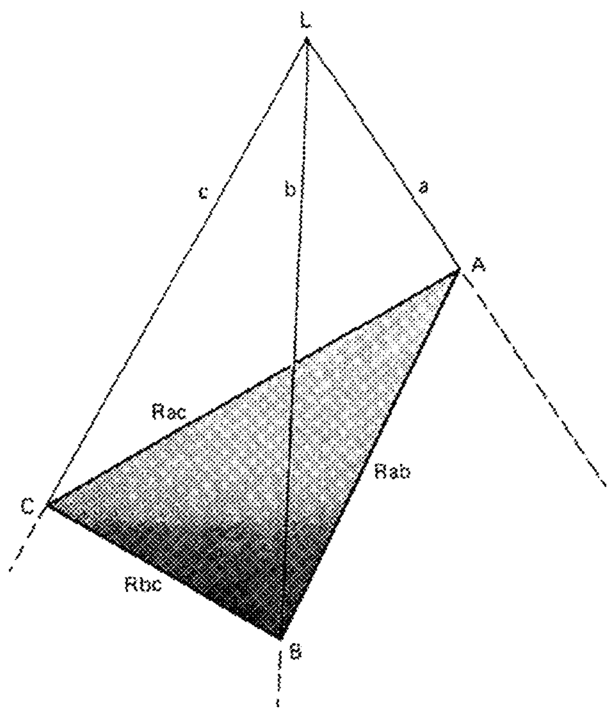
FIG. 13D illustrates an example geometry of a P3P task in some embodiments.

For the case n=4, when all four control points lie in a common plane (not containing the CP, and such that no more than two of the control points lie on any single line), some embodiments provide a technique that will always produce a unique solution. Surprisingly, when all four control points do not lie in the same plane, a unique solution cannot always be assured; for example, FIG. 13F-(a)-13F-(c) show that at least two solutions are possible for the P4P problem with the control points in "general position." To solve for the location of the CP in the case of four nonplanar control points, some embodiments can use the algorithm on two distinct subsets of the control points taken three at a time; the solution(s) common to both subsets locate the CP to within the ambiguity inherent in the given information. The approach used to construct the example shown in FIG. 13F-(a)-13F-(c) can be extended to any number of additional points.

Figure 13G:
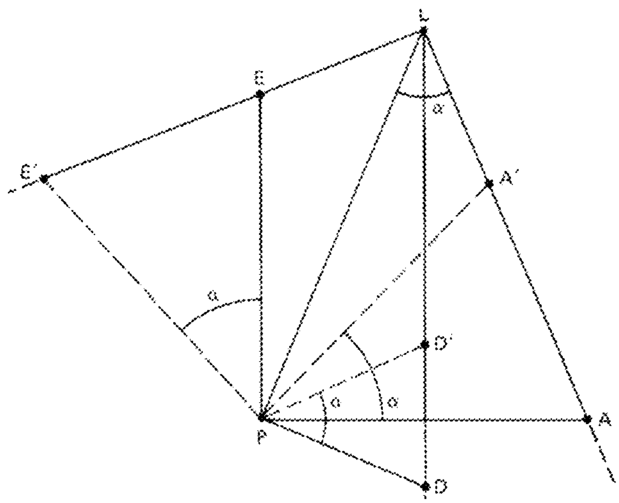
FIG. 13G illustrates an example P5P task in some embodiments.

It is based on the principle depicted in FIG. 13C: If the CP and any number of control points lie on the same circle, then the angle between any pair of control points and the CP will be independent of the location on the circle of the CP (and hence the location of the CP cannot be determined). Thus, some embodiments are able to construct the example shown in FIG. 13G, in which five control points in general position imply two solutions to the P5P problem. While the same technique will work for six or more control points, four or more of these points must now lie in the same plane and are thus no longer in general position. To prove that six (or more) control points in general position will always produce a unique solution to the P6P problem, it may be noted that for this case some embodiments can always solve for the 12 coefficients of the 3×4 matrix T that specifies the mapping (in homogeneous coordinates) from 3-space to 2-space; each of the six correspondences provides three new equations and introduces one additional unknown (the homogeneous coordinate scale factor). Thus, for six control points, some embodiments have 18 linear equations to solve for the 18 unknowns (actually, it can be shown that, at most, 17 of the unknowns are independent). Given the transformation matrix T, some embodiments construct an additional (synthetic) control point lying in a common plane with three of the given control points and compute its location in the image plane; and a unique solution may be obtained.

Consider the tetrahedron in FIG. 13E-(a). The base ABC is an equilateral triangle and the "legs" (e.g., LA, LB, and LC) are all equal. Therefore, the three face angles at L (e.g., <ALB, <ALC, and <BLC) are all equal. By the law of cosines, the following may be established: Cos (α)=5/8. This tetrahedron defines one solution to a P3P problem. A second solution is shown in FIG. 13E-(b). It is obtained from the first by rotating L about BC. It is necessary to verify that the length of L'A can be 1, given the rigid triangle ABC and the angle alpha. From the law of cosines, the following may be established:

$$(2*\sqrt{3})^2 = 4^2 + (L'A)^2 - 2*4*(L'A)*\left(\frac{5}{8}\right)$$

which reduces to:

$$(L'A-1)*(L'A-4)=0$$

Therefore, L'A can be either 1 or 4. FIG. 13E-(a) illustrates the L'A=4 case, and FIG. 13E-(b) illustrates the L'A=1 case. Notice that repositioning the base triangle so that its vertices move to different locations on the legs is equivalent to repositioning L. FIG. 13E-(c) shows the position of the base triangle that corresponds to the second solution. Since the tetrahedron in FIG. 13E-(a) is threefold rotationally symmetric, two more solutions can be obtained by rotating the triangle about AB and AC.

The RANSAC/LD Algorithm The RANSAC/LD algorithm accepts as input the following data: (I) A list L of m 6-tuples-each 6-tuple containing the 3-D spatial coordinates of a control point, its corresponding 2-D image plane coordinates, and an optional number giving the expected error (in pixels) of the given location in the image plane. (2) The focal length of the imaging system and the image plane coordinates of the principal point. (3) The probability (1−w) that a 6-tuple comprises a gross mismatch. (4) A "confidence" number G which is used to set the internal thresholds for acceptance of intermediate results contributing to a solution. A confidence number of one forces very conservative behavior on the algorithm; a confidence number of zero will call almost anything a valid solution.

The RANSAC (Random Sample Consensus)/LD (Location Determination) algorithm produces as output the following information: (I) The 3-D spatial coordinates of the lens center (e.g., the Center of Perspective), and an estimate of the corresponding error. (2) The spatial orientation of the image plane.

The RANSAC/LD algorithm operates as follows: (I) Three 6-tuples are selected from list L by a quasi-random method that ensures a reasonable spatial distribution for the corresponding control points. This initial selection is called SI. (2) The CP (called CPI) corresponding to selection SI is determined using a closed-form solution; multiple solutions are treated as if they were obtained from separate selections in the following steps. (3) The error in the derived location of CPI is estimated by perturbing the given image plane coordinates of the three selected control points (either by the amount specified in the 6-tuples or by a default value of one pixel), and recomputing the effect this would have on the location of the CPI. (4) Given the error estimate for the CPI, some embodiments use the technique described in [I] to determine error ellipses (dimensions based upon the supplied confidence number) in the image plane for each of the control points specified in list L; if the associated image coordinates reside within the corresponding error ellipse, then the 6-tuple is appended to the consensus set SI/CPI. (5) If the size of SI/CPI equals or exceeds some threshold value t (nominally equal to a value between 7 and mw), then the consensus set SI/CPI is supplied to a least-squares routine for final determination of the CP location and image plane orientation. 1 Otherwise, the above steps are repeated with a new random selection S2, S3, . . . , etc. (6) If the number of iterations of the above steps exceeds k=[log (I−G)]/[log (I−w3)], then the largest consensus set found so far is used to compute the final solution (or terminate in failure if this largest consensus set comprises fewer than six members).

With the 2D line segment predicted at 1508H, one or more line segments may be removed at 1510H based at least in part upon one or more criteria. For example, at least one of line segments having a difference between slopes≤$\theta_{min}$ may be removed at 1510H as described above in some embodiments. A closed path may be created for the estimated room perimeter at 1512H along points or nodes at least by executing, for example, a modified 2-opt. algorithm that provides a solution to the exponential time traveling-salesman problem as described above.

Figure 16A:
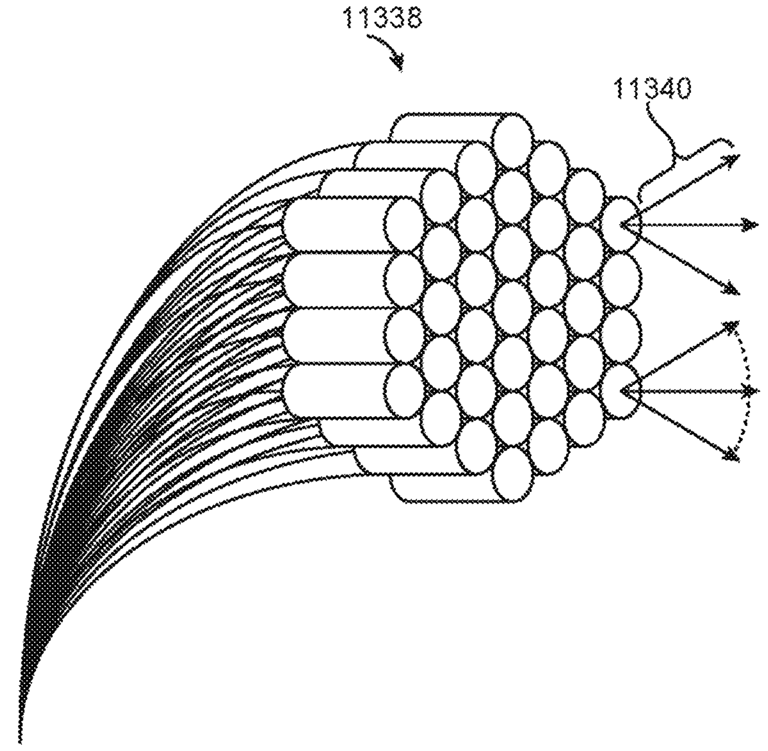
FIGS. 16A-I illustrate example configurations of an array of micro-projectors and coupling the array of micro-projectors with an optical system in one or more embodiments.
Figure 16B:
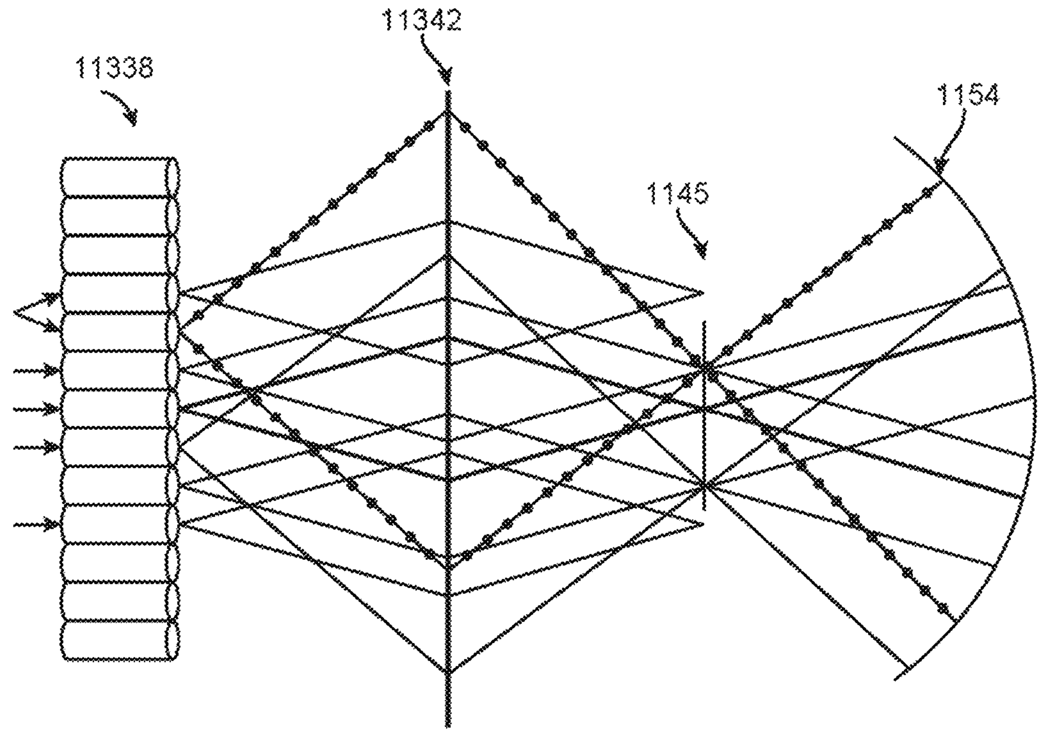
Figure 16C:
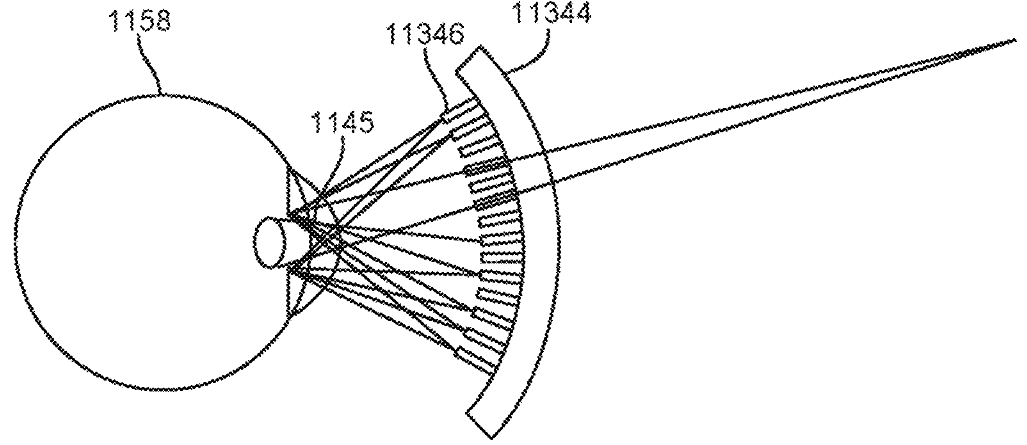
Figure 16D:
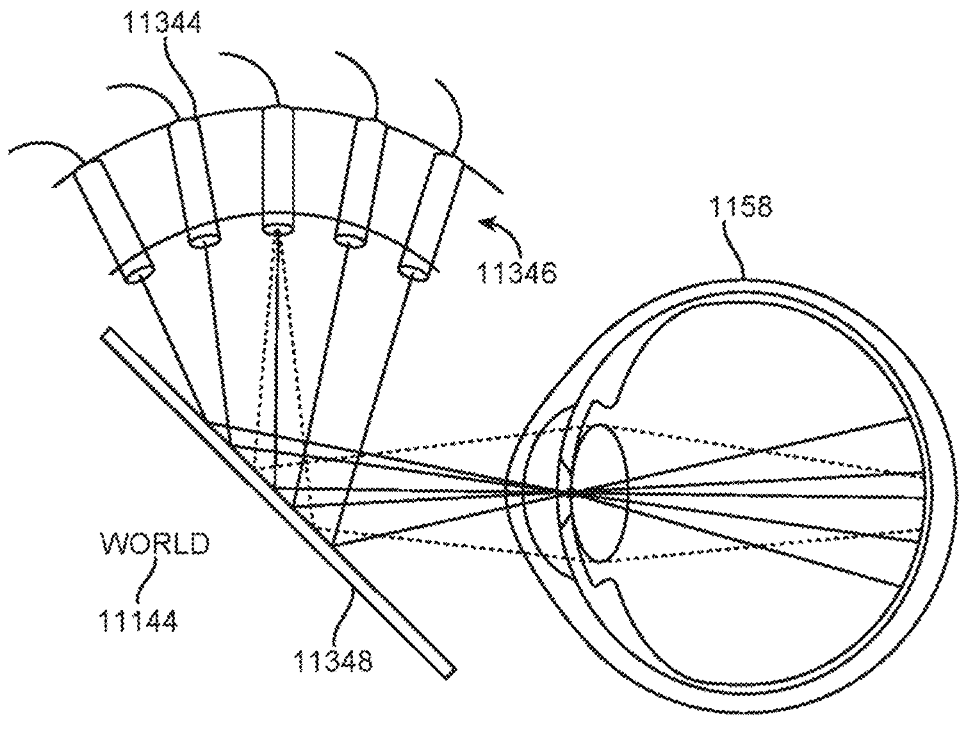
Figures 16E, 16F:
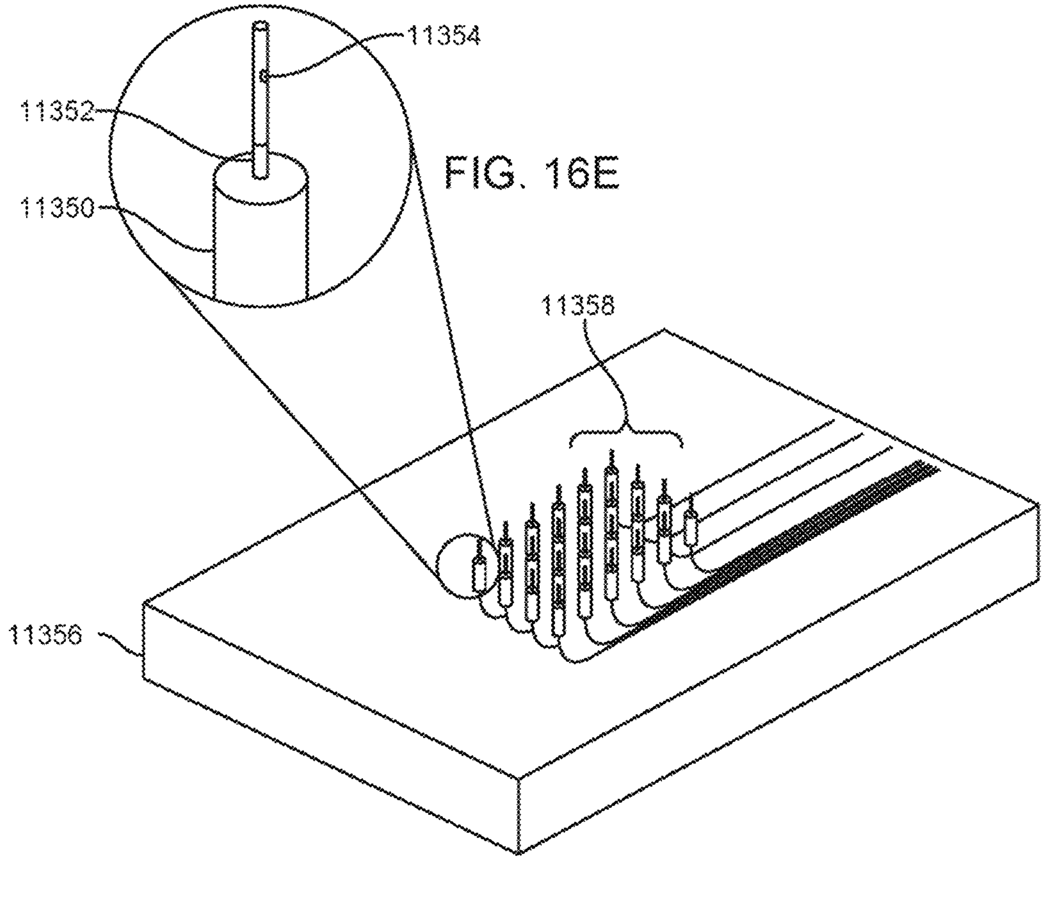
Figure 16G:
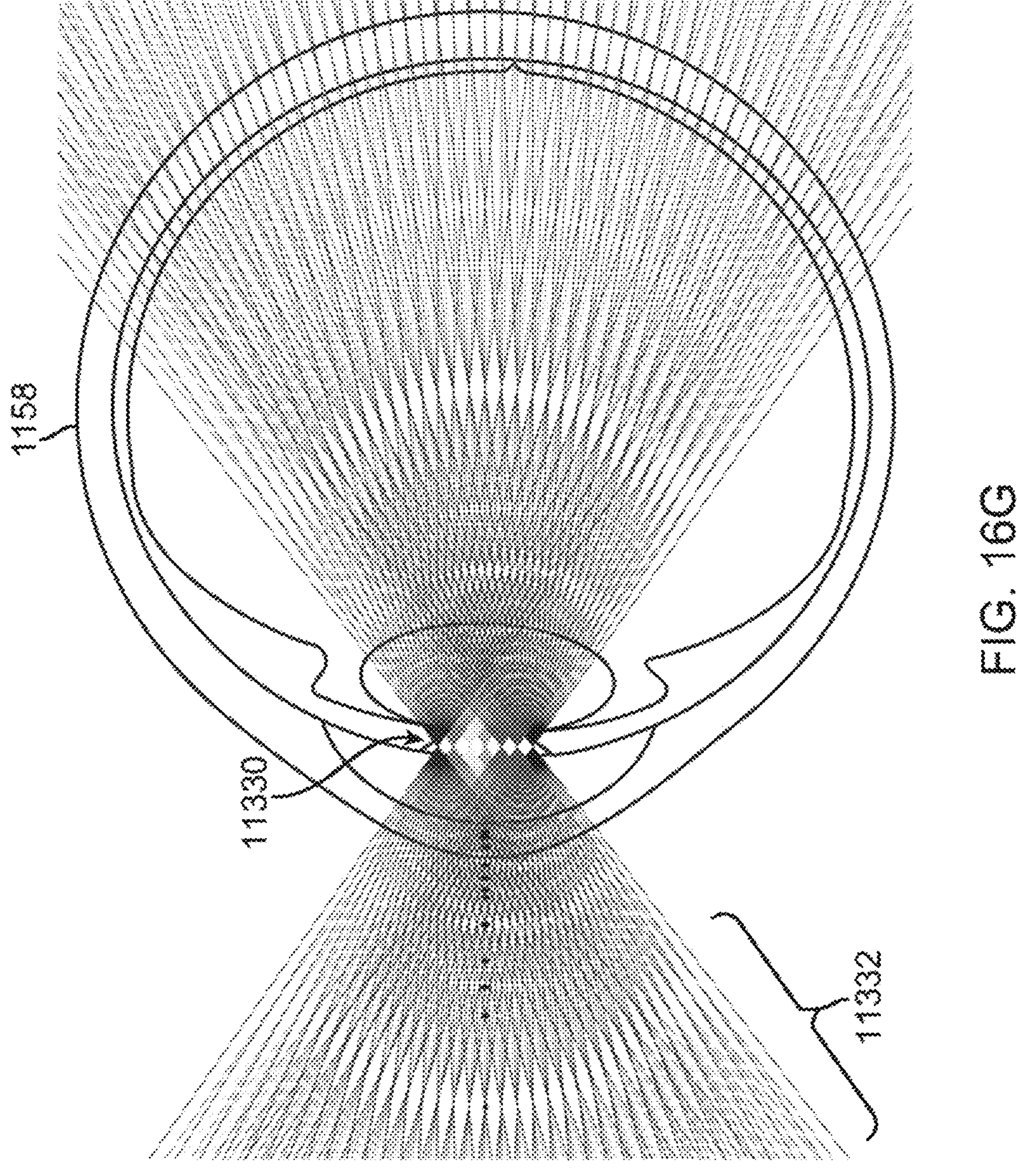
Figure 16H:
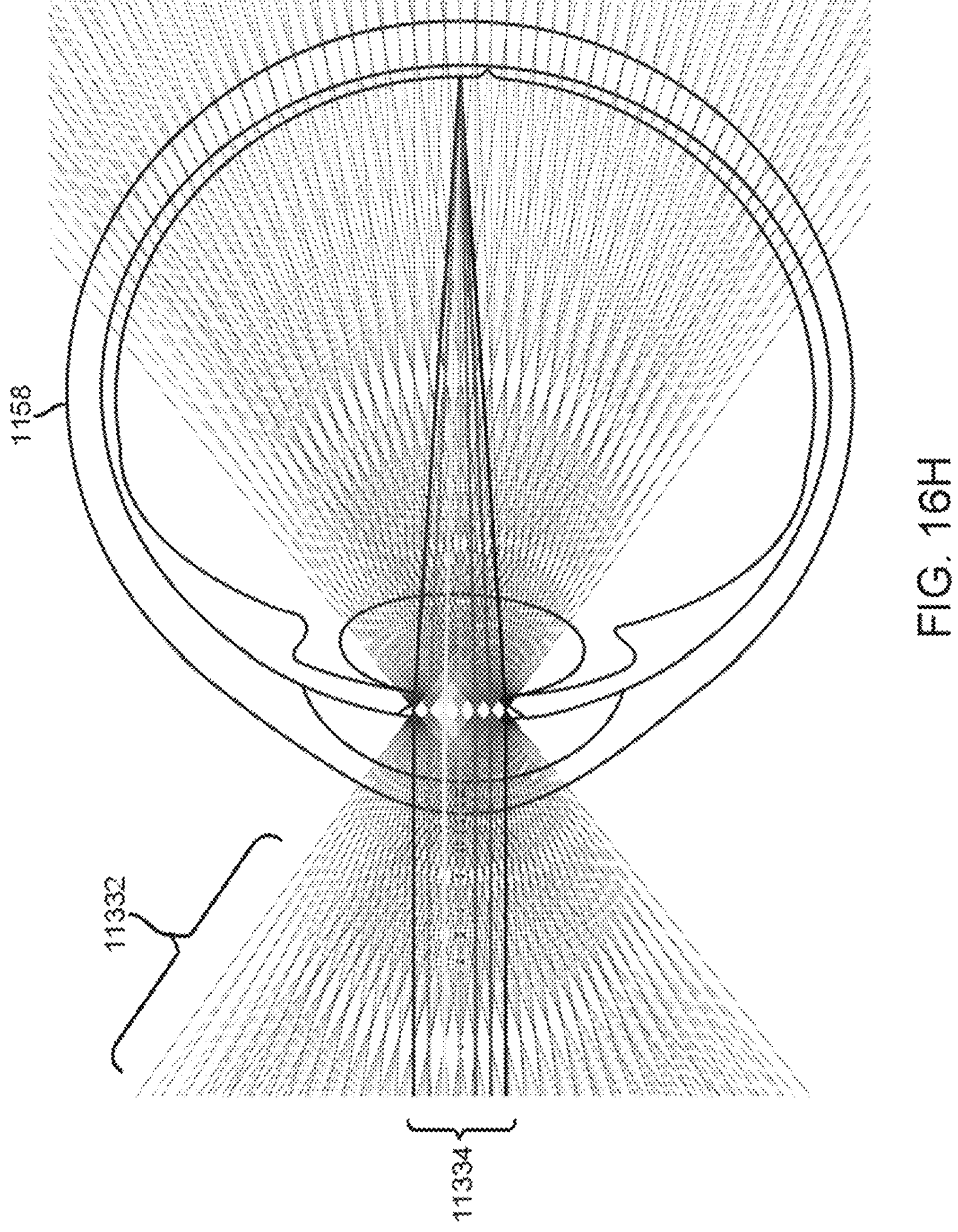

FIGS. 16A-I illustrate some non-limiting example configurations of an array of micro-projectors and schematics showing coupling the array of micro-projectors with an optical system in one or more embodiments. Referring to FIG. 16G, each of a multiplicity of incoming beamlets (11332) is passing through a small exit pupil (11330) relative to the eye 1158 in a discretized wavefront display configuration. Referring to FIG. 16H, a subset (11334) of the group of beamlets (11332) may be driven with matching color and intensity levels to be perceived as though they are part of the same larger-sized ray (the bolded subgroup (11334) may be deemed an "aggregated beam"). In this case, the subset of beamlets is parallel to one another, representing a collimated aggregate beam from optical infinity (such as light coming from a distant mountain). The eye is accommodated to infinity so the subset of beamlets is deflected by the eye's cornea and lens to all fall substantially upon the same location of the retina and are perceived to comprise a single in focus pixel.

Figure 16I:
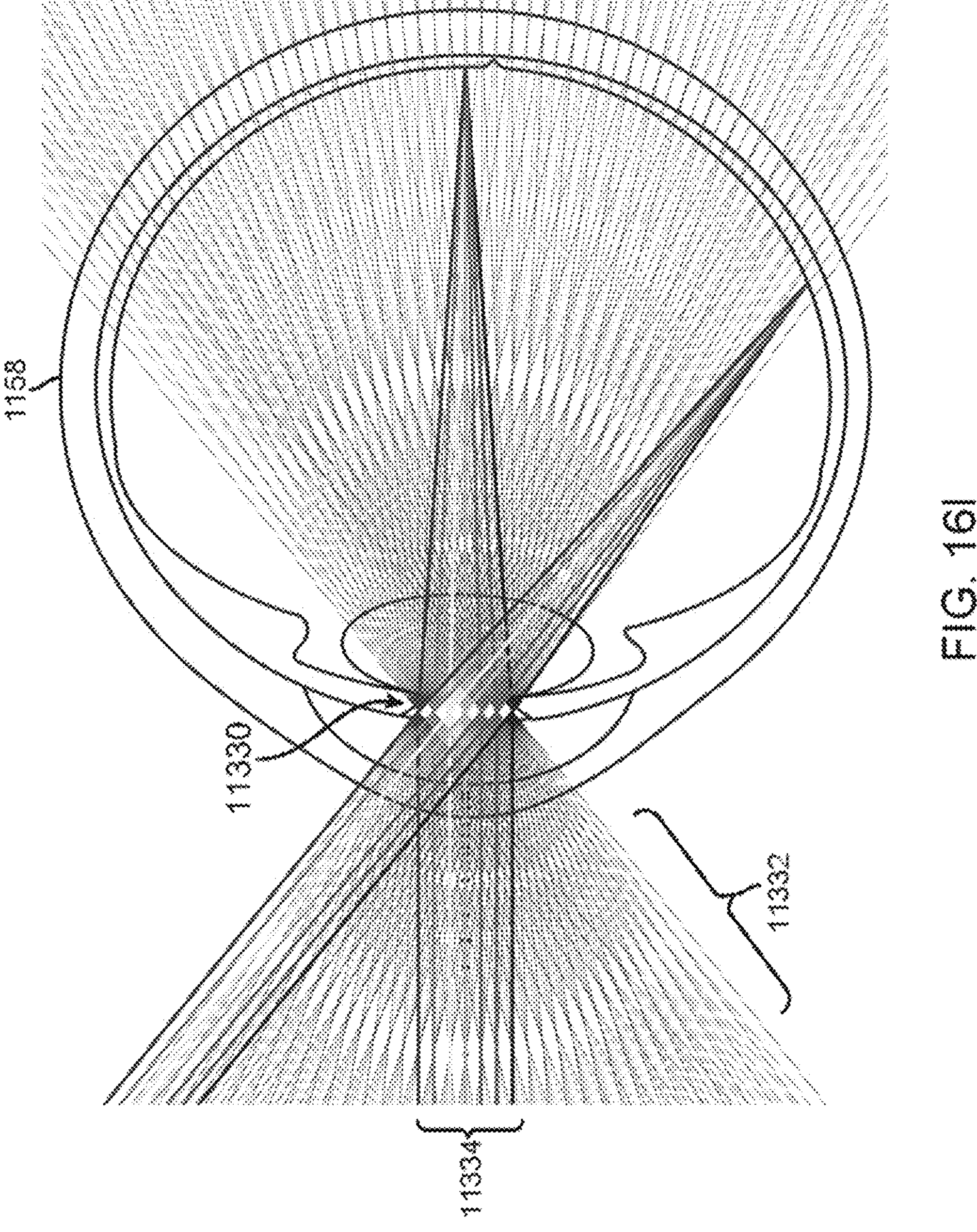

FIG. 16I shows another subset of beamlets representing an aggregated collimated beam (11336) coming in from the right side of the field of view of the user's eye 58 if the eye 1158 is viewed in a coronal-style planar view from above. Again, the eye is shown accommodated to infinity, so the beamlets fall on the same spot of the retina, and the pixel is perceived to be in focus. If, in contrast, a different subset of beamlets were chosen that were reaching the eye as a diverging fan of rays, those beamlets would not fall on the same location of the retina (and be perceived as in focus) until the eye were to shift accommodation to a near point that matches the geometrical point of origin of that fan of rays.

With regards to patterns of points of intersection of beamlets with the anatomical pupil of the eye (e.g., the pattern of exit pupils), the points of intersection may be organized in configurations such as a cross-sectionally efficient hex-lattice or a square lattice or other two-dimensional array. Further, a three-dimensional array of exit pupils could be created, as well as time-varying arrays of exit pupils.

Discretized aggregate wavefronts may be created using several configurations, such as an array of microdisplays or microprojectors placed optically conjugate with the exit pupil of viewing optics, microdisplay or microprojector arrays coupled to a direct field of view substrate (such as an eyeglasses lens) such that they project light to the eye directly, without additional intermediate viewing optics, successive spatial light modulation array techniques, or waveguide techniques.

Referring to FIG. 16A, in one embodiment, a stereoscopic (e.g., three-dimensional) or a four- or five-dimensional lightfield may be created by bundling a group of small projectors or display units (such as scanned fiber displays). FIG. 16A depicts a hexagonal lattice projection bundle 11338 which may, for example, create a 7 mm-diameter hex array with each fiber display outputting a sub-image (11340). If such an array has an optical system, such as a lens, placed in front of it such that the array is placed optically conjugate with the eye's entrance pupil, this will create an image of the array at the eye's pupil, as shown in FIG. 16B, which essentially provides the same optical arrangement as the embodiment of FIG. 16G.

Each of the small exit pupils of the configuration is created by a dedicated small display in the bundle 11338, such as a scanning fiber display. Optically, it is as though the entire hex array 11338 is positioned right into the anatomical pupil 1145 in some embodiments. Such embodiments may be used for driving different sub-images to different small exit pupils within the larger anatomical entrance pupil 1145 of the eye, comprising a superset of beamlets with a multiplicity of incident angles and points of intersection with the eye pupil. Each of the separate projectors or displays may be driven with a slightly different image, such that sub-images may be created that pull out different sets of rays to be driven at different light intensities and colors.

In one embodiment, a strict image conjugate may be created, as in the embodiment of FIG. 16B, wherein there is direct one-to-one mapping of the array 11338 with the pupil 1145. In another variation, the spacing may be changed between displays in the array and the optical system (lens 11342 in FIG. 16B) such that instead of receiving a conjugate mapping of the array to the eye pupil, the eye pupil may be catching the rays from the array at some other distance. With such a configuration, one would still get an angular diversity of beams through which one could create a discretized aggregate wavefront representation, but the mathematics regarding how to drive which ray and at which power and intensity may become more complex (although, on the other hand, such a configuration may be considered simpler from a viewing optics perspective). The mathematics involved with light field image capture may be leveraged for these calculations.

Referring to FIG. 16C, another lightfield creating embodiment is depicted wherein an array of micro-displays or micro-projectors 11346 may be coupled to a frame (11344), such as an eyeglasses frame. This configuration may be positioned in front of the eye 1158. The depicted configuration is a nonconjugate arrangement wherein there are no large-scale optical elements interposed between the displays (for example, scanning fiber displays) of the array 11346 and the eye 1158. One can imagine a pair of glasses, and coupled to those glasses are a plurality of displays, such as scanning fiber engines, positioned orthogonal to the eyeglasses surface, and all angled inward so they are pointing at the pupil of the user. Each display may be configured to create a set of rays representing different elements of the beamlet superset.

With such a configuration, at the anatomical pupil 1145 the user may receive a similar result as received in the embodiments discussed in reference to FIG. 16G, in which every point at the user's pupil is receiving rays with a multiplicity of angles of incidence and points of intersection that are being contributed from the different displays. FIG. 16D illustrates a nonconjugate configuration similar to that of FIG. 16C, with the exception that the embodiment of FIG. 16D features a reflecting surface (11348) to facilitate moving the display array 11346 away from the eye's 58 field of view, while also allowing views of the real world 11144 through the reflective surface (11348).

Another configuration for creating the angular diversity for a discretized aggregate wavefront display is presented. To optimize such a configuration, the sizes of the displays may be decreased to the maximum. Scanning fiber displays which may be utilized as displays may have baseline diameters in the range of 1 mm, but reduction in enclosure and projection lens hardware may decrease the diameters of such displays to about 0.5 mm or less, which is less disturbing for a user. Another downsizing geometric refinement may be achieved by directly coupling a collimating lens (which may, for example, comprise a gradient refractive index, or "GRIN", lens, a conventional curved lens, or a diffractive lens) to the tip of the scanning fiber itself in a case of a fiber scanning display array. For example, referring to FIG. 16E, a GRIN (gradient-index) lens (11354) is shown fused to the end of a single mode optical fiber. An actuator 11350, such as a piezoelectric actuator, may be coupled to the fiber 11352 and may be used to scan the fiber tip.

In another embodiment the end of the fiber may be shaped into a hemispherical shape using a curved polishing treatment of an optical fiber to create a lensing effect. In another embodiment a standard refractive lens may be coupled to the end of each optical fiber using an adhesive. In another embodiment a lens may be built from a dab of transmissive polymeric material or glass, such as epoxy. In another embodiment the end of an optical fiber may be melted to create a curved surface for a lensing effect.

FIG. 16F shows an embodiment wherein display configurations (e.g., scanning fiber displays with GRIN lenses, shown in close-up view of FIG. 16E) may be coupled together through a single transparent substrate 11356 preferably having a refractive index that closely matches the cladding of the optical fibers 11352 such that the fibers themselves are not substantially visible for viewing of the outside world across the depicted assembly. It should be appreciated that if the index matching of the cladding is done precisely, then the larger cladding/housing becomes transparent and only the small cores, which preferably are about three (3) microns in diameter, will be obstructing the view. In one embodiment the matrix 11358 of displays may all be angled inward so they are directed toward the anatomic pupil of the user (in another embodiment, they may stay parallel to each other, but such a configuration is less efficient).

It is appreciated that features and aspects of the various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

Various example embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosures.

All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications may be made without departing from the spirit and scope of the disclosure, as will be recognized by those skilled in the relevant art. The teachings provided herein of the various embodiments may be applied to other devices that implement VR, AR, MR, XR, or hybrid systems and/or which employ user interfaces, not necessarily the example optics systems or XR devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples may be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, may be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information may be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information may be embodied in any computer-readable medium for use by or in connection with an instruction execution system, apparatus, or device, such as a computer-based system, processor-containing system, or other system that may fetch the instructions from the instruction execution system, apparatus, or device and execute the instructions associated with logic and/or information.

In the context of this specification, a "computer-readable medium" may be any element that may store the program associated with logic and/or information for use by or in connection with the instruction execution system, apparatus, and/or device. The computer-readable medium may be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein may be performed with variations. For example, many of the methods may include additional acts, omit some acts, and/or perform acts in a different order than as illustrated or described.

The various embodiments described above may be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments may be modified, if necessary, to employ systems, circuits and concepts of the various patents, applications and publications to provide yet further embodiments.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above may be combined to provide further embodiments. Aspects of the embodiments may be modified, if necessary, to employ concepts of the various patents, applications and publications to provide yet further embodiments.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

APPENDIX

The contents of the references listed below are explicitly incorporated by reference in their entireties for all purposes.

Ankerst, M., Brennig, M. M., Kriegel, I. P., Sander, J.: Optics: ordering points to identify the clustering structure. ACM Sigmod record 28(2), 49 60 (1999)

Avetisyan, A., Dahnert, M., Dai, A., Savva, M., Chang, A. X., NieBuer, M.: Scan2cad: Learning cad model alignment in rgb-d scans. In: Proceedings of the IEEE Conference on Computer Vision and Pattern Recognition. pp. 2614 2623 (2019)

Ayad, H. G., Kamel, M. S.: Cumulative voting consensus method for partitions with variable number of clusters. IEEE transactions on pattern analysis and machine intelligence 30(1), 160-173 (2007)

Caron, M., Bojanowski, P., Joulin, A., Douze, M.: Deep clustering for unsuper-vised learning of visual features. In: Proceedings of the European Conference on Computer Vision (ECCV). pp. 132 149 (2018)

Choy, C., Gwak, J., Savarese, S.: 4d spatio-temporal convnets: Minkowski convolutional neural networks, In: Proceedings of the IEEE Conference on Computer Vision and Pattern Recognition. pp. 3075 3084 (2019)

Crocs, G. A.: A method for solving traveling salesman problems. Operations re-search 6(6), 791 812 (1958)

Dai. A., Ritchie, D., Bokeloh, M., Reed, S., Sturm, J., Nieβner, M.: Scancomplete: Large-scale scene completion and semantic segmentation for 3d scans. In: Proceedings of the IEEE Conference on Computer Vision and Pattern Recognition, pp. 4578 4587 (2018)

Dasgupta, S., Fang, K., Chen, K., Savarese, S.: Delay: Robust spatial layout estimation for cluttered indoor scenes. In: Proceedings of the IEEE conference on computer vision and pattern recognition. pp. 616 624 (2016)

Derpanis, K. G.: Mean shift clustering. Lecture Notes p. 32 (2005)

Dimitriadou, E., Weingessel, A., Hornik, K.: Voting-merging: An ensemble method for clustering. In: International Conference on Artificial Neural Networks, pp. 217 224. Springer (2001)

Exter, M., Kriegel, H. P., Sander, J., Xu, X., et al.: A density-based algorithm for discovering clusters in large spatial databases with noise. In: Kdd. vol. 96, pp. 226 231 (1996)

Fischler, M. A., Bolles, R. C.: Random sample consensus: a paradigm for model fitting with applications to image analysis and automated cartography. Communications of the ACM 24(6), 381 395 (1981)

Hartigan, J. A., Wong, M. A.: Algorithm as 136: A k-means clustering algorithm. Journal of the Royal Statistical Society. Series C (Applied Statistics) 28(1), 100 108 (1979)

He, K., Ckioxari, G., Dollár, P., Girshick, R.: Mask r-cnn. In: Proceedings of the IEEE international conference on computer vision. pp. 2961-2969 (2017)

He, K., Gkioxari, G., Dollar. P., Girshick, R.: Mask r-cnn. In: The IEEE International Conference on Computer Vision (ICCV) (October 2017)

Hsiao, C. W., Sun, C., Sun, M., Chen, H. T.: Flat2layout: Flat representation for estimating layout of general room types. arXiv preprint arXiv:1905.12571 (2019)

Iqbal, A. M., Moh'd. A., Khan, Z.: Semi-supervised clustering ensemble by voting. arXiv preprint arXiv: 1208.4138 (2012)

Jiacheng Chen, Chen Lin, J. W. Y. F.: Floor-sp: Inverse cad for floorplans by sequential room-wise shortest path. In: The IEEE International Conference on Computer Vision (ICCV) (2019)

Kruzhilov, I., Romanov, M., Konushin, A.: Double refinement network for room layout estimation (2019)

Lex, C. Y., Badrinarayanan, V., Malisiewicz. T., Rabinovich, A.: Roomnet: End-to-end room layout estimation. In: The IEEE International Conference on Computer Vision (ICCV) (October 2017)

Li. Y., Bu. R., Sun, M., Wu, W., Di. X., Chen, B.: Pointenn: Convolution on x-transformed points. In: Advances in neural information processing systems, pp. 820 830 (2018)

Lin. C., Wu. J., Furukawa. Y.: Floornet: A unified framework for floorplan reconstruction from 3d scans. In: Proceedings of the European Conference on Computer Vision (ECCV). pp. 201-217 (2018)

Liu, W., Anguelov. D., Erhan, D., Szegedy. C., Reed, S., Fu, C. Y., Berg, A. C: Ssd: Single shot multibox detector. In: European conference on computer vision. pp. 21 37. Springer (2016)

Moore, A. W.: Very fast em-based mixture model clustering using multiresolution kd-trees. In: Advances in Neural information processing systems. pp. 543-549 (1999)

Murali, S., Speciale, P., Oswald, M. R., Pollefeys, M.: Indoor sean2bim: Building information models of house interiors. In: 2017 IEEE/RSJ International Conference on Intelligent Robots and Systems (IROS). pp. 6126-6133. IEEE (2017)

Ng. A. Y., Jordan, M. I., Weiss, Y.: On spectral clustering: Analysis and an algorithm. In: Advances in neural information processing systems. pp. 849 856 (2002)

Phalak, A., Chen, Z., Yi, D., Gupta, K., Badrinarayanan, V., Rabinovich, A.: Deep-perimeter: Indoor boundary estimation from posed monocular sequences. arXiv preprint arXiv: 1904.11595 (2019)

Phan, A. V., Le Nguyen, M., Nguyen, Y. L. H., Bui, L. T.: Dgenn: A convolutional neural network over large-scale labeled graphs. Neural Networks 108, 533-543 (2018)

Qi, C. R., Litany, O., He, K., Guibas, L. J.: Deep hough voting for 3d object detection in point clouds. In: Proceedings of the IEEE International Conference on Computer Vision. pp. 9277-9286 (2019)

Qi. C. R., Su, H., Mo, K., Guibas, L. J.: Pointnet: Deep learning on point sets for 3d classification and segmentation. In: Proceedings of the IEEE conference on computer vision and pattern recognition. pp. 652-660 (2017)

Qi, C. R., Yi. L., Su. H., Guibas, L. J.: Pointnet ||: Deep hierarchical feature learning on point sets in a metric space. In: Advances in neural information processing systems. pp. 5099 5108 (2017)

Qi. X., Liao, R., Jia, J., Fidler, S., Urtasun, R.: 3d graph neural networks for rgbd semantic segmentation. In: Proceedings of the IEEE International Conference on Computer Vision. pp. 5199 5208 (2017)

Redmon, J., Divvala, S., Girshick, R., Farhadi, A.: You only look once: Unified, real-time object detection. In: Proceedings of the IEEE conference on computer vision and pattern recognition. pp. 779 788 (2016)

Ren, S., He, K., Girshick, R., Sun, J.: Faster r-cnn: Towards real-time object deter-tion with region proposal networks. In: Advances in neural information processing systems. pp. 91 99 (2015)

Schubert, E., Sander, J., Ester, M., Kriegel, H. P., Xu. X.: Dbscan revisited, revisited: why and how you should (still) use dbscan. ACM Transactions on Database Systems (TODS) 42(3), 1-21 (2017)

Shen, Y., Feng, C., Yang, Y., Tian, D.: Mining point cloud local structures by kernel correlation and graph pooling. In: Proceedings of the IEEE conference on computer vision and pattern recognition. pp. 1548 4557 (2018)

Shukla, A., Cheema, G. S., Anand, S.: Semi-supervised clustering with neural net-works, arXiv preprint arXiv: 1806.01547 (2018)

Tatarchenko, M., Dosovitskiy, A., Brox, T.: Octree generating networks: Efficient convolutional architectures for high-resolution 3d outputs. In: Proceedings of the IEEE International Conference on Computer Vision. pp. 2088-2096 (2017)

Wang, P. S., Liu, Y., Gno, Y. X., Sun, C. Y., Tong, X.: O-cnn: Octree-based convolutional neural networks for 3d shape analysis. ACM Transactions on Graphics (TOG) 36(4). 1 11 (2017)

Wang, Y., Sun, Y., Lin, Z., Sarma, S. E., Bronstein, M. M., Solomon, J. M.: Dynamic graph can for learning on point clouds. ACM Transactions on Graphics (TOG) 38(5). 1 12 (2019)

Xie, J., Girshick, R., Farhadi, A.: Unsupervised deep embedding for clustering analysis. In: International conference on machine learning. pp. 478-487 (2016)

Zhang, J., Kan, C., Schwing, A. G., Urtasun, R.: Estimating the 3d layout of indoor scenes and its clutter from depth sensors. In: Proceedings of the IEEE International Conference on Computer Vision. pp. 1273 1280 (2013)

Zhang, T., Ramakrishnan, R., Livny, M.: Birch: A new data clustering algorithm and its applications. Data Mining and Knowledge Discovery 1(2), 141-182 (1997)

Zhang, W., Zhang, W., Gu, J.: Edge-semantic learning strategy for layout estimation in indoor environment. IEEE transactions on cybernetics (2019)

Zhao, H., Shi, J., Qi, X., Wang, X., Jia, J.: Pyramid scene parsing network. In: Proceedings of the IEEE conference on computer vision and pattern recognition. pp. 2881 2890 (2017)

Zheng, J., Zhang, J., Li, J., Tang, R., Gao, S., Zhou, Z.: Structured3d: A large photo-realistic dataset for structured 3d modeling. arXiv preprint arXiv:1908.00222 (2019)

Zhou, Y., Tuzel, O.: Voxelnet: End-to-end learning for point cloud based 3d object detection. In: Proceedings of the IEEE Conference on Computer Vision and Pattern Recognition. pp. 4490-4499 (2018)

Zou, C., Colburn, A., Shan, Q., Hoiem, D.: Layoutnet: Reconstructing the 3d room layout from a single rgb image. In: Proceedings of the IEEE Conference on Computer Vision and Pattern Recognition, pp. 2051 2059 (2018)

The invention claimed is:

1. A method, comprising:

determining a plurality of entities in a higher-dimensional space from a plurality of images captured from the higher-dimensional space, wherein the higher-dimensional space has a dimensionality greater than two; and determining an indoor scene having one or more rooms or areas and one or more walls in the higher-dimensional space at least by:

determining one or more first labels for a first subset of entities of the plurality of entities and one or more wall labels for the one or more walls using at least the first subset;

determining, by a neural network, one or more room labels for the one or more rooms or areas based at least in part upon the one or more first labels;

generating one or more respective shapes for the one or more rooms or areas at least by jointly utilizing the one or more first labels, the one or more wall labels, or the one or more room labels;

determining the indoor scene from the plurality of entities based at least in part upon the one or more respective shapes; and generating a dataset for training the neural network at least by:

identifying a set of shapes, wherein a shape comprises a combination of bits on a binary kernel;

selecting a shape from the set based at least in part upon a constraint;

placing the shape in an occupancy grid in a grid space; and selecting a separate shape and placing the separate shape in an adjacent occupancy grid in the grid space.

2. The method of claim 1, wherein at least some images of the plurality of images are captured via a higher-dimensional scan of the higher-dimensional space that comprises the indoor scene.

3. The method of claim 1, wherein the indoor scene is determined at least by determining the one or more areas or rooms from the first subset of entities, and the one or more first labels and the one or more wall labels are concurrently determined in parallel using the neural network.

4. The method of claim 1, wherein a first label corresponds to an entity of the first subset of entities, and the entity corresponds to a vertex in the first subset of entities that is perceptually uniform.

5. The method of claim 1, wherein the neural network is used to concurrently output the one or more room labels and the one or more wall labels as an output using the first subset of entities as an input.

6. The method of claim 1, determining the one or more room labels comprising:

determining a second subset of entities from the plurality of entities; and obtaining, from a second subset entity in the second subset, two or more first data structures and one or more second data structures, wherein each second subset entity is used to cast at least two votes for the one or more rooms and at least one vote for the one or more walls.

7. The method of claim 6, determining the one or more room labels comprising:

determining whether the second subset entity belongs to a single room or area or more than one room or area based at least in part upon the two or more first data structures.

8. The method of claim 7, wherein the two or more first data structures are identical when the second subset entity belongs to the single room of the one or more rooms and are distinct when the second subset entity belongs to two or more different rooms; and a first data structure of the two or more first data structures is determined from the second subset entity to a predicted center of a room or area of the one or more rooms, and a second vector of the one or more second data structures is determined from the second subset entity to a center of a wall of the one or more walls.

9. The method of claim 7, determining the one or more room labels comprising:

obtaining a plurality of first data structures and a plurality of second data structures generated by using at least the second subset of entities; and clustering the plurality of first data structures or the plurality of second data structures respectively based at least in part upon respective spatial density distributions pertaining to the plurality of first data structures or the plurality of second data structures, wherein a vote cast by the second subset entity represents that the second subset entity is determined to be located within a room or area or along a wall.

10. The method of claim 1, further comprising:

training the neural network at least by providing the dataset to the neural network as an input and determining whether a predicted output generated by the neural network satisfies a criterion.

11. The method of claim 1, further comprising:

generating a super-room at least by assigning a single room identification to multiple shapes selected from the set and placed in the grid space.

12. A system, comprising:

a processor; and memory operatively coupled to the processor and storing a sequence of instructions which, when executed by the processor, causes the processor to perform a set of acts, the set of acts comprising:

determining a plurality of entities in a higher-dimensional space from a plurality of images captured from the higher-dimensional space, wherein the higher-dimensional space has a dimensionality greater than two; and determining an indoor scene having one or more rooms or areas and one or more walls in the higher-dimensional space at least by:

determining one or more first labels for a first subset of entities of the plurality of entities and one or more wall labels for the one or more walls using at least the first subset;

determining, by a neural network, one or more room labels for the one or more rooms or areas based at least in part upon the one or more first labels;

generating one or more respective shapes for the one or more rooms or areas at least by jointly utilizing the one or more first labels, the one or more wall labels, or the one or more room labels;

determining the indoor scene from the plurality of entities based at least in part upon the one or more respective shapes;

determining a second subset of entities from the plurality of entities;

obtaining, from a second subset entity in the second subset, two or more first data structures and one or more second data structures, wherein each second subset entity is used to cast at least two votes for the one or more rooms and at least one vote for the one or more walls; and determining whether the second subset entity belongs to a single room or area or more than one room or area based at least in part upon the two or more first data structures, wherein the two or more first data structures are identical when the second subset entity belongs to the single room of the one or more rooms and are distinct when the second subset entity belongs to two or more different rooms, and a first data structure of the two or more first data structures is determined from the second subset entity to a predicted center of a room or area of the one or more rooms, and a second data structure of the one or more second data structures is determined from the second subset entity to a center of a wall of the one or more walls.

13. The system of claim 12, wherein at least some images of the plurality of images are captured via a higher-dimensional scan of the higher-dimensional space that comprises the indoor scene.

14. The system of claim 12, wherein the indoor scene is determined at least by determining one or more areas or rooms from the first subset of entities, a first label corresponds to an entity of the first subset of entities, the entity corresponds to a vertex in the first subset of entities that is perceptually uniform, and the neural network is used to concurrently output the one or more room labels and the one or more wall labels as an output using the first subset of entities as an input.

15. A wearable extended reality device for generating a floorplan of an indoor scene, comprising:

an optical system having an array of micro-displays or micro-projectors to present digital contents to an eye of a user;

a processor coupled to the optical system; and memory operatively coupled to the processor and storing a sequence of instructions which, when executed by the processor, causes the processor to perform a set of acts, the set of acts comprising:

determining a plurality of entities in a higher-dimensional space from a plurality of images captured from the higher-dimensional space, wherein the higher-dimensional space has a dimensionality greater than two; and determining an indoor scene having one or more rooms or areas and one or more walls in the higher-dimensional space at least by:

determining one or more first labels for a first subset of entities of the plurality of entities and one or more wall labels for the one or more walls using at least the first subset;

determining, by a neural network, one or more room labels for the one or more rooms or areas based at least in part upon the one or more first labels;

generating one or more respective shapes for the one or more rooms or areas at least by jointly utilizing the one or more first labels, the one or more wall labels, or the one or more room labels;

determining the indoor scene from the plurality of entities based at least in part upon the one or more respective shapes;

determining a second subset of entities from the plurality of entities;

obtaining, from a second subset entity in the second subset, two or more first data structures and one or more second data structures, wherein each second subset entity is used to cast at least two votes for the one or more rooms and at least one vote for the one or more walls; and determining whether the second subset entity belongs to a single room or area or more than one room or area based at least in part upon the two or more first data structures, wherein the two or more first data structures are identical when the second subset entity belongs to the single room of the one or more rooms and are distinct when the second subset entity belongs to two or more different rooms, and a first data structure of the two or more first data structures is determined from the second subset entity to a predicted center of a room or area of the one or more rooms, and a second data structure of the one or more second data structures is determined from the second subset entity to a center of a wall of the one or more walls.

16. The wearable extended reality device of claim 15, wherein at least some images of the plurality of images are captured via a higher-dimensional scan of the higher-dimensional space that comprises the indoor scene.

17. The wearable extended reality device of claim 15, wherein the indoor scene is determined at least by determining one or more areas or rooms from the first subset of entities, a first label corresponds to an entity of the first subset of entities, the entity corresponds to a vertex in the first subset of entities that is perceptually uniform, and the neural network is used to concurrently output the one or more room labels and the one or more wall labels as an output using the first subset of entities as an input.

* * * * *